US009673855B2

(12) United States Patent
Branlund et al.

(10) Patent No.: US 9,673,855 B2
(45) Date of Patent: Jun. 6, 2017

(54) ADAPTIVE TRANSMISSION METHODS FOR MULTIPLE USER WIRELESS NETWORKS

(71) Applicant: The DIRECTV Group, Inc., El Segundo, CA (US)

(72) Inventors: Dale A. Branlund, Portola Valley, CA (US); Phillip L. Kelly, Sunnyvale, CA (US); Matthew C. Bromberg, Leominster, MA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 0 days.

(21) Appl. No.: 14/590,540

(22) Filed: Jan. 6, 2015

(65) Prior Publication Data

US 2015/0188604 A1 Jul. 2, 2015

Related U.S. Application Data

(63) Continuation of application No. 13/597,205, filed on Aug. 28, 2012, now Pat. No. 8,929,193, which is a
(Continued)

(51) Int. Cl.
*G01R 31/08* (2006.01)
*H04B 1/7103* (2011.01)
(Continued)

(52) U.S. Cl.
CPC ....... *H04B 1/7103* (2013.01); *H04B 1/71052* (2013.01); *H04L 25/03114* (2013.01);
(Continued)

(58) Field of Classification Search
CPC .............. H04B 1/7103; H04B 1/71052; H04B 2201/709709; H04L 25/03114;
(Continued)

(56) References Cited

U.S. PATENT DOCUMENTS 5,367,517 A * 11/1994 Cidon ................. H04L 12/5602
370/230
5,511,068 A * 4/1996 Sato ........................ H04J 13/00
370/335
(Continued)

FOREIGN PATENT DOCUMENTS

EP WO 02/071770 A1 * 9/2002 ............... H04Q 7/00

OTHER PUBLICATIONS

Santella, et al., "A Frequency and Symbol synchronization System for OFDM Signals", IEEE Trans on Vehicular Technology, vol. 49, No. 1, Jan. 2000, pp. 254-275.
(Continued)

*Primary Examiner* — Robert Wilson
(74) *Attorney, Agent, or Firm* — Pillsbury Winthrop Shaw Pittman LLP

(57) ABSTRACT

An exemplary wireless communication network that includes a base that communicates with remote units located in a cell of the network. The base concatenates information symbols with a preamble corresponding to a destination remote unit. One or more remote units communicating with the base each concatenates information symbols with a preamble corresponding to that remote unit. An adaptive receiver system for a base unit rapidly adapts optimal despreading weights for reproducing information symbols transmitted from multiple remote units. A transmitter system for a base unit concatenates information symbols with a preamble associated with a remote unit in the cell. An adaptive receiver system for a remote unit in a communication network rapidly adapts optimal weights for reproducing a signal transmitted to it by a specific base unit in the network.

23 Claims, 62 Drawing Sheets

Related U.S. Application Data continuation of application No. 11/532,857, filed on Sep. 18, 2006, now Pat. No. 8,254,241, which is a continuation of application No. 10/092,937, filed on Mar. 6, 2002, now Pat. No. 7,110,349.

(60) Provisional application No. 60/273,829, filed on Mar. 6, 2001.

(51) Int. Cl.
  *H04B 1/7105* (2011.01)
  *H04L 25/03* (2006.01)
  *H04W 72/04* (2009.01)
  *H04W 88/08* (2009.01)

(52) U.S. Cl.
  CPC ............... *H04W 72/0453* (2013.01); *H04B 2201/709709* (2013.01); *H04L 2025/03414* (2013.01); *H04W 88/085* (2013.01)

(58) Field of Classification Search
  CPC .... H04L 2025/03414; H04W 72/0453; H04W 88/085
  See application file for complete search history.

(56) References Cited

U.S. PATENT DOCUMENTS

| | | | |
|---|---|---|---|
| 5,592,490 A * | 1/1997 | Barratt | H01Q 1/246 370/310 |
| 5,710,768 A | 1/1998 | Ziv et al. | |
| 5,757,845 A | 5/1998 | Fukawa et al. | |
| 6,006,110 A * | 12/1999 | Raleigh | H01Q 3/2605 342/367 |
| 6,081,547 A * | 6/2000 | Miya | H04B 1/709 370/342 |
| 6,128,276 A | 10/2000 | Agee | |
| 6,144,711 A | 11/2000 | Raleigh et al. | |
| 6,289,062 B1 * | 9/2001 | Wang | H01Q 3/2605 375/232 |
| 6,366,761 B1 * | 4/2002 | Montpetit | H04B 7/195 370/230 |
| 6,480,506 B1 * | 11/2002 | Gubbi | H04W 72/0453 370/280 |
| 6,594,279 B1 * | 7/2003 | Nguyen | H04J 3/1617 370/229 |
| 6,625,138 B2 | 9/2003 | Karna et al. | |
| 6,834,039 B1 * | 12/2004 | Kelly | H01Q 1/1257 370/229 |
| 6,891,881 B2 | 5/2005 | Trachewsky et al. | |
| 6,898,204 B2 | 5/2005 | Trachewsky et al. | |
| 7,061,861 B1 * | 6/2006 | Mekkittikul | H04L 12/2852 370/230 |
| 7,076,015 B2 | 7/2006 | Bhatoolaul et al. | |
| 7,110,349 B2 * | 9/2006 | Branlund | H04B 1/71052 370/203 |
| 8,009,552 B2 * | 8/2011 | Branlund | H04W 74/002 370/208 |
| 8,254,241 B2 * | 8/2012 | Branlund | H04B 1/71052 370/203 |
| 8,755,475 B1 * | 6/2014 | Bromberg | H04L 25/0234 375/285 |
| 8,929,193 B2 * | 1/2015 | Branlund | H04B 1/71052 370/203 |
| 9,252,908 B1 * | 2/2016 | Branlund | H04J 14/00 |
| 2001/0001616 A1 * | 5/2001 | Rakib | H03M 13/256 375/259 |
| 2002/0115421 A1 * | 8/2002 | Shahar | H04L 5/1438 455/403 |
| 2002/0122411 A1 * | 9/2002 | Zimmerman | H04L 12/24 370/349 |
| 2005/0089064 A1 * | 4/2005 | Zimmerman | H04Q 11/0478 370/468 |
| 2008/0253394 A1 * | 10/2008 | Spinar | H04W 28/20 370/468 |
| 2012/0320834 A1 * | 12/2012 | Branlund | H04B 1/71052 370/328 |
| 2015/0188604 A1 * | 7/2015 | Branlund | H04B 1/71052 370/329 |

OTHER PUBLICATIONS

Speth, et al., "Optimum Receiver Design for OFDM-Based Broadband Transmission, Part II: A Case Study", IEEE Trans. on Communications, vol. 49, No. 4, Apr. 2001, pp. 571-578.

* cited by examiner

| Band | Bandwidth (MHz) | Subbands | Guard Bands (MHz) |
|---|---|---|---|
| WCS (A & B) | 2 x 5 | 3 | 0.625 |
| WCS (C/D) | 2 x 5 | 2 | 1.250 |
| MMDS | 2 x 12 | 8 | 1.000 |

FIG. 54

| Band of Interest | Channel Bandwidth (MHz) | Number of Subbands | Active Bandwidth (MHz) | Guard Band on each side of active band (MHz) |
|---|---|---|---|---|
| UHF, WCS PCS | 5 | 3 | 3.75 | 0.625 |
| | 10 | 7 | 8.75 | 0.625 |
| | 15 | 10 | 12.5 | 1.25 |
| MMDS | 3 | 2 | 2.5 | 0.25 |
| | 6 | 4 | 5 | 0.5 |
| | 12 | 8 | 10 | 1 |
| 3.5 GHz | 3.5 | 2 | 2.5 | 0.5 |
| | 7 | 4 | 5 | 1 |
| | 14 | 8 | 10 | 2 |
| 3.65 GHz | 25 | 16 | 20 | 2.5 |

FIG. 55

| Tone per burst | 16 | 16 | 16 | 16 | 16 | 16 |
|---|---|---|---|---|---|---|
| Information bits per tone | 4 | 4 | 3 | 3 | 2 | 2 |
| Bits per burst | 64 | 64 | 48 | 48 | 32 | 32 |
| Bursts per slot | 5 | 4 | 5 | 4 | 5 | 4 |
| Bits per bearer slot | 320 | 256 | 240 | 192 | 160 | 128 |
| Bits per frame | 1600 | 1280 | 1200 | 960 | 800 | 640 |
| Partition rate (kbps) | 80 | 64 | 60 | 48 | 40 | 32 |
| Full rate (kbps) | 1920 | 1536 | 1440 | 1152 | 960 | 768 |

FIG. 56

| $i_1$ \ $i_0$ | $i_0$=0 | $i_0$=1 | $i_0$=2 | $i_0$=3 | $i_0$=4 | $i_0$=5 | $i_0$=6 | $i_0$=7 | ... | $i_0$=62 | $i_0$=63 |
|---|---|---|---|---|---|---|---|---|---|---|---|
| $i_1$=0 | X | a=0 | a=64 | a=128 | a=192 | ... | a=3712 | a=3776 | a=3840 | a=3904 | a=3968 |
| $i_1$=1 | a=3969 | X | a=1 | a=65 | a=129 | ... | a=3649 | a=3713 | a=3777 | a=3841 | a=3905 |
| $i_1$=2 | a=3906 | a=3970 | X | a=2 | a=66 | ... | a=3586 | a=3650 | a=3714 | a=3778 | a=3842 |
| $i_1$=3 | a=3843 | a=3907 | a=3971 | X | a=3 | ... | a=3523 | a=3587 | a=3651 | a=3715 | a=3779 |
| $i_1$=4 | a=3780 | a=3844 | a=3908 | a=3972 | X | ... | a=3460 | a=3524 | a=3588 | a=3652 | a=3716 |
| $i_1$=5 | ... | ... | ... | ... | ... | ... | ... | ... | ... | ... | ... |
| $i_1$=6 | a=315 | a=379 | a=443 | a=507 | a=571 | ... | X | a=59 | a=123 | a=187 | a=251 |
| $i_1$=7 | a=252 | a=316 | a=380 | a=444 | a=508 | ... | a=4028 | X | a=60 | a=124 | a=188 |
| ... | a=189 | a=253 | a=317 | a=381 | a=445 | ... | a=3965 | a=4029 | X | a=61 | a=125 |
| $i_1$=62 | a=126 | a=190 | a=254 | a=318 | a=382 | ... | a=3902 | a=3966 | a=4030 | X | a=62 |
| $i_1$=63 | a=63 | a=127 | a=191 | a=255 | a=319 | ... | a=3839 | a=3903 | a=3967 | a=4031 | X |

FIG. 57

```
function fli = make_fli (codeword_descriptor)
% function fli = make_fli (codeword_descriptor)
% Synthesize a scaled 16 by 1 FLI codeword.
% 0 <= codeword_descriptor < 4096

% select the octal digits from the codeword descriptor
i0 = bitand (codeword_descriptor, -7);
i1 = bitand (bitshift (codewortd_descriptor, -3), 7);
i2 = bitand (bitshift (codeword_descriptor, -6), 7);
i3 = bitand (bitshift (codeword_descriptor, -9), 7);
generatingVector = [i0, i1, i2, i3] % generating vector % the following kronecker basis function provides 4096 total codes
% and is based on an 8-star constellation
h = [ ...
      1.1923+0.2372j,  2.0960+0.4169j,  1.1923+0.2372j,  2.0960+0.4169j, ...
      1.1923+0.2372j,  2.0960+0.4169j,  1.1923+0.2372j,  2.0960+0.4169j; ...
      2.0960+0.4169j,  0.6754+1.0108j,-0.4169+2.0960j,-1.0108+0.6754j, ...
     -2.0960+0.4169j,-0.6754-1.0108j,  0.4169-2.0960j,  1.0108 -0.6754j;

% make the kronecker codeword
fli = 1;
for jj=1:4
       fli = kron (h(:, generatingVector(jj)+1), % matlab is one based
end % quantize the codeword
fli = round (fli);
```

FIG. 58

```
760                                                        762
% fls_super_results_12.m
% Lower 12 bits are the base tones, upper 4 bits are the superframe tones.
% First index (row) is the base, second (column) is the superframe
```

| Codeword = [ ... |
|---|
| 23125 39509 27221 55893  6741 43605 47701 10837 51797 31317 59989 19029; ... |
| 40269 36173 64845 44365 56653 11597 48461 15693 27981 60749 52557 32077; ... |
| 47781 60069 27301 15013 10917 39589 51877  2725 35493 19109 43685 55973; ... |
| 13669 54629  5477 34149 62821 21861  9573 38245 42341 46437 30053 50533; ... |
| 27309 10925 55981 43693 47789 51885  6829 35501 15021 19117 39597 23213; ... |
| 21813 38197 34101  5429 42293 54581  9525 62773 46389 17717 50485 58677; ... |
| 27477 56149 11093 43861 19285 39765  6997 23381 52053 35669 60245 47957; ... |
| 42389 17813 46485 50581 21909  1429  9621 62869 30101 45677 26005 58773; ... |
| 42709 38613 46805 14037 18133 50901  5845 22229 54997 59093 34517 30421; ... |
| 38217 46409 25929 42313  5449  9545 50505 13641 54601 17737 21833 30025; ... |
|  4693 12885 21077 16981 53845 41557 49749 62037 45653 29269 25173 37461; ... |
| 59049 34473  5801  9897 54953 13993 26281 18089 38569 42665 46761 50857; ... |
| ]; |

```
%  5A55 9A55 6A55 DA55 1A55 AA55 BA55 2A55 CA55 7A55 EA55 4A55
%  9D4D 8D4D FD4D AD4D DD4D 2D4D BD4D 3D4D 6D4D ED4D CD4D 7D4D
%  BAA5 EAA5 6AA5 3AA5 2AA5 9AA5 CAA5 0AA5 8AA5 4AA5 AAA5 DAA5
%  3565 D565 1565 8565 F565 5565 2565 9565 A565 B565 7565 C565
%  6AAD 2AAD DAAD AAAD BAAD CAAD 1AAD 8AAD 3AAD 4AAD 9AAD 5AAD
%  5535 9535 8535 1535 A535 D535 2535 F535 B535 4535 C535 E535
%  6B55 DB55 2B55 AB55 4B55 9B55 1B55 5B55 CB55 8B55 EB55 BB55
%  A595 4595 B595 C595 5595 0595 2595 F595 7595 D595 6595 E595
%  A6D5 96D5 B6D5 36D5 46D5 C6D5 16D5 56D5 D6D5 E6D5 86D5 76D5
%  9549 B549 6549 A549 1549 2549 C549 3549 D549 4549 5549 7549
%  1255 3255 5255 4255 D255 A255 C255 F255 B255 7255 6255 9255
%  E6A9 86A9 16A9 26A9 D6A9 36A9 66A9 46A9 96A9 A6A9 B6A9 C6A9
```

Nb = 12; % Number of tones in base
Ns =  4; % Number of tones in superframe sequence
Nt = 16; % Total number of tones

```
function fls = make_fls (base, superframe)
% function fls = make_fls (base, superframe)
% base is the base offset code and varies from 0 to 11
% superframe is the slot sequence number and varies from 0 to 11 fls_super_results_12 % read in the codeword descriptor array t = zeros (Nt, 1);
for jj=1:Nt
        t(jj) = 2^(jj-1); % form a vector of walking ones
end cw = codeword (base+1, superframe+1); % select codeword descriptor
bv = (bitand(cw,t) ~= 0) * 2 - 1; % make BPSK vector
fls = (15 + 15j) * bv; % scale the BPSK vector
```

| Partition | | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|---|---|
| Frame | Slot | Burst | | | | | | | | | | | | | | | | | | | | | | | | | |
| 0 | 0 | 0 3 | 01 | | 10 | | | 01 | | | 10 | | | 01 | | | 10 | | | 01 | | | 10 | | | | |
| 0 | 1 | 0 3 | | | | | | | | | | | | | | | | | | | | | | | | | | |
| 0 | 2 | 0 3 | | 23 | | 32 | | | 23 | | | 32 | | | 23 | | | 32 | | | 23 | | | 32 | | | |
| 0 | 3 | 0 3 | | | | | | | | | | | | | | | | | | | | | | | | | | |
| 0 | 4 | 0 3 | | | 45 | | | 54 | | | 45 | | | 54 | | | 45 | | | 54 | | | 45 | | | 54 | |
| 0 | 5 | 0 3 | | | | | | | | | | | | | | | | | | | | | | | | | | |
| 1 | 6 | 0 3 | 76 | | | 67 | | | 76 | | | 67 | | | 76 | | | 67 | | | 76 | | | 67 | | | |
| 1 | 7 | 0 3 | | | | | | | | | | | | | | | | | | | | | | | | | | |
| 1 | 8 | 0 3 | | 98 | | | 89 | | | 98 | | | 89 | | | 98 | | | 89 | | | 98 | | | 89 | | |
| 1 | 9 | 0 3 | | | | | | | | | | | | | | | | | | | | | | | | | | |
| 1 | 10 | 0 3 | | | 11 10 | | | 10 11 | | | 11 10 | | | 10 11 | | | 11 10 | | | 10 11 | | | 11 10 | | | 10 11 | |
| 1 | 11 | 0 3 | | | | | | | | | | | | | | | | | | | | | | | | | | |
| 2 | 12 | 0 3 | 01 | | | 10 | | | 01 | | | 10 | | | 01 | | | 10 | | | 01 | | | 10 | | | |
| 2 | 13 | 0 3 | | | | | | | | | | | | | | | | | | | | | | | | | | |
| 2 | 14 | 0 3 | | 23 | | 32 | | | 23 | | | 32 | | | 23 | | | 32 | | | 23 | | | 32 | | | |
| 2 | 15 | 0 3 | | | | | | | | | | | | | | | | | | | | | | | | | | |
| 2 | 16 | 0 3 | | | 45 | | | 54 | | | 45 | | | 54 | | | 45 | | | 54 | | | 45 | | | 54 | |
| 2 | 17 | 0 3 | | | | | | | | | | | | | | | | | | | | | | | | | | |
| 3 | 18 | 0 3 | 76 | | | 67 | | | 76 | | | 67 | | | 76 | | | 67 | | | 76 | | | 67 | | | |
| 3 | 19 | 0 3 | | | | | | | | | | | | | | | | | | | | | | | | | | |
| 3 | 20 | 0 3 | | 98 | | | 89 | | | 98 | | | 89 | | | 98 | | | 89 | | | 98 | | | 89 | | |
| 3 | 21 | 0 3 | | | | | | | | | | | | | | | | | | | | | | | | | | |
| 3 | 22 | 0 3 | | | 11 10 | | | 10 11 | | | 11 10 | | | 10 11 | | | 11 10 | | | 10 11 | | | 11 10 | | | 10 11 | |
| 3 | 23 | 0 3 | | | | | | | | | | | | | | | | | | | | | | | | | | |

| Burst -> | 0 | 1 | 2 | 3 | 4 |
|---|---|---|---|---|---|
| Time slot counter modulo 6 | Partition in which the RU is directed to send an RLI ||||
| 0 | 20 | 2 | 8 | 14 | 20 |
| 1 | 3 | 9 | 15 | 21 | 3 |
| 2 | 10 | 16 | 22 | 4 | 10 |
| 3 | 17 | 23 | 5 | 11 | 17 |
| 4 | 0 | 6 | 12 | 18 | 0 |
| 5 | 13 | 19 | 1 | 7 | 13 |
FIG. 64
| Burst -> | 0 | 1 | 2 | 3 | 4 |
|---|---|---|---|---|---|
| Time slot counter modulo 6 | Partition in which the RU is directed to send an RLI ||||
| 0 | 8 | 11 | 2 | 5 | 8 |
| 1 | 3 | 6 | 9 | 0 | 3 |
| 2 | 10 | 1 | 4 | 7 | 10 |
| 3 | 5 | 8 | 11 | 2 | 5 |
| 4 | 0 | 3 | 6 | 9 | 0 |
| 5 | 1 | 4 | 7 | 10 | 1 |
FIG. 65
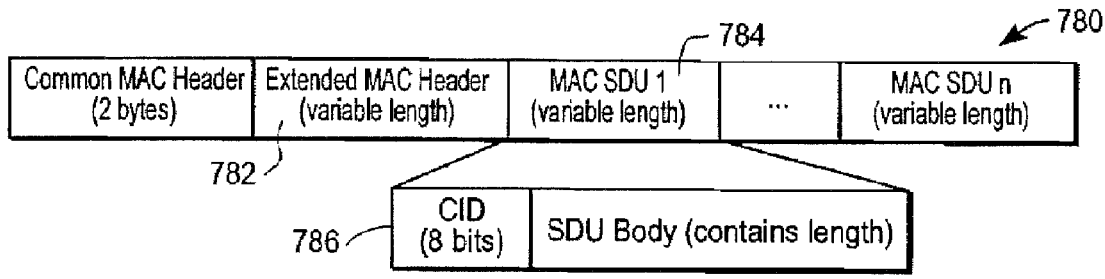
FIG. 66
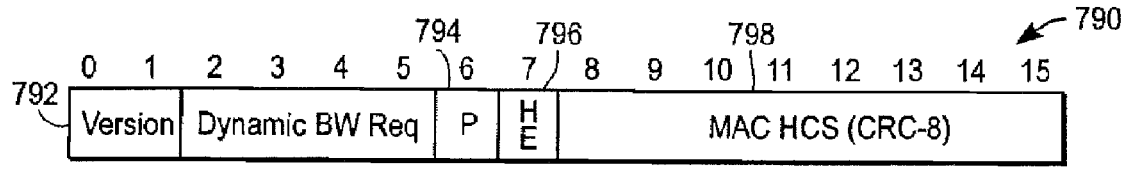
FIG. 67
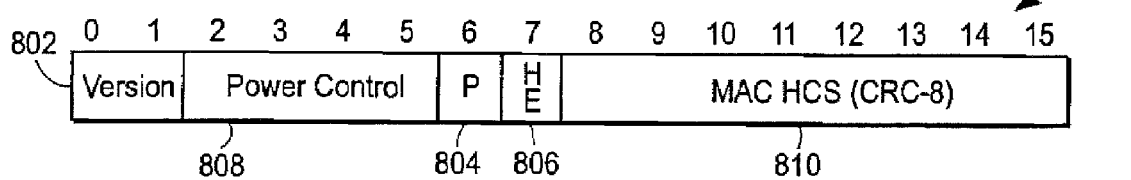
FIG. 68

- L = Last Segment

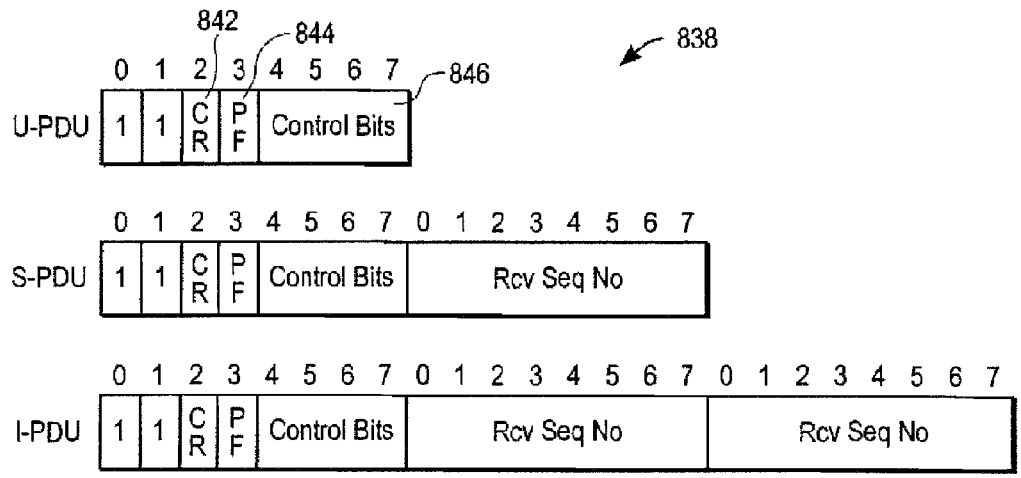

FIG. 72

| Modulation Order | 4 Bits/Sym | | 3 Bits/Sym | | 2 Bits/Sym | |
|---|---|---|---|---|---|---|
| Link Direction | Forward | Reverse | Forward | Reverse | Forward | Reverse |
| Bits/Symbol | 4 | 4 | 3 | 3 | 2 | 2 |
| Symbols/Burst | 16 | 16 | 16 | 16 | 16 | 16 |
| Bursts/Slot | 5 | 5 | 5 | 4 | 5 | 4 |
| Bits/Slot | 320 | 256 | 240 | 192 | 160 | 128 |
| Bytes/Slot | 40 | 32 | 30 | 24 | 20 | 16 |
| Slots/Frame | 5 | 5 | 5 | 5 | 5 | 5 |
| Bits/Frame | 1600 | 1280 | 1200 | 960 | 800 | 640 |
| Bytes/Frame | 200 | 160 | 150 | 120 | 100 | 80 |
| Viterbi Tail Byte(*) | 1 | 1 | 1 | 1 | 1 | 1 |
| RS Check Bytes | 28 | 28 | 18 | 18 | 10 | 10 |
| Common MAC Header | 2 | 2 | 2 | 2 | 2 | 2 |
| MAC SDU Header | .169 | 129 | 129 | 99 | 87 | 67 |
| Data SDU Header | 6 | 6 | 6 | 6 | 6 | 6 |
| Data Payload | 163 | 123 | 123 | 93 | 81 | 61 |
| Data Rate/Partition, kbps | 65.2 | 49.2 | 49.2 | 37.2 | 32.4 | 24.4 |
| Partitions/Subband | 24 | 24 | 24 | 24 | 24 | 24 |
| Data Rate/Subband, kbps | 1564.8 | 1180.8 | 1180.8 | 892.8 | 777.6 | 585.6 |
| Subband Data Rate/T1 | 1.02 | 0.77 | 0.77 | 0.58 | 0.51 | 0.38 |

FIG. 73

| Modulation Order | 4 Bits/Sym | | 3 Bits/Sym | | 2 Bits/Sym | | |
|---|---|---|---|---|---|---|---|
| Link Direction | Forward | Reverse | Forward | Reverse | Forward | Reverse | |
| Entry Slot | – | – | – | – | – | – | |
| Bearer Slot 1 | 40 | 32 | 30 | 24 | 20 | 16 | 10 ms |
| Bearer Slot 2 | 40 | 32 | 30 | 24 | 20 | 16 | |
| Common MAC Header | 2 | 2 | 2 | 2 | 2 | 2 | |
| Mac SDU Length | 78 | 62 | 58 | 46 | 38 | 30 | |
| Bearer Slot 3 | 40 | 32 | 30 | 24 | 20 | 16 | |
| Bearer Slot 4 | 40 | 32 | 30 | 24 | 20 | 16 | 10 ms |
| Bearer Slot 5(*) | 39 | 31 | 29 | 23 | 19 | 15 | |
| Common MAC Header | 2 | 2 | 2 | 2 | 2 | 2 | |
| MAC SDU Length | 117 | 93 | 87 | 69 | 57 | 45 | |

(*) Viterbi tail byte occurs in the 5th bearer slot.

FIG. 76

| Frame Duration | 20ms | | | 10 ms | | |
|---|---|---|---|---|---|---|
| Vocoder | G.711 | G.726 | G.729 | G.711 | G.726 | G.729 |
| Bit Rate, kbps | 64.0 | 32.0 | 8.0 | 64.0 | 32.0 | 8.0 |
| Voice Bytes | 160 | 80 | 20 | 80 | 40 | 10 |
| VoIP Overhead(*) | 16 | 16 | 16 | 3 | 3 | 3 |
| VoIP Payload Size | 176 | 96 | 36 | 83 | 43 | 13 |
| Voice SDU Header | 2 | 2 | 2 | 3 | 3 | 3 |
| 4 Bits/Sym | | | | | | |
| SDU Size Limit (RL) | 129 | 129 | 129 | 62 | 62 | 62 |
| No. Partitions | 2 | 1 | 1/3 | 2 | 1 | 1/3 |
| SDU Size | 90x2 | 98 | 38 | 45+44 | 46 | 16 |
| 3 Bits/Sym | | | | | | |
| SDU Size Limit (RL) | 99 | 99 | 99 | 46 | 46 | 46 |
| No. Partitions | 2 | 1 | 1/2 | 2 | 1 | 1/2 |
| SDU Size | 90x2 | 98 | 38 | 45+44 | 46 | 16 |
| 2 Bits/Sym | | | | | | |
| SDU Size Limit (RL) | 67 | 67 | 67 | 30 | 30 | 30 |
| No. Partitions | 3 | 2 | 1 | 4 | 2 | 1 |
| SDU Size | 61x2+60 | 50x2 | 38 | 24x3+23 | 25+24 | 16 |

(*) Include RTP, UDP, IP, PPPoE, and Ethernet

FIG. 77

1. Event = MA_UnitData.Request
SendRLA; Set ReplyCounter; RLAMiss=0;

2. Event = ReplyTimer > 0
ReplyCounter--;

3. Event = ReplyCounter = 0
RLAMiss++; BORetry--;
BOCounter=Ran(MIN+2^RLAMiss*Win);

4. Event = BOCounter>0
BOCounter--;

5. Event = BOCounter=0 & BORetry>0
RLAMiss=0; SendRLA; Set ReplyCounter

6. Event = BOCounter=0 & BORetry>0
Issue access failure signal; Reset BORetry;

7. Event = FLIRcvd or FLARcvd
Start PE to add partition; wait for partition open 8. Event = PE Success 9. Event = PE Fail
Issue access failure signal (?)

10. Event = Delete last partition
Start PE to delete partition;

11. Event = FLIRcvd or FLARcvd
Start PE to add partition

12. Event = ActiveOffTimeout
Reinitialize encryption/scrambling engines (call PE)

13. Event = MA_UnitData.Request
PE_SendData

14. Event = FLBRcvd
PE_UnitData.Indication

FIG. 90

| RUID | RU1 | RU5 | ... | RU500 |
|---|---|---|---|---|
| Backlog | 1 | 12 | ... | 1 |
| Partition 0 | 1 | 1 | | 0 |
| Partition 1 | 0 | 1 | | 0 |
| ... | ... | ... | ... | ... |
| Partition 23 | 1 | 0 | | 0 |
| CHANGE | -2 | 0 | | +1 |

| Condition | message | Base starting state | Base action | Prob | Base next state | channel | RU start state | RU action | Prob | RU next state |
|---|---|---|---|---|---|---|---|---|---|---|
| normal | FLI | closed | send FLI | | starting | pass FLI | closed | detect FLI | 1-Pm(FLI) | starting |
| | RLI | starting | detect RLI | 1-Pm(RLI) | starting | pass RLI | starting | send RLI | | starting |
| | FLT | starting | send FLT | | starting | pass FLT | starting | detect FLT | 1-Pm(FLT) | starting |
| | RLI | starting | detect RLI | 1-Pm(RLI) | open | pass RLI | starting | send RLI | | starting |
| | FLT | open | send FLT | | open | pass FLT | starting | detect FLT | 1-Pm(FLT) | open |
| | | | encr = 2 or more | 0.99997 | | | | encr = 2 or more | 0.99458 | |

Pm_FLI
Pf_FLI
Pm_FLT
Pf_FLT
Pm_RLI
Pf_RLI

FIG. 95

| Condition | message | Base starting state | Base action | Prob | Base next state | channel | RU start state | RU action | Prob | RU next state |
|---|---|---|---|---|---|---|---|---|---|---|
| RU false detects FLI and misses both FLTs | FLI | closed | skip FLI | | closed | empty | closed | detect FLI | Pf(FLI) | starting |
| | RLI | closed | miss RLI | 1 | closed | pass RLI | starting | send RLI | | starting |
| | FLT | closed | skip FLT | | closed | empty | starting | skips FLT | 1-Pf(FLT) | starting |
| | RLI | closed | miss RLI | 1 | closed | pass RLI | starting | send RLI | | starting |
| | FLT | open | skip FLT | | closed | empty | starting | skips FLT | 1-Pf(FLT) | closed |
| | | | encr = 0 | 1.00000 | | | | encr = 2 | 9.98E-07 | |

FIG. 96

| Condition | message | Base starting state | Base action | Prob | Base next state | channel | RU start state | RU action | Prob | RU next state |
|---|---|---|---|---|---|---|---|---|---|---|
| RU misses both FLTs | FLI | closed | send FLI | | starting | pass FLI | closed | detect FLI | 1-Pm(FLI) | starting |
| | RLI | starting | detect RLI | 1-Pm(RLI) | starting | pass RLI | starting | send RLI | | starting |
| | FLT | starting | send FLT | | starting | stop FLT | starting | miss FLT | Pm(FLT) | starting |
| | RLI | starting | detect RLI | 1-Pm(RLI) | open | pass RLI | starting | send RLI | | starting |
| | FLT | open | send FLT | | open | stop FLT | starting | miss FLT | Pm(FLT) | closed |
| | | | encr = 2 | 0.99997 | | | | encr = 2 | 4.0E-06 | |
| base misses both RLIs and RU false detects either FLT | FLI | closed | send FLI | | starting | pass FLI | closed | detect FLI | 1-Pm(FLI) | starting |
| | RLI | starting | miss RLI | Pm(RLI) | starting | stop RLI | starting | send RLI | | starting |
| | FLT | starting | skip FLT | | starting | empty | starting | detect FLT | Pf(FLT) | starting |
| | RLI | starting | miss RLI | Pm(RLI) | closed | stop RLI | starting | send RLI | | starting |
| | FLT | open | skip FLT | | closed | empty | starting | detect FLT | Pf(FLT) | open |
| | | | encr = 2 | 2.9E-05 | | | | encr = 2 | 1.6E-05 | |
| RU misses FLI base misses both RLIs | FLI | closed | send FLI | | starting | stop FLI | closed | miss FLI | Pm(FLI) | closed |
| | RLI | starting | miss RLI | 1-Pf(RLI) | starting | empty | closed | skip RLI | | closed |
| | RLI | starting | miss RLI | 1-Pf(RLI) | closed | empty | closed | skip RLI | | closed |
| | | | encr = 2 | 3.0E-06 | | | | encr = 0 | 3.0E-06 | |
| RU misses FLI, and base false detects either RLI | FLI | closed | send FLI | | starting | stop FLI | closed | miss FLI | Pm(FLI) | closed |
| | RLI | starting | detect RLI | Pf(RLI) | starting | empty | closed | skip RLI | | closed |
| | RLI | starting | detect RLI | Pf(RLI) | open | empty | closed | skip RLI | | closed |
| | | | encr = 2 | 8.4E-09 | | | | encr = 0 | 3.0E-06 | |
| RU false detects FLI and false detects either FLT | FLI | closed | skip FLI | | closed | empty | closed | detect FLI | Pf(FLI) | starting |
| | RLI | closed | miss RLI | 1 | closed | pass RLI | starting | send RLI | | starting |
| | FLT | closed | skip FLT | | closed | empty | starting | detect FLT | Pf(FLT) | starting |
| | RLI | closed | miss RLI | 1 | closed | pass RLI | starting | send RLI | | starting |
| | FLT | closed | skip FLT | | closed | empty | starting | detect FLT | Pf(FLT) | open |
| | | | encr = 0 | 1.00000 | | | | encr = 2 | 9.0E-12 | |

FIG. 96 (Continued)

ADAPTIVE TRANSMISSION METHODS FOR MULTIPLE USER WIRELESS NETWORKS

CROSS-REFERENCE TO RELATED APPLICATIONS

This application is a continuation of U.S. application Ser. No. 13/597,205 filed Aug. 28, 2012, which is a continuation of U.S. application Ser. No. 11/532,857 filed Sep. 18, 2006, now U.S. Pat. No. 8,254,241, which is a continuation of U.S. application Ser. No. 10/092,937 filed Mar. 6, 2002, now U.S. Pat. No. 7,110,349, which claims the benefit of priority to U.S. Provisional Application No. 60/273,829 filed Mar. 6, 2001, all of which are incorporated herein by reference in their entireties.

BACKGROUND OF THE INVENTION

This invention relates to wireless communications, and more specifically to adaptive methods for multiple user access in a dynamic wireless communications network.

There is growing demand for high speed access to communication networks to support data, voice, and multimedia services. In addition to services based on physical connectivity through wire or fiber, there is increasing interest in the use of wireless communication networks. Wireless communication networks offer certain economies and flexibility not available in wired networks. These include reduced time and cost for installation and maintenance.

In wireless communication networks, multiple users share the same communication medium at the same time. Because the spectrum is limited, it is important to use it efficiently in order to accommodate the needs of all users desiring access within a reasonable time. The spectral and temporal limitations lead to problems with radio interference among users transmitting at the same time.

The use of multiple antennas is known to enhance the performance and the capacity of wireless communications networks. Most systems that exploit the spatial properties of wireless communication links use multiple antennas with fixed beams that enhance a given spatial sector, thereby reducing interference from outside that sector. Additional performance enhancements can be achieved using adaptive antenna arrays. For example, an adaptive array can place nulls in the direction of specific interferers, such as from other users transmitting in the same frequency channel, and can enhance the signal of interest. However, current techniques are generally unsuitable for use in data networks where data are transmitted in discrete packets. Most of the techniques currently suggested adapt slowly and are unsuitable for point-to-multipoint topologies where users and their characteristics are constantly changing.

In a packet-switched network, data transfer between nodes, for example, between a given user and a base station in a wireless network, is typically bursty, requiring high data rates for short periods of time. Preferably, a network should exploit the silent periods associated with one user to service other users in the network. Furthermore, spectrum limitations, spectrum assignment to users in the network should be dynamic to accommodate changing bandwidth requirements and user loads. Existing methods for packet-radio systems typically suffer because of a lack of flexibility in managing resources as users enter and leave the system and as the flow of data changes.

SUMMARY OF THE INVENTION

An exemplary wireless communication network in which the present invention may be implemented includes a base that communicates with remote units located in a cell of the network.

In one aspect of the present invention a base concatenates information symbols with a preamble corresponding to a destination remote unit. The concatenated signal is spread by base transmitter spreading weights and transmitted. Each remote unit applies its preamble detector to the received data. Only the destination remote unit detects its preamble. The remote unit uses the detected preamble to generate optimal despreading weights. The despreading weights are applied to the information portion of the received data to estimate the information symbols transmitted from the base.

In another aspect of the present invention, one or more remote units communicating with a base each concatenates information symbols with a preamble corresponding to that remote unit. Each remote unit spreads the concatenated signal with transmitter spreading weights and transmits the spread signal. The base detects each preamble corresponding to each remote unit in the received data. Each detected preamble is used to determine a set of optimal despreading weights corresponding to that preamble. Each set of despreading weights is applied to the information portion of the received data to reproduce information symbols corresponding to each remote unit.

Another aspect of the present invention is an adaptive receiver system for a base unit that rapidly adapts optimal despreading weights for reproducing information symbols transmitted from multiple remote units. The base receiver system uses matrix decomposition methods for detecting preamble signals associated with remote units transmitting within a cell of the network. Each detected preamble is used to determine despreading weights which when applied to the information portion of the received data optimally estimates the information symbols transmitted from the corresponding remote unit.

Another aspect of the present invention, is a transmitter system for a base unit, which concatenates information symbols with a preamble associated with a remote unit in the cell. The concatenated signal is spread using spreading weights, which are formed by scaling and conjugating the base receiver despreading weights.

Another aspect of the present invention is an adaptive receiver system for a remote unit in a communication network which rapidly adapts optimal weights for reproducing a signal transmitted to it by a specific base unit in the network. The remote unit receiver uses matrix decomposition methods to detect its preamble signal in the received signal data. The detected preamble is used to determine weights which, when applied to the received data, estimates the information symbols transmitted to it from the base.

Another aspect of the present invention is a transmitter system for a remote unit in a cell of a communication network unit, which concatenates information symbols with preamble associated with the remote unit. The concatenated signal is spread using spreading weights, which are formed by scaling and conjugating the remote unit receiver despreading weights.

In an exemplary time and frequency plan in which the present invention can be implemented, time is divided into time slots and a frequency band is divided into a number of frequency partitions for each time slot. Each time slot includes a base transmit portion and a remote unit transmit portion. The base transmit and remote transmit portions of a time slot can be implemented using time division duplex (TDD) transmission. Each frequency partition includes a number of frequency bins. The frequency bins in the frequency partitions can be implemented using discrete multitone (DMT) modulation. Particular partitions in particular time slots are designated for messages related to communication initiation, synchronization, and other management functions. These are referred to as entry slots.

In another aspect of the present invention a base initiates communication with a desired remote unit by transmitting an initiation codeword in a selected entry slot. The initialization codeword is associated with the desired remote unit. The desired remote unit remote and other remote units each apply a detector during the selected entry slot. Only the detector of the desired remote unit detects the initiation codeword in the selected entry slot. The desired remote unit then transmits a response signal to the base.

In another aspect of the present invention one or more remote units each initiates communication with a base by transmitting an initiation codeword associated with the remote unit in a selected entry slot. The base detects each codeword associated with each remote unit in each selected entry slot. The base then transmits a response signal for each remote unit.

In another aspect of the present invention a remote unit synchronizes in time and frequency to the base using a sequence of synchronization signals transmitted by the base in a number of entry slots. In a first stage of synchronization, the remote unit detects a portion of each synchronization signal to determine an initial frequency bin index of an entry slot. In a second stage, the remote unit detects the entire synchronization signal for the sequence and uses the detection statistics to align its time slots and frequency partitions with those of the base.

BRIEF DESCRIPTION OF THE DRAWINGS

These and other aspects of the invention will become more apparent and more readily appreciated from the following detailed description of the presently preferred exemplary embodiments of the invention taken in conjunction with the accompanying drawings, where:

FIG. 54 is a table listing parameters for applications of aspects of the present invention in particular bands of the spectrum;

FIG. 55 is a table of frequency plans for several bands of the spectrum where applications of aspects of the present invention may be deployed;

FIG. 56 is a table of example throughputs for a 4×6 layout and a 3⅓ ms time slot duration, in accordance with an aspect of the present invention;

FIG. 57 is a table of access codes used to derive reverse link initiation codewords from a Hadamard matrix, in accordance with an aspect of the present invention;

FIG. 58 is a listing of a sample computer program in Matlab® for generating forward link initiation (FLI) codewords, in accordance with an aspect of the present invention;

FIG. 59 is a listing of computer code in Matlab® that includes matrices containing forward link synchronization (FLS) codeword descriptors, in accordance with an aspect of the present invention;

FIG. 60 gives a computer program in Matlab® for synthesizing FLS codewords, in accordance with an aspect of the present invention;

FIG. 61 is a table of FLS codeword sequence numbers for a spreading factor of two, in accordance with an aspect of the present invention;

FIG. 62 is a table of FLS codeword number sequence for a spreading factor of four, in accordance with an aspect of the present invention;

FIG. 63 is a table of base transmit weight patterns for FLS bursts for a spreading factor of two, in accordance with an aspect of the present invention;

FIG. 64 is a table of assignments of reverse link initiation (RLI) partitions based on forward link access (FLA) indices for a spreading factor of two, in accordance with an aspect of the present invention;

FIG. 65 is a table of assignments of reverse link initiation (RLI) partitions based on forward link access (FLA) indices for a spreading factor of four, in accordance with an aspect of the present invention;

FIG. 66 is a diagram of a medium access control (MAC) frame structure, in accordance with an aspect of the present invention;

FIG. 67 is a diagram of a reverse link common MAC header of a MAC frame, in accordance with an aspect of the present invention;

FIG. 68 is a diagram of a forward link MAC common header of a MAC frame, in accordance with an aspect of the present invention;

FIG. 72 is a diagram of a format for the logical link control (LLC) field of the protocol data unit of FIG. 71, in accordance with an aspect of the present invention;

FIG. 73 is a table of frame sizes and data rates for a 20 ms segments, in accordance with an aspect of the present invention;

FIG. 76 is a table of frame sizes and data rates for a 10 ms segments, in accordance with an aspect of the present invention;

FIG. 77 is a table of VoIP payload sizes for various vocoders and VoIP frame duration, in accordance with an aspect of the present invention;

FIG. 90 lists events and actions of the RU MAC scheduler of FIG. 89, in accordance with an aspect of the present invention;

FIG. 95 gives messages, states and actions of a base and RU for starting a flow, in accordance with an aspect of the present invention;

FIG. 96 gives messages, states and actions of a base and RU for various error conditions while starting a flow, in accordance with an aspect of the present invention.

DETAILED DESCRIPTION OF THE PREFERRED EMBODIMENTS

Figure 19:
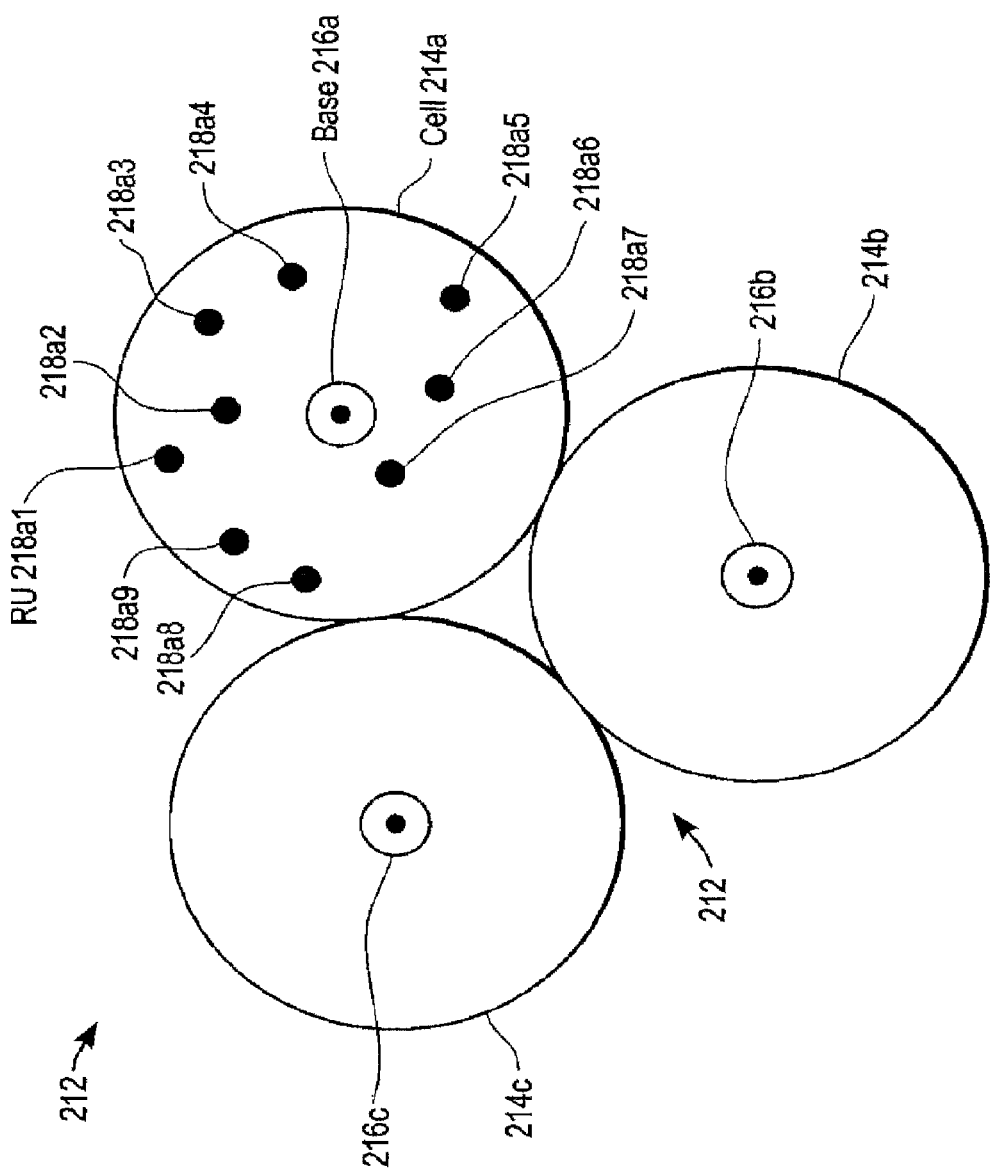
FIG. 19 illustrates an exemplary wireless communications network in accordance with a preferred embodiment.

An exemplary wireless communications network in accordance with a preferred embodiment is illustrated in the diagram of FIG. 19. In this example, a wireless communications network 212 is divided into three cells 214a-214c. A cell includes a central node referred to as a base 216a-216c. Each cell 214a-214c represents an area of coverage by one corresponding base 216a-216c, respectively. Typically the bases 216a-216c are fixed and include connections to external networks such as the Internet or networks supported and maintained by a service provider.

A remote unit, referred to as RU, is located in a cell. In the example of FIG. 19, RUs 218a1-218a9 provide broadband access to a single user or a network of users. Nine RUs 218a1-218a9 are shown in cell 214a for illustrative purposes. Additional RUs may be included in the first cell 214a, as well as in the second and third cells 214b-214c. The RUs are fixed in this example, although in general they are not necessarily fixed. Each RU communicates with the base for cell that includes the RU.

A base 216a includes a transmitter and a receiver for communication with RUs 218a1-218a9 in the corresponding cell 214a. Likewise, each RU 218a1-218a9 also includes a transmitter and a receiver that is used for communication with base 216a. Communication between the bases 216a-216c and the RUs 218a1-218a9 using a relatively small bandwidth wireless link. The bases typically communicate with each other using a backhaul network with a relatively high bandwidth resource such as fiber optics, microwave or cable.

A base 216a typically includes multiple sensors for communication with the RUs 218a1-218a9. A RU typically includes just one sensor, although multiple sensors are possible. The term "sensor" is used broadly to designate any physical resource capable of receiving or transmitting electromagnetic energy. As in typical communications systems, each sensor is connected to an associated system of electronic components for downconverting and possibly digitizing the received waveform or upconverting and transmitting an analog waveform derived from a digital source. Two components function as separate sensors when signal processing by each component is separate. For example, separate RF and digitizing components for multiple polarizations function as separate sensors. A combination of multiple sensors is called an array, or a sensor array. For example, an array may be a combination of sensor elements separated by space or polarization.

In a typical arrangement, each base station uses multiple antennas and multiple spreading frequencies, nominally two but up to four, to transmit data to remote units. Multiple antennas and spreading frequencies provide degrees of freedom exploited by the to form spatial and spectral gains and nulls for reliable communication with many remote units simultaneously. The base station can access all of the available spectrum.

A remote unit uses a directional gain antenna and multiple spreading frequencies to transmit data to an assigned base station. Multiple spreading frequencies provide degrees of freedom used to form spectral gains and nulls. The RU uses the same spreading frequencies that the base station uses in communication with the RU. A remote unit accesses a portion of the frequency spectrum, such as a single subband pair, available at the base station. Higher capacity remote units can be configured to make use of multiple subband pairs. In an alternate embodiment, a remote unit can have more than one antenna.

An orthogonal frequency division multiplexing (OFDM) structure is used to minimize inter-symbol interference caused by multipath. For OFDM, a digital processing architecture includes fast transforms, and beamforming and null steering algorithms. The system exploits multiple antenna elements at base stations and stacked carrier spread spectrum to provide for increased system capacity.

Discrete Multitone (DMT) is a preferred modulation. It allows for the processing of multicarrier communication signals in the frequency domain. A preferred embodiment uses Fast Fourier Transforms (FFT's) that are either zero padded or have a cyclic prefix. Alternative embodiments, known in the art, include the use of a filter bank. DMT processing provides frequency bins in a given frequency band. A set of adjacent, associated frequency bins referred to as a partition. Partitions are used for defining communication channels in the preferred embodiment.

Packet radio transmission is preferred for communications between bases 216a-216c and RUs 218a1-218a9. For packet radio transmission, information is transmitted from a transmitter to a receiver in discrete packets.

Time Division Duplex (TDD) is a preferred protocol for transmission and reception between the base and the RUs. The TDD protocol is spectrum efficient because the same frequency resources are shared for both transmission and reception in a communications system. Transmission events are separated from reception events in time and typically alternate in a periodic fashion. To the extent possible, the same RF components are used in both the transmission and reception paths at the base and at the RU. This permits the effective channel seen from the base to the RU to be reciprocal of the channel seen from the RU to the base. This allows exploitation of channel reciprocity when forming transmit signals. Physical layer communication is nearly symmetric so that the spreading weights applied to the transmit signal are based on the weights computed from the receive signal.

Methods and apparatus for transmitters and receivers that include multiple sensors, DMT modulation, TDD protocol, and packet radio transmission in a wireless communication network are described in Agee, U.S. Pat. No. 6,128,276.

The TDD slots and available blocks of frequency are partitioned to provide multiple physical channels that support bearer traffic. A set of communication channels used during a TDD frame when a base is transmitting and the RUs are receiving is called the forward link. Likewise, a set of communication channels used during a TDD frame when a base is receiving and the corresponding RUs are transmitting is called the reverse link.

The present invention provides a system of protocols for communication between base 216a and the RUs 218a1-218a9 in the corresponding cell 214a. Using the preferred system of protocols, the base 216a provides multiple links simultaneously to the nine RUs 218a1-218a9. These links are established as needed for communicating RUs in the cell. For a given interval, existing links may be deallocated and links to an entirely different set of RUs may be established.

The base acts as a central controller to efficiently manage airlink resources. This is unlike Ethernet where access control is distributed among all users and all users are connected to each other. In a preferred embodiment, the base schedules all traffic to RUs to meet service level agreements. Distributing forward link traffic in this scenario is relatively straightforward. For managing reverse link bandwidth, traffic loading information is communicated from each RU to its corresponding base. Communications from a RU to a base are contention oriented. With this approach, the base can schedule multiple users to simultaneously "contend" for a communication channel. To minimize contention by unscheduled users requesting access, a preferred entry method uses a home partition to initiate data flows.

When a RU is installed in the network, it is configured to communicate with a single base. In one embodiment, a base offset code unique to the assigned base is provided. The RU uses the base offset code to selectively receive data from its corresponding base.

The physical channels for data traffic are divided into two general types: bearer channels for high-speed transfer of bearer data, and initiation channels for requesting access to the bearer channels. Reverse link initiation messages are contention oriented, whereas the base station schedules the forward link initiation messages. For forward link initiation, the base uses entry slots for signaling a remote unit that it has a message to download and for sending a weight-training message for maintaining an existing link.

The present invention includes the rapid computation of despreading and spreading weights for the receiver and transmitter, respectively, of the base and RU. The despreading and spreading weights direct signal gain toward intended recipients and signal nulls toward sources of interference. By exploiting reciprocity, the despreading weights determined for reception are modified to provide spreading weights used for transmission. On the reverse link, the initiation messages also serve as training signals that base station uses to compute initial despreading and spreading weights for bearer traffic. Once the initial weights are computed, decision-direction algorithms are used to adapt the weights to time varying channel conditions.

The transmitter and receiver functions of the present invention can be implemented using digital signal processors, such as general purpose digital signal processors (DSP) or, preferably, application specific integrated circuits (ASIC). Functions are implemented on digital signal processors as programs and subroutines using well-known digital signal processing techniques. For a fully functional base and remote unit, additional secondary elements including antennae, RF amplifiers, downconverters, upconverters, local oscillators (LO), analog-to-digital converters (ADC, and digital-to-analog converters (DAC) would be added to the base and remote unit transmitter and receiver functions described herein. Such additions will be evident to those skilled in the art.

Figure 20:
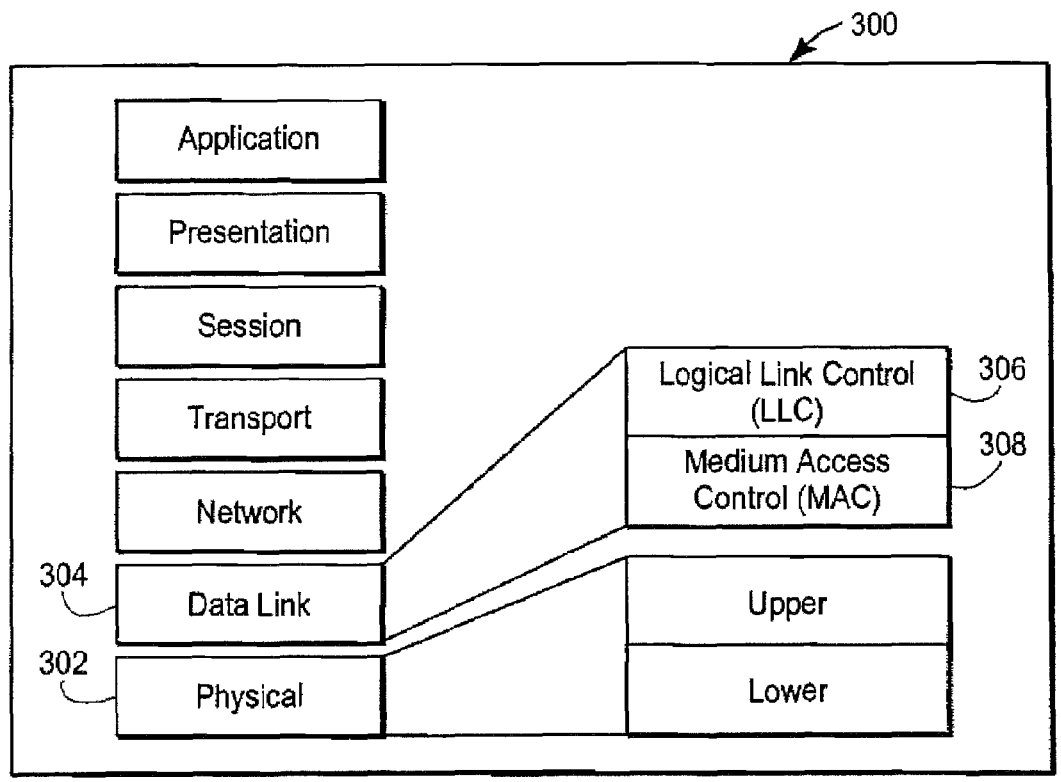
FIG. 20. OSI Protocol Framework for reference in understanding an aspect of the present invention.

In the description that follows, reference is made to Open Systems Interconnect (OSI) Reference Model established by the International Organization for Standardization (ISO). FIG. 20 illustrates the seven layer OSI reference model 300. The description that follows primarily refers to the physical layer 302, the data link layer 304 and data link sublayers for logical link control (LLC) 306 and medium access control (MAC) 308.

Base Receiver Operation

Referring to FIG. 19, the present invention includes methods for base 216a to communicate with nine RUs 218a1-218a9 in its corresponding cell 214a. Base receiver operation includes preamble detection on a contention oriented channel that permits multiple RUs 218a1-218a9 to enter the system simultaneously.

Figure 1:
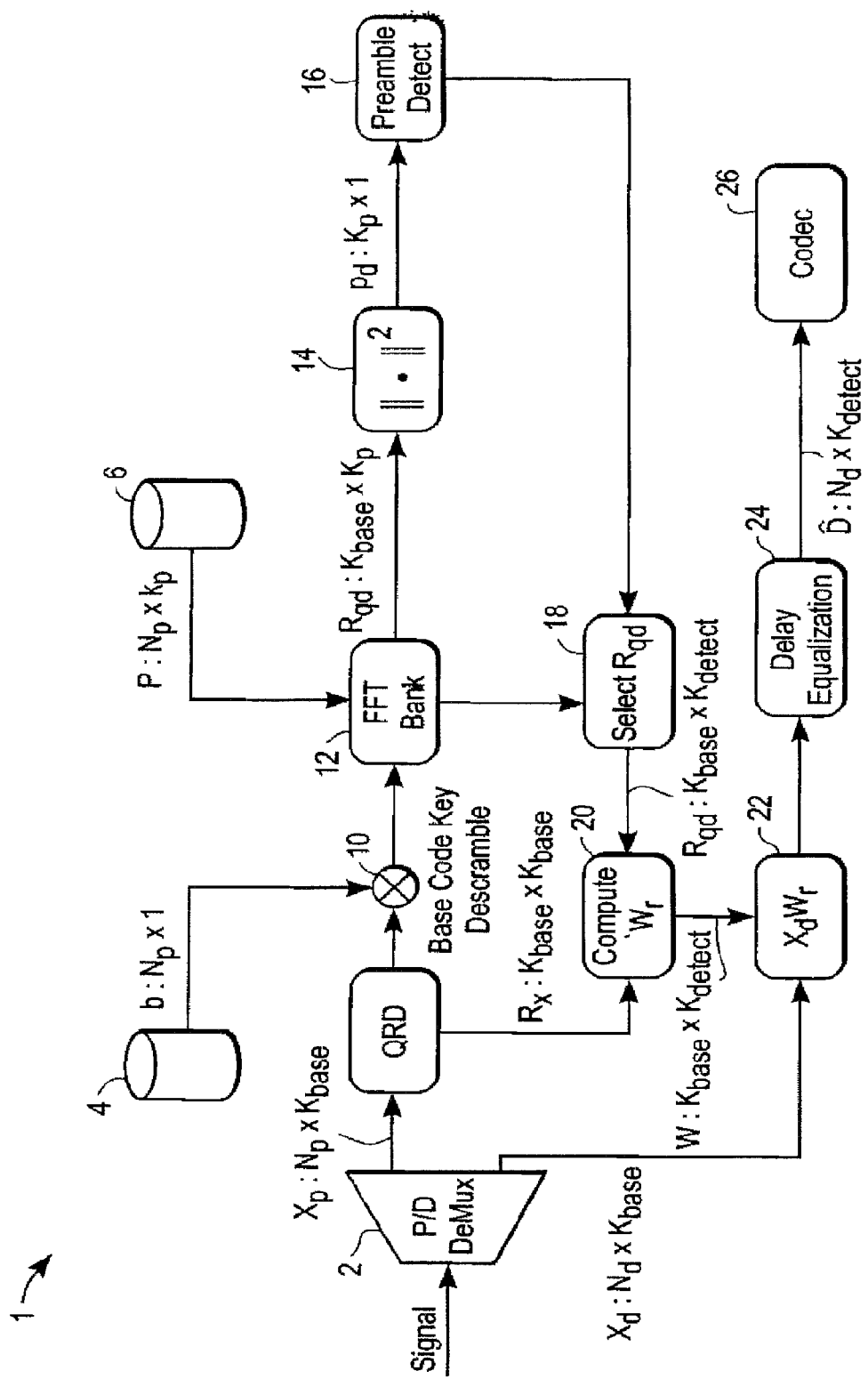
FIG. 1 is a block diagram of a base station receiver including preamble detection and despreading operations, in accordance with an aspect of the present invention.

FIG. 1 gives a block diagram of the base receiver 1. The base receiver 1 computes a set of complex despreading weights for the purpose of enhancing a signal of interest, and suppressing in-cell and out-of-cell interferers. Relevant symbol definitions for FIG. 1 are P: $N_p \times K_p$ Conjugate preamble vectors for each of up to $K_p$ users $X_p$: $N_p \times K_{base}$ Conjugate received data at a base over the time/frequency indices used by the known preamble $X_d$: $N_d \times K_{base}$ Conjugate received data at a base over the time/frequency indices used by the transmitted data symbols Q: $N_p \times K_{base}$ Whitened received data (orthonormal columns) after the Q-R decomposition (QRD 8 of FIG. 1) of $X_p$ $R_x$: $K_{base} \times K_{base}$ Cholesky factor of $X_p$ $R_{qd}$: $K_{base} \times K_p$ Cross-correlation between whitened data and known preambles b: $N_p \times 1$ Conjugate base scrambling code. (Used to decorrelate $R_{qd}$ with other bases)

$W_r$: $K_{base} \times K_{detect}$ Despreading gains for the $K_{detect}$ users detected The dimensions $K_p$ and $K_{detect}$ respectively refer to a maximum number of users and the number of detected users in a given frequency partition. The dimensions $N_p$ and $N_d$ respectively refer to the number of preamble symbols and the number of information symbols.

The number of sensors used by a base is $K_{antenna}$. The number of degrees of freedom used by a base is $K_{base}$, which includes all base sensors as well as the spreading frequencies. These two dimensions are related by $K_{RU}$, the spreading factor used to expand the signal bandwidth whereby the total number of symbols transmitted will be a product of $K_{RU}$ and the number of source symbols. That is, there are $K_{base}$ separate digitized complex symbols that are received over $K_{antenna}$ sensors and $K_{RU}$ separate spreading frequencies so that $K_{base} = K_{antenna} K_U$.

Referring to FIG. 19, for example, a signal from RU 218a1 is received at base 216a by base receiver 1 of FIG. 1. The processing operations of FIG. 1 apply to a single frequency partition. For multiple partitions, analogous operations are applied in each partition. Referring to FIG. 1, data are received by preamble/data demultiplexer 2, or P/D DeMux. Base receiver 1 may include first storage disk 4 for storing the conjugate base scrambling code b and second storage disk 6 for storing conjugate preamble vectors P. The conjugate received preamble $X_p$ output from P/D DeMux 2 is passed to QR decomposition, or QRD, block 8. QRD 8 produces whitened received data matrix Q and the Cholesky factor matrix R. Multiplier 10 combines the base scrambling code b and the whitened received data Q and transfers the output to FFT bank 12. Conjugate preamble vectors P from storage element 6 are also input to FFT bank 12. FFT bank 12 produces the cross-correlation matrix $R_{qd}$. Norm evaluator 14 calculates the norm of matrix $R_{qd}$. The output of norm evaluator 14 is input to preamble detection block 16, which identifies detected preambles. Selection block 18 combines the output from preamble detection block 16, the identified preamble, with $R_{qd}$ output from FFT bank 12 to produce a reduced-order cross-correlation $R_{qd}$ with dimensions $K_{base} \times K_{detect}$.

Weight-computation block 20 combines the reduced-order cross-correlation $R_{qd}$ from selection block 18 with the Cholesky factor $R_x$ from QRD block 8 to produce the despreading gains matrix $W_r$. Matrix product block 22 combines the conjugate received data $X_d$ with the despreading gains $W_r$. The output from matrix product block 22 is passed to delay equalization block 24. The results of the delay equalization block 22 are then passed to a codec 26.

The preamble detection block 16 described herein provides for simultaneous detection of preamble messages from multiple users. In practice, every active user 218a1-218a9 in a cell 214a of the network exemplified in FIG. 19 is assigned a preamble sequence and a designated partition for requesting system access over a contention oriented channel. For instance, a user 218a1 simply begins transmission in his assigned partition using his assigned preamble. Because of the degrees of freedom available in the system by multiple sensors and multiple spreading frequencies, it is possible for the base to resolve many users that simultaneously transmit on a contention-oriented channel. This provides an improvement over traditional approaches where collisions occur when more than one user simultaneously transmit a message and each user must retransmit their message. A resulting advantage is that higher throughput can be achieved on the contention oriented channel, which reduces user access latency in cases of high user loads.

The access method described herein is referred to as soft contention because contention occurs only during periods of high system loading, and then users are not necessarily completely blocked, but rather their performance degrades gradually as the number of simultaneous entries increases.

Referring to FIG. 1, the base receiver can efficiently detect which users are transmitting in a given partition by performing FFT 12 during the computation of the cross-correlation coefficients $R_{qd}$. The detection statistic used by the base receiver is, $$\rho_d = \frac{\tilde{d}^H P(X_p) \tilde{d}}{\tilde{d}^H \tilde{d}}$$

where the projection operator is defined as $P(X) = X(X^H X)^{-1} X^H$, $\tilde{d}$ is a conjugate preamble vector chosen from a set of known preamble symbols, and $X_p^H$ is a matrix whose columns contain all of the $K_{base} \times 1$ received data vectors over each frequency bin in a given partition and the time indices within a single adaptation interval. Therefore the matrix $X_p^H$ can be written as $X_p^H = [x(1,1), x(2,1), \ldots, x(M,1), x(1,2), x(2,2), \ldots x(M,N)]$, where x(m, n) is the $K_{base} \times 1$ complex baseband received data vector at frequency index m and time index n.

The parameter M is the number of frequency bins reserved for the transmitted preamble and N is the number of time samples reserved for the transmitted preamble. The total number of preamble symbols is therefore $N_p = MN$. In a preferred embodiment, but without loss of generality, the preamble symbols are in contiguous bins and in the first N time samples of an adapt frame. The present invention is not restricted to this configuration and encompasses any mapping of the preamble symbols onto the available time and frequency indices. In general, it is most advantageous to evenly distribute the preamble over all of the bins in a partition.

The detection statistic can detect a large number of users simultaneously transmitting in the same cell and the same frequency partition. After a QR decomposition is performed on $X_p$ so that $QR_x = X_p$, and Q is an orthonormal $MN \times K_{base}$ matrix and $R_x$ is an $K_{base} \times K_{base}$ upper triangular matrix, the detection statistic can be written as, $$\rho_d = \frac{\tilde{d}^H Q Q^H \tilde{d}}{\tilde{d}^H \tilde{d}} \qquad (A1)$$

$$= \frac{\|Q^H \tilde{d}\|^2}{\|\tilde{d}\|^2}$$

M is the number of bins in a partition, and N is the number of samples in a preamble block of an adapt frame.

In one embodiment, the preambles are chosen from a FFT basis of the form, $$d(m, n) = e^{\frac{-2\pi j k(m+M(n-1))}{M_C}} b(m, n)$$

where d(m,n) is a conjugate preamble symbol, b(m,n) is a conjugate base scrambling code symbol, $M_c$ is the size of the FFT basis, in is the frequency bin index, and n is the time index. The base scrambling code is a constant modulus pseudo-random code. The index k selects the preamble basis function. For purposes of searching for the correctly transmitted preambles, the m+M(n−1)'th element of $\tilde{d}$, $\tilde{d}(m,n)$, can be set equal to d(m,n) above. By exploiting a FFT-like structure for the preambles, the computation of the cross-correlation $Q^H \tilde{d}$ can be performed very efficiently.

In alternative embodiments, preambles are derived from other basis functions that yield fast transforms instead of FFT basis functions. These include Hadamard, Kronecker, wavelets, discrete cosine transform, etc., basis functions. An alternative embodiment using Hadamard basis functions is described later for reverse link initialization. Hadamard basis functions have computational advantages over FFT. Also, more preamble codes can be derived from the Hadamard basis functions so that base scrambling codes are not needed.

Even for a large number of preambles the computational complexity is dominated by the computation of Q. Most of the complexity of the system is at the base rather than the RUs. This improves the economics of the overall system design.

The base scrambling code, b(m,n), is unique for each base. Mathematically, it can be absorbed into the orthonormal Q matrix, while still maintaining its orthogonality, i.e. if $$Q_b(m,n;r) = Q(m,n;r)b(m,n),$$

where Q(m,n; r) is the element of the matrix Q in the m+M(n−1)'th row and r'th column and where $Q_b$(m,n; r) is the element of the matrix $Q_b$ in the m+M(n−1)'th row and r'th column. $Q_b$ is still an orthonormal matrix.

The cross-correlation coefficient $Q^H \tilde{d}$ can be computed very efficiently using fast Fourier Transform (FFT) techniques by computing, $$R_{qd}(r; k) \equiv \sum_{l=1}^{M_c} Q_b^*(m(l), n(l); r) e^{-2\pi j l k / M_c}$$

where m(l) and n(l) are the unique integers in the intervals [1 M] and [1 N] respectively that satisfy l=m+M (n−1). The $Q_b$(m(l), n(l); r) is the element from the l'th row and r'th column of $Q_b$ provided that $M_c$, M and N are selected such that $M_c$=MN. The $R_{qd}$(r;k) is the k'th element of the vector $Q^H \tilde{d}$ whose norm is proportional to the detection statistic from equation (A1). Referring to FIG. 1, FFT bank 12 computes each $R_{qd}$(r;k) corresponding to each k'th preamble basis function. The norm evaluator 14 computes the norms and the corresponding detection statistic of equation (A1).

Fine Delay Synchronization

The present invention includes a robust technique for the detection and removal of small delay errors between a remote unit and its base. As described later, the RU synchronizes its transmit and receive gates so that the effective delay between the RU and the base is minimal. In addition, the RU of the present invention includes a set of equalization gains that are applied to every bin to equalize out, in the frequency domain, any residual signal delays. Any number of well-known equalization techniques used in wireless communications can accomplish the equalization process. See, for example, G. Santella, "A Frequency and Symbol Synchronization System for OFDM Signals: Architecture and Simulation Results," IEEE Transactions on Vehicular Technology, Vol. 49, No. 1, January 2000 and M. Speth et al, "Optimum Receiver Design for OFDM-Based Broadband Transmission—Part II: A Case Study", IEEE Transactions on Communications, Vol. 49, No. 4, April 2000.

The base receiver provides fine delay synchronization to remove any delay errors that were not compensated by the RU delay compensation procedure. Fine delay synchronization in the base receiver is based on the following model in which a residual delay term is added to the detection statistic in equation (A1) by modeling, $$d(m, n) = e^{-2\pi j \left( m\delta + \frac{kM(n-1)}{M_c} \right)} b(m, n). \qquad (A2)$$

The δ term represents an unknown normalized frequency modeled as the preamble frequency $$\frac{k}{M_c}$$

plus an unknown delay offset $\delta_0$, so that $$\delta = \delta_0 + \frac{k}{M_c}.$$

If $\delta_0$ is small, then a local search of the detection statistic in the vicinity of $$\frac{k}{M_c}$$

provides a highly accurate estimate of the residual delay error $\delta_0$. Therefore the procedure to obtain $\delta_0$ first estimates the preamble index k, followed by the substitution of equation (A2) into equation (A1) to obtain the fine synchronization objective function as a function of δ.

The present invention provides a novel technique for rapidly computing δ using the Q matrix resulting from the QR decomposition 8 and of FIG. 1. For the following definition, $$\tilde{Q}_b(m, s) = \sum_{n=1}^{N} Q_b^*(m, n; s) e^{2\pi j k M (n-1)/M_c},$$

the detection statistic can be written as, $$\rho_d(\delta) = \frac{1}{MN} \sum_{s=1}^{K_{base}} \sum_{l=1}^{M} \sum_{m=1}^{M} \tilde{Q}_b^*(m,s) \tilde{Q}_b(l,s) e^{2\pi j(m-l)\delta} \quad (A3)$$

Least squares quadratic approximations of $\rho_d(\delta)$ and $e^{2\pi j(m-l)\delta}$ lead to efficient computations using the FFT. The quadratic approximations are valid between any two adjacent preamble frequencies $$\frac{k}{M_c}.$$

The approximation of $e^{2\pi j(m-l)\delta}$ is $c_m(\delta) \approx e^{2\pi jm\delta}$. Substitution into the equation (A3) for the detection statistic gives, $$\rho_d(\delta) \approx \hat{\rho}_d(\delta) \equiv \frac{1}{MN} \sum_{s=1}^{K_{base}} \sum_{m=1}^{M} \tilde{Q}_b^*(m,s) \sum_{l=1}^{M} \tilde{Q}_b(l,s) c_{m-l}(\delta).$$

This computation can be performed in the 'frequency domain' to achieve $$\hat{\rho}(\delta) = \frac{1}{4M^2 N} \sum_{q=1}^{4M} \sum_{s=1}^{K_{base}} |Q_F(q,s)|^2 c_F(q;\delta). \quad (A4)$$

The $c_F$ and $Q_F$ in the above equation are frequency domain representations calculated as follows, $$c_F(q;\delta) \equiv \sum_{r=-2M}^{2M-1} c_r(\delta) e^{\frac{2\pi j q r}{4M}}$$

and $$Q_F(q;s) \equiv \sum_{l=-2M}^{2M-1} \tilde{Q}_b(l,s) e^{\frac{\pi j q l}{4M}}.$$

The computation of $Q_F(q;s)$ can serve double duty by using it to develop the FFTs used in the preamble detection algorithm.

An efficient method for computing $c_F$ is using a look-up table is described as follows. The expansion $c_r(\delta) = \alpha_0(r) + \alpha_1(r)\delta + \alpha_2(r)\delta^2$ is valid for the normalized frequency interval $\delta \in [a, b]$. The $c_r(\delta)$ can be calculated by computing the FFTs for each $\alpha_j(r)$ for each $[a, b]$. The normalized frequency interval bounds are restricted to $$a = \frac{k}{M}$$

and $$b = \frac{k+1}{M},$$

corresponding to consecutive preamble indices. The FFTs of every $\alpha_j(r)$ of interest can be computed and tabulated in advance to produce a look-up table. This look-up table is accessed for computing $c_F(q;\delta)$.

After computing $c_F$ and $Q_F$, the quadratic approximation in equation (A4) is optimized over the normalized frequency $\delta$, providing an estimate of $\delta$. The delay estimate $\delta_0$, is found using the relationship $$\delta_0 = \delta - \frac{k}{M_c}.$$

Despreading Weight Computation

Despreading weight computation 20 of FIG. 1 is described herein. After a correct preamble has been identified by preamble detection block 16 and delay errors have been reduced by fine delay synchronization, a set of despreading weights $w_r$ is computed corresponding to the detected preamble. The despreading weights can be computed using the results for the preamble detection and fine synchronization error detection. After $\tilde{d}$ has been estimated according to the model in equation (A2), the set of despreading weights corresponding to the detected preamble $\tilde{d}$ is calculated according to the following equation, $$w_r = R_x^{-1} Q^H \tilde{d},$$

Referring to FIG. 1, the Q and $R_x$ matrices are obtained from the QR decomposition 8 of $X_p$. The set of despreading weights $w_r$ represents the minimum least squares linear beamforming weights for the set of 'known' preamble symbols transmitted. That is, $w_r$ minimizes of the objective function, $$\mu = \|\tilde{d} - X_p w_r\|^2$$

A different set of weights are computed for each of the $K_{detect}$ preambles detected. The despreading weight vectors for all of the detected preambles form the $K_{detect}$ columns of the despread gain matrix $W_r$ output from the weight computation block 20.

Processing of the received data bearing symbols by the base receiver is now described. Referring to FIG. 1, P/D DeMux 2 separates the conjugate received data corresponding to transmitted data symbols, $X_d$, from the conjugate received preamble data. The weights $W_r$ are applied to the conjugate received data $X_d$ by matrix product block 22, which forms the product $X_d W_r$. This step is analogous to beamforming, so matrix product block 22 is also referred to as a beamformer. Delay equalizer 24 removes any estimated delay errors from the output of matrix product block 22. The following equation represents the weighting and delay equalization of a received data vector, $$\hat{d}(m,n) = e^{-2\pi jm\delta_0} w_r^H x(m,n)$$

In the above equation, $x(m,n)$ is a $K_{base} \times 1$ complex baseband received data vector at frequency index m and time index n corresponding to time/frequency indices used by transmitted data symbols, $\delta_0$ is the delay offset corrected by the delay equalizer. The decoder 26, or codec, decodes the output of the delay equalizer to reproduce the reverse link transmitted bit sequences.

Recursive Implementation of QR Decomposition

An alternative embodiment of QR decomposition block 8 of FIG. 1 provides a recursive implementation. The previously described QR decomposition and computation of the despreading weights by the weight computation block 20 corresponds to the case of processing a single adapt frame, or block of data, without using previous blocks of data. As described next, an embodiment of this invention includes block recursive and exponential recursive cases. Techniques of block recursion are described in D. Manolakis, et al, *Statistical and Adaptive Signal Processing*, MacGraw Hill, 2000.

Let $X_1$ be the received data matrix for all previous blocks and let $X_2$ be the data matrix received over the most current adapt block. The data matrices include rows of received data vectors, which are the Hermitian transposes of the complex received data. A QR decomposition has been performed on the $X_1$ data to date, produces an orthonormal $Q_1$ and an upper triangular $K_{base} \times K_{base}$ matrix $R_1$ such that, $$Q_1 R_1 = X_1.$$

It is desired to obtain the joint QR decomposition of the total data matrix $X_T$, which contains all the received data, $$X_T \equiv \begin{bmatrix} X_1 \\ X_2 \end{bmatrix},$$

so that $$Q_T R_T = X_T.$$

The new QR decomposition can be obtained from the much smaller augmented matrix, $$X_A \equiv \begin{bmatrix} R_1 \\ X_2 \end{bmatrix}.$$

The QR decomposition of $X_A$ can be performed in a straightforward fashion using any number of standard techniques. In a preferred embodiment Householder transforms are used since this technique can exploit the zeros in the upper triangular $R_1$ matrix.

A Householder transform is an orthonormal matrix of the form, $$H_T = I - 2vv^H,$$

for any unit-norm vector v. For arbitrary nonzero matrices a and b, a Householder transform can be obtained such that, $$H_T a = \omega \frac{\|a\|}{\|b\|} b$$

for a unit modulus complex number $\omega$.

This property can be used to design successive Householder transforms in order to change $X_A$, column by column into $$\begin{bmatrix} R_T \\ 0 \end{bmatrix}.$$

By inserting zeros into the elements of v, the Householder transforms can be designed to operate on only the nonzero elements of a given column vector, reducing the overall computational burden. The Householder matrices generated by this process are multiplied out in reverse order, and the first $K_{base}$ columns are retained to obtain the QR decomposition of $X_A$, which can be written as $$\begin{bmatrix} T_1 \\ T_2 \end{bmatrix} R_T = \begin{bmatrix} R_1 \\ X_2 \end{bmatrix} = X_A, \quad (A5)$$

where $$\begin{bmatrix} T_1 \\ T_2 \end{bmatrix}$$

is the orthonormal Q matrix in the QR decomposition of $X_A$. The R component of the QR decomposition of $X_A$ is the same as $R_T$. This is because of the uniqueness of the Cholesky factor of the auto-correlation matrix, $$R_T^H R_T = X_T^H X_T = X_A^H X_A.$$

The matrix $$\begin{bmatrix} Q_1 T_1 \\ T_2 \end{bmatrix}$$

is the Q component of the QR decomposition of $X_T$ because of the uniqueness of the QR decomposition and the following relationships, $$\begin{bmatrix} Q_1 T_1 \\ T_2 \end{bmatrix} R_T = \begin{bmatrix} Q_1 R_1 \\ X_2 \end{bmatrix} = \begin{bmatrix} X_1 \\ X_2 \end{bmatrix} = X_T, \quad (A6)$$

where use is made of equation (A5).

The $T_2$ matrix is the component of the QR decomposition of the total received data corresponding to the new data block $X_2$. This matrix can replace the Q matrix in the recursive implementation. If an exponential weighting is desired, then the following augmented matrix is used, $$X_A \equiv \begin{bmatrix} \lambda^{N/2} R_1 \\ X_2 \end{bmatrix},$$

where $\lambda$ is the per-sample exponential delay factor, and N is the number of rows (i.e. the number of samples) in the new data block $X_2$.

A result of using a longer time frame or recursive adaptation is improved performance both for persistent signals and for any new signals that enter within a single block using a known or detected preamble. There is improved detection performance for new signals because the algorithm naturally exploits both the FFT structure of the preamble and the fact that the new signal is nonzero only in the new data block.

Persistent signals can be protected from the intrusion of new RUs by either signal cancellation techniques or by decreasing $\lambda$ so that the past history does not prevent the weights for the current block from canceling any new signals.

Base Transmitter Spreading Operation

Figure 2:
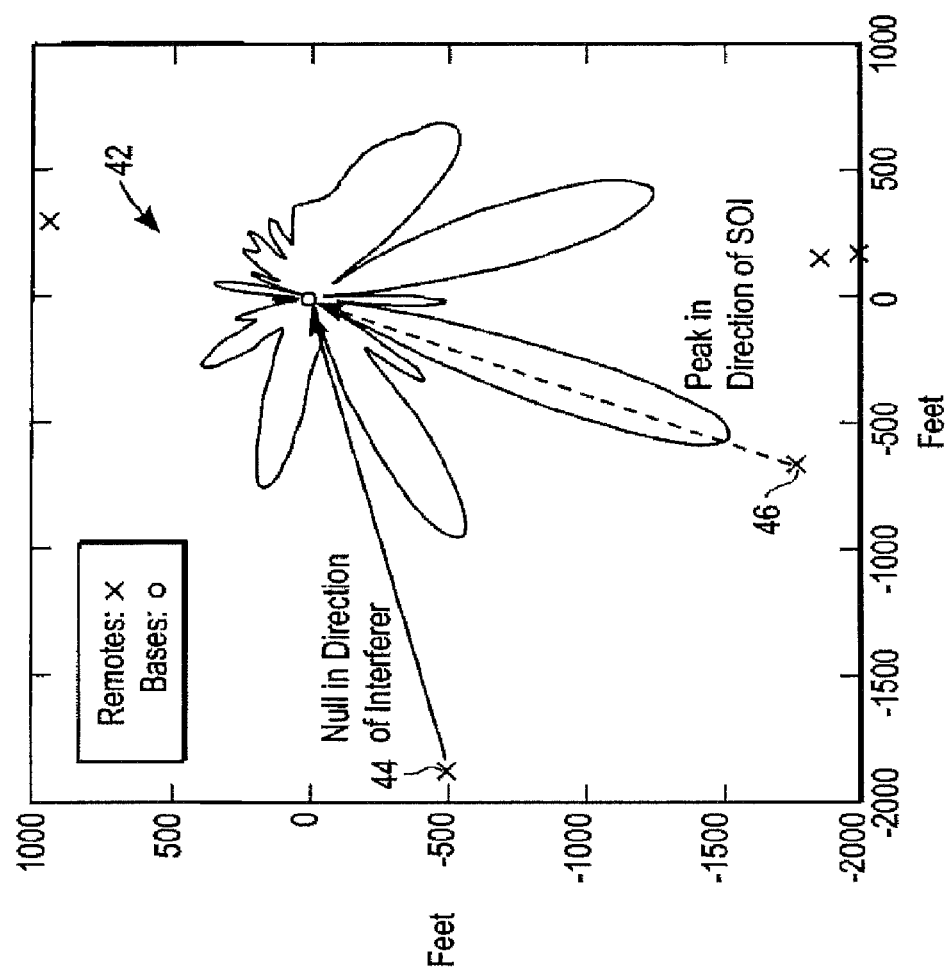
FIG. 2 illustrates beamforming which peaks in the direction of a signal of interest and a nulling in the direction of the interference, in accordance with an aspect of the present invention.

The present invention exploits channel reciprocity to formulate spreading weights for transmission. When there is channel reciprocity, the channel matrices between the base and the RU for the forward (downlink) and reverse (uplink) directions are transposes of one another. As previously stated, a preferred embodiment of the present invention uses a time division duplex (TDD) protocol. For a TDD protocol, both the forward and reverse links share the same set of frequency bins. Transmission using forward link spreading weights that are a scaled version of the reverse link despreading weights will generate a beam pattern that places nulls in the direction of RUs that are not the intended recipients, and gains in the direction of RUs that are the intended recipients. FIG. 2 illustrates an example of a beamforming pattern 42 with a peak in the direction of a signal of interest 46 and nulling in the direction an interferer 44.

In a preferred embodiment, the spreading weights $g_f$ used for transmission on the forward link are determined by scaling the receive despreading weights $w_r$ as follows, $$g_f = k_{fwd} w_r^*. \quad (A7)$$

The scaling constant $k_{fwd}$, is used throughout the network and is chosen to select the desired mean transmit gain for each link from a base to a RU. For a TDD protocol, the reverse link channel will be nearly identical to the forward link channel, after calibrating out any component differences between the transmission and reception hardware in the base and the RU. For this situation, spreading weights $g_f$ that are optimal, based on a minimum mean square error criterion, are a scaled version of the despreading weights $w_r$.

Figure 3:
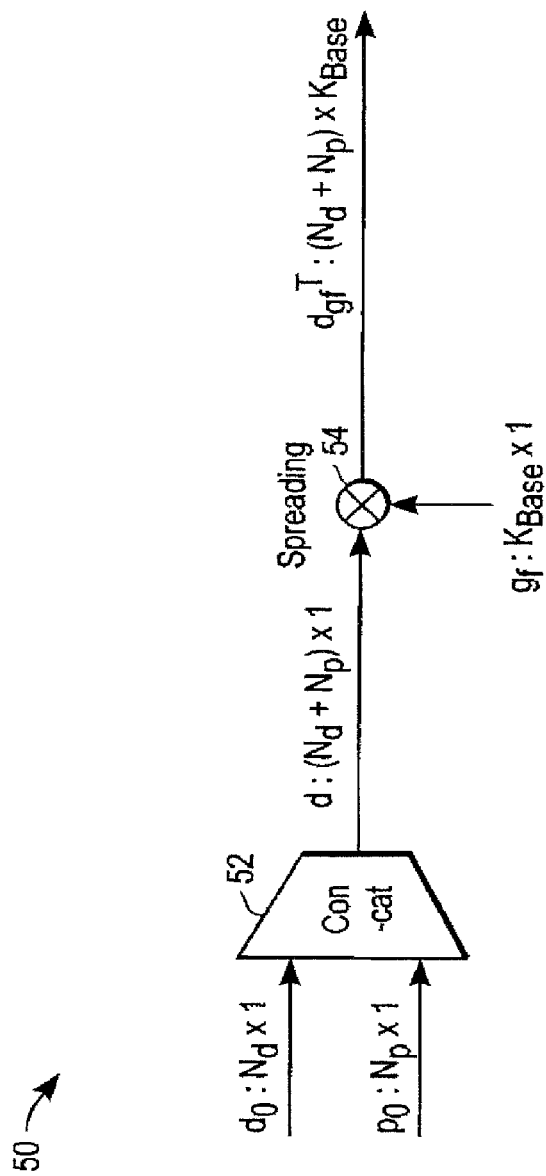
FIG. 3 is a block diagram of base transmitter operations including concatenating a preamble to information data and forward link spreading, in accordance with an aspect of the present invention.

FIG. 3 illustrates a preferred embodiment of the base transmitter spreading operation 50. The spreading operation includes combining a known preamble sequence $p_0$ with the desired transmit data $d_0$ at concatenator 52. For example, the known preamble sequence $p_0$ can be the product of a pseudo-random constant modulus base code and an orthogonal (within a given cell) preamble sequence. The total number of symbols, including both preamble and information symbols, is mapped to a designated set of $N_d + N_p$ symbols within an adapt frame and frequency partition. The spreading multiplier 54 spreads the symbols over all $K_{RU}$ spreading frequencies and $K_{antenna}$ sensors using the complex spreading gains $g_f$.

Figure 4:
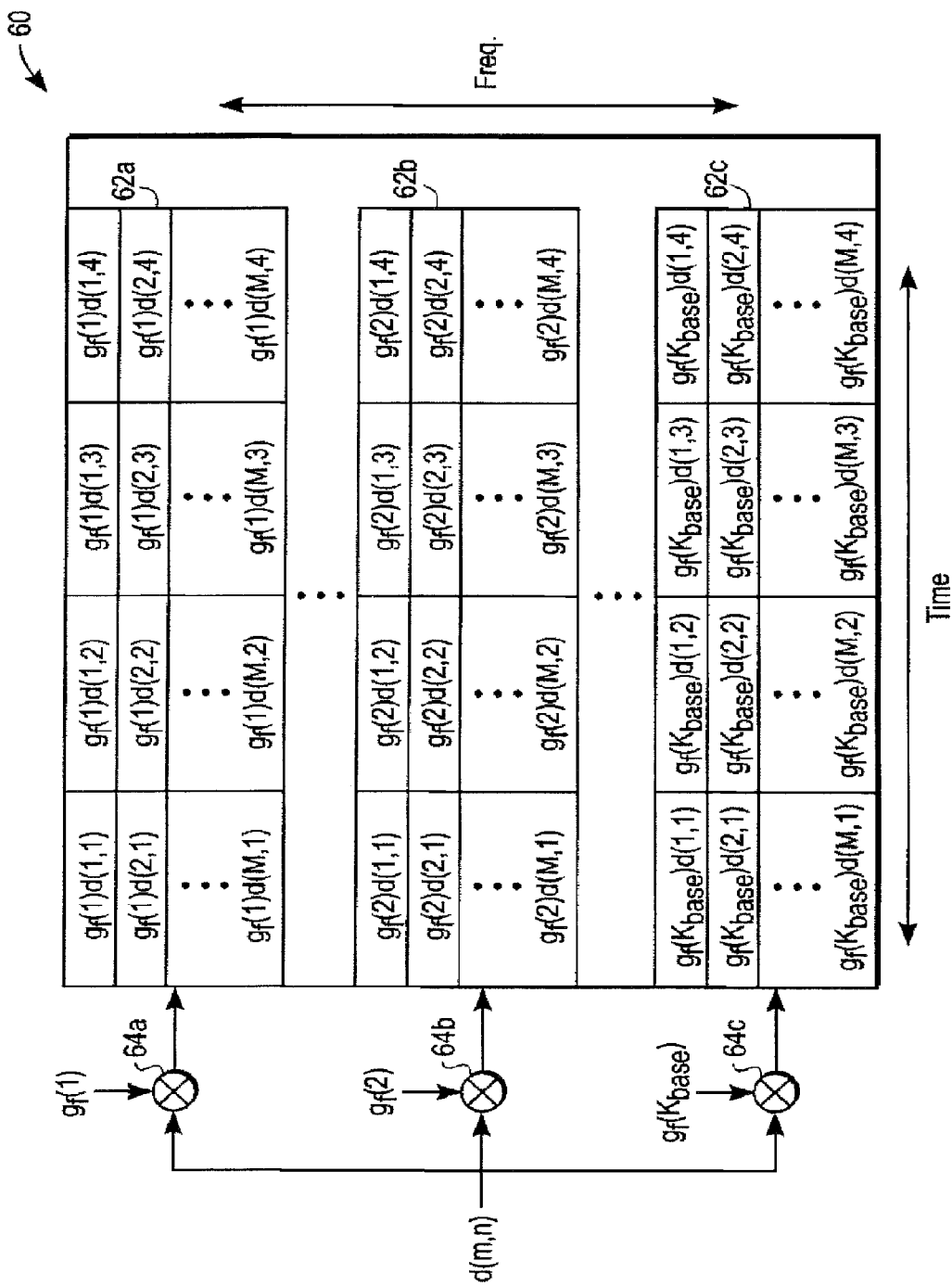
FIG. 4 illustrates an example of symbol mapping in time and frequency by base forward link spreading, in accordance with an aspect of the present invention.

FIG. 4 illustrates a spreading of symbol map 60 resulting from the spreading operation 54 of FIG. 3. Referring back to FIG. 4, each of the $K_{Base}$ complex weights multiplies each symbol $d(m,n)$. For example, multiplier 64a multiplies each symbol by the complex weight $g_f(1)$ and maps weighted symbols in frequency and time as shown in the mapping 62a. Analogous symbol mappings 62b and 62c result from spreading multiplications 64b and 64c by spreading weights $g_f(2)$ and $g_f(K_{Base})$, respectively. For this example, the number of time samples is four. Combining the preamble symbols and the data symbols is most effective if the preamble symbols are spread evenly among the available frequency bins in a partition.

Forward Link Power Control

A preferred embodiment of the base transmitter provides forward link power control described herein. The desired gain from a signal transmitted from a RU through a reverse link spreader of FIG. 6, a channel, and the base receiver's despreader of FIG. 1 is unity. This is modeled as $$w_r^H(m) g_r \approx 1,$$

where $g_r$ is the RU transmitter's spreading gain and $H(m)$ is the $K_{base} \times K_{RU}$ matrix channel model as a function of frequency index m. $H(m)$ has the block diagonal form, $$H(m) = \begin{bmatrix} h(f_1, m) & 0 & \mathcal{L} & 0 \\ 0 & h(f_2, m) & 0 & \mathcal{M} \\ \mathcal{M} & \mathcal{M} & \mathcal{O} & 0 \\ 0 & 0 & \mathcal{L} & h(f_{K_{RU}}, m) \end{bmatrix}.$$

The frequency $f_k$ represents the start of the k'th spreading frequency used by a given partition. The index m is the m'th frequency bin offset into the partition. Each $h(f_k, m)$ is a $K_{antenna} \times K_{antenna,RU}$ matrix representing the channel transfer function between a RU and a base. $K_{antenna}$ is the number of sensors used by a base, and $K_{antenna,RU}$ is the number of sensors used by a RU. Nominally, the number of number of sensors used by a RU is one; however, alternative embodiments of the present invention may include multiple sensors at a RU. The channel includes the effects of wave propagation through space and any filtering operations that may occur in either the transmitter or receiver RF components.

The reverse link power control is effected by setting the bulk transmit gains so that the mean received power in a partition is equal to a design target of $\kappa_{rev}$, $$\sqrt{\langle \|H(m) g_r\|^2 \rangle} = \kappa_{rev}.$$

A formula for mean received power is based the relationships, $$1 \approx |w_r^H(m) g_r| \approx \epsilon \|w_r\| \|H(m) g_r\| \approx \epsilon \|w_r\| \kappa_{rev}. \quad (A8)$$

The term $\epsilon$ is a system design parameter related to system efficiency. Its maximum value is 1, but is typically smaller due to array loading from other interferers, multipath and partition bandwidth. A more typical value of $\epsilon$ is −10 to −11 dB. In the noise-free case and in the absence of time or frequency dispersion, $\epsilon$ can achieve its maximum of unity since the optimal least squares despreading gains $w_r$ will tend to be proportional to the received aperture $H(m) g_r$. When the differential delay of the multipath is small relative to the inverse of the partition bandwidth, and after the direct path delays have been compensated, the received aperture is nearly independent of the frequency bin index m within a given partition.

From equations (A7) and (A8) a formula for the norm of the forward link transmit gains and a design formula for $\kappa_{fwd}$ is obtained as follows, $$\|g_f\| \approx \frac{\kappa_{fwd}}{\epsilon \kappa_{rev}}, \quad (A9)$$

$$\kappa_{fwd} \approx \|g_f\| \epsilon \kappa_{rev}$$

When the transmit power is specified due to power amplifier operating characteristics, FCC regulations or the economics of the desired cell radius, then the correct retrodirective gain $\kappa_{fwd}$ can be specified using equation (A9).

An alternative method is to set the magnitude of each weight vector to the same constant $k_f$, as follows, $$g_f = \frac{w_r^*}{\|w_r\|} k_f$$

This method assumes channel reciprocity.

RU Receiver Despreading Operation

Figure 5:
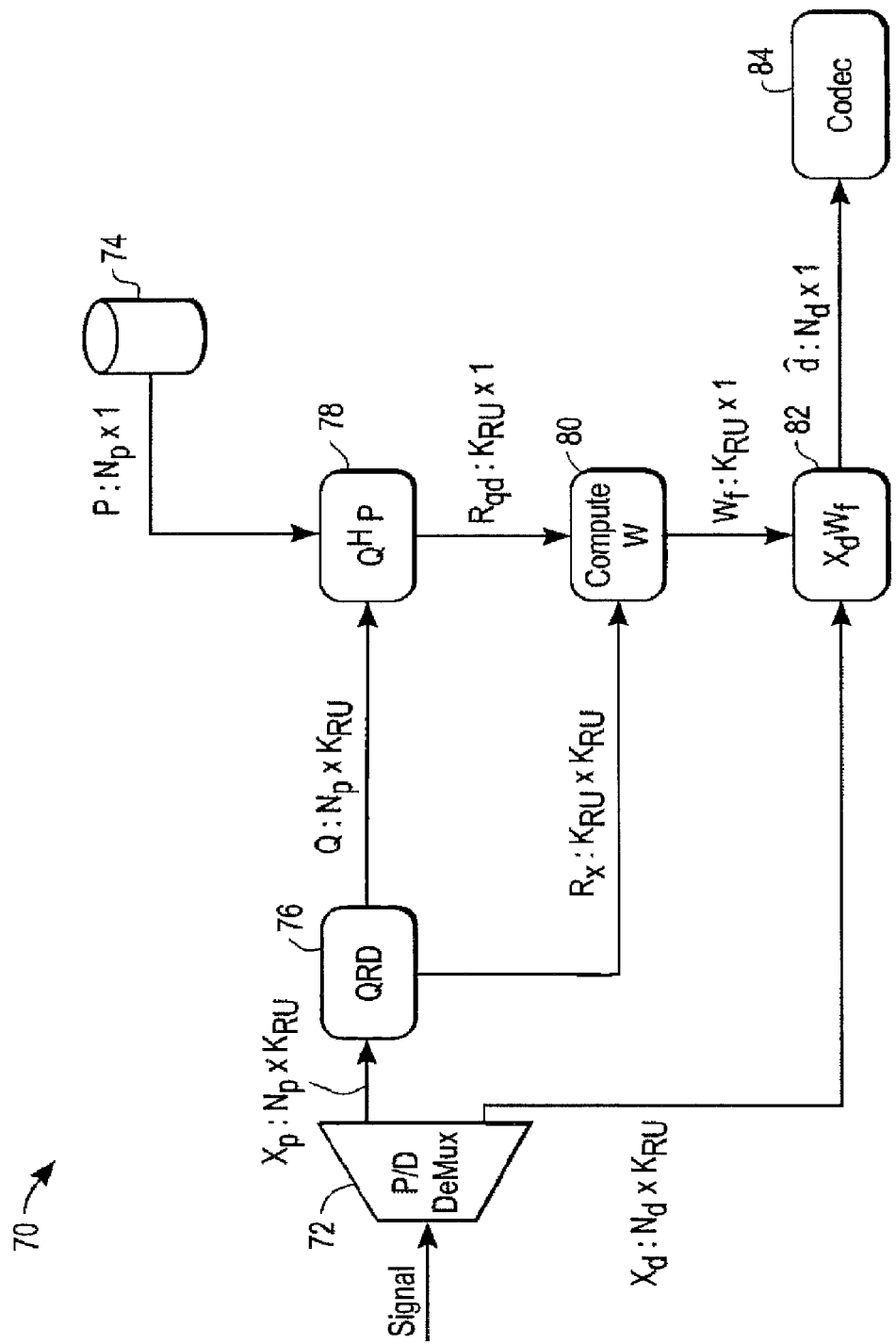
FIG. 5 is a block diagram of remote unit receiver operations including preamble detection and despreading operations, in accordance with an aspect of the present invention.

FIG. 5 illustrates a RU receiver despreading processor 70. Definitions of the signal parameters involved are provided below.

P: $N_p \times 1$ conjugate preamble vector, unique for a given RU.

$X_p$: $N_p \times K_{RU}$ conjugate received data at a RU over the time/frequency indices used by the known preamble.

$X_d$: $N_d \times K_{RU}$ conjugate received data at a RU over the time/frequency indices used by the transmitted data symbols.

Q: $N_p \times K_{RU}$ whitened received data (orthonormal columns) after the QR decomposition of $X_p$.

$R_x$: $K_{RU} \times K_{RU}$ Cholesky factor of $X_p$.

$R_{qd}$: $K_{RU} \times 1$ cross-correlation between the whitened data and the known preamble vector.

$w_f$: $K_{RU} \times 1$ despreading gains for the RU.

All of the matrices and dimensions described above are quantities used internally by the RU digital signal processor(s) and are different than those described for the base receiver in FIG. 1, although they play analogous roles. The RU despreading operation now described applies to a single partition. When multiple partitions are used, each partition has corresponding despreading weights, which are applied to the received data in the given partition. The received data are first down-converted, digitized and broken into partitions. A partition of data is separated into a set of received vectors associated with the transmitted preamble, $X_p$, and those vectors associated with the transmitted information symbols $X_d$. The rows of $X_p$ contain the Hermitian transposes of a set of received $K_{RU} \times 1$ data vectors, $x(m_i,n)$, where $m_i$ is the $i^{th}$ frequency bin containing a preamble symbol.

FIG. 5 is a block diagram of a remote unit receiver 70. The preamble/data demultiplexor P/D Demux 72 separates the input signal into preamble data $X_p$ and transmitted information data $X_d$. The RU's conjugate preamble vector P can be stored in a storage disk 74 or in memory. The received preamble data $X_p$ is whitened using a QR decomposition 76, such that $Q R_x X_p$, where Q is an orthonormal matrix. The multiplication block 78 combines the conjugate preamble vector P with the whitened received preamble matrix Q to give the cross-correlation $R_{qd}$.

The weight computation block 80 computes despreading weights $w_f$. The despreading weights $w_f$ optimize a simple least squares performance criterion. They are computed according to the formula, $$w_f = R_x^{-1} Q^H P.$$

The multiplication block 82 applies despreading weights $w_f$ to the data vectors in $X_d$ associated with the information symbols to form a vector of despread information symbols, according to the formula, $$\hat{d} = X_d w_f.$$

The output of the multiplication block 82 is processed by codec 84 to obtain the transmitted information bits.

The dimension of the despreader in this example is $K_{RU}$, the frequency spreading gain factor. In general, a RU may have multiple sensors, increasing the degrees of freedom and improving its ability to cancel interference. For some applications, however, it is advantageous to minimize the complexity of the RU by minimizing the degrees of freedom used in the despreader. For TDD systems, the base can manage the majority of the complexity needed to provide interference excision.

RU Transmitter Spreading Operation

Figure 6:
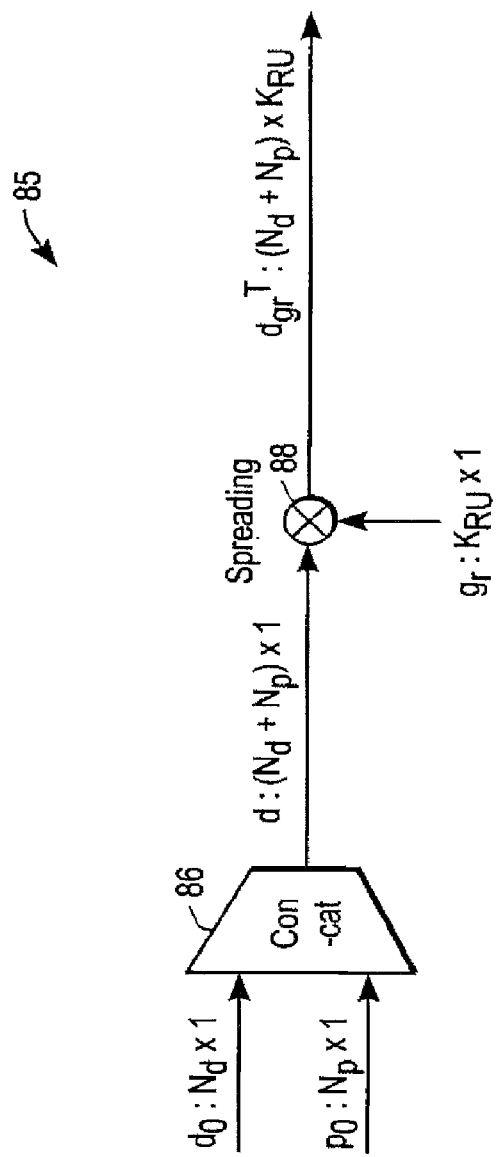
FIG. 6 is a block diagram of remote unit transmitter operations including concatenating a preamble to information data and forward link spreading, in accordance with an aspect of the present invention.

FIG. 6 illustrates an embodiment of an RU transmitter 85. The concatenator 86 combines a known preamble sequence $p_0$ with the transmit data $d_0$. The combined preamble and transmit symbol sequence has a total length of $N_d + N_p$. The preamble sequence $p_0$ is the product of a constant modulus base scrambling code, $b(m,n)$, and a unique orthogonal preamble sequence previously assigned to the RU.

Alternative embodiments do not use a base scrambling code. For embodiments using Hadamard basis functions, for example, the preamble sequence assigned to the RU is based on a Hadamard basis function.

The combined sequence is mapped to a designated set of symbols within an adapt interval and frequency partition. Spreading operation 88 spreads the symbols over all $K_{RU}$ spreading frequencies by multiplying with complex spreading gains $g_r$. The spreading operation 88 reproduces the transmitted symbols in $K_{RU}$ widely separated frequencies for each sensor and scales each symbol by a complex constant.

Figure 7:
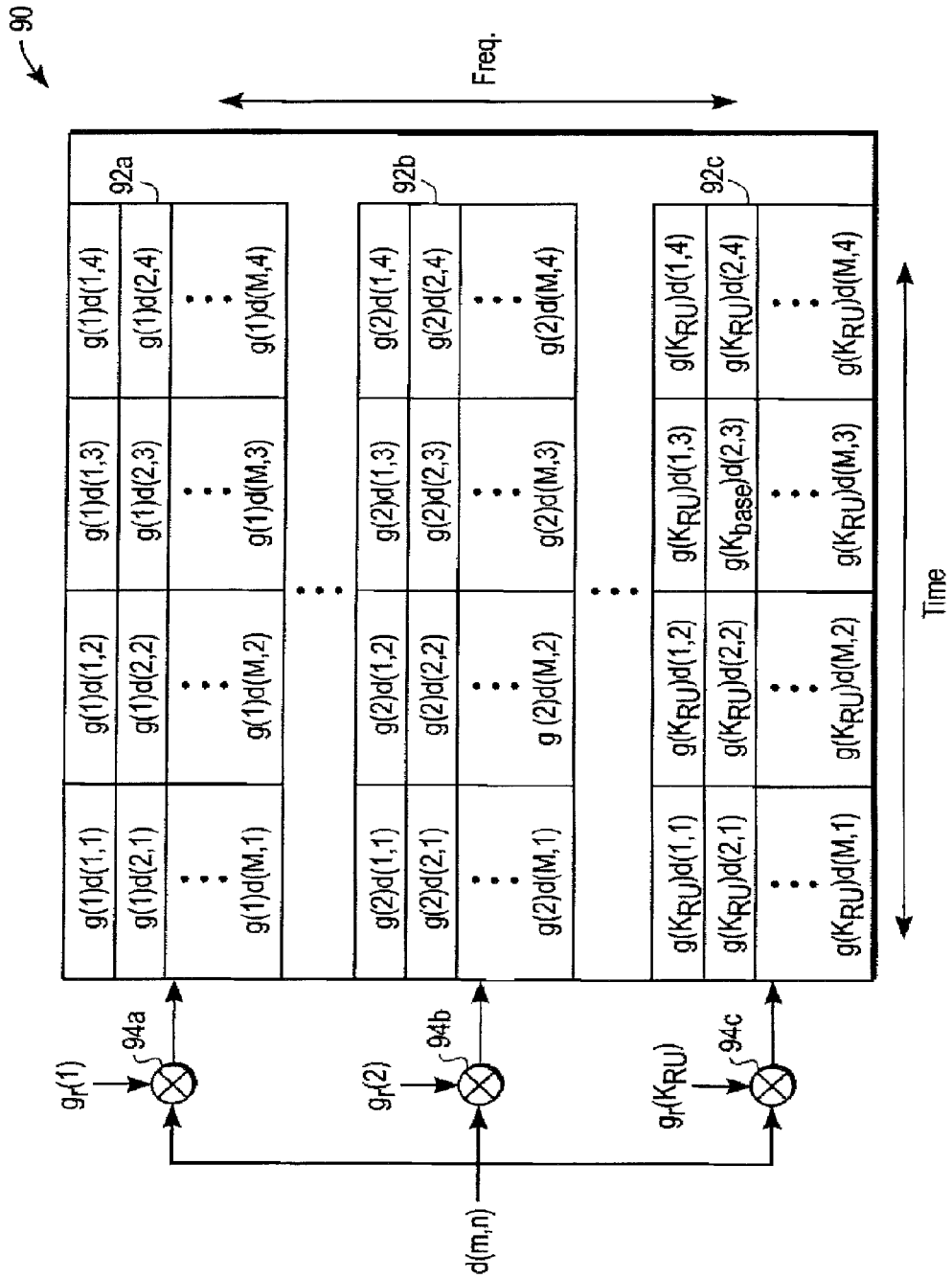
FIG. 7 illustrates an example of symbol mapping in time and frequency by remote unit forward link spreading, in accordance with an aspect of the present invention.

FIG. 7 illustrates a spreading of symbol map 90 resulting from the spreading operation 88 of FIG. 6. Referring back to FIG. 6, each of the $K_{RU}$ weights multiplies the symbols $d(m,n)$. For example, multiplier 94a produces symbols weighted by the complex weight $g_r(1)$ and mapped to frequency bins and time as shown in mapping 92a. Multipliers 94b and 94c produce symbol maps 92b and 92c using weights $g_r(2)$ and $g_r(K_{RU})$, Respectively. Combining Preamble symbols and the data symbols is most effective if the preamble symbols are spread evenly among the available frequency bins in a partition.

Closed Loop Power Control

Referring back to the retrodirective spreading gain relationship in equation (A9), the forward link power is indirectly controlled by controlling the reverse link transmit power. A simple technique for maintaining reverse link power control is to monitor the gain of the reverse link spreading weights at the base station. Based on system operating parameters and link budget, target values are established for forward link transmission power and the norm of the forward link transmission gains $\|g_t\|$ can be determined. This allows an estimate of the target value for $\|w_r\| = \eta$ based on equation (A7). The power control method preferably maintains and overall transfer function gain of unity, as indicated in equation (A8).

By monitoring $\|w_r\|$ at the base and comparing it to a set of predefined thresholds $\eta_-$, $\eta_+$ such that $\eta_- \leq \eta \leq \eta_+$, it is determined whether the despreading weight power needs to be changed by an incremental gain change parameter $\gamma_1$, which is adjustable. If the changes in transmit gains are kept small, for example in 1 dB increments or decrements, then a simple two bit return message can be sent to the RU from the base to indicate the desired changes in power control.

Figure 8:
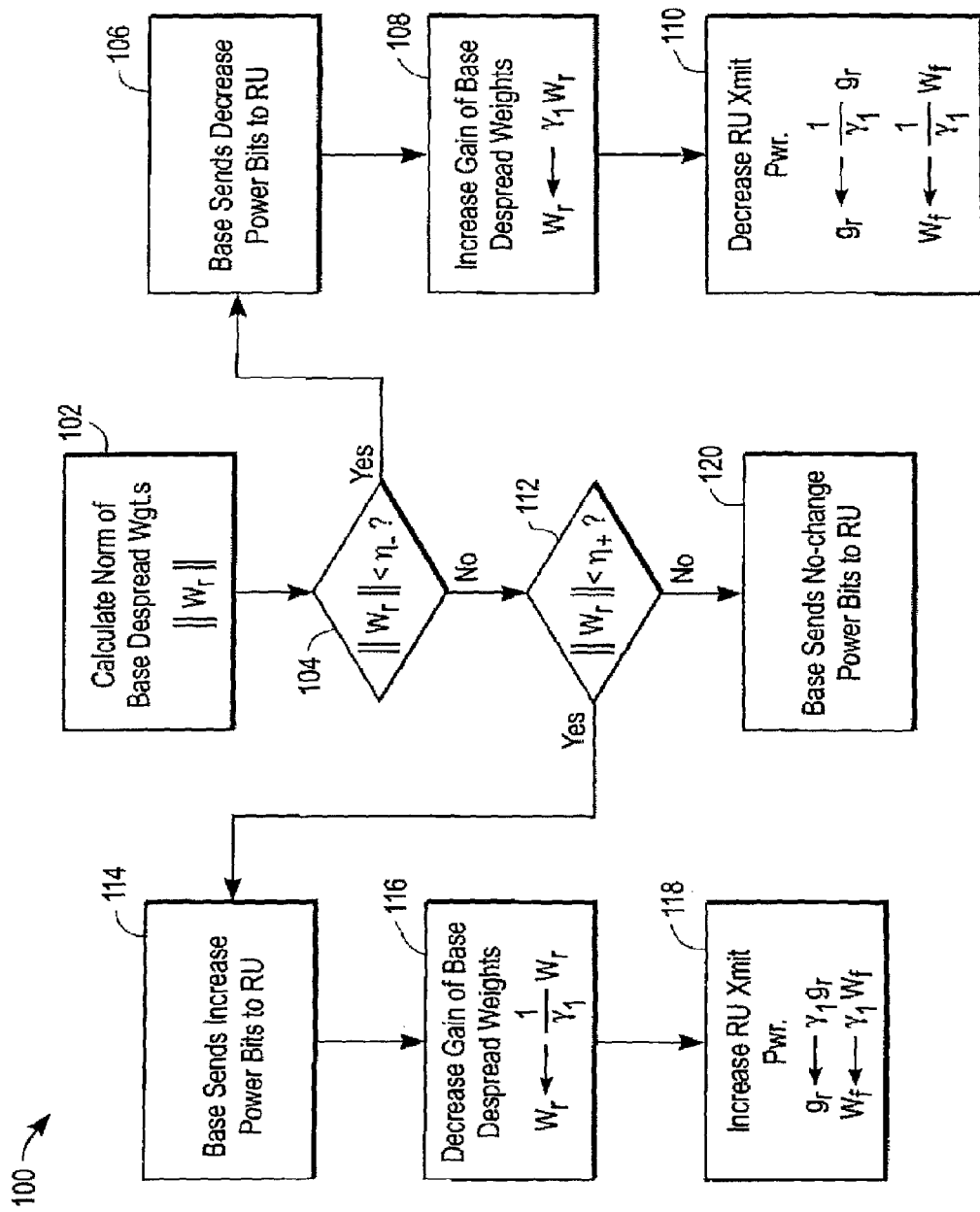
FIG. 8 is flow chart of a closed loop power control method, in accordance with an aspect of the present invention.

FIG. 8 gives a flow chart for a closed loop power control method 100. A calculation block 102 calculates the norm of the base despreading weights $w_r$. A first comparator 104 compares this norm with the lower threshold $\eta_-$. When the result of the first comparator 104 is "yes", the base sends decrease-power bits to the RU according to a decrease-power block 106. At increase-gain block 108, the gain of the base despreading weights is increased, and at decrease-power block 110 the power transmitted by the RU is decreased. The incremental gain change parameter $\gamma_1$ is used by both increase-gain block 108 and the decrease-power block 110.

When the result of the first comparator 104 is "no", a second comparator 112 compares this norm with the upper threshold $\eta_+$. When the result at the second comparator is "yes", the base sends increase-power bits to the RU at block 114. At decrease-gain block 116 the gain of the base despreading weights is decreased, and at an increase-power block 118 the power transmitted by the RU is increased. The on the incremental gain change parameter $\gamma_1$ is used by both the decrease-gain block 116 and the increase-power block 118.

When the result of the second comparator 112 is "no", the base send unchanged power bits to the RU according to a no-change power block 120.

When despreading weight update intervals are longer than the power control interval or when longer block or exponential averaging times are used, the despreading gains are adjusted to compensate for the new transmit gain powers. In this case, the corresponding cross-correlation coefficients are adjusted in a similar way, since the coefficients and weights are proportional.

An alternative calculation of RU transmit weights for weights having the same magnitude is as follows. The base computes the incremental gain change and sends the RU the power change bits. The RU in turn converts these bits into the desired transmit power, $k_r$, and converts the RU receive weight vector, $w_f$ to the RU transmit weight vector, $g_r$, using, $$g_r = \frac{w_f^*}{\|w_f\|} k_r$$

Alert Control Channel

An embodiment of a control channel is the alert control channel is described herein. An alternative to the alert control channel, the access channel, is described later. One purpose of a control channel is to initialize communication links Initializing communication on the forward link can be difficult since there is little or no information available to a base station for determining spreading weights used to null interference from other remote units. To reduce cost and complexity, most RU implementations will have a small number of sensors, typically one, and may have one or two degrees of freedom cancel interference and enhance the signal of interest from the base. For example, the bases have 16 sensors and 2 spreading frequencies for a total of $K_{base}=32$ degrees of freedom. The RU has 1 sensor and 2 spreading frequencies for $K_{RU}=2$ degrees of freedom. It is advantageous for the base transmitter weights to provide interference mitigation since the base has more degrees of freedom. To train transmitter weight, a base can request that a particular RU transmit a message that it can use to compute initial transmit weights. One approach is for the base to broadcast a request message to all RUs. Another approach is to maintain a low data rate link for request messages to each RU considered active.

An alert channel, or alert channel cache, is a set of frequency bins dedicated to the transmission of control information used to initiate communication links. For initiating communication links, base station requests a particular RU to transmit a message that can be used by the base station to compute transmit weights for that RU. The base uses the alert channel to maintain a low data rate link to each active RU. The base sends a few bits to the RU on a forward link alert channel, indicating that it wishes to transmit data packets to the RU. The RU will then respond by transmitting a weight training message (WTM). The WTM is a known preamble that the base uses to compute a set of transmit weights.

The alert channel supports other control functions. These include indicating the partitions for transmission, the number of frames of data to be transmitted, power control information for controlling power levels on both the alert channel and on the traffic bins, and RU performance and status information.

The RUs using the alert channel are the most active users currently in the network. In this sense, the alert channel plays a role similar to a cache in computer architecture. When a base wishes to transmit to a RU, there is a high probability it can signal the desired RU using the alert channel.

Figure 9:
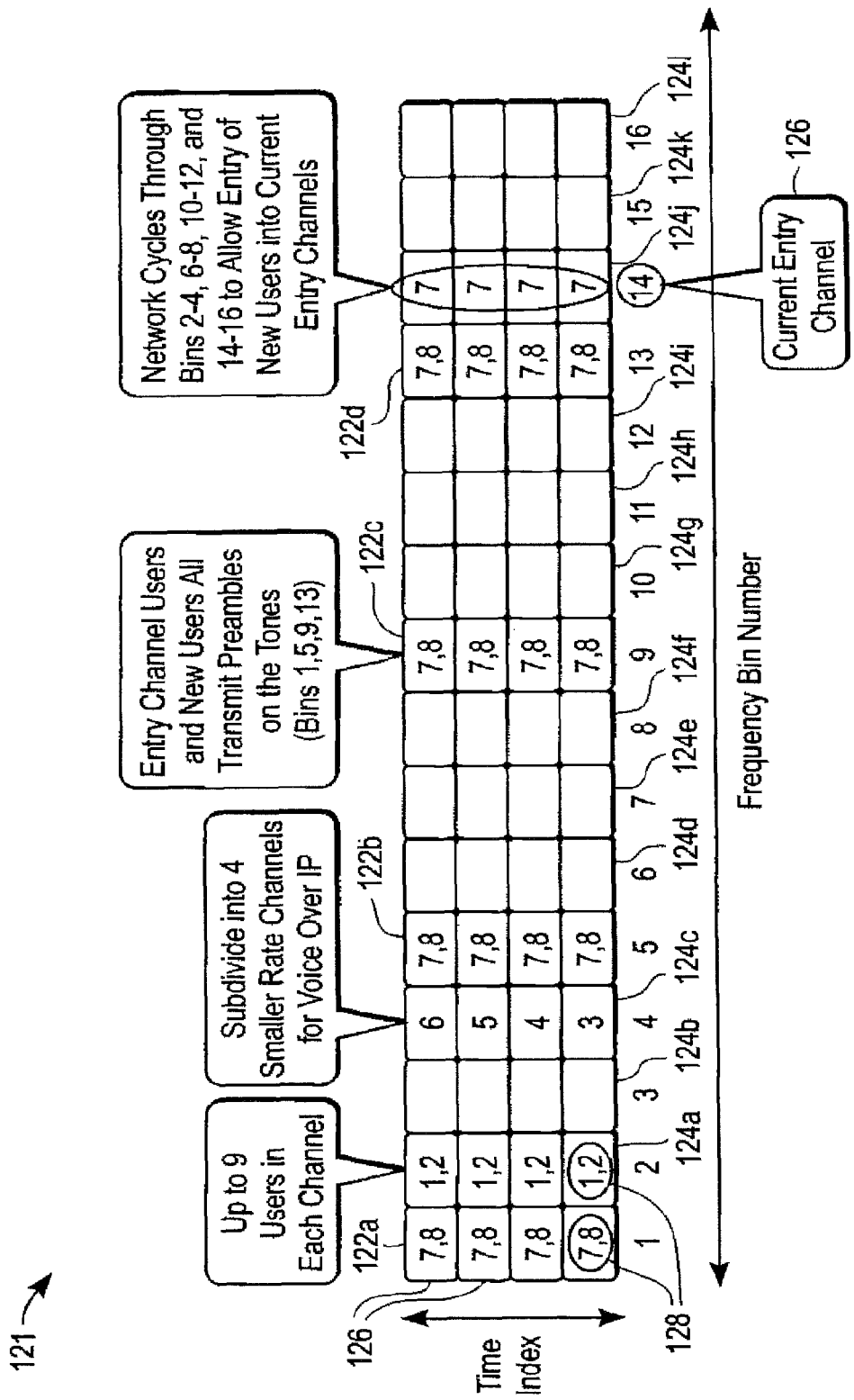
FIG. 9 illustrates a time and frequency allocation for an embodiment of an alert channel, in accordance with an aspect of the present invention.

FIG. 9 illustrates an example time/frequency resource allocation for an alert channel cache 121. The alert channel in this example uses 16 frequency bins 122a through 122d and 124a through 124l and four time indices 126. Channels 124a through d are referred to as alert bearer channels. Four training bins, or training channels, 122a-d, are allocated for new users to enter the alert channel network. A separate entry channel "e", or current entry channel, is cycled through the 12 alert bearer channels 124a-1. For this example, the current entry channel occupies frequency bin 124j. A user number 128 indicates that a particular RU is using a channel.

Each RU transmits a preamble sequence on the four training bins 122a-d. After a suitable number of adapt frames has passed, despreading weights are trained for each RU in the alert channel. Transmission then switches to the current entry channel 124j. Once the signals have transitioned to the current entry channel 124j, the entry channel number is incremented so that new alert bearer channel, for example 124k, will add signals. The applies the despreading weights to data received in the alert channel The number of users allowed per channel may vary and channels may be further specialized. Up to $M_{base}$ users may be added to each alert bearer channel 124a-l. A channel may be divided into smaller, lower rate channels for specialized transmissions such as voice transmissions in an internet protocol (IP) network. For example alert bearer channel 124c, is time division multiplexed to support four users.

Figure 10:
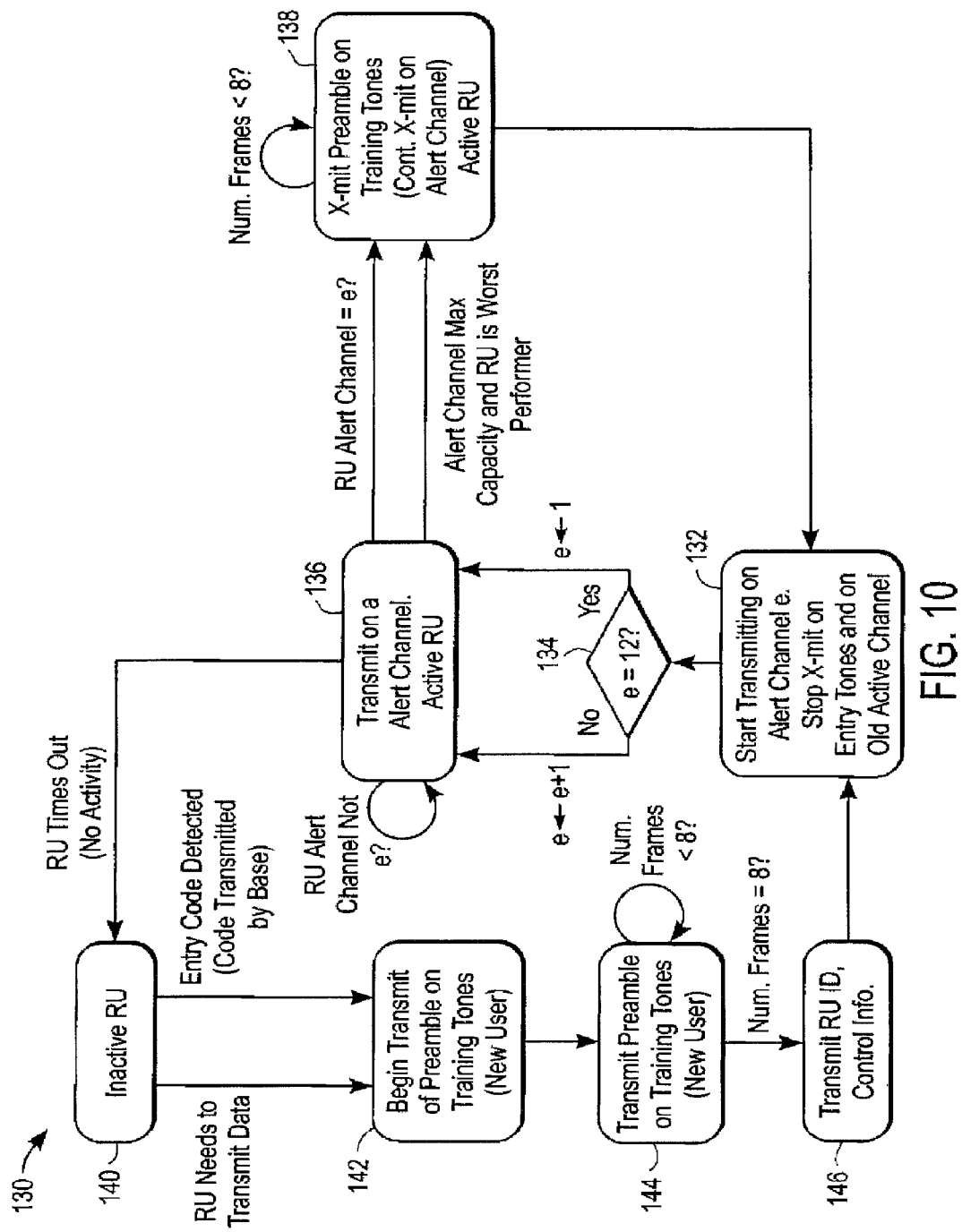
FIG. 10 is a flow chart of an alert channel protocol method, in accordance with an aspect of the present invention.

FIG. 10 illustrates an alert channel protocol method 130. In step 132, transmission begins on the current entry channel. Step 134 checks for the value of e=12, for this example. More generally, this step checks whether e equals the number of alert bearer channels. If the result is "yes" then the value is reset to 1; otherwise, the value is incremented. A transmission 136 is made to an active RU. If there is no time out, then the preamble is transmitted 138 followed by continued transmissions 132 on the current entry channel 132. After an inactive RU time out 140, transmission of a preamble is begun from a new RU in step 142. A preamble is transmitted on training tones 144 for a number of frames, eight for this example. Next, RU ID and control data are transmitted 146 followed by transmission 132 on the current entry channel.

Active User Entry

When an inactive RU has data to transmit to a base, it can begin doing so over the bearer channels and the training bins in the alert channel cache. Initially, the RU 218a1 transmits preambles so that the base can adapt a set of despreading weights. The base can use two techniques to determine which of the RUs 218a1-218a9 are entering.

The first technique includes having a fixed set of orthogonal preambles reserved for each partition of each base 216a-216c for transmission over the alert channel training bins. The preamble symbols are selected from an orthogonal basis set that admits fast transforms, such as FFT or Hadamard basis. Several basis sets may be maximally separated by a unit modulus scrambling code in order to increase the number of available preamble sequences and minimize the probability of collision. For dynamically assigned preambles, after the base 216a has transmitted the preamble sequence, the RU 218a1 responds by transmitting a heavily encoded identifier, or RU ID, and control information over several frames. The base 216a can analyze the RU response for bit errors and determine whether to send an acknowledgement. The base can send an acknowledgement over several alternative channels, including training bins in the next few frames, the alert bearer channels after users transfer to the current entry channel or frames borrowed from the forward link initiation transmit opportunities.

In the second technique, the RU 218a1 enters on an alert bearer channel by simply starting to transmit preamble symbols and data. The base detects the preamble using a preamble detection algorithm. Associated with the initial reverse link entry, is a forward link return channel containing control information from the base. The control information designates the preamble the RU should transmit on the alert channel. After receiving this control information, the RU 218a1 can enter the alert channel by transmitting the designated preamble. In this scenario, a RU ID would be unnecessary.

These two techniques have different performance tradeoffs. With the first technique, there would be greater latency for initial RU entry on an available alert channel With the second technique, there would be additional loading on the alert bearer channels. Also, if the alert bearer channels use soft contention, additional handling of contention issues would be required.

After transmission of preamble data, the RU transmits ID information and then moves all transmission to the current entry channel, for example, channel 124j in FIG. 9. The entry channel number is then incremented, modulo the number of available entry channels, which is twelve in the example of FIGS. 9 and 10.

Once the RU is active, the base can compute its despreading weights using decision-directed adaptation. Decision-directed adaptation uses the output of a symbol decoder to estimate the transmitted symbols. The base uses the estimated symbols to compute a cross-correlation. The base then computes despreading weights according to a minimum mean square error (MMSE) criterion as follows, $$w_a = R_{xx}^{-1} R_{xs},$$

where $R_{xx}$ is the received data auto-correlation matrix. When the RU is transmitting symbols on the training bins, the transmitted symbols are known by the base and do not need to be estimated.

The alert channel provides a low data rate circuit for two-way communication between the base and the RU. Because the transmit gains on the forward link can be chosen retrodirectively as in equation (A7), the forward link transmission will be efficient, allowing up to nine users to share the channel when $K_{base}=32$. The efficiency increases when the RU also chooses its transmit gains retrodirectively. This efficiency increase is accompanied by increasing RU complexity, since the differences between the transmitter and receiver hardware at the RU must be compensated.

While a RU is active in the alert channel cache, the base can use the channel to indicate when the RU should transmit weight training messages for a forward link data transmission. The RU can also use the alert channel cache to transmit performance statistics and power control information on the reverse link. When the RU does not have data to transmit on the alert channel, it still transmits weight training messages to enable a forward link transmission from the base.

Inactive User Exit

After the RU has been using the alert channel for a while, its activity on the channel may decrease. This occurs when the user is no longer using his data modem or the user is processing data that has already been transferred, such as reading a downloaded web page. At this point it is desirable to remove the user from the alert channel.

The decreased activity can be detected by using a simple activity threshold. The packet transfer rate can be measured and when it drops below a pre-defined level the RU is informed over the alert channel that it is being removed from the channel and is now considered inactive.

This strategy can modified to support lower data rate CBR (constant bit rate) services. These services must be identified and appropriate activity thresholds must be set for the type of service employed.

Alert Channel Load Leveling

In order to prevent one alert bearer channel becoming overloaded while others remain underloaded, a simple load leveling algorithm is applied. The loading on each alert bearer channel is kept as even as possible by directing the channel with the largest number of users to offload one of its users to the current entry channel 124j of FIG. 9. For example, if the active tone with the largest number of users has two more users than the current entry channel, one of its users is offloaded, such as the one with the lowest MSE.

The base informs the selected RU of its status by transmitting control bits over the forward link alert channel. The RU then begins transmitting its preamble symbols in the training bins and data in its current alert bearer channel. Other RUs may also be transmitting preambles in the training bin. The transmitted preamble of the selected RU can use a separate code so that it will not collide with others in the training bins. The RU transmits any necessary control data in the alert bearer channel. After the transmission on the training bins is finished, the selected RU begins to transmit on the current entry channel with the other RUs. The selected RU simultaneously ceases transmission on the old maximally-loaded channel. This effects a transfer from the most loaded channel to the current entry channel.

Because of its fixed schedule, the current entry channel is known to every user and every base in the network. Therefore, current entry channel information need not be passed between the base and RU.

Base Initiated Transmission

In certain cases, the base initiates transmission with an inactive RU. For example, paging and e-mail services require the transfer of information on a periodic basis at various intervals, such as every ten minutes, hourly or daily. The base uses the alert channel training bins on the forward link to initiate these transmissions.

The base 216a transmits a symbol sequence unique to the RU 218a1 with which it desires to communicate. Each of the inactive RUs 218a2-218a9 cross-correlates its unique code against the received data transmitted from the base to determine whether it is being paged by the base 216a. If the computed detection statistic of a RU 218a1 exceeds a threshold, then the RU 218a1 accepts the page request of the base 216a and begins transmission on its home partition. The RU 218a1 transmits a known weight training message, which the base uses for adapting its forward link transmission gains. The RU 218a1 also begins transmission on the alert channel training bins for entry into the alert channel cache.

The detection statistic used by each RU 218a1-218a9 is of the form, $$\rho_d = \frac{c^H P(X_a) c}{c^H c}$$

where $X_a$ is a complex matrix whose rows are the Hermitian transposes of the $K_{RU} \times 1$ received data vectors over the alert channel training bins. The unique detection code for each RU 218a1-218a9 is represented by the vector c. The dimension of c is equal to the number of available training bins in a given partition. For the example of FIG. 9, the number of available training bins is sixteen.

A set of unique detection codes can be chosen using sphere packing codes to provide maximum separation. The codes can be generated using known lattices or computer aided numerical optimization techniques. The codes do not require a special structure for the purposes of encoding or decoding since each RU tests only the code assigned to it. The RU computes the detection statistic only when it is otherwise dormant or in an inactive state. The computations do not impact the RU while it is active.

The performance of forward link initiation can be enhanced by the proper choice of forward link spreading gains. During the course of normal operation, the base makes measurements of the RU to base channel over the alert channel bins. The base computes a cross-correlation vector $R_{xs}$, which is a measure of the base receive aperture vector. The most recent aperture estimates can be saved in a database at the base. The spatial component of the apertures should remain invariant for reasonably long periods of time. The base can set the transmit gains to be proportional to $R_{xs}$, scaled to the desired transmit power. This enhances the gain in the direction of the RU of interest by a factor as large as $K_{base}$.

Periodic User Strategies

Users of voice, broadcast video, video conferencing and similar applications will establish links that have constant bit rates (CBR) and fairly regular periodic packets of data. A different strategy for lower data rate applications, such as voice, will provide efficient use of system resources. For example, when a large number of voice users is anticipated, adding time division multiple access (TDMA) slots to each frequency bin can increase the number of channels available in the alert channel. This example is illustrated in FIG. 9. The alert bearer channel 124b has four separate channels, each with an independent user. The channels are separated in time. The base has a set of despreading weights for each of the four channels.

For the example of FIG. 9, adding TDMA allows for a factor of up to four increase in the number of users that can be active in the alert channel cache. The increase in users is achieved at the expense of decreasing the bit rate for each of the CBR alert channel links. In practice, a fixed percentage of the frequency bins would be allocated for lower rate CBR channels. Since a CBR link will remain active longer and its parameters are sufficiently time invariant, the RU can assume a default partition allocation and a default number of packets to transmit. In this situation, the RU receives only a few bits to indicate when to begin transmission and for controlling the alert channel itself. This accommodates the reduced bit rate of a CBR alert channel.

For RU entry, each TDMA style CBR alert channel is assigned its own entry number on a network wide basis. A RU entering on a CBR alert channel transmits only within its TDMA slot once it has successfully entered on the training bins. The system planner uniformly distributes the CBR channels evenly among the available entry channel numbers to minimize the wait for entry into either a CBR (low bit rate) or undefined bit rate (UBR) or high bit rate alert channel.

An alternative method for handling a large number of low bit rate CBR users is a reservation scheme wherein the user simply agrees to transmit his data periodically in a pre-defined partition at predefined times. Such a user is left out of the alert channel cache so that resources are not wasted on maintaining the user's status. The operation of such a channel is similar to the bearer channel cache described next.

Bearer Channel Cache

The concept of the alert channel cache can be extended to include all of the bearer channel resources. In such a system, every partition would function similarly to an alert channel. Upon entering the system, the RU transmits on a set of training bins contained within the partition it is entering.

Figure 11:
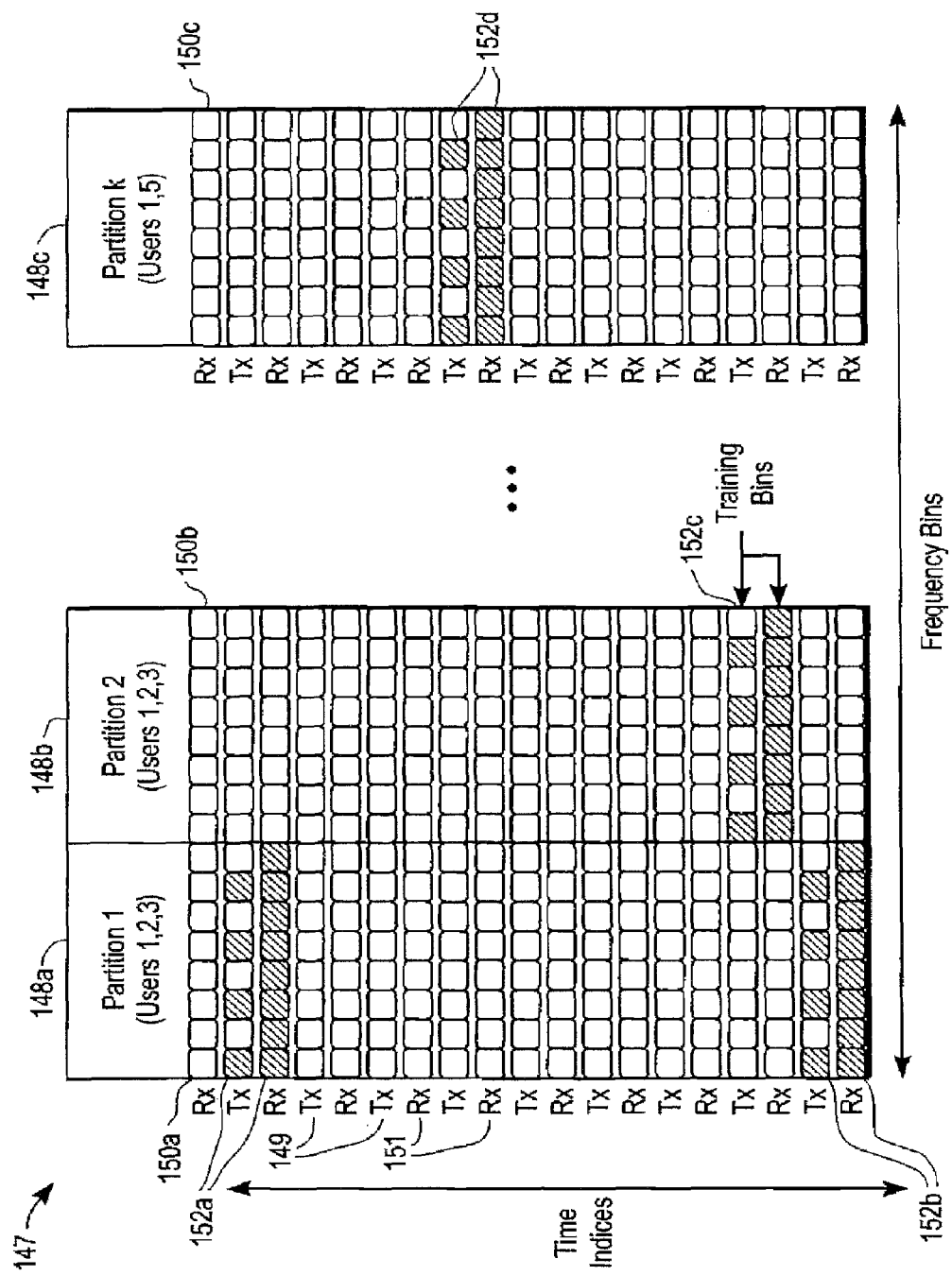
FIG. 11 illustrates time and frequency allocation for bearer channel caches in partitions, in accordance with an aspect of the present invention.

FIG. 11 illustrates an example of time and frequency allocation for a bearer channel cache 147 distributed in partitions of the bearer channel resources. For TDD transmission, every RU 218a1-218a9 and every base 216a-216c alternate between transmit time periods 149 and receive time periods 151. In a given partition 148a-148c, the training bins 152a-152d are evenly distributed over the available frequency bandwidth. The training bins 152a-152d carry preamble symbols that are used to train despreading weights. It is advantageous to stagger the entry opportunities 152a-152d from one partition 148a-148c to the next. With enough partitions this will make it possible for a user who desires access to the network to enter in any given frame. In addition to the training bins, bearer channels 150a-c can be designated as entry channels in a similar fashion to the entry channels of the alert channel cache.

A given user may be in one or more partitions depending upon the needed bandwidth. Bandwidth growth can correspond to the dynamic bandwidth allocation schemes inherent within the internet protocol (IP) or bandwidth can be assigned based on the measured growth of channel utilization. Partitions of varying bandwidths, are provided to support lower data rate CBR services. Bandwidth allocations may be based on frequency or on time. Using Time Division Multiple Access (TDMA), where a user transmits on periodic time slots facilitates changing bandwidth based on time.

The nominal use for the entry bins in the bearer channel cache is similar to the functioning of the training bins in the alert channel. Newly activated RUs transmit preambles in the entry bins along with any existing users in the partition. After a fixed period, sufficiently long to train despreading weights, all RUs switch to the new weights developed on the entry bins and begin transmitting on the data bearing slots of the partition.

Subsequent adaptation of the despreading weights is achieved using decision-direction algorithm. The decision-direction can also occur after trellis decoding or block decoding. Since despreading weights are available at all times for the data bearing slots there is no latency incurred by computing new weights after obtaining symbols from the output of the decoder. The symbols are used for the purpose of computing the cross-correlation vector $R_{xs}$. The available weights are applied to the data first.

Figure 12:
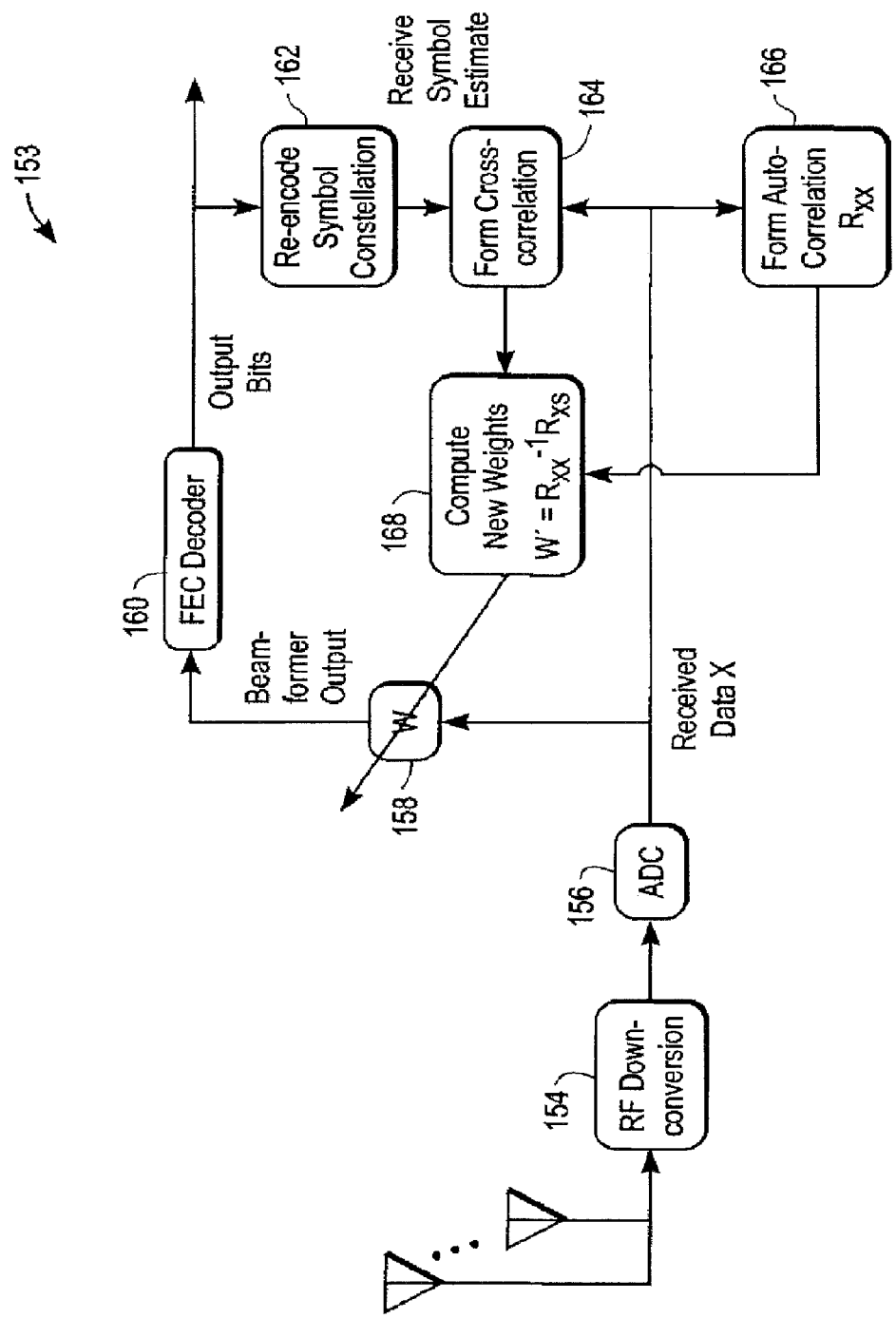
FIG. 12 is a block diagram of a decision-direction method for calculating weight updates, in accordance with an aspect of the present invention.

FIG. 12 is a block diagram for the decision-direction method 153. A received signal is down converted 154 followed by analog-to-digital conversion 156. Despreading weights 158 are then applied followed by decoding 160 to produce output bits. The output bits are re-encoded and mapped to the constellation 162 to produce a received symbol estimate. Cross-correlations calculation 164 of the received data and estimated symbols forms $R_{xs}$ and auto-correlation calculation 166 of the received data forms $R_{XX}$. The compute new weights block 168 uses $R_{xs}$ and $R_{XX}$ to form new weights W'. The new weights will be applied to the next data block.

Independent Downlink/Uplink Layout

The Independent Downlink/Uplink (IDU) channel layout method uses multiple channels at different symbol rates to support the transmission of packet data. This method separates the uplink communications channel from the RU to the base from the downlink channel from the base to the RU.

The advantage is that the loading due to multiple users performing uplink transmission has no effect on users performing downlink transmission. This is achieved at the cost of bandwidth to support the forward link control (FL-C) and reverse link control (RL-C) channels. These channels must have sufficient bandwidth to support weight training messages (WTM). A WTM is a set of known preamble symbols transmitted for the purpose of allowing either the base or the RU to adapt a set of transmit weights.

Figure 13:
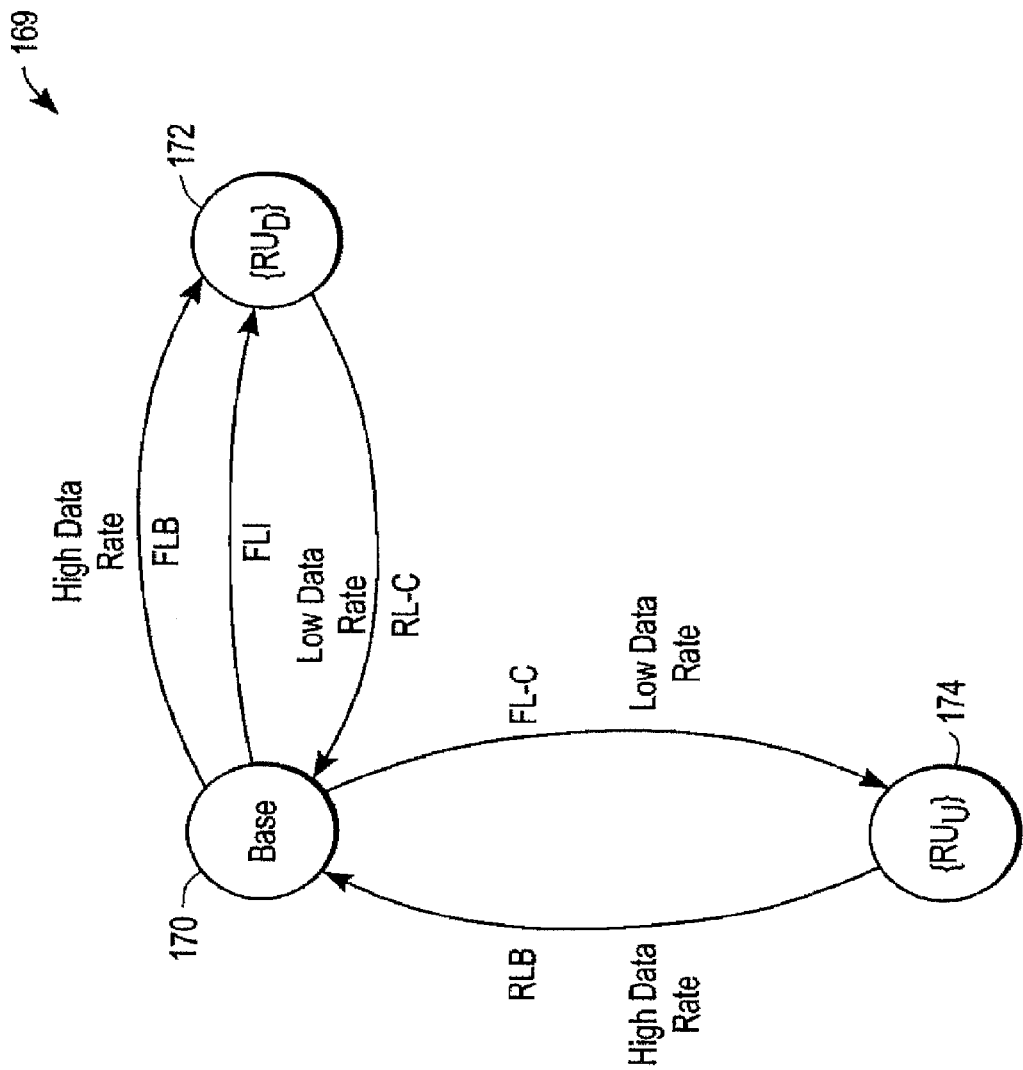
FIG. 13 is a diagram of an independent downlink/uplink (IDU) channel layout, in accordance with an aspect of the present invention.

FIG. 13 illustrates the channel functions for the IDU method 169. A base 170 communicates with a RU on the downlink channel 172 and on the uplink channel 174. The adaptation process exploits channel retrodirectivity for TDD systems so that the reverse link channel will be nearly the same as the forward link channel. As described earlier, the transmit weights are set to a scalar multiple of the receive weights. The transmit weights minimize the energy transmitted to unintended recipients.

The base signals a RU to enter the network using a forward link initiation channel (FLI). The FLI is used primarily when the base has data to transfer to a RU that is not actively transmitting in the network.

Figure 14:
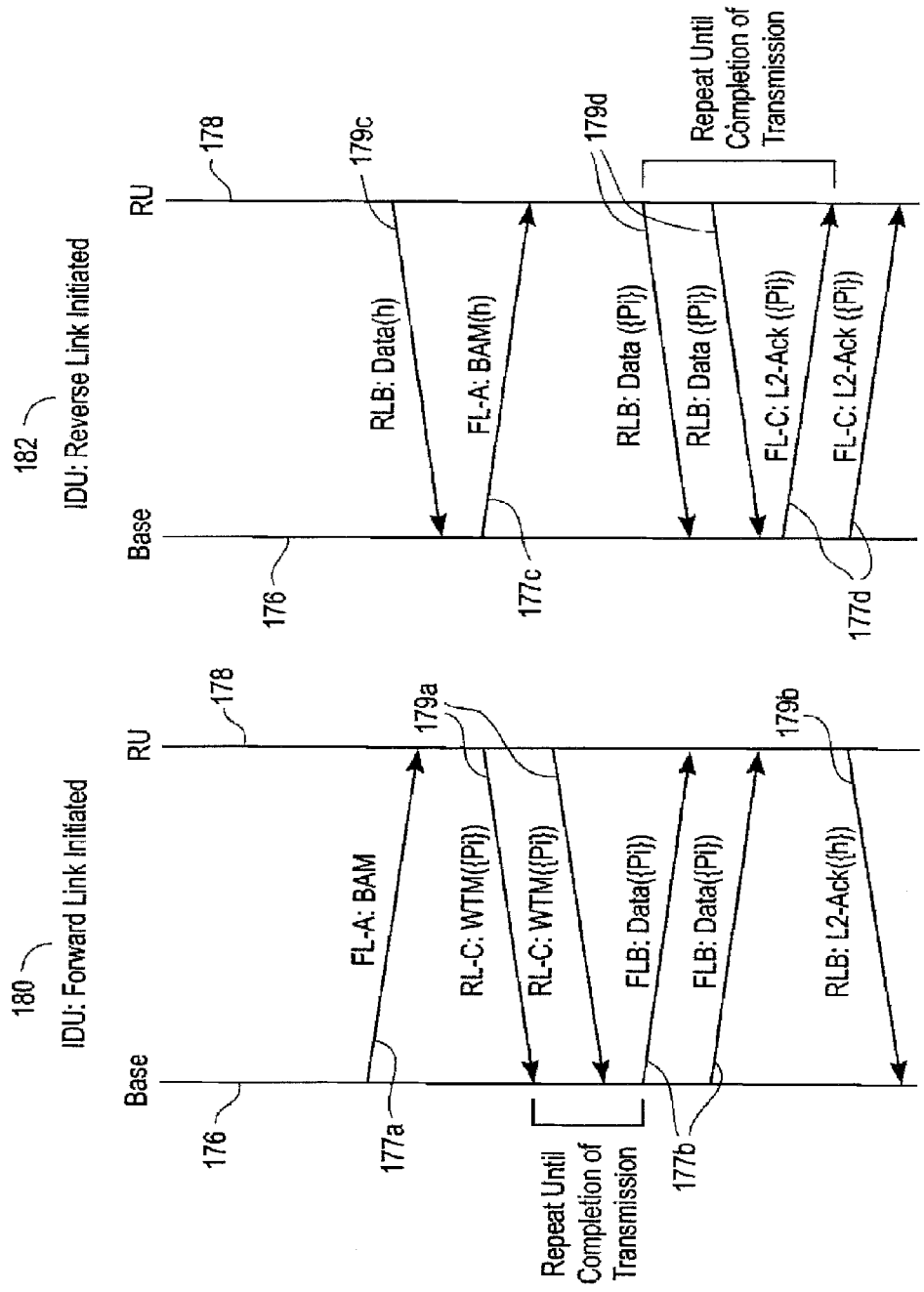
FIG. 14 gives ping diagrams for initiating data transfer using the IDU method, in accordance with an aspect of the present invention.

FIG. 14 gives ping diagrams for initiating data transfer using the IDU method. For the forward link initiated transmission 180, when data are available at the base 176, to be transmitted to the RU 178, the base 176 sends a bandwidth allocation message (BAM) 177a to the RU 178 over the forward link alert (FL-A) channel established for that link. This message contains the size of the desired packet, which frequency bins are needed to for the transmission and the quality of service. The RU 178 responds to the BAM by transmitting a succession of weight training messages (WTM) 179a on the reverse link control channel (RL-C). The messages 179a are used to train the transmit weights that the base will use to transmit data on the forward link bearer channel (FLB). It is assumed that there is a fixed and known latency between the WTM transmission on the RL-C and its associated FLB transmission 177b. After the designated number of data frames have been transmitted, the RU 178 sends an acknowledgement (Ack) 179b to the base by "banging" in on the designated RU's home partition. This uses the soft contention approach described earlier.

For reverse link initiated transmission 182, RU 178 can begin data transmission immediately on its home partition using soft contention to enter the network. The initial data frame 179c also contains control information describing how much reverse link data needs to be transmitted, quality of service, etc. The base 176 takes the requested transmission information and schedules the use of its resources. The scheduled information is conveyed by a BAM message 177c on the forward link alert (FL-A) channel. After this the RU 178 begins transmission of data 179d in the partitions and for the duration indicated by the BAM message. The RU 178 will use an agreed upon preamble message to train the base despreading weights. After each transmission of a data frame, the base 176 responds by sending an acknowledgment 177d on the forward link control (FL-C) channel.

In the IDU method, the WTMs on the RL-C support the FLB channel by providing training symbols for adaptation of the FLB transmit weights. Similarly the reverse link bearer channel (RLB) supports the transmit weights for FL-C transmission. The base uses the preamble symbols that are transmitted with the RLB bearer symbols to train the despreading weights, which are then used to formulate the forward link transmit gains for the FL-C. Thus the high data rate channels are coupled with the low data rate channels. However the RL-C/FLB pair is independent of the RLB/FL-C pair, and the shared loading on one set of channels does not effect the shared loading on the other set of channels.

Coupled Downlink/Uplink Layout

Figure 15:
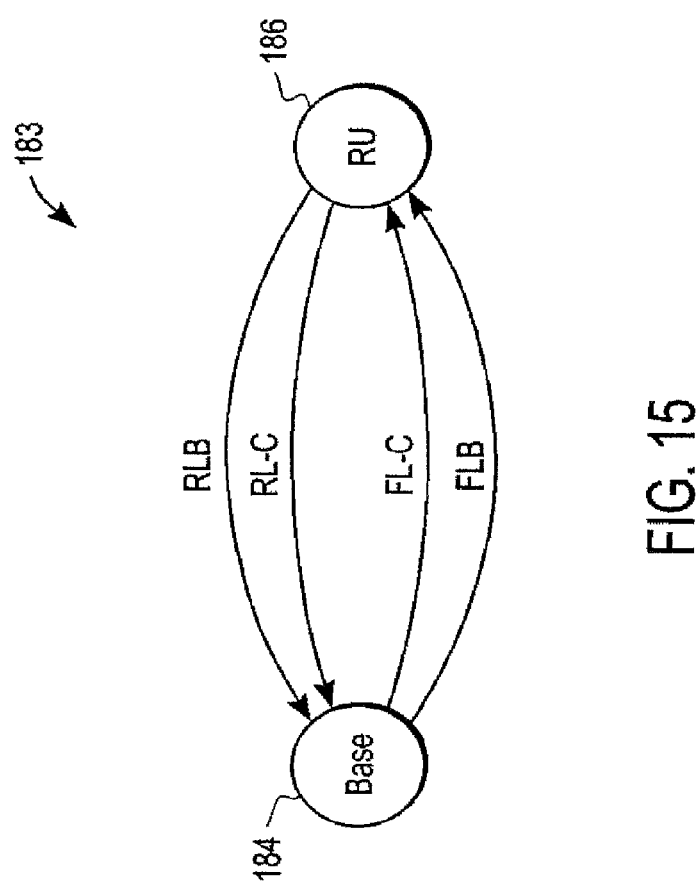
FIG. 15 is a diagram of a coupled downlink/uplink (CDU) channel layout, in accordance with an aspect of the present invention.

For the coupled downlink/uplink layout (CDU) every FLB transmission is supported with WTMs transmitted on the RLB. The RL-C is carried by the RLB and the FL-C is carried by the FLB. The CDU layout does not separate the coupling between the FLB and RLB. FIG. 15 gives a channel diagram for the CDU layout 183 for a base 184 communicating with a RU 186.

An advantage of the CDU method is that a separate RL-C for supporting WTMs is not needed. This saves bandwidth on the reverse link. The saved bandwidth can accommodate additional bearer traffic, which increases the maximum throughput on a given link. The CDU traffic model is also simpler since fewer independent resources are managed. A disadvantage is that any loading on the FLB also loads the RLB because WTMs are transmitted on the RLB to train the transmit weights used for the FLB transmission. This disadvantage is offset by the fact that typical reverse link transmission is a fraction of forward link transmission for many important uses, such as Internet traffic, broadcast video or audio. As a consequence, the additional loading caused by reverse link traffic for the transmission of WTMs on the RL-C/RLB is usually not a factor.

Figure 16:
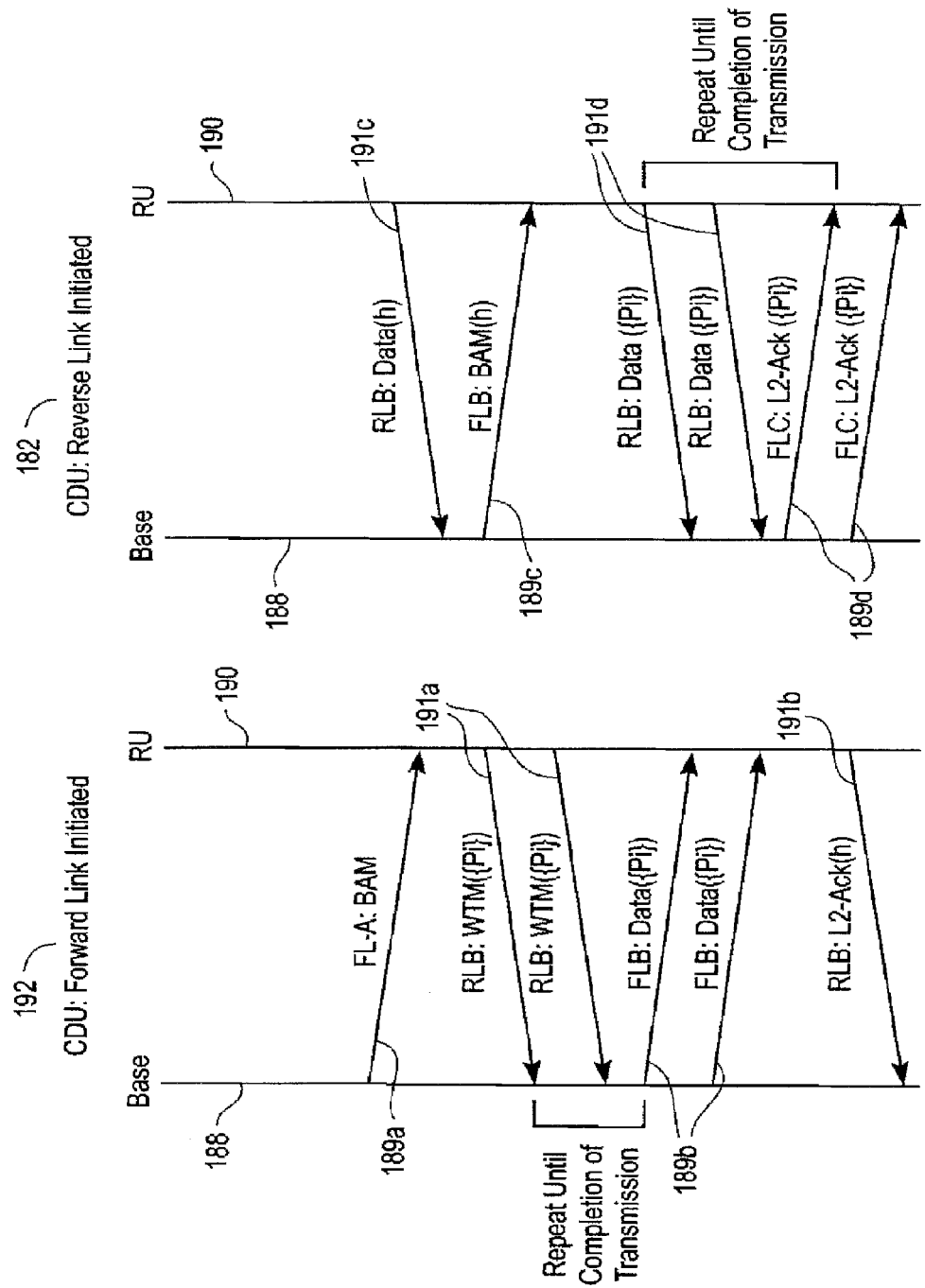
FIG. 16 gives ping diagrams for initiating data transfer using the CDU method, in accordance with an aspect of the present invention.

FIG. 16 gives ping diagrams for initiating data transfer using the CDU method for a base 188 and a RU 190. For forward link initiated data transfer 192, the base 188 transmits a bandwidth allocation message (BAM) 189a over the forward link alert channel (FL-A) established for that link. The BAM designates partitions and transmit time for the RU. The RU 190 then uses its bearer channel (RLB) to transmit a series of weight training messages (WTMs) 191a to support the forward link transmission. After a known and fixed latency, the base has used the reverse link WTMs to generate a set of transmit weights which it uses to transmit forward link data 189b on the FLB channel. After all the data frames have been transmitted as specified by the BAM message, the RU 190 transmits an acknowledgement 191b on its home partition using an agreed upon preamble sequence for training base despreading weights.

For a reverse link initiated data transfer 194, the RU 190 transmits an initial packet and bandwidth and quality of service information (QOS) request 191c in its home partition. This uses the soft contention entry approach described earlier. The base 188 processes this request and allocates bandwidth according to its scheduler's protocols. It then issues a BAM 189c on the FLB in the RU's home partition. The RU 190 can then transmit data 191d on the RLB within the partitions designated by the BAM message. Each data frame elicits an acknowledgement 189d on the FLC, which is carried by the FLB.

When an error is detected in a data frame, a re-send is requested in the acknowledgement message.

Hybrid Layout

Figure 17:
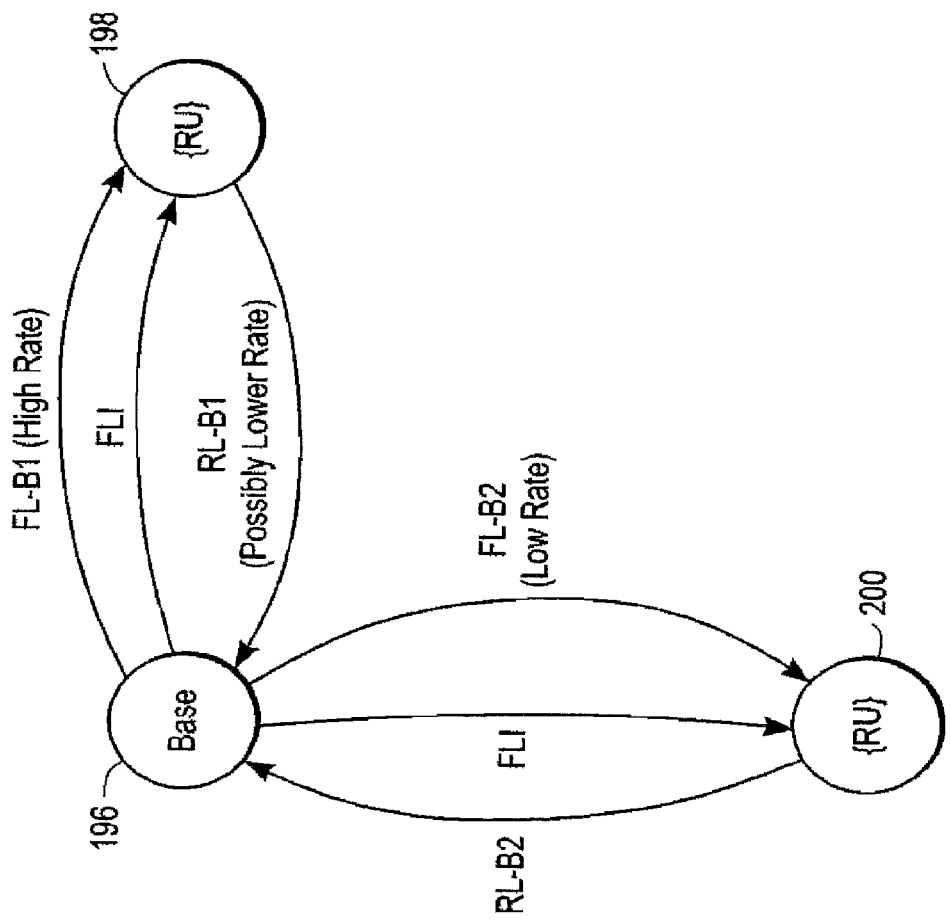
FIG. 17 is a diagram of a hybrid downlink/uplink channel, in accordance with an aspect of the present invention.

The hybrid layout method combines aspects of both the CDU and the IDU methods. The hybrid layout method is increases the bandwidth of the RL-C of the IDU design until it can carry smaller data rate messages such as acknowledgments or voice packets. This channel is referred to as RL-B1. Similarly the data rate of the FL-C is increased until it can carry low data rate messages, and it is referred to as FL-B2. FIG. 17 gives a channel diagram for the hybrid layout 195. A base 196 communicates with a RU on the downlink channel 198 and on the uplink channel 200.

The hybrid layout is similar to the IDU in that high data rate channels are coupled with lower data rate channels, i.e. FL-B1/RL-B1 and RL-B2/FL-B2, while still providing independent loading on the two pairs. By increasing the data rate of the FL-C to that of the RL-B1, the maximum allowable data rate for reverse link transmission has increased to the sum of the RL-B1 and RL-B2 rates.

The addition of smaller rate channels has another positive effect. The fragmentation efficiency of the overall system improved because of the presence of the smaller data rate channels. This prevents the waste of precious system resources when small data packets, such as acknowledgments, have to be carried on high bandwidth channels. In hybrid layouts, smaller packets can be hosted on the RL-B1 or FL-B2 channels.

The ping diagram for the hybrid layout is identical to the diagram for the CDU layout. Scheduling algorithms for the allocation of resources can accommodate the differing channel rates on each partition.

Strategies to Increase RU Bandwidth

In order to increase the forward link bandwidth available for a given RU, it is necessary to train base transmit weights for every frequency partition in which the base is transmitting to the RU. This requirement conflicts with the desire to reduce RU costs since the necessity of transmitting WTMs over all the partitions would greatly increase the cost of the power amplifiers in each RU. Time multiplexing the RU transmission opportunities over all the desired partitions can reduce transmit power requirements. For example, during one frame a WTM message can be sent over one partition and during the next frame a WTM message can be sent over a different partition.

Figure 18:
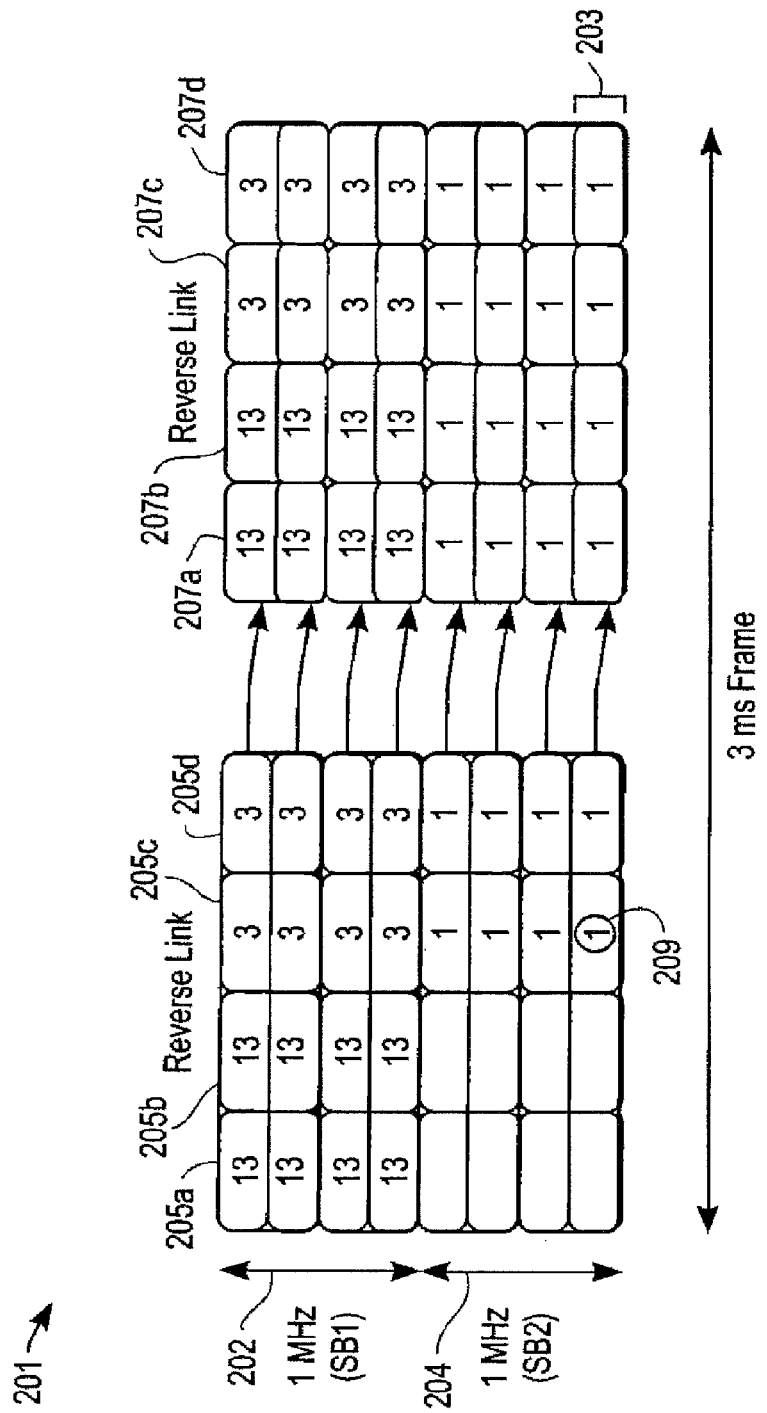
FIG. 18 illustrates an example of time and frequency use resulting from a remote unit bandwidth expansion method, in accordance with an aspect of the present invention.

FIG. 18 illustrates an example of time and frequency use resulting from a RU bandwidth expansion method 201. In this example, the RU doubles its available bandwidth from one subband to two subbands, 202 and 204, in a forward link 208 and a reverse link 206. Each subband 202 and 204 is divided into partitions 203. In this configuration there are four transmission slots 205a through 205d on the reverse link 206 followed by four available receptions slots 207a through 207d on the forward link 208 for each RU 218a1-218a9. A RU's use of a particular slot is indicated by a numeral 209 in that slot. The first RU 218a1 is denoted by a "1" and the third RU 218a3 is denoted by a "3."

During the first two slots 205a-b, the first RU transmits over the full 1 MHz bandwidth of the first subband 202. The first RU uses these transmission opportunities to transmit WTM's to support a high bandwidth data transfer to the first RU in the first subband 202. During the third and fourth slots 205c-d, the first RU transmits over the tones in the second subband 204. This transmission of WTM's is used to train weights for forward link transmission 208 in the second subband 204.

The third RU, on the other hand, does not require the full forward link bandwidth and instead confines its reverse link transmission 208 to a single subband 202. The third RU's transmission mode supports the maximum reverse link symbol rate. This requires that the base 216a restrict its forward link transmission 208 to the first subband 202. In this example, neither RU 218a1 or 218a3 at any time transmits over a bandwidth greater than 1 MHz. This allows the RU designer to avoid the cost of doubling the RU transmit power which may typically quadruple the cost of the RU power amplifiers.

Frequency Plan

In an example of preferred embodiment, the available spectrum is divided into operational units called subbands.

Figure 21:
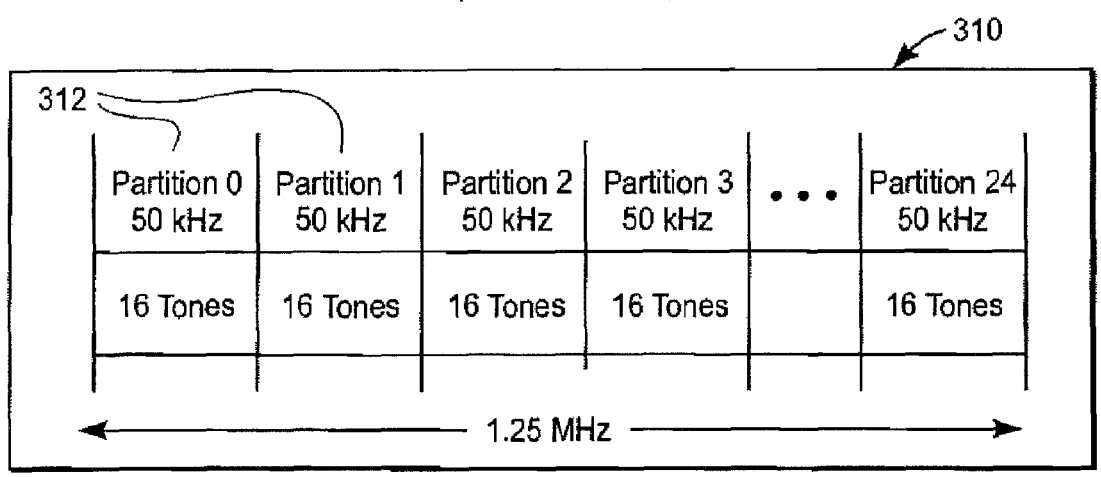
FIG. 21 illustrates tone partitions within a subband, in accordance with an aspect of the present invention.

A remote unit is generally provisioned to use one subband pair, though additional throughput can be achieved by using additional subbands. FIG. 21 illustrates a group of tone partitions within a subband 310. For this example, based on RF and FFT processing considerations, a subband bandwidth of 1.25 MHz is divided into 25 partitions. Each partition 312 has 16 tones with tone spacing of 3.125 KHz, so the partition spans 50 KHz. Each tone corresponds to a frequency bin. This arrangement has a total of 400 tones.

Figure 22:
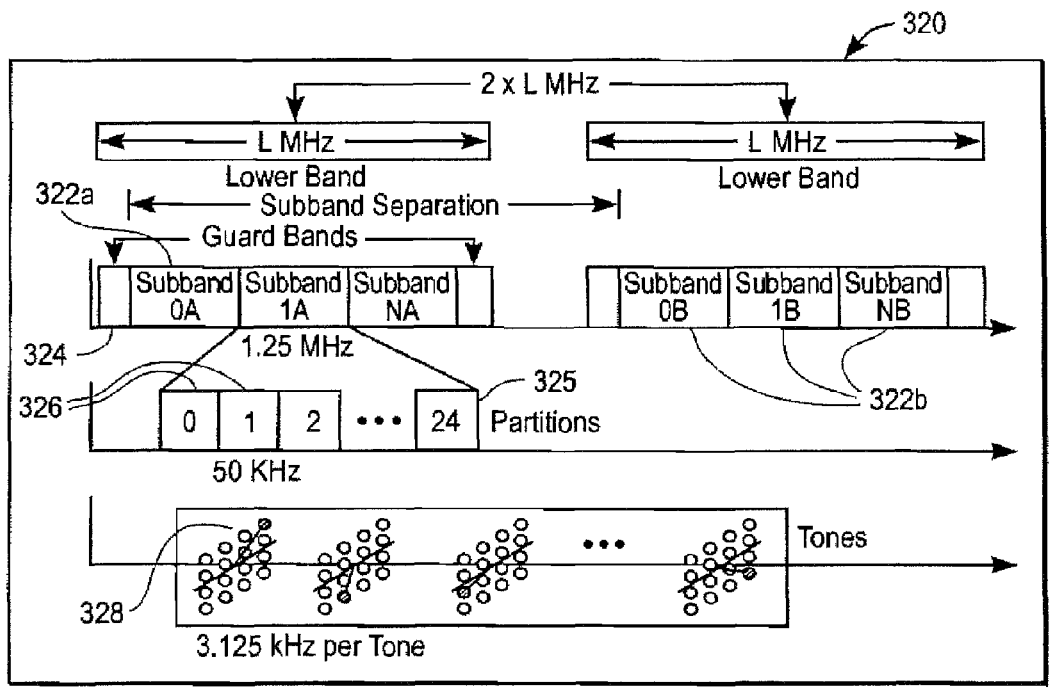
FIG. 22 illustrates a frequency plan with a frequency spreading factor of two, in accordance with an aspect of the present invention.

FIG. 22 illustrates a frequency plan 320 with a spectral spreading factor, or frequency spreading factor, of two. The available bandwidth is divided into a number of subbands 322a and 322b and guard bands 324. Each 1.25 MHz subband has 25 partitions 326. Each tone 328 in a partition has a complex gain. The example in FIG. 22 illustrates complex gains mapped to a 16 QAM constellation. The data within each partition of subband 322a are repeated in its paired subband 322b. Although arbitrary spreading factors can be supported, the factor of two is easily applied to paired frequency bands such as the PCS and WCS bands, described below regarding FIGS. 54 and 55.

Partitions "0" through "24" are used for "normal" traffic. Although the $25^{th}$ partition 325 may also be used for traffic, it may be reserved for base directed communications, such as requesting status or health from particular RUs. For base directed communications, RUs may not use the partition unless directed to do so by a base. In the future, out-of-band control information associated with T1 links may be carried over this partition. The $25^{th}$ may also be used as an access channel as described later.

Figure 23:
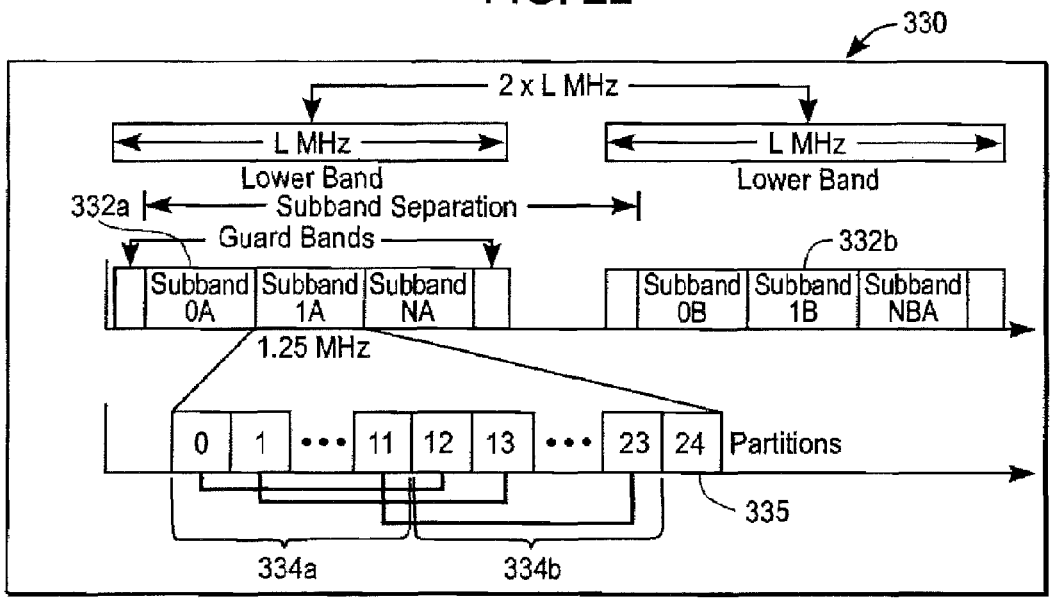
FIG. 23 illustrates a frequency plan with a frequency spreading factor of four, in accordance with an aspect of the present invention.

FIG. 23 shows an alternate frequency plan 330 having a spectral spreading factor of four applied to a paired subband frequency plan. In this layout, the data within the first 12 partitions 334a is repeated within a subband 332a in partitions 334b as well as in its paired subband 332b. The pairing of partitions within a subband is designed to provide the maximum frequency separation. The 25th partition 335 supports a spreading factor of two.

FIG. 54 gives parameters for applications in particular bands of the spectrum. This table indicates the number of subbands that can be supported within the indicated bandwidth for the listed frequency bands. The remaining bandwidth is assigned as guard bands. Referring to FIG. 54, it is possible to pair the Wireless Communication Service, or WCS, C & D blocks to form a 2×5 MHz bandwidth layout, but the stringent out-of-band emissions for these bands require larger guard bands than the A & B blocks. The Multichannel Multipoint Distribution Service, or MMDS, band includes many 6 MHz channels. The assumption here is that two 6 MHz channels are combined to form a 12 MHz block. Example calculations are as follows.

400 tones per subband=1.25 MHz per subband/3.125 KHz per tone 400 tones=25 sets×16 tones per set 384 tones=24 partitions×16 tones per partition 50 KHz per partition=16 tones per partition×3.125 KHz per tone FIG. 55 gives frequency plans for several bands where the present invention may be deployed. These frequency plans assume a 1.25 MHz active subband. The number of subbands, total active bandwidth, and guard band size are listed for various channel bandwidths. Guard band bandwidth generally increases with frequency.

Time Plan

Figure 24:
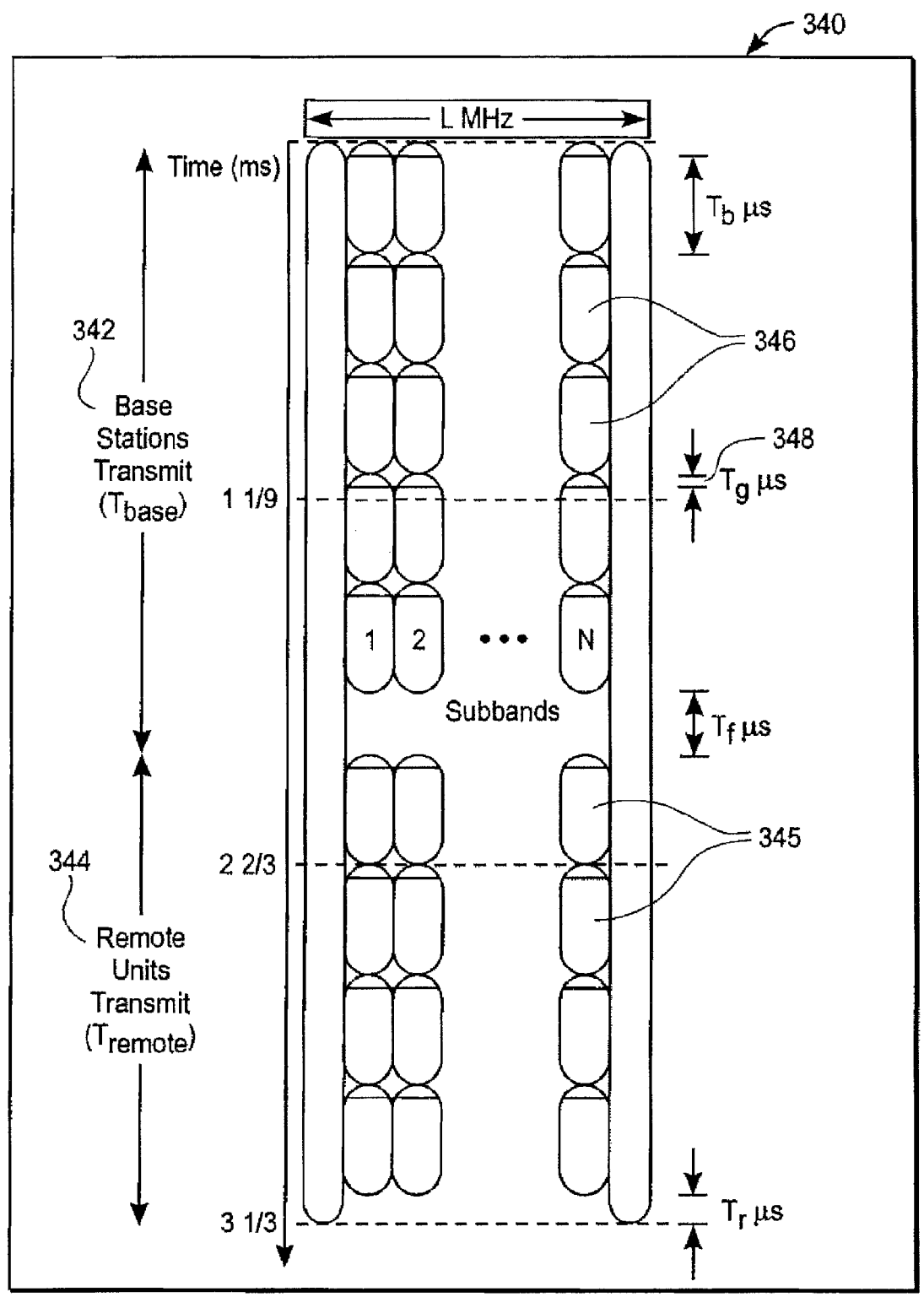
FIG. 24 illustrates example of a time plan for a single time slot, in accordance with an aspect of the present invention.

FIG. 24 illustrates example of a time plan for a single time slot 340. Table 1 gives example durations of the time slot parameters. For this example, each TDD time slot 340 is 3⅓ ms in duration. A time slot is divided into a base transmit opportunity 342 and RU transmit opportunity 344. Within each transmit opportunity, signals are transmitted in a series of bursts, five bursts 346 from the base and four bursts 345 from a RU. Each burst spans Tg+Tb μs. The parameter Tg is for the inter-burst guard time 348 that allows the receiver to collect significant multipath. The first column of duration values in Table 1 is preferred. In this arrangement, every two of three time slots in the reverse link have an additional 0.3 ms in Tr and the third time slot has an additional 0.4 ms in Tr so that three time slots span 10 ms.

TABLE 1

Time Slot Definitions.

| Parameter | Duration (μs) | Duration (μs) | Description |
| --- | --- | --- | --- |
| Tb | 320 | 320 | Burst length |
| Tg | 20 | 25 | Guard time |
| Tf | 243 | 193 | Excess time in the forward link |
| Tr | 30 | 35 | Excess time in the reverse link |
| Tbase | 1943 | 1918 | Base transmit/RU receive |
| Tremote | 1390 | 1415 | RU transmit/Base receive |

Figure 25:
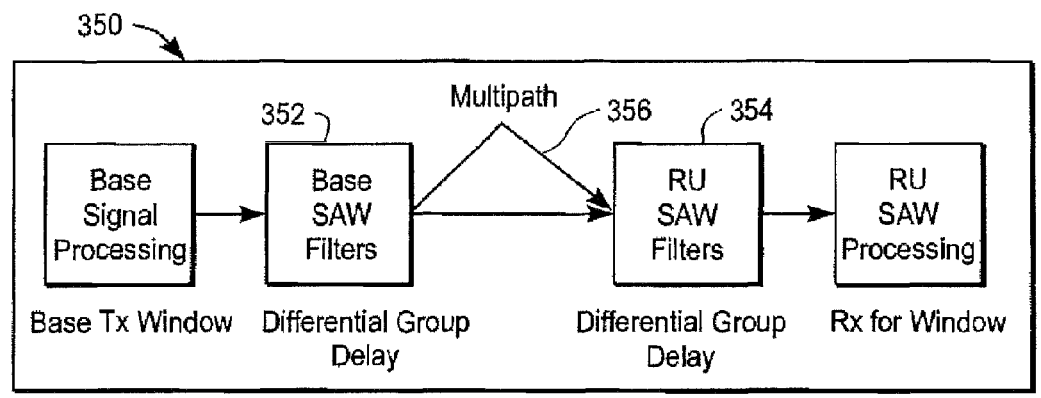
FIG. 25 gives a model useful for defining time delay parameters, in accordance with an aspect of the present invention.

FIG. 25 gives a model 350 useful for defining time delay parameters. The base SAW filter 352 and RU SAW filter 354 implementations cause delay in addition to delay caused by multipath 356. The value of $T_g$ includes additional delay quantities with typical values given in Table 2. The base differential group delay assumes a worst case delay of 3.5 μs minus the least delay of 3.1 μs. The RU differential group delay assumes a worst case delay of 3.0 μs minus the least delay of 1.8 μs.

TABLE 2

Guard Time Duration.

| Parameter | Duration (μs) |
| --- | --- |
| Base Tx Window | 0 |
| Base SAW | 0.4 |
| Multipath | 18.4 |
| RU SAW | 1.2 |
| RU Rx Window | 0 |
| Tg | 20.0 |

The excess time parameter $T_f$ following the last burst from the base station defines the transmission range, and is designed to mitigate base-to-base interference. The $T_f$ constrains the cell radius. The excess time following the last burst from a RU is $T_r$ μs. The $T_r$ cannot be reduced below the transmit/receive switch settling time, which is on the order of 30 μs. Every three time slots span 10 ms (3⅓ ms×3 slots). The sampling rate at the remote unit is 25.6 MS/s (megasamples per second), so there are 25,600 samples every three time slots. Hence, two time slots span 8,533 samples and the third time slot spans 8,534 samples.

Time/Frequency Plan

Figure 26:
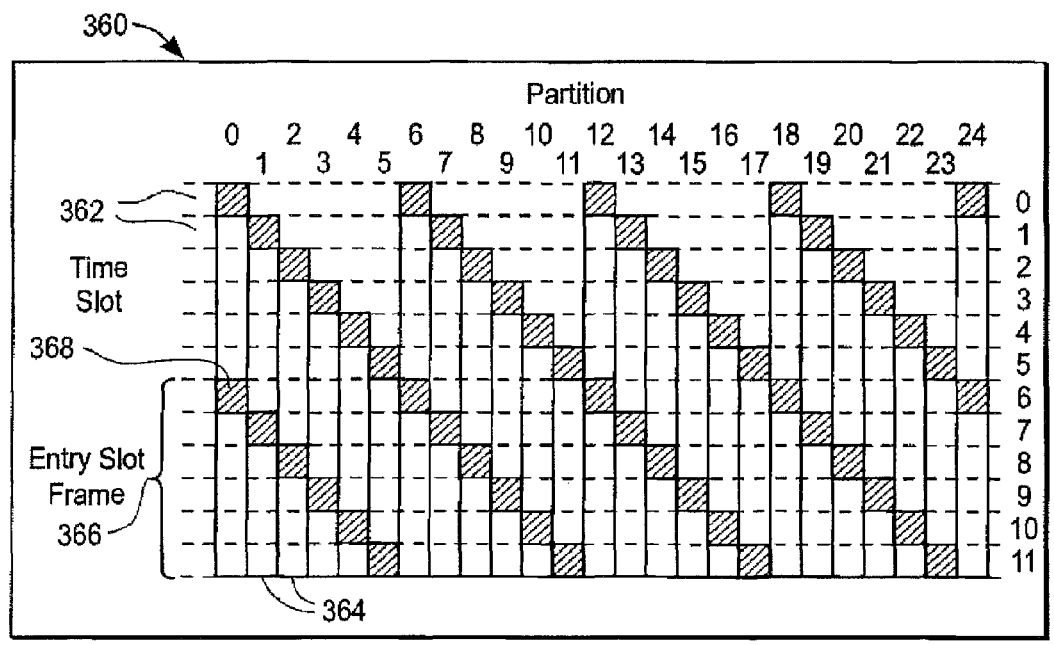
FIG. 26 illustrates a partition layout for a lower subband with a spectral spreading factor of 2 with a 4×6+1 layout, in accordance with an aspect of the present invention.

Examples of time/frequency plans are represented by partition layouts. FIG. 26 illustrates a partition layout 360 over twelve time slots 362 and 25 partitions 364. A set of time slots in a partition is referred to as a frame 366. For example, in FIG. 26, there are 6 time slots 362 per frame 366. The first time slot within each frame is designated as the entry slot 368, and is used for link establishment and synchronization signals. It is preferable to stagger the entry slots in time across partitions so that there is at least one partition with an entry opportunity in any given time slot. FIG. 26 shows a partition layout with at least four entry opportunities in each time slot when using six slots per frame, referred to as a 4×6 layout.

Figure 27:
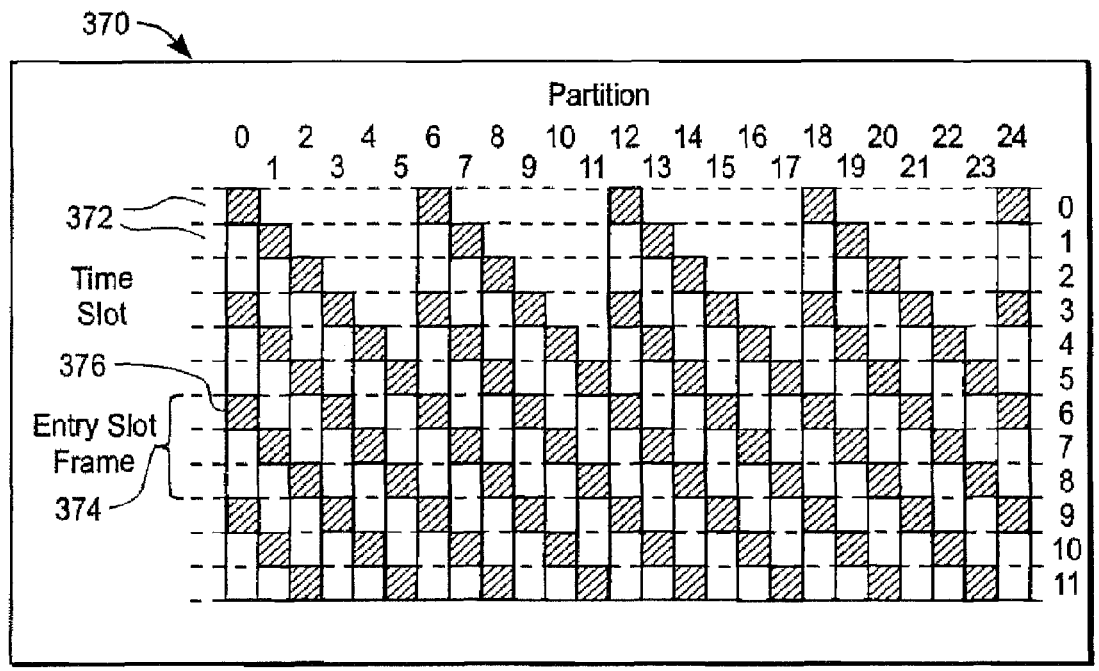
FIG. 27 illustrates a partition layout for a lower subband with a spectral spreading factor of 2 with an 8×3+1, in accordance with an aspect of the present invention.

FIG. 27 shows a partition layout 370 with three time slots 372 per frame 374. The entry slots 376 provide at least eight entry opportunities in each time slot, for an 8×3 layout. The arrangements of FIG. 26 or FIG. 27 can be used with a spectral spreading factor of two as illustrated in FIG. 22.

Figure 28:
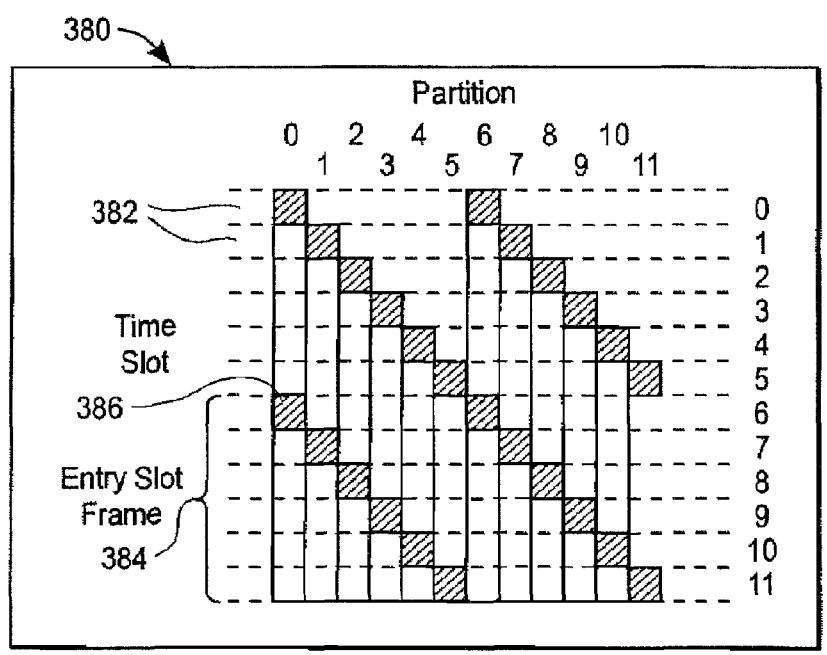
FIG. 28 illustrates a partition layout for a lower subband with a spectral spreading factor of 4 with a 2×6 layout, in accordance with an aspect of the present invention.

For a spectral spreading factor of four, either additional bandwidth is used or the data are spread within a subband. As previously described and illustrated in FIG. 23, for spreading within a subband, partitions k=0 1 . . . 11, are paired with partitions k=12 13 . . . 23. The 25th partition is spread across only two spreading frequencies. FIG. 28 illustrates a partition layout 380 for a spectral spreading factor of four. The layout 380 has six time slots 282 in each frame 384. The layout 380 has 2 entry slots 386 per time slot, for a 2×6 layout.

Figure 29:
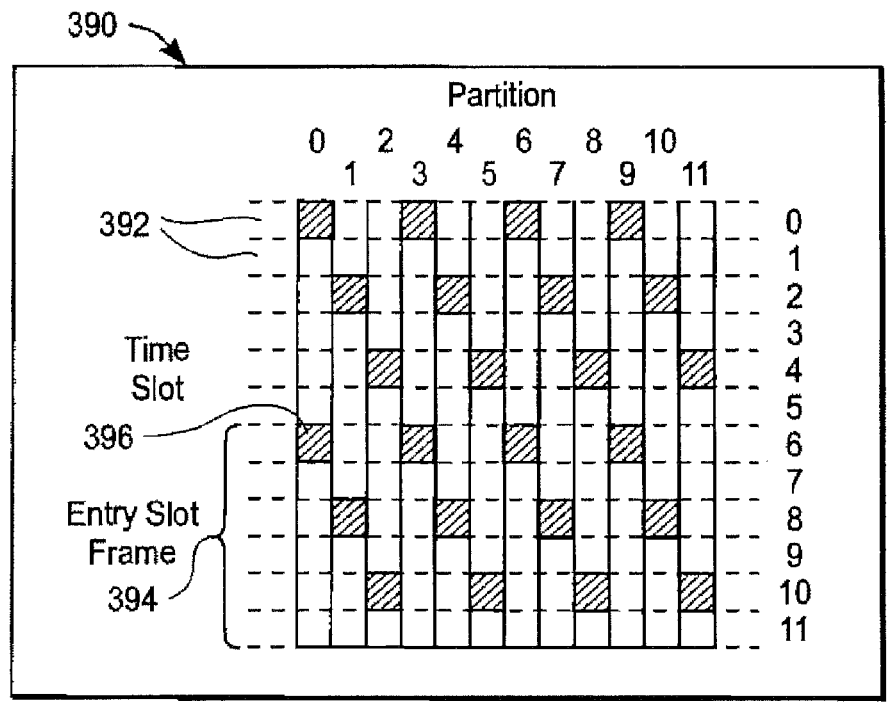
FIG. 29 illustrates a partition layout for a spectral spreading factor of 4 with a 4×6 layout, in accordance with an aspect of the present invention.

FIG. 29 illustrates an alternative layout 390 for a spectral spreading factor of four. The layout 390 has six time slots 392 per frame 394 and four entry slots 396 per time slot, for a 4×6 layout.

FIG. 56 gives some example throughputs for a 4×6 layout and a 3⅓ ms time slot duration. The full rate corresponds to 24 partitions using the bit rate per partition, or partition rate. The number of information bits per tone depends on the constellation used for mapping bits to the complex gain for each tone. The number of bursts is five for the forward link and four for the reverse link.

The frame length can be selected to accommodate different applications. For example, the frame length can be selected to accommodate Ethernet frames. Ethernet frames on an Ethernet LAN are typically 1518 bytes or less, while Ethernet frames on the Internet are typically 594 bytes or less. Frames with a larger number of time slots can accommodate 594 bytes of data and any additional overhead. For voice applications, speech frames are typically 10, 20 or 30 ms long. A 3⅓ ms time slot matches the 10 ms speech frame every three time slots, and 20 ms speech frames every six time slots. The number of bytes per speech frame depends on the codec used.

Physical Layer Channels

Reverse Link RLI and RLB

Physical layer channels for the reverse link include a reverse link initiation (RLI) channel and a reverse link bearer (RLB) channel. The RLI channel allows a RU to request access for a given frame on a given partition. The RLI channel occurs within an entry slot and spans all bursts of a time slot. The RLB channel is used for data, both informational and supervisory. RLB channels occur on all non-entry time slots and also span all bursts of a time slot.

Forward Link FLI, FLT, FLS, FLB

Figure 30:
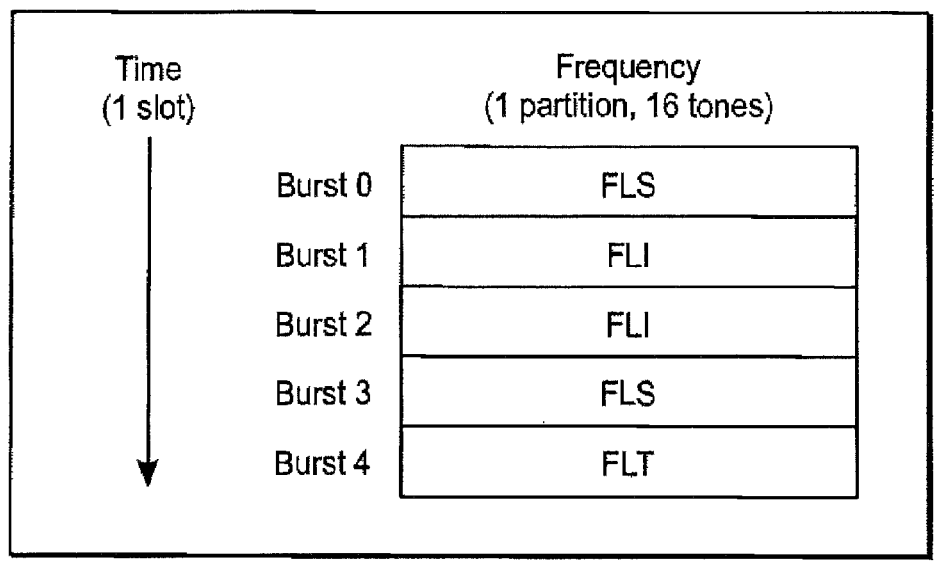
FIG. 30 illustrates burst assignments in the forward link entry slot, in accordance with an aspect of the present invention.

Physical layer channels for the forward link include forward link initiation (FLI), forward link training (FLT), forward link synchronization (FLS) and forward link bearer (FLB) channels. The FLI channel allows a base to command a RU to enter on a specific frame within a specific partition. The FLI channel occurs within an entry slot. The FLT channel, which also occurs within an entry slot, allows a weight training message to be transmitted so that a RU can update its despreading and spreading weights. The FLS channel, which also occurs within an entry slot, provides a synchronization message used by a RU to maintain time, frequency, and phase synchronization with a base. FIG. 30 illustrates FLS, FLI, and FLT assignments to bursts within an entry slot. FLS channels occupy the first and fourth bursts. FLI channels occupy the second and third bursts. The FLT channel occupies the fifth burst. The forward link bearer (FLB) channel is used for data, both informational and supervisory. FLB channels occur during non-entry time slots of a frame and span all bursts.

Access Channel FLA and RLA

In an exemplary embodiment, the first 24 partitions are used as traffic channels and the 25$^{th}$ partition is used as an access channel. A RU can access the network by sending a reverse link access (RLA) message on the reverse link access channel. These access requests are isolated from the traffic channels. The base can initiate communication with a RU by sending a forward link access (FLA) message on the forward link access channel. The access channel method is an alternative to the alert channel method described previously.

Time/Bandwidth Allocation

A base manages system resources to achieve quality of service (QoS) and load balancing requirements among all users in a cell. RUs use a slotted-Aloha mechanism to communicate with a base for sending both supervisory messages, such as bandwidth requests, and information data messages. Each base can resolve up to $M_{base}$ simultaneous users, where $M_{base}$ is a function of the number of degrees of freedom at a base and the network topology, such as number of in-cell and out-of-cell co-channel interferers, and severity of the multipath. For a fully cellularized network in a suburban environment, $M_{base}$ is nominally 10 for a base with 16 sensors and using two subbands. Nominal values for other base configurations are summarized in Table 3. In practice, $M_{base}$ is a soft number in the sense that the number of simultaneous users that can be supported will depend on the instantaneous user and network topology and multipath environment. Hence, $M_{base}$ will deviate about a nominal value as a function of the signal to interference plus noise ratio, or SINR, for a frame within a partition. The number of simultaneous links that can be maintained in the presence of in-cell and out-of-cell interference is approximately ⅓ the degrees of freedom due to spatial and spectral degrees of freedom. The values in Table 3 are based on a spectral spreading factor of 2.

TABLE 3

Number of Simultaneous Links.

| Number of Elements | Degrees of Freedom | $M_{base}$ | Comments |
| --- | --- | --- | --- |
| 4 | 8 | 2 | |
| 6 | 12 | 3 | |
| 8 | 16 | 4 | |
| 9 | 18 | 5 | |
| 12 | 24 | 6 | |
| 15 | 30 | 8 | |
| 16 | 32 | 9 | RU antenna: 30., 3 dB beamwidth |
| 16 | 32 | 10 | RU antenna: 20., 3 dB beamwidth |
| 16 | 32 | 16 | Single cell deployment |

To minimize the impact of unscheduled traffic and provide management of the reverse link contention oriented channels, each RU is assigned to a home partition. A RU can use the home partition for initial contact with a base. Using a communication channel on the home partition, the RU can request additional bandwidth from the base. A RU is assigned a set of home partitions, such as one partition per time slot. The assignment can depend on service level agreements and the number of RLI codes that can be supported by the physical layer. When more than $M_{base}$ users contend for a frame on a partition, collisions may occur. When collisions occur, users apply a backoff mechanism to retry communicating with a base.

The base can allocate resources based on the requirements of a service. Services such as data are bursty, in which case frames will be allocated as needed and available, then released. A preferred approach for these services is to rapidly apply system resources such that the data transfer occurs in a minimal amount of time. For large data transfers, this requires rapidly allocating the use of all partitions, and subsequently releasing the resources so that they are available for other users. In cases involving smaller datagrams, such as, TCP acknowledgements, only a subset of the partitions would be allocated. The time scale for reservation of resources is estimated to be on the order of milliseconds or tens of milliseconds, whereas the network/server delays may be on the order of hundreds of milliseconds. During non-peak hours, it may be possible to minimize the latency associated with allocating resources by sending idle bits during periods of inactivity for maintaining links. During peak hours, resources for a given user would be allocated and released on a burst basis to support the necessary level of multiplexing between users.

Services such as voice and streaming audio/video tend to be more regular in terms of their bandwidth requirements. This means that resources would be allocated or reserved for extended periods of time. This is particularly true for highly quality voice where latency is a key concern and allocating resources on a packet by packet basis is not practical given current physical and logical link layer processing times. An initial latency associated with setting up a channel is insignificant. Since this occurs during the signaling phase, it does not have the stringent latency requirements associated with the voice/audio/video payload.

Airlink Frames

For transmission over the airlink, Ethernet frames encapsulating IP (Internet Protocol) datagrams are passed to the data link layer. Within the data link layer, a datagram is segmented into airlink frames. Airlink frames are atomic units with fixed duration and provisioned in a network to be either 20 or 10 ms. The airlink is packet switched since the airlink frames are dynamically assigned to users based on loading and QoS parameters. The airlink frames are assigned on frame epochs. For the reverse link, a low-rate contention channel is used to mediate access to multiple bearer channels. For the forward link, the base station uses the low-rate channels to schedule bearer channels.

Figure 31:
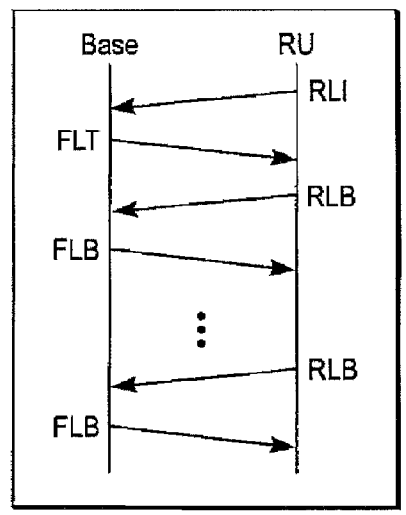
FIG. 31 illustrates a channel structure for an airlink frame, in accordance with an aspect of the present invention.
Figure 32:
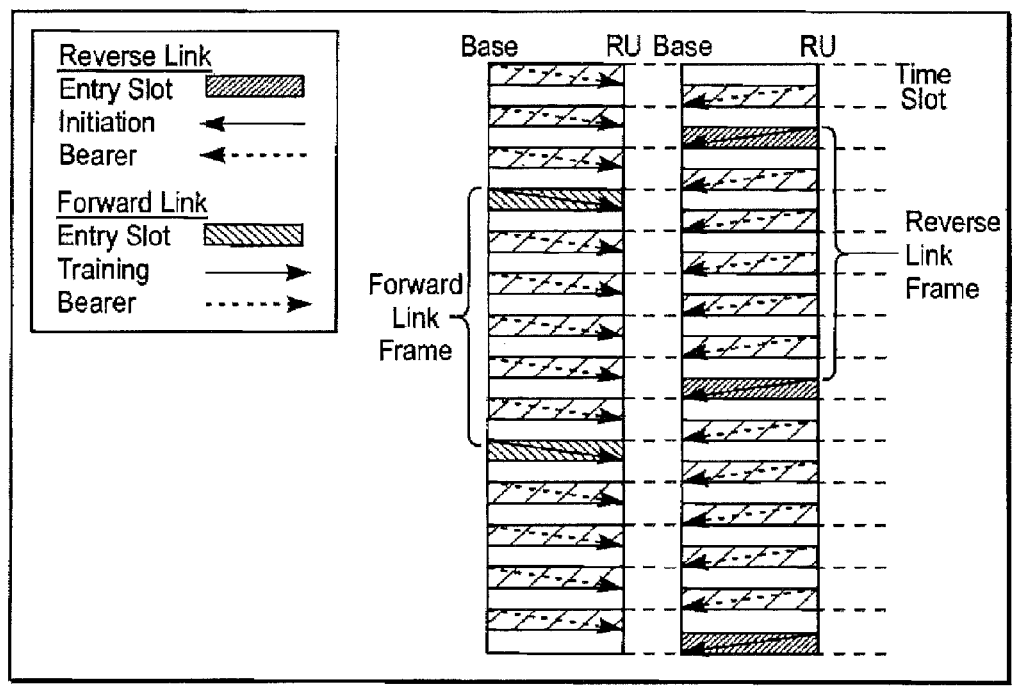
FIG. 32. Frame Offset, in accordance with an aspect of the present invention.

FIG. 31 illustrates a channel structure for an airlink frame. Each airlink frame begins with an initiation message from a RU on the reverse link initiation (RLI) channel, and a training message from the base responds on a forward link training (FLT) channel. The remainder of the frame includes data on bearer channels. Because a base station cannot compute spreading weights instantaneously, the entry slots for the reverse and forward links are offset. For an example shown in FIG. 32, the forward link entry slot is offset from the reverse link entry slot by two time slots. For this example, the base station and RU each compute and apply spreading weights within one time slot. The forward and reverse link frames are offset to allow time for computation of spreading weights.

RU Initiated Transfer

Figure 33:
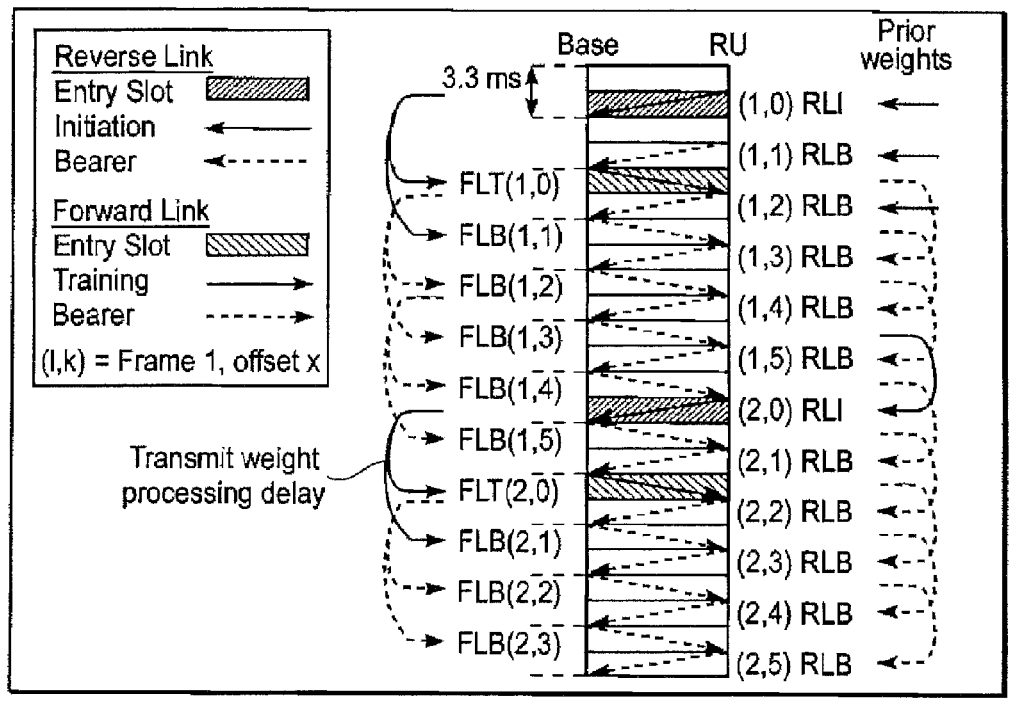
FIG. 33 illustrates a reverse link initiated transfer, in accordance with an aspect of the present invention.

If a communication link between a RU and a base is not currently established, a reverse link initiation message is sent to a base. FIG. 33 illustrates a reverse link initiated transfer. The entry slot of every frame has a RLI and FLT. The base station forms transmit weights in response to the RLI. The FLT provides a positive acknowledgement. The forward and reverse link frames are offset because of the processing time required to compute transmit weights. In the example of FIG. 33, the (1,1) RLB is transmitted even though the positive acknowledgement has not yet been received. This reduces latency with little impact on network performance. If the RLI is received successfully, then the RLB can also be received successfully. If the base station as interference considers the RLI, the base will have formed weights to reject the subsequent (1,1) RLB from this same remote, and can continue to successfully receive other signals.

The RLI message is transmitted on a frame in a RU's home partition. Each RU is assigned a RLI code that is unique to that RU for the frames and partitions for which it is assigned. That is, multiple RUs may share a RLI codeword, but no more than one RU will use that codeword in a given frame within a given partition. When prior spectral spreading weights are not available or are out-of-date, random spreading weights, scaled to a desired transmit power, can be chosen for the RLI channel.

After detecting a RLI, a base will respond with a FLT in the next forward link entry slot in the same partition as that of the received RLI. The FLT is and acknowledgement that the RLI was successfully detected and provides a training signal that the RU may use to determine despreading weights. Because of the offset of entry slots, the remote unit will not receive a message back from the base station in the next time slot. Rather than wait, the remote unit will use the prior spreading weights and send a RLB message containing data. In the absence of a collision and assuming the base permits the connection, the base station will send a weight training message in the FLT on the same partition. The remote unit will interpret this FLT as a positive acknowledgement of a link establishment and continue to send RLB messages. If the base station has no data to send to the remote unit, the base station will transmit idle signals for weight training purposes. Similarly, the RU will pad its frame with idle signals so that the base station can send it data any time during the frame.

If the remote does not detect the FLT, it assumes that a collision has occurred and repeats the RLI process on a subsequent time slot. Two types of collisions may occur. First, the base station is able to resolve up to $M_{base}$ simultaneous RLI signals. If more than $M_{base}$ remote units transmit RLI signals on the same time slot within the same partition, some or all of the signals will not be detected. Second, it may be possible that multiple remote units will be provisioned with the same RLI codeword. In this case, remote units using the same codeword will collide and their signals will not be detected.

Forward Link Initiated Transfer

Figure 34:
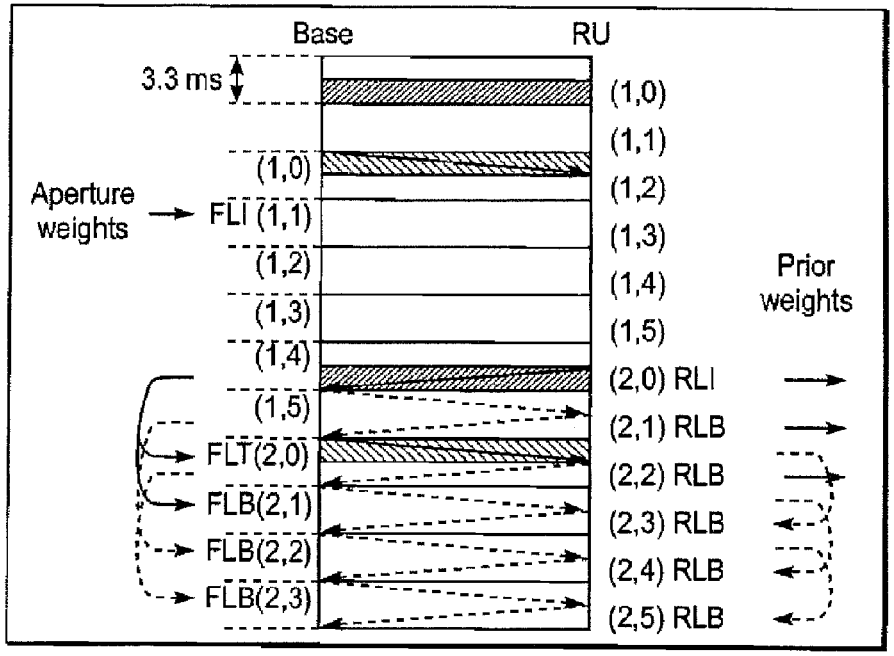
FIG. 34 illustrates a forward link initiated transfer, in accordance with an aspect of the present invention.

FIG. 34 illustrates forward link initiated transfer. Forward link initiated transfer is nearly identical to reverse link initiated transfer. The difference is that a base station commands a RU to a send a RLI so that the bearer channel weights can be determined. It does this by sending a FLI message as shown in FIG. 34. The FLI transmitted on the initial frame of a datagram to command a RU to send a RLI for weight training purposes. Thereafter, the command for a RLI on additional partitions can be sent as part of the data link layer's overhead.

Although a remote unit can detect a FLI message quickly, the next entry opportunity on that partition for a RLI message does not occur immediately. If this latency is not acceptable, the RLI message in response to the FLI message can be sent on another partition. For example, latency is about 13 ms for a layout with 6 slots per frame. When the FLI message is sent on another partition, the minimum latency is 3 ms, assuming that the remote unit detects and responds to a FLI message in the next time slot.

Airlink Protocol

The reverse link initiation (RLI) channel occurs on a reverse link entry slot. This channel allows a remote unit to send a defined signal to the base station. The RLI includes a training signal used to compute adaptive despreading weights and initial spreading weights for the next bearer message. The RLI channel is a slotted Aloha contention oriented channel, but a base station can demodulate multiple RLI signals using beamforming and the structure of the codes. RUs contending for a RLI channel are managed users, where managed users have been directed by a base station to use specific airlink resources. The base manages the number of users contending for a RLI channel using the access channel and RLA procedure, described later.

Each base station has a set of RE codewords. Each remote unit uses a RLI codeword, or preamble, from the set of codewords specific to the corresponding base station. In a preferred embodiment, the number of RD codewords is sufficient to define a unique codeword per RU in a cell. In an alternative embodiment, multiple RUs may share a codeword, but only one RU may use the codeword in a particular partition and a particular frame. A remote unit may be provisioned to use codewords from a set designated for initial entry. Once a link is established, the base station may direct a remote unit to use a codeword from an alternate set to minimize detection errors with other new entrants. For an exemplary embodiment, the defined training signal is a codeword, or preamble, with a length of 64 symbols, corresponding to the 64 symbols in a reverse link entry slot.

The base coordinates between remote units transmitting on the RD channel. After transmitting a RD message, the remote unit will listen for a FLT message from the base station on the same partition. If a FLT message is received, the remote unit will use the RLB message on the remaining slots in the frame to transmit data. If the FLT message is not received, the remote unit may wait for the next entry slot on that partition or transmit a RLI message on an entry slot in another partition.

It is possible to designate a partition for restricted access, meaning that remote units are not permitted to contend for the channel unless directed to do so by a base station. This provides a base station with a procedure for maintaining a virtual circuit by managing the contention on that partition.

To provide compensation measurements at the base station, certain entry slots are not RLI opportunities. These "blanked out" RLI opportunities shall be scheduled according to some published formula based on the partition number and the global slot counter. Both the base and the remote unit behave as if the same remote units sending traffic during the previous frame are continuing in the present frame. In the current frame, weights are carried forward from the previous frame, a FLT is sent, and that valid bearer traffic will be sent in both directions. This allows the blanking of RLI opportunities to be conducted without disrupting steady flows of bearer traffic.

The reverse link bearer (RLB) channel occurs on non-entry slots within a frame. This channel is used to transmit data, link layer messages, bandwidth requests and, in the absence of any data, idle (training) signals to maintain the frame connection from a remote unit to its base station.

For reliable reception at a remote unit, the base applies spatial gain to the channels of the forward link entry slot. For this purpose, the base stores weights determined during installation of a remote unit or updated during prior transactions.

The Forward Link Initiation (FLI) channel occurs on a forward link entry slot. This channel allows a base station to inform a specific remote unit to send a RLI message on a particular partition and time slot so that forward and reverse link bearer channels can be setup. A FLI message is a codeword used to uniquely identify a remote unit. For an exemplary embodiment with 16 tones per partition, each codeword is a complex vector of length 16 corresponding to the complex gains applied to the 16 tones. Associated with each FLI, and hence each RU, is an aperture weight vector. These weights form a beam in the direction of a RU but do not steer nulls. Only one FLI codeword is assigned to a RU.

For the exemplary layouts of FIGS. 26 and 30, there are four entry slots per time slot, ignoring the 25th partition, and the two FLI bursts per entry slot. For this arrangement, the base can send FLIs to up to 8 RUs per time slot. Each RU processes a single burst within a partition in search of a FLI message. Once bearer channels are created on a partition, control information sent within the bearer channels can convey requests and allocation messages for additional bandwidth. With this arrangement, additional FLIs are not needed to inform a RU to send a RLI message on additional partitions.

The base may request a user that has a large data transfer pending to minimize entry time by entering in all available entry slots. In this situation, a RU must monitor every FLI message opportunity. For a 4×6 layout, such as in FIG. 26, this requires the RU to monitor four separate partitions within a single time slot. Since the monitoring computations occur while the RU is in the inactive state, the peak operating performance, in terms of floating point operations per second, is not affected.

The Forward Link Training (FLT) channel occurs in a forward-link entry-slot. This channel allows a base station to send a known training signal to a RU. The RU uses the FLT message to update its despreading/spreading weights for the next RLB channel The Forward Link Synchronization (FLS) channel occurs on a forward link entry slot. This channel allows a base to send a known signal to a remote so that the remote can update its time, frequency, and phase tracking parameters to maintain synchronization with the base.

The forward link bearer (FLB) channel occurs on non-entry slots within a frame. This channel is used to transmit data from a base unit to a remote unit. The forward link bearer channel uses the same forward error control coding used by the RLB.

The reverse link access (RLA) message is sent by the RU on the $25^{th}$ partition and requests the base to open a flow with the RU. The reverse link access channel is contention oriented. If too many RUs send in a request at the same time, some may not be detected and will need to retransmit RLA messages. The RLA detection method and codewords are similar those of the RLL The RLA can occur during any time slot.

The forward link access (FLA) channel occurs on any burst within a slot. It is sent on the $25^{th}$ partition, or access channel. This channel is used similarly to the FLI. The burst position of the FLA indicates the partition that the RU should use to send a RLI.

A flow is a set of adjacent frames exchanged between the base and the RU on a particular partition. A flow may be started by the base in one of three ways: as part of a control message from the base to a RU in an existing flow on another partition, by sending a FLI on the partition in which the flow is to occur or by sending a FLA on the access channel. The number of frames in a flow is negotiated during flow initiation. A RU cannot initiate a flow by sending a RLI, but rather is directed to do so by the base. A RU can request a flow by sending a RLA.

A flow is in one of five states: closed, waiting, starting, open, and ending. If neither the base nor the RU have any traffic to send or receive on a particular non-voice flow, then that flow is closed to conserve link bandwidth.

A session is one or more simultaneous flows each on separate partitions between the base and a particular RU. Sessions eventually terminate to prevent an excessive number of RUs from sending or receiving only dummy, or filler, data.

If the base decides that the communication rate should increase with a particular RU, the base increases the number of flows with that RU. The number of flows is also governed by the service agreement.

A remote unit is in the ACTIVE_ON state if there is a session or a flow on any partition. A remote unit is in the ACTIVE_OFF state if it used to be in the ACTIVE_ON state and less than ACTIVE_OFF_TIMEOUT slots have elapsed since the last RLI was sent on any partition. A remote unit is in the INACTIVE state when there is not a session and ACTIVE_OFF_TIMEOUT slots or more have elapsed since the last RLI was sent on any partition. An ACTIVE_OFF state means that no traffic has occurred in the last ACTIVE_ON_TIMEOUT slots on any partition.

If a RU receives any FLI or FLA, it transitions to the ACTIVE_ON state. The RU remains in the ACTIVE_ON state while either it or the base sends bearer data on any partition of the traffic channel.

If neither the forward link nor reverse link carry bearer data for ACTIVE_ON_TIMEOUT slots on any partition, then the base and RU exchange messages and acknowledgements and transition to the ACTIVE_OFF state.

A time slot counter is recorded when the RU transitions to the ACTIVE_OFF state. A RU in the ACTIVE_OFF state transitions to the INACTIVE state after being in the ACTIVE_OFF state for ACTIVE_OFF_TIMEOUT slots. Thus after a certain amount of time expires, the RU is moved to the INACTIVE state.

There are two logical channels: traffic and access. In an exemplary embodiment, there are 25 partitions. The first 24 partitions constitute the traffic channel. The last partition is the access channel. The access channel does not use frames.

In a preferred embodiment, a network operates with its traffic channel in one of two spreading factor modes. Referring to FIGS. 22 and 26 for a spreading factor of 2, the frequency plan has a total of 24 partitions with both an upper and lower carrier. The layout includes 4 partitions with an entry slot per time slot and 6 entry slots per 6-slot frame. Referring to FIGS. 23 and 29 for a spreading factor of 4, the frequency plan has a total of 12 partitions, with 2 groups of 12 partitions on the lower carrier and another 2 groups of 12 partitions on the upper carrier. The layout includes 4 partitions with an entry slot per time slot and 3 entry slots per 6-slot frame. For each mode, the access channel has a spreading factor of 2.

The base transmits during the first half of a time slot and the RUs transmit during the second half of a time slot. On the traffic channel, FLI, FLT, FLS, and FLB messages are sent on the forward link, and RLI and RLB messages are sent on the reverse link. On the access channel, FLA messages are sent on the forward link, and RLA messages are sent on the reverse link.

Figure 49:
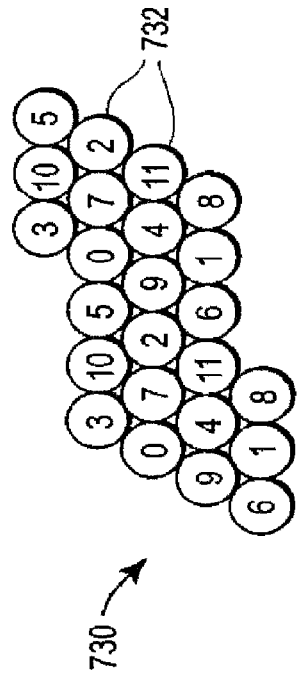
FIG. 49 is an illustration of base offset code assignments for a base offset code repeat factor of twelve and a hexagonal layout of cells, in accordance with an aspect of the present invention.
Figure 51:
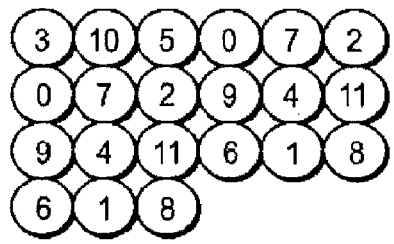
FIG. 51 is an illustration of base offset code assignments for a base offset code repeat factor of twelve and a rectangular layout of cells, in accordance with an aspect of the present invention.

There are 12 base offset codes. The assignments of base offset codes distinguish one base from its adjacent neighbors. FIG. 49 and FIG. 51 illustrate geographical layouts of bases with their associated base offset codes. The base offset codes range from 0 to 11.

Each provisioned RU in a subband of a base is assigned a unique access code. The access code is reused from subband to subband and from base to base. A database in maintained to correlate the access code with the RU identification number. In a given subband in a given base, each RU has its own unique access code. The access code specifies which RLA message is used by the base to communicate with the RU. Similarly, access codes also specify RLI, FLA, FLI, and FLT messages.

For an exemplary embodiment, there is a maximum of 4032 access codes. The access codes, $a=2016t+c$, are divided into two equal sets. The first set of access codes, ($t=0$, $0 \leq c \leq 2015$) is for bases with an even base offset code. The second set of access codes, ($t=1$, $0 \leq c \leq 2015$) is for bases with an odd base offset code. Each set of 2016 access codes are divided into three groups with each group allocated a certain number of access codes. There are 2000 access codes, a, for provisioned RUs: $0 \leq c \leq 1999$; there are 8 access codes, a, for ranging RUs: $2000 \leq c \leq 2007$; and there are 8 access codes, a, for installation RUs: $2008 \leq c \leq 2015$.

The access codes are reused every other cell. The rectangular arrangement of cells shown in FIG. 51 is preferred to the hexagonal layout shown in FIG. 49. The following methods enable code reuse:

1) code selectivity: assignment of a set of access codes to even cells and the remaining access codes to odd cells;

2) spatial selectivity: directivity of antenna patterns that focus the transmitted power in the direction of the intended receiver within the cell rather than to receivers in adjacent cells;

3) power discrimination: RUs within the cell transmit at just enough power for their base but not enough for the adjacent bases;

4) delay separation: codewords received from an adjacent cell have more delay than those within the cell and consequently have their symbols modulated by a phase ramp; and 5) time schedule: only certain subsets of RUs are permitted to send RLAs at specific times.

If the RU is not yet provisioned and does not know its range, it randomly chooses a ranging access code, sends a RLA message, attempts to detect a FLA response from the base, and adjusts its delay and transmit power based on whether a FLA was detected. It repeats this process until the best delay and transmit power have been identified. The RU uses an average power level of received FLS signals to select its initial transmit power level.

If the RU is not yet provisioned and knows its range, it randomly chooses an installation access code, sends a RLA message to the base, receives the FLA response from the base, and sends a RLI on the partition indicated by the FLA. It continues communicating with the base to finish the provisioning process. If the base has an open session with an installation RU, it ignores subsequent RLAs with the same access code from other RUs. If an installation RU fails to receive a FLA on the access channel, it waits a predetermined amount of time before choosing another installation access code and repeating the process.

The base decides when to end a flow by evaluating the number of flows and the number of packets in the forward and reverse link queues. It takes three frames to end a flow. In each frame, the base sends two bits of information indicating the frame number of the "ending" state. This counter begins at 1 in the first frame of the "ending" state and concludes at 3 in the third frame of the "ending" state. The base does not transmit the frame after the third frame of the "ending" state because the flow will be closed. A counter value of 0 is reserved to indicate that the flow is not in the "ending" state. The RU receives the counter in any of the FLB messages. If the counter is non-zero, the RU determines that the flow is ending and decides how many additional RLIs to send the base. The RU must detect a counter value of 1 or 2 in order to turn off the flow at the same frame number as the base. When both of these FLBs have an excessive BER, the RU encryption engines will be out of sync with those of the base. An alternative approach is that the base sends the time slot counter value of the first slot of the closed state in each FLB message of the "ending" state. The RU would compare the current time slot counter with the value in the medium access control (MAC) message to determine when to close the flow.

Time Slot Counter

In an exemplary embodiment, the time slots are numbered from 0 to 2147483399 inclusive. There is one logical time slot counter in the base and one time slot counter in each RU. If there are multiple time slot counters in the base, they all contain the same value and increment at the same time. The time slot counter is at least 31 bits wide, indicates the number of time slots that have gone by, and wraps around every 2147483400 slots. At 300 slots per second, the wrap around occurs every 7158278 seconds (82.9 days). Every second, on the second, the reverse entry slot of the first partition begins.

Twenty-four frame counters, one for each partition, can be derived from the time slot counter. The frame counter, $n(j,k)$, is calculated by the following formula, $$n(j,k)=[(j-d*k+s) \div 6] \ \& \ 0x7FFFFFFF,$$

where the division and the bit-wise "and" function use 32-bit 2's complement arithmetic, j is the time slot counter; k is the zero based partition number, d is 1 for two way spreading and is 2 for four way spreading, and s is 0 for the reverse link and is 3 for the forward link.

The entry slots occur when the following is true, $$\mod [(j-d*k+s),6]==0,$$

where j is the time slot counter, k is the zero based partition number, d is 1 for two way spreading and is 2 for four way spreading, and s is 0 for the reverse link and is 3 for the forward link. The forward entry slots are different in time from the reverse entry slots. The forward entry slot transmission begins approximately 2.5 slots after the reverse entry slot transmission begins. There are no reverse entry slots on odd slots for four way spreading, as shown in FIG. 62.

The base and the RU have time slot counters that contain the same count and virtually increment at the same time. All of the time slot counters in a network contain the same count and virtually increment at the same time.

Timing and Weight Dependencies

Figure 48:
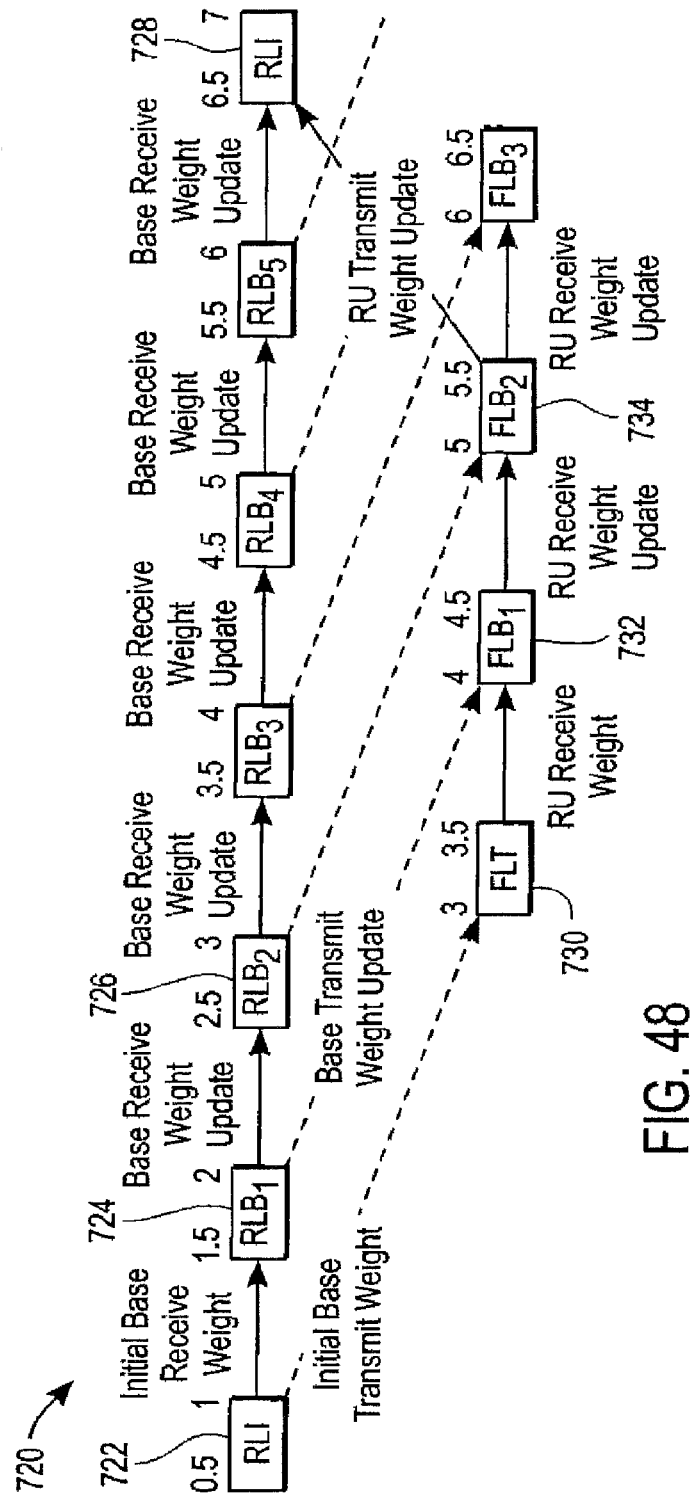
FIG. 48 is an illustration of timing and weight dependencies during base and remote unit communications, in accordance with an aspect of the present invention.

FIG. 48 is an illustration of timing and weight dependencies during communication of RLIs, RLBs, FLT and FLBs between a RU and a base. The base receives a RLI 722 from the RU from slot j+0.5 to j+1. The base uses the RLI 722 to form its initial base receive weight vector which is used to despread the RLB 724 from the RU received from slot j+1.5 to j+2. Thereafter, the RLB 724 from slot j+1.5 to j+2 is used to update the base receive weight vector which is then used to despread the RLB 726 from slot j+2.5 to j+3.

The base also uses the RLI 722 from slot j+0.5 to j+1 to form its initial base transmit weight vector. The initial base transmit weight vector is first used to spread the FLT 730 transmitted from the base from slot j+3 to j+3.5.

The base also uses the RLB 724 from slot j+1.5 to j+2 to update its base transmit weight vector. The updated base transmit weight vector is first used to spread the FLB 732 transmitted from the base from slot j+4 to j+4.5.

The RU receives a FLT 730 from the base from slot j+3 to j+3.5. The RU uses this FLT 730 to initialize its RU receive weight vector which is first used to despread the FLB 732 from the base received from slot j+4 to j+4.5. Thereafter, the FLB 732 from slot j+4 to j+4.5 is used to update the RU receive weight vector which is then used to despread the FLB 734 from slot j+5 to j+5.5.

The RU uses the RU receive weight vector as updated by the FLB 734 in slot j+5 to j+5.5 to update the RU transmit weight vector to spread the RLI 728 transmitted from the RU from slot j+6.5 to j+7. The RU transmit weight vector is updated just prior to transmitting the RLI 728.

RLI Use

A RLI is sent from a RU to the base during the reverse entry slot of the reverse link.

The RU sends a RLI in two consecutive frames during the "starting" state of a flow. The RLI in the second frame of a starting flow is always sent regardless of whether the RU receives a FLT in the first frame. The RU transitions from the "starting" state to the "open" state and then continuously sends RLIs on open flows.

The base looks for RLIs in all flows that are not in the "closed" state. The RLI false alarm rate is low because the base does not look for RLIs in closed flows. Thus, the RU can not use a RLI to request the base to start a closed flow.

There are three different RLI detection thresholds, one for each RLB data rate of 2, 3 or 4 bits per symbol. If the base would be receiving RLBs with two bits per symbol, then the base uses a low (sensitive) detection threshold. If the base would be receiving RLBs with four bits per symbol, then the base uses a high (less sensitive) detection threshold. The detection threshold also is a function of the number of base antennas. Generally the detection threshold is lower for a 6 antenna base than for a 16 antenna base.

When a flow at the base transitions from the "closed" to "starting" state, the base records the time slot counter, j, when the first RLI is expected. If a RLI is detected by the base during time slot j or j+6 in the particular partition, then the flow state progresses to "open", otherwise the flow state reverts back to "closed". If a flow is not successfully opened, the base may try again to start the flow by sending a FLI during time slot j+12 or by sending a partition allocation message in an already open flow. This process is repeated until the flow is opened successfully or the base gives up.

If the base fails to receive CONSECUTIVE_RLI_LOSS_THRESHOLD RLIs in a row in an open flow, then the base unilaterally marks the flow as closed. The base may restart the flow if necessary. CONSECUTIVE_RLI_LOSS_THRESHOLD RLIs has a default of three Only RUs in the ACTIVE_ON state may send RLIs on non-closed flows of the traffic channel.

When a RU receives a FLI on the forward entry slot in frame n of partition k, it always sends two RLIs, one in frame n+1 and the other in frame n+2, in the reverse entry slot of partition k. Likewise, when a RU receives a FLA or a partition allocation message, it always sends at least two consecutive RLIs. In both cases, from sending the first RLI until the RU tests for the second FLT, the flow at the RU is in the "starting" state.

While a flow at the base is in the "starting" state, the base attempts to detect two RLIs, one in the first frame of the "starting" state, and one in the second frame. If either RLI is detected, the flow at the base proceeds to the "open" state.

At a schedule tied to the time slot counter, the reverse link entry slot may be blanked out, and may not be used by any RU for the transmission of a RLI. These entry slots of the reverse link are reserved for base transmit/receive compensation. The frame associated with that blanked out entry slot is defined to contain bearer traffic between the base and the same RUs as did the previous frame on that partition. Weights shall be preserved at the base and RU across the blanked out entry slot. In the scheduled time slot, there are usually 4 and sometimes 5 partitions with a reverse entry slot that would be blanked. Thus, there would have to be at least 6 scheduled time slots to cover all 25 partitions. For j representing the zero based time slot counter, k representing the zero based partition under consideration, and d is 1 for two way spreading and is 2 for four way spreading, then the reverse entry slot is blanked when the following is true, $$(((j-(k*CP\_SCHED\_MULT)) \,\&\, CP\_SCHED\_MASK)<6) \,\&\&$$

$$(((j-(k*d)) \,\%\, 6)==0).$$

Candidate values for these system wide variables are CP_SCHED_MULT=157 and CP_SCHED_MASK=4095. For the $25^{th}$ partition, provisioned RUs that have acquired the correct value of the time slot counter shall not transmit RLAs during the blanked out slot. RUs without a synchronized time slot counter may transmit a ranging RLA or installation RLA during any time slot.

RLI Weights

The base uses the RLI to calculate the initial value of the base receive despreading weight vector used during the frame. The weight vector has an antenna gain pattern with a main lobe in the direction of the RU and nulls in the direction of co-channel interfering RUs.

If the duration of a closed flow is less than RU_WEIGHT_STALENESS slots, then the RU uses the previous transmit weights for this starting flow; otherwise, the RU uses transmit weights with random phases.

When a RLI is not detected, the base uses the base transmit and receive weights from the previous frame of the current non-closed flow. However, during the "starting" state of a flow, if a RLI is not detected in the first frame, then the base transmit weight vector is set to all zeros. Likewise, during the "starting" state of a flow, if a RLI is not detected in neither the first nor the second frame, then the base transmit weight vector for the second frame is set to all zeros. The all-zero transmit weight vector in the "starting" state zeroes the FLT transmit power which in turn is used to tell the RU (via lack of detecting the FLT) that the base did not detect the corresponding RLI.

The same RU transmit weight vector is used to spread both the RLI and the all of the subsequent RLBs. Since the symbols used to transmit the RLBs have less power than the RLI symbols, the SNR of the received RLBs at the base will be less than the SNR of the received RLI at the base. This SNR decrease, (the ratio of the typical RLB power to the RLI power) is given in the sixth column in Table 4.

TABLE 4

Constellation Power.

| Constellation | Use | Index, i | RMS, B(i) | Peak | Peak/RMS, dB | RMS rel to RLI, dB | RMS rel to FLI, dB |
|---|---|---|---|---|---|---|---|
| 2 BPSK | FLS | 0 | 21.21 | 21.21 | 0.0 | 0.0 | 7.2 |
| 4 QAM | RLI, RLA | 1 | 21.21 | 21.21 | 0.0 | 0.0 | 7.2 |
| 8 PSK | FLB, RLB | 2 | 14.07 | 14.14 | 0.0 | −3.6 | 3.7 |
| 16 QAM | FLB, RLB | 3 | 15.81 | 21.21 | 2.6 | −2.6 | 4.7 |
| 32 CROSS | FLB, RLB | 4 | 13.42 | 17.49 | 2.3 | −4.0 | 3.2 |
|  | FLI, FLT, FLA | 5 | 9.24 | 21.21 | 7.2 | −7.2 | 0.0 |

RLI Addressing

RLIs uniquely identify which RU, out of all the RUs that are assigned to the base, is requesting a frame in a partition. RLIs do not uniquely identify which base is assigned to the RU. The RLI codes repeat every other base.

RLIs can be simultaneously received from multiple RUs at the same time. The base uses beamforming and RLI codes to separate the various RUs.

The number of RUs, which simultaneously transmit RLI messages, is less than or equal to $M_{BASE}$. The base checks $M_{BASE}$ RLIs per reverse entry slot because the base schedules the traffic on the traffic channel in a deterministic fashion. Since the RUs are scheduled by the base to use particular partitions, the RUs in the ACTIVE_ON state are known and are the only ones permitted to communicate on the traffic channel.

RLI Codewords

An exemplary embodiment uses RLI codewords based on Hadamard basis functions. For this example, there is a maximum of 4032 RLI codewords. RLIs are described by an access code, a, 0 ≤ a ≤ 4032. A RLI codeword, $p_{i_1 i_0}$, contains 64 complex symbols and has in-phase and quadrature components taken from the columns of a 64 by 64 Hadamard matrix, $$p_{i_1 i_0} = 15 h_{i_1} + 15 j h_{i_0}, \ i_1 \neq i_0$$

where $h_{i_1}$ and $h_{i_0}$ are particular columns from the Hadamard matrix. The indices $i_1$ and $i_0$ select a particular RLI code. For a given access code, a, the zero-based column indices are, $$i_1 = \mathrm{mod}(a, 64)$$

$$i_0 = \mathrm{mod}(\lfloor a/64 \rfloor + i_1 + 1, 64).$$

For two given column indices, the access code is, $$a = 64 \ \mathrm{mod}(i_0 + i_1 + 63, 64) + i_1.$$

FIG. 57 gives access codes as a function of the in-phase column index $i_1$ and the quadrature column index $i_0$. The cross-correlation between any two given RLIs based on their access codes is zero if all four column indices are unique. For this reason, the access codes increment down the diagonals in order to maximize the probability that sequential access codes have unique column indices, thereby providing the maximum separation between one codeword and the next codeword. The maximum correlation coefficient between any two codewords is 0.5 and occurs when two of the column indices are equal.

Each complex symbol of a RLI codeword has the same amplitude. Thus the ratio of the largest amplitude to the RMS amplitude is 0 dB. The modulation on each complex symbol could be considered QPSK. A scale factor of 15 is applied to the RLI at the RU prior to it being loaded into an ASIC so that it contains no more than 5 bits of resolution in the in-phase and quadrature components. In addition, this scale factor maximizes the transmit power of the RLI since the most positive 5-bit two's complement number is +15.

Figure 35:
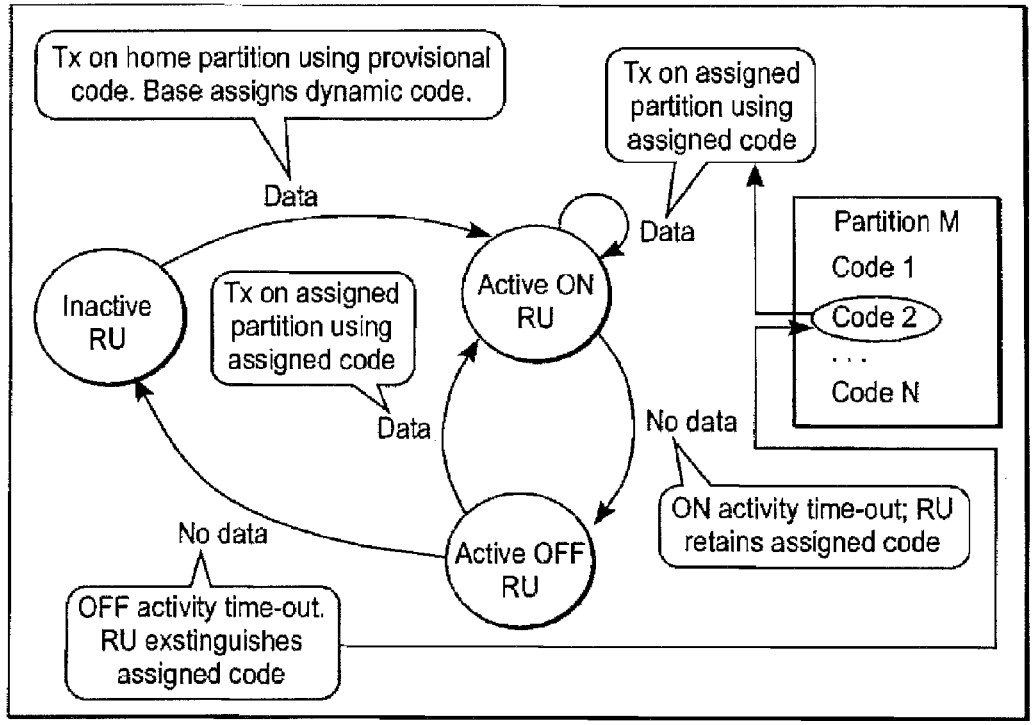
FIG. 35 is a state diagram of dynamic reverse link initialization (RLI) code assignment, in accordance with an aspect of the present invention.

FIG. 35 show a flow diagram of dynamic RLI code assignment. A RLI code is relinquished by and inactive RU and reassigned to a newly active RU.

RLA Use

The RLA can be sent during any slot of the reverse access channel. When the base detects a RLA with a provisioned access code on the reverse access channel and if it has unused traffic channel capacity, it sends either a FLI or a FLA to the RU. If the base detects a RLA with a ranging access code, it sends a FLA to the RU. If the base detects a RLA with an installation access code and it has unused traffic channel capacity and it does not have an open session with another RU with the same installation access code, it sends a FLA to the RU.

If a RU sends a RLA and does not receive any FLI or FLA, then it implements a backoff algorithm thereby waiting a random number of opportunities before sending the next RLA. The possible reasons for no FLI or FLA are a) the base did not detect the RLA; b) the base did not have any more traffic channel capacity and so did not send either; c) the base did have unused traffic channel capacity but all of the FLI and FLA bursts were allocated to send messages to other RUs; or d) the RU failed to detect the FLI or FLA.

The access channel is contention oriented because the number of RLAs that arrive in a given slot may be more than the maximum number that the base can detect. Statistically, the majority of the time, the base will detect all of the RLAs. In the rare case that too many RLAs occur, the undetected ones will be serviced on subsequent RLA transmissions.

Only a certain subset of the RUs in the ACTIVE_OFF state is permitted to communicate on the reverse access channel during a particular slot. The base has difficulty detecting RLAs if too many arrive at the same time. In addition, to keep the RLA false alarm rate low, the base limits the number of RLAs that it looks for. The subset includes all those RUs whose access code, a, is given by, $$a = g + i,$$

where i is a counter that ranges from 0 to $2^{K_A} - 1$ for all but the last subset and ranges from 0 to $2^{K_A} - 33$ for the last subset. The parameter g is the first access code of the subset, $$g = ((j+e) \& ((1 << K_A) - 1)) << (11 - K_A) + 2016 * (e \& 1),$$

where j is the time slot counter, and e is the base offset code. All but the last subset have $2^{K_A}$ RUs in each subset. There are $2^{(11-K_A)}$ subsets. Only $2^{K_A}$ active-off RUs out of the 2016 RUs can send a RLA on the access channel on a particular slot. By selecting $K_A$, the system can be tuned to control the amount of contention that is permitted on the access channel. For example, setting $K_A$ to 8 gives 8 subsets with 256 RUs per subset. For $K_A$ set to 8, a RU would wait between 0 and 8 slots to send a RLA on the reverse access channel. The delay would range from 0 to 27 ms with a typical delay of 13 ms.

In a similar fashion, only a certain subset of the RUs in the INACTIVE state is permitted to communicate on the reverse access channel during a particular slot. The subset includes all those RUs whose access code, a, is given by, $$a = g + i,$$

where i is a counter that ranges from 0 to $2^{K_1}-1$ for all but the last subset and ranges from 0 to $2^{K_1}-33$ for the last subset. The parameter g is the first access code of the subset, $$g((j+e)\&((1-K)-1)) << (11-K_1) + 2016*(e\&1),$$

j is the time slot counter, and e is the base offset code. All but the last subset have $2^{K_1}$ RUs in each subset. There are $2^{(11-K_1)}$ subsets. Only $2^{K_1}$ inactive RUs out of the 2016 RUs can send a RLA on the access channel in a particular time slot. For example, setting $K_1$ to 5 gives 64 subsets with 32 RUs per subset. For $K_1$ set to 5 a RU would wait between 0 and 64 slots to send a RLA on the reverse access channel. The delay would range from 0 to 213 ms with a typical delay of 107 ms.

A provisioned RU starts in the INACTIVE state and initiates communication with the base by sending a RLA on the access channel during a prescribed slot that occurs on a periodic basis.

The ACTIVE_OFF_TIMEOUT, ACTIVE_ON_TIMEOUT, $K_A$, $K_1$, CP_SCHED_MULT, CP_SCHED_MASK, and other similar network wide parameters are sent from the base to the RUs in a MAC message.

The base checks only for specific RLA access codes during a given access channel slot. The base always checks for the RLAs associated with the installation and ranging access codes.

The base uses a detection threshold to determine the presence of a RLA. The detection threshold is based upon the number of bits per symbol used by the RU for RLB traffic. If the base would be receiving RLBs on the traffic channel with two bits per symbol, then the base uses a low (sensitive) detection threshold. If the base would be receiving RLBs with four bits per symbol, then the base uses a high (less sensitive) detection threshold. Installation and ranging RLAs use detection thresholds corresponding to two bits per symbol. The detection threshold also is a function of the number of base antennas. Generally the detection threshold is lower for a 6 antenna base than for a 16 antenna base.

RLA Weights

RLAs can be simultaneously received from multiple RUs at the same time. The base uses beamforming and RLA codes to separate the various RUs.

The RU transmit spreading weights for the RLA have equal amplitude; the power in the lower carrier is equal to the power in the upper carrier. The phase of the upper carrier transmit weight is selected from a pseudo-random number generator that produces at least 16 different phases and repeats the phase sequence no more often than every 127 times. The pseudo-random sequence of phases are unique for each RU.

The transmitted RLA power, measured at the RU antenna, is about the same as the RLI power. The same technique for selecting RLI power is also applied to selecting the RLA power.

RLA Addressing

RLAs do not uniquely identify which base is assigned to the RU. The RLA codes repeat every other base.

RLAs uniquely identify which RU, out of all the RUs that are assigned to the base, is requesting service.

RLA Codewords

The RLA content is identical to the RLI content in terms of number of symbols, codeword, and modulation.

FLI Use

The base sends a FLI to a RU to initiate a flow with the RU. A FLI is sent from the base to a RU during the forward entry slot. For a 16 tone partition, a FLI message includes 16 tones during a burst of a forward entry slot.

Referring to FIG. 30, there are two possible FLI bursts during a forward entry slot. Thus, the base can send FLIs to two RUs per slot per partition. For example, in a 4 by 6 layout as in FIGS. 26 and 29, there are four forward entry slots in 24 partitions. For this example, the base can send FLIs to a maximum of eight RUs per time slot. If the base has FLI messages for three or more different RUs in the same forward entry slot of the same partition, then it must either 1) wait until the next frame to send one of the messages, or 2) use another flow to send one of the messages.

The base can also start a flow on a new partition using an open flow by sending information in the MAC header of the open flow. If the RU does not receive a partition allocation message, the message is not acknowledged and must be re-transmitted.

If the flow is closed, the base sends a FLI is to the RU start a new flow. The RU responds with a RLI. Then during FLB channels, the base sends parameters that describe the scope of the flow. The RU in turn automatically transmits RLIs on all frames of the flow while the flow is open. The base only sends FLIs when a flow is in the "closed" state. A forward entry slot in frame n may not contain both a FLT and a FLI directed to the same RU. The FLT is used in frame n and the FLI is used to request a RLI in frame n+1.

The RU uses a maximum-likelihood based detector to recognize the presence of its FLI codeword. The RU may falsely detect a FLI and send a RLI on a closed flow. The base would ignore such a RLI since it only tests RLI access codes corresponding to open flows. The RU would then realize that the FLI was a false alarm since it did not receive a FLT on the first frame of the opening flow. The RU may fail to detect a FLI and thereby not send a RLI. When the base fails to receive a RLI on the first frame of the flow that is just opened, it assumes that the RU failed to receive the FLI and simply sends the FLI at the next opportunity to open the flow.

The RU uses a detection threshold to determine the presence of a FLI. The detection threshold is based upon the number of bits per symbol used by the RU for RLB traffic. If the RU would be receiving FLBs with two bits per symbol, then the RU uses a low (sensitive) detection threshold. If the RU would be receiving FLBs with four bits per symbol, then the RU uses a high (less sensitive) detection threshold.

FLI Weights

The base uses a transmit weight vector for the FLI in order to point the main lobe in the direction of the desired RU. The antenna pattern does not necessarily have nulls in the direction of other RUs since the FLI is sent to only one RU. Thus, the base uses antenna aperture matching beamforming for the FLI transmit weight vector. The transmit weight vector for each FLI burst is tailored for the RU to which it is being sent. The base uses recent RLB messages in which RLI was successfully detected to update the FLI transmit weights.

The magnitude squared of the base FLI transmit weight vector is the same for each RU. Since the FLI power is not shared between multiple RUs, in contrast to FLB power that is shared among RUs, the FLI power is set higher than the typical FLB. The magnitude squared of the FLI transmit weight vector can be scaled so that it is 4 times (6 dB) larger than the magnitude squared of a typical FLB transmit weight vector. The total transmit power depends upon the transmit weight vector power and the constellation power. As shown in Table 4, the constellation symbols used to synthesize a FLB are different than those used to synthesize a FLI. Column 4 shows that the RMS power of the FLB relative to that of the FLI depends upon the constellation type. For each constellation, the RMS power of the FLB is greater than or equal to that of the FLI. Increasing the FLI transmit weight vector by 6 dB, makes the relative RMS power of the FLI greater than that of the FLB.

FLI Addressing

The content of a FLI identifies which RU should respond to this FLI. Each RU in a cell monitors entry slots for its FLI codeword. Although FLIs are received by all of the RUs in a cell, only the specific RU addressed detects its FLI codeword and responds to the base.

The content of a FLI does not identify which base is sending the FLI. The RU detects its FLI whether from its base or from a base in an adjacent cell.

For an exemplary embodiment, a FLI burst in a forward entry slot has at most one FLI message. For this embodiment, FLI messages are not code division multiplexed.

FLI Codewords

An example of a preferred embodiment uses FLI codewords based on Kronecker basis functions. For this example, there is a maximum of 4096 FLI codewords.

FLI messages based on Kronecker basis functions are described by the following.

Dimension n, $0 \leq n < 4$;
Access code, a, $0 \leq a < 4096$;
Generating vector i, with dimension 4 and range $0 \leq i(n) < 8$ and elements,
  i(0) is bits 0 to 2 of a,
  i(1) is bits 3 to 5 of a,
  i(2) is bits 6 to 8 of a, and $$i(3) \text{ is bits 9 to 11 of a: } a = \sum_{n=0}^{3} i(n)8^n.$$

The elements of generating vector, i, are the four octal digits of a. FIG. 58 shows sample computer code in Matlab® that generates 16 complex spectral values for FLI forward entry bursts given an access code. For this example, each FLI codeword has about the same peak to RMS ratio of the 16 complex tones, 7.4 dB.

Some FLI codewords are "near" other FLI codewords. About 99.61 percent of the codeword pairs have a correlation coefficient squared less than 0.435 and 0.39 percent have a correlation coefficient squared of about 0.645. For any given codeword, there are 16 other codewords that are "near" it. If there are two RUs that are near in azimuth and FLI codeword, then there could be a high false alarm rate at those RUs when detecting the FLI message. One solution is to separate the RUs in azimuth.

The azimuth that the RU makes with the base is divided into 12 portions each called an "hour". For example, a RU that has an azimuth between 0° and 30° with respect to the base, is assigned to hour 0. Ideally, if two codewords were near each other, then one would be assigned to hour h and the other to hour h+6, so that they would be far apart in azimuth. This six hour separation cannot always be achieved. Instead, the base offset code and the "nearness" of the FLI codeword are used to compute the permissible hours as follows, $$\text{hour} = e + \text{mod}\left\{\left\lfloor \frac{9}{2}\sum_{n=0}^{3} i(n) \right\rfloor, 12\right\}.$$

where n is the octal digit index, i(n) are the values of the octal digits, and e is the base offset code, ranges from 0 to 11, and specifies which base the RU is communicating with. The inverse of the above equation gives a list of FLI codes that could be assigned to a RU, given a particular base offset code and azimuth in hours.

Figure 50:
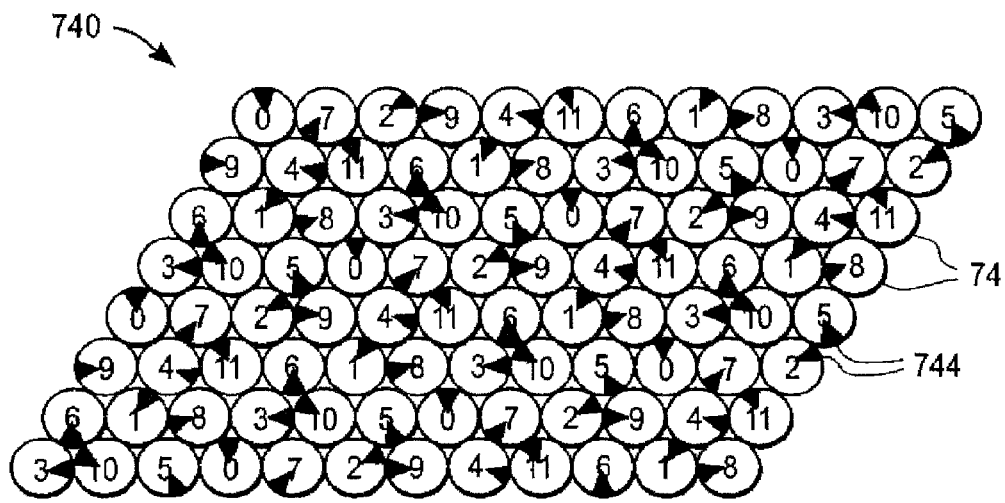
FIG. 50 is an illustration showing azimuths of a subset of forward link initiation (FLI) codes and base code assignments with a repeat factor of twelve and hexagonal layout of cells layout, in accordance with an aspect of the present invention.
Figure 52:
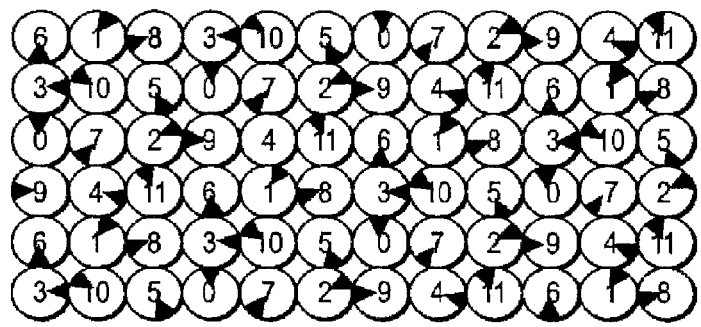
FIG. 52 is an illustration showing azimuths of a subset of forward link initiation (FLI) codes and base code assignments with a repeat factor of twelve and rectangular layout of cells layout, in accordance with an aspect of the present invention.

FIG. 50 illustrates reuse of a particular subset of FLI codewords at different azimuths 744 by different bases 742 arranged in a hexagonal layout. FIG. 52 gives an analogous illustration for a rectangular layout of bases.

FLA Use

A FLA message can be sent from the base to a RU during any burst of any slot of the forward access channel. Only one FLA message can be sent per burst to one specific RU.

One or more FLAs are sent from the base only in response to a RLA received by the base. In addition, to start a flow on a new partition, the base may send a FLA to the RU without having received a recent RLA.

A FLA may be sent regardless of the RU state, including INACTIVE, ACTIVE_OFF or ACTIVE_ON.

Figure 53:
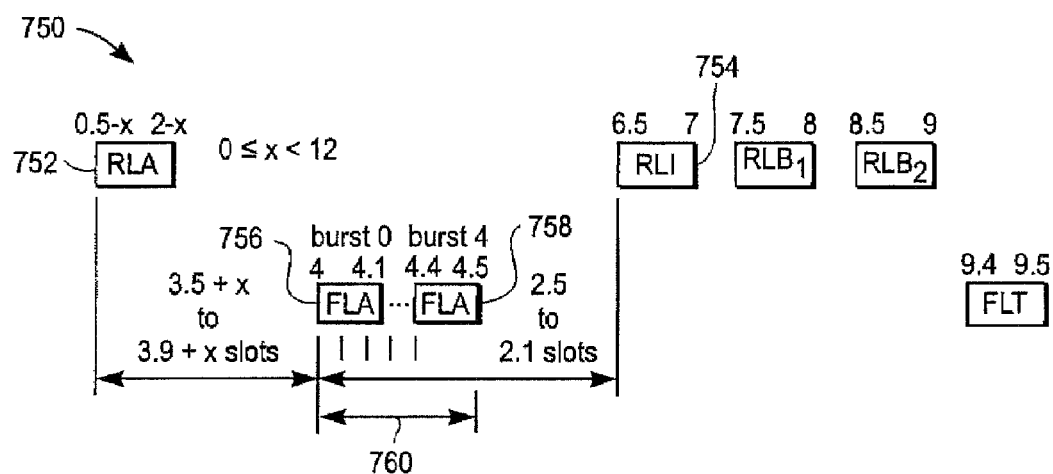
FIG. 53 is an illustration of the relative timing of transmissions of reverse link access (RLA), forward link access (FLA), and reverse link initiation (RLI) signals, in accordance with an aspect of the present invention.

FIG. 53 illustrates the timing relationship 750 of FLAs following a RLA. The RU transmits RLA 752 from time slot j+0.5 to j+1. The base responds by transmitting a FLA 756 in a burst within the time slot 760 from j+x+4 to j+x+4.5, where j is the time slot counter and x is the number of slots that the base may wait to schedule the FLA, $0 \leq x < 12$. The quickest that the base respond with a FLA is 3 slots, from the end of RLA 752 to start of FLA 756. This corresponds to transmitting the FLA 756 in burst 0 of the time slot 760, with x=0 slots of delay. The base scheduler has 12 slots, or 60 bursts, to allocate a partition and select the corresponding burst and slot for that partition.

The RU responds to a FLA transmitted during a burst within time slot j+4 to j+4.5 by transmitting a RLI 754 during time slot j+6.5 to j+7. The quickest that the RU would respond to a FLA is 2.1 slots, from the end of FLA 758 to start of RLI 754.

If the RU sends a provisioned or installation RLA and the base does not respond with a FLA or FLI then the RU implements a backoff algorithm before sending the next RLA. Likewise, if the RU fails to detect a FLA or FLI within a certain number of slots of the RLA, then it implements a backoff algorithm before sending the next RLA.

The RU uses a detection threshold to determine the presence of a FLA. The detection threshold is based upon the number of bits per symbol used by the RU for RLB traffic. If the RU would be receiving FLBs with two bits per symbol, then the RU uses a low (sensitive) detection threshold. If the RU would be receiving FLBs with four bits per symbol, then the RU uses a high (less sensitive) detection threshold. Installation and ranging FLAs use a detection threshold corresponding to 2 bits per FLB symbol.

FLA Weights

The base transmitter weights the FLA using a transmit weight vector so as to point the main lobe in the direction of the desired RU. The transmit weight vector for each FLA burst is tailored for the RU to which it is being sent. The transmit weight vector is the antenna aperture derived from the most recently received RLAs on the reverse access channel. The transmit weight vector uses aperture matching rather than null steering beamforming.

The magnitude squared of the base FLA transmit weight vector is the same for each RU and is four times larger than the magnitude squared of a typical FLB base transmit weight vector.

FLA Addressing

FLAs with provisioned or installation access codes are used to command the RU to send a RLI on a particular partition. The RUT partition can be assigned according to the FLA's burst index and time slot counter. FIGS. 64 and 65 give examples of mappings of the FLA's burst index and time slot counter to RLI partitions for spreading factors of two and four, respectively. The latency of the FLA to RLI is smaller than the latency of the FLI to RLI.

In each time slot, there are several opportunities for the base to open a flow with a particular RU. With one FLA opportunity per burst, there are five FLA opportunities per slot. For two way spreading, eight FLIs on the traffic channel in addition to the five FLAs on the access channel yield thirteen opportunities per slot to start a flow with a particular RU.

FLAs with ranging access codes are used to indicate to the RU that the corresponding RLA was detected; the FLA does not command the RU to a particular partition. A RLA with a ranging access code transmitted from the RU from slot j+0.5 to j+1 is sent a FLA during any burst of slot j+3 to j+3.5. If all of the bursts of said FLA slot are allocated with provisioned or installation FLAs, no ranging FLA is transmitted. Ranging FLAs have the lowest priority.

The content of a FLA does not identify which base is sending the FLA. The RU detects its FLA whether from its base or from a base in an adjacent cell. The content of the FLA identifies which RU should send a RLI.

FLA Codewords

The FLA has the same number of tones, modulation, and codewords as the FLI.

FLS Use

The base sends FLS messages that the RU uses for synchronization in time and frequency with the base. The RU also uses the average received signal strength of FLS messages to determine the path loss between the base and RU. As shown in FIG. 30, each forward entry slot has FLS messages in the first and fourth bursts, indicated by burst indices 0 and 3 in FIG. 61 through FIG. 63.

Figure 61:
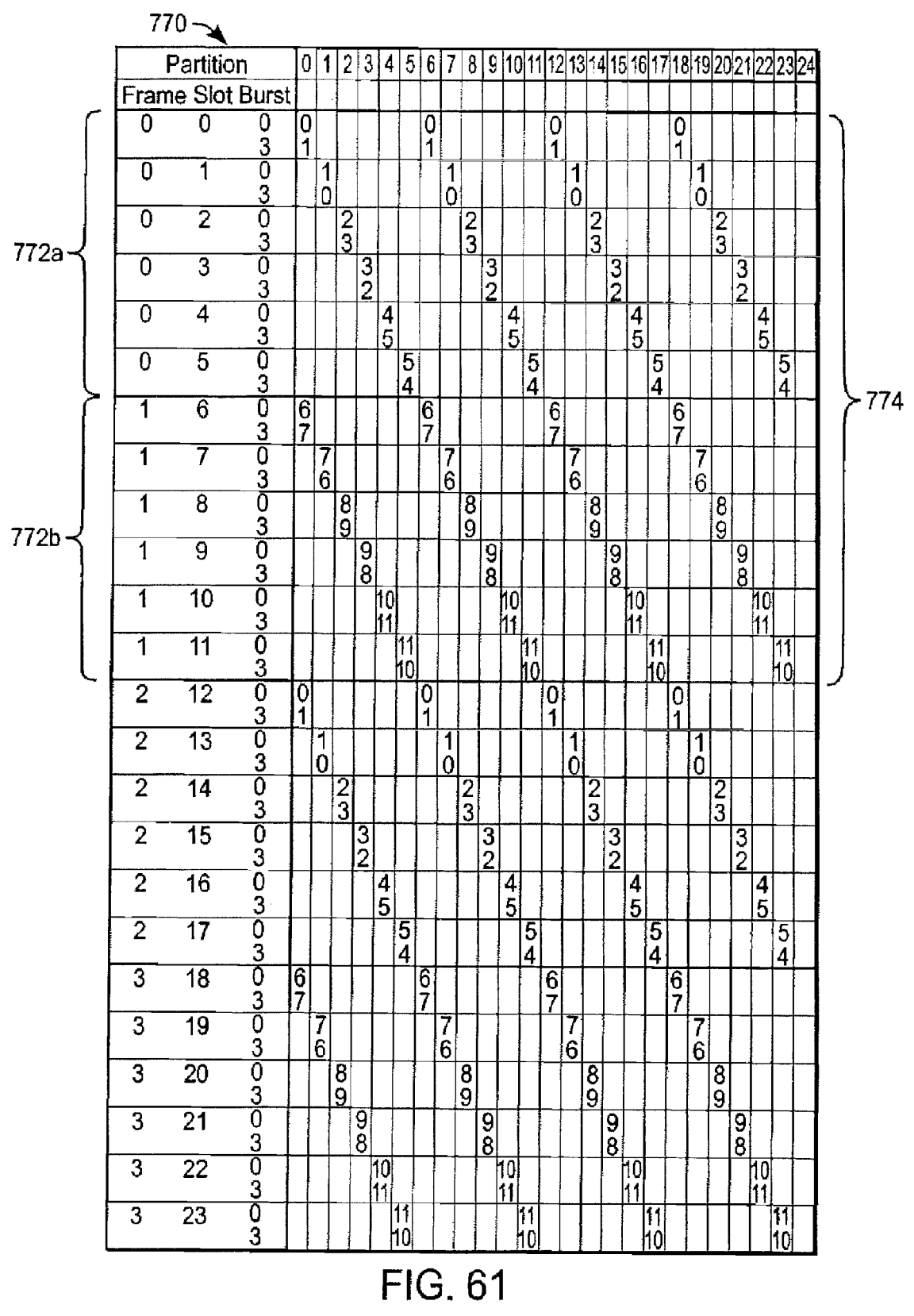

FIG. 61 gives a table of FLS codeword sequence numbers for a spreading factor of two 770. This corresponds to the 4 by 6 layout of FIG. 26. The diagonal pattern of entry slots in FIG. 26 corresponds to the diagonal pattern of entries in FIG. 61. The pattern of FLS codewords is unique within a superframe 774, or two consecutive synchronization frames 772a and 772b, and repeats from superframe to superframe. FIG. 62 gives the FLS codeword sequence numbers for a spreading factor of four. FIGS. 61 and 62 show when forward entry slots occur, which partitions have forward entry slots, and which FLS codeword sequence number is used for the first burst and for the fourth burst.

FLS Weights

The base selects random transmit weight vectors for FLS messages for each slot, partition and spreading frequency. Each element of each transmit weight vector has the same amplitude and a randomly selected phase. The random transmit weight vectors are used so that with high probability, at least one of them has a main lobe in the direction of each RU. The random number generator for one partition in one base should not be correlated with or have the same repeat period as the generator of another partition of any base with a different base offset code.

Figure 63:
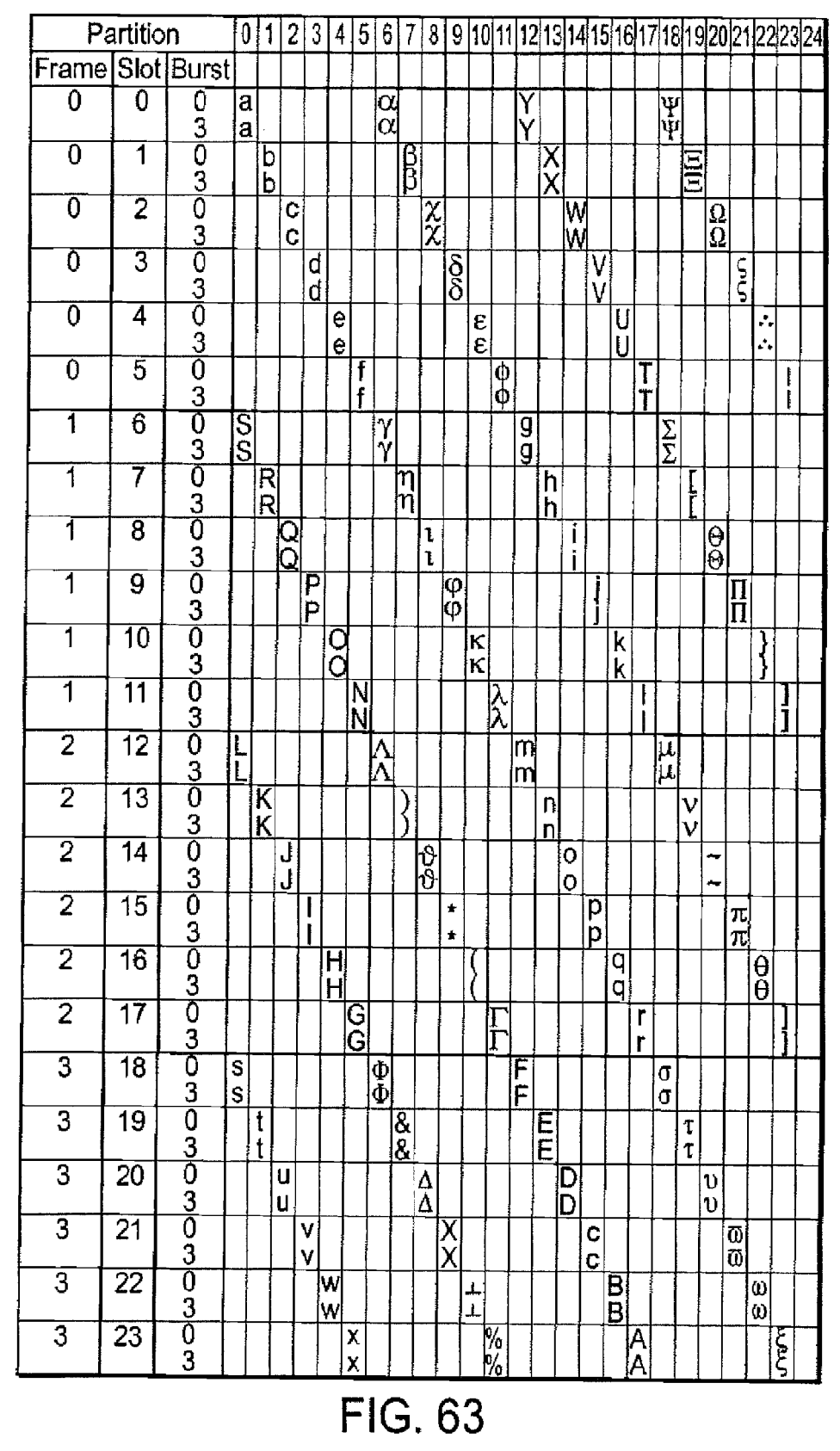

FIG. 63 gives base transmit weight patterns for FLS bursts for a spreading factor of two. Both FLS bursts in a given time slot and partition use the same transmit weight vector.

The average power in the FLS per degree of freedom (DOF) is proportional to the average power per DOF of a single user's FLB, to $P_{FLI}$ (a factor used to control the total FLS transmit power) and to $M_{BASE}$ (the maximum number of flows per partition). The FLS power is constant from tone to tone and from DOF to DOF. The FLS modulation is constant modulus and has the same power regardless of the symbol transmitted. If the symbol power changes as a result of using a different modulation scheme, or if $M_{BASE}$ changes, the transmit weight amplitude also changes to compensate these variations.

FLS Addressing

Every base uses a particular set of FLS codewords. The base offset code associated with the base forms part of the FLS codewords used by that base. FIG. 49 gives an example of a hexagonal layout of 24 cells 730. The numeral in each cell 732 is its base offset code. FIG. 51 gives an example of a rectangular layout of 24 cells. FLS codeword sequences, like the base offset codes, may be reused every 12 cells.

FLS Codewords

Adjacent bases use different FLS codewords so that a RU, which may receive FLS messages from both bases, will lock to its assigned base. FIG. 59 gives matrices of FLS codeword descriptors 760 generated using a computer program in Matlab®. Matrix 762 gives the decimal version and matrix 764 gives the hexadecimal version. The matrix 764 has 12 rows, each row containing the FLS codeword descriptors corresponding to a particular base offset code. For each row, there are 12 columns, one for each slot of a superframe. During the first burst of the first slot of a superframe, all of the bases would transmit their FLS codewords taken from the first column of matrix 764. Likewise, during the first burst of the last slot of a superframe, the bases transmit FLS codewords taken from the last column of matrix 764. The column index of matrix 764 is the FLS codeword sequence number and varies from 0 to 11. FIG. 61 and FIG. 62 give the FLS codeword sequence numbers for the FLS bursts in the entry slots for spreading factors of two and four, respectively. As shown in FIGS. 61 and 62, the superframe sequence pattern repeats every 12 slots.

The bits of a FLS codeword descriptor from matrix 764 in FIG. 59 are converted to BPSK symbols for phase modulating the tones in a FLS partition. FLS codewords use the extreme points of the constellation, 15+15j and −15−15j, in order to maximize their transmit power. The modulation on each tone could be considered BPSK with the phases being 45° or 225°. The peak tone power to average tone power ratio is 0 dB. Other BPSK modulation schemes such as +1 for when the bit is on and −1 for when the bit is off are also acceptable at the RU.

A $N_f$=16 tone FLS message is divided into two parts. The lower in frequency $N_b$=12 tones are called the base tones and the upper $N_s$=4 tones are called the superframe sequence tones. For a given base, the base tones are the same for all FLS messages. The base tones correspond to the three least significant hexadecimal digits in any row of matrix 764 of FIG. 59 and remain constant for that row. This permits the RU to first synchronize to a given base without regard to the superframe sequence. For a given base, the superframe sequence tones are different for each FLS message. The superframe sequence tones correspond to the most significant hexadecimal digit of the elements of matrix 764. This digit is unique for each element in any given row of matrix 764. The superframe sequence tones permit the RU to recognize the superframe sequence number assigned to a particular time slot.

The pattern of FLS codeword sequence numbers for a spreading factor of 2 given in FIG. 61 is determined using the following formula.

---

Let j be the time slot counter in FIG. 61 and n be the column of matrix 764 in FIG. 59.
The first burst uses column $n_0 = \text{mod}(j, 12)$.
The fourth burst uses column $n_1 = n_0 + 1 - 2\text{mod}(j, 2)$.

---

A spreading factor of 4 uses a different pattern as shown in FIG. 62.

FIG. 60 gives a computer program in Matlab® that synthesizes a 16 by 1 FLS vector for a given base offset code and a given slot number j of a superframe. A codeword from matrix 764 of FIG. 59 is selected corresponding to the base offset code (row index of matrix 764) and superframe slot number (column index of matrix 764). The FLS codewords of FIG. 59 were selected to maximize the probability that the RU would lock onto the correct base at the correct superframe sequence and the correct frequency.

FLT Use

A FLT is transmitted over the last burst of the forward entry slot, as shown in FIG. 30. The base sends a particular FLT to a particular RU to indicate that the base received a RLI from that RU. When a base receives a RLI on the entry slot of the reverse link for frame n of partition k, it sends a FLT on the entry slot of the forward link for frame n of partition k.

In the "starting" state of a flow, if the RU detects the FLTs in the first or second frames, it transitions the flow state to "open", otherwise, to "closed". If the RU fails to receive CONSECUTIVE_FLT_LOSS_THRESHOLD FLTs in a row on an open flow, then the RU unilaterally closes the flow and does not send any RLIs on the closed flow. If there are other open flows with the base, the RU may send a MAC message to the base on one of the other open flows indicating that it closed the flow due to lack of FLT detection. The base may reopen the flow via a MAC message on an open flow or by sending a FLI message. The default value for CONSECUTIVE_FLT_LOSS_THRESHOLD is three frames.

A flow must remain closed for at least CONSECUTIVE_FLT_LOSS_THRESHOLD frames. The base does not send FLTs for these consecutive frames to signal to the RU to close a flow that cannot be closed by MAC messages and acknowledgements. When the flow is subsequently opened, both the base and RU will start from known flow states.

Since the RU rarely fails to receive its FLT, it continues transmitting the RLB for that particular frame. The FLT detection thresholds are very low so that the RU virtually always detects a FLT on open flows. This is because the RU expects the FLT on open flows in which the RU just sent a RLI. There are three FLT detection thresholds, one for each data rate of 2, 3 or 4 bits per symbol.

FLT Weights

During the forward link entry slot on each partition, the RU tests for the presence of its FLT. If its FLT is detected, the RU uses the received FLT signal to initialize the despreading weight vector for subsequent FLB despreading. The receive weight vector is used to combine the upper carrier and the lower carrier and to remove the channel phase and gain. If a RU fails to receive a FLT, it uses the RU receiver despreading weights from the previous frame.

For each FLT, the base uses a transmit weight vector to point the main lobe in the direction of the desired RU. The antenna pattern has nulls in the direction of other RUs that are simultaneously being sent other FLTs. The FLT transmit weight vector is dependent upon the RLI messages, noise, and co-channel interference.

FLT messages can be code division multiplexed. The base can send FLT messages to multiple RUs in the same forward entry slot on the same partition. For example, for two RUs the base adds the FLT spectral values for a first RU multiplied by the first RU's transmit weights to the FLT spectral values for a second RU multiplied by the second RU's transmit weights. The FLT codes provide separation between different RUs. Transmit beamforming also provides some isolation. This same approach can be applied to sending FLT messages to multiple RUs.

The transmit weight vector for the FLT is different from the transmit weight vector for the FLI or FLS. The RU uses the received FLT and FLB, but not the FLI, to update the RU receive weight vector.

The base transmit weight vector is scaled by a factor of two when used for spreading the FLT, but is scaled by a factor of one when spreading the FLB. The RU receive weight vector formed using the FLT is scaled by a factor of ½ when used to despread the first FLB. This scaling overcomes the differences in the constellation power of the FLT versus the constellation power of the FLB, as indicated in Table 4.

FLT Addressing

The content of a FLT identifies which RU should respond to it. FLTs are not intended to be broadcast to all of the RUs in a cell, but rather to a specific RU. The content of a FLT does not identify which base is sending the FLT. The RU detects its FLT whether from its base or possibly from a base in a neighboring cell that uses the same partition and FLT codeword.

FLT Codewords

FLT messages use the same access codes, number of tones, number of codewords and modulation as FLI messages.

FLB Use

The FLB channel is used for transmitting data from the base to a remote unit. FLB channels occur during non-entry time slots of a frame. Referring to FIG. 24, the FLB span all bursts 346 of the base transmit interval 342 of a time slot. Constellations for the FLB data include 8PSK, 16 QAM, and 32 CROSS. Constellation powers are given in Table 4. The forward link bearer channel uses the same forward error control coding used by the RLB.

After receiving an RLI from a RU, if the base has no data to send to that RU during the frame, it sends a default message with valid trellis coding and Reed-Solomon coding to the RU. The RU uses the default message to continue adapting its weights during the frame.

FLBs are sent whenever a FLT is sent. FLBs always follow a FLT.

During non-closed flows the base and RU ensure that both the base and RU encryption engines remain synchronized. The base sends all FLB slots in a frame and updates both the FLB encryption and RLB decryption engines regardless of whether the base receives a RLI during the frame. Likewise, the RU sends all RLB slots in a frame and updates both the RLB encryption and FLB decryption engines regardless of whether the RU receives a FLT during the frame. In non-closed flows, the encryption engines continue to advance regardless of RLI or FLT detection. When the base does not detect the RLI, it stills formulates a FLB. Both the FLB and FLT are sent with an all-zero base transmit weight vector. This permits the encryption engines to advance and remain synchronized with the RU. Since the base transmit power is set zero there is minimum interference.

RLB Use

The RLB channel is used for transmitting data from the RU to the base. RLB channels occur on all non-entry time slots. Referring to FIG. 24, the RLB spans all bursts 345 of the RU transmit interval 344 of a time slot. Constellations for the RLB data include 8 PSK, 16 QAM, and 32 CROSS.

The data rate, for the initial RLB messages sent immediately after the RU receives the ranging FLA, is two bits per symbol. The data rate is modified thereafter to three or four bits per symbol by exchange of MAC messages based on the ability of the RU to transmit 3 or 6 dB more power, respectively.

When the RU has no data to send to the base during a frame of a flow, the RU sends a default message with valid trellis coding and Reed-Solomon coding to the base so that the weights can continue to adapt during the frame.

Remote Unit Synchronization

A preferred embodiment for frequency synchronization of a remote unit with the corresponding base is described herein. The RU uses FLS symbols to synchronize with the base station in both time and frequency. The RU performs synchronization acquisition shortly after the remote unit is powered up and if synchronization is lost during normal operation. Synchronization of the RU includes estimating the frequency offset and the delay offset of the forward link data transmitted from the base relative to the RU.

The frequency estimator uses a FLS message transmitted in the first and fourth burst in a forward link entry slot, as described previously. For example, a 4 by 6 layout has eight entry slots per time slot. Referring back to FIGS. 26 and 29, a single FLS message is spread over 8 frequencies; four of the spread frequencies are partitions in a single subband, and the other four are in the paired subband.

The FLS messages are constant modulus codes unique to a given base. The code has BPSK modulation in a preferred embodiment. Other modulations, such as QPSK, 8-PSK, 16 QAM, AND 32 CROSS can also be used. The FLS messages from a particular base have low correlation with FLS messages from other bases. Also, a FLS message has low correlation with itself and nonzero time lags. Furthermore, the codeword in the fourth FLS burst does not resemble a constant times the codeword in the first FLS burst. For this configuration, a code of length 32 is sufficient. The code is split into two codewords for the two FLS bursts in a forward link entry slot.

A 32-element vector containing the code is multiplied by a complex gain for each of the 8 spread partitions. For each partition, the resulting 32 complex elements are split between the two FLS bursts. The FLS of the first burst has the first 16 complex elements and the FLS of the fourth burst has the second 16 complex elements. The base then transmits the code over the assigned FLS partitions. The code is received at the RU in its corresponding FLS partitions with an unknown frequency error due to the independence of the RU's voltage controlled crystal oscillator (VCXO). For initial acquisition, a frequency offset is estimated by applying a maximum likelihood objective function to frequency shifted and time shifted versions of the FLS data. Once the initial search is completed, a tracking frequency estimate is obtained by measuring the phase change between bursts after an appropriate set of beamformer weights have been applied.

The frequency estimator uses the lower subband FLS data for initial acquisition. Let $V_1$ be the received signal matrix. The subscript refers to the first burst. For example, in a 4 by 6 layout with 16 tones per partition, received signal matrix $V_1$ has dimensions of 16 by 4. $V_4$ is the received signal matrix for the fourth burst. The first step is to demodulate the signal by dividing element by element with the transmitted signal. Since the desired signal has elements with unity amplitude, this is equivalent to multiplying element by element by the conjugate of the codeword, $$X_1(m,n) = V_1(m,n) c_1(m)$$

$$X_4(m,n) = V_4(m,n) c_4(m) \tag{B1}$$

where $X_1(m, n)$ are the elements of matrix $X_1$, $X_4(m,n)$ are the elements of matrix $X_4$, and $c_1(m)$ and $c_4(m)$ are the conjugate codeword elements of the first and fourth bursts, respectively.

The demodulated signal from the first and fourth bursts are concatenated to form, $$Y = \begin{bmatrix} X_1 \\ X_4 \end{bmatrix} \tag{B2}$$

A despread signal is formed, $$z = \begin{bmatrix} z_1 \\ z_4 \end{bmatrix} = Yw \tag{B3}$$

where w is the despreading weight vector. If there were no noise, delay error or frequency error, the despread signal vector would be an ideal signal vector of all ones. The demodulated signal despread by the weights approximates the desired signal, s, $$Yw \approx s \tag{B4}$$

A QR decomposition of Y such that, $$QR = Y \tag{B5}$$

and substituting equation (B4) into equation (B5) gives, $$QRw \approx s \tag{B6}$$

Solving equation (B6) for the despreading weight vector yields, $$w = R^{-1} Q^H s \tag{B7}$$

where Q is orthonormal, $$Q^H Q = I \tag{B8}$$

Q is separated into its first and fourth bursts, $$Q = \begin{bmatrix} Q_1 \\ Q_4 \end{bmatrix} \tag{B9}$$

The desired signal s is separated into its first and fourth bursts and modeled as follows, $$s = \begin{bmatrix} d \\ d\alpha \end{bmatrix} \quad (B10)$$

where d is a phase delay ramp vector with each element, $$d_k = e^{-j2\pi f_b \hat{\tau} k i} \quad (B11)$$

where $f_b$=3125 Hz is the bin spacing, for example, and $\hat{\tau}$ is the delay step size. The variable i ranges from −1 to +1 in steps of 1 to generate phase ramps with delays −$\hat{\tau}$, 0, and +$\hat{\tau}$. The phase delay ramp of equation (B11) is formed during coarse state of synchronization processing, described later.

Substituting equations (B9) and (B10) into equation (B7) gives, $$w = R^{-1}(Q_1^H d + \alpha Q_4^H d) \quad (B12)$$
$$= R^{-1}(q_1 + \alpha q_4)$$

where the correlation vectors are, $$q_1 = Q_1^H d, \; q_4 = Q_4^H d \quad (B13)$$

A frequency compensated vector v is, $$v = q_1 + \alpha q_4 \quad (B14)$$

The $\alpha$ that maximizes the magnitude-squared length of v and having a constant modulus is, $$\alpha = \frac{q_1^H q_4}{\|q_1^H q_4\|} \quad (B15)$$

The detection statistic is related to the correlation coefficient squared, $$\rho_b = \frac{v^H v}{2N_s} = \frac{\|q_1 + \alpha q_4\|^2}{2N_s} \quad (B16)$$

where $N_s$ is the number of symbols per FLS burst, $N_s$ is 16 for this example. The correlation coefficient is used for delay estimation, described later. The SINR estimate is, $$\gamma = \frac{\rho_b}{1 - \rho_b} \quad (B17)$$

The signal quality is for the nth time slot is the square root of the SINR, $$s(n) = \sqrt{\gamma} \quad (B18)$$

The signal quality is used for delay estimation, described later.

The frequency error estimate is related to the phase progression from the first burst to the fourth burst in the $n^{th}$ time slot as follows, $$y(n) = \frac{\arg(\alpha)}{2\pi 3 \tau_b} \quad (B19)$$

where $\tau_b$ is burst duration.

The despread signal bursts $z_1$ and $z_4$ are calculated based on equations (B3), (B5) and (B12) as follows, $$z = Qv$$
$$\begin{bmatrix} z_1 \\ z_4 \end{bmatrix} = \begin{bmatrix} Q_1 v \\ Q_4 v \end{bmatrix}$$

The despread signal bursts $z_1$ and $z_4$ are combined with the frequency error removed, $$r = z_1 + \alpha^* z_4 \quad (B20)$$

If there were no delay error, noise, or interference, the demodulated-despread signal would simply be, r=2d. Delay errors cause r to exhibit a phase ramp. The slope of the phase as a function of frequency is proportional to the delay error. For an exemplary embodiment, the delay error is estimated using the lag 8 correlation of the demodulated-despread signal, $$\chi_8 = \sum_{k=0}^{k=7} r_k^* r_{k+8} \quad (B21)$$

The time delay error estimate with units of seconds is, $$\tau = -\frac{\arg(\chi_8)}{2\pi 8 f_b} \quad (B22)$$

The coarse time delay error estimate with units of clocks (for example, each clock being 13.0283 ns, the reciprocal of $F_C$=76.8 MHz) is, $$t(n) = -\frac{F_C}{2\pi 8 f_b} \arg(\chi_8) \quad (B23)$$

which is valid if the magnitude of the actual time delay error, |t(n)|, is less than the ambiguity caused by the arctangent function of 20 □s.

Frequency Locked Loop

Figure 36:
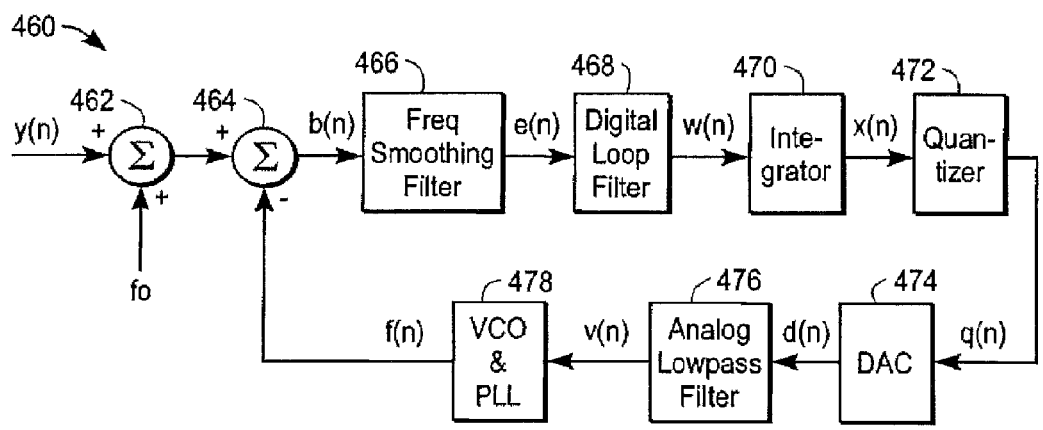
FIG. 36 is a block diagram of a frequency locked loop for synchronization of a remote unit with a base, in accordance with an aspect of the present invention.

FIG. 36 illustrates a frequency locked loop for RU synchronization 460.

Frequency error estimate y(n) from equation (B19) added by adder 462 to $f_o$, the desired center frequency. For every time slot n, subtractor 464 generates frequency error b(n) of the RU oscillator. A positive error means that the frequency of the phase lock loop (PLL) of the RU is higher than the base. A quality factor is derived which is proportional to the square root of the SINR, s(n) using equation (B18). Previous quality factors are averaged for generating weights of a frequency smoothing filter 466. A predetermined number, typically twelve, previous quality factors are averaged. Frequency smoothing filter 466 computes a weighted frequency error e(n) using the average of the previous quality factors, as follows, $$e(n) = \frac{12 s(n)}{\sum_{i=0}^{11} s(n-i)} b(n). \quad (B24)$$

The frequency smoothing filter de-emphasizes those time slots for which the RU receives a low power FLS. The weighted frequency error e(n) is applied to the digital loop filter 468. The loop gain, K, and the filter coefficient $h_1$ are selected so the composite response of the frequency locked loop has the desired characteristics. The word width of the output of the digital loop filter is at least 26 bits wide so as to reduce the effects of quantization noise. The digital loop filter 468 produces w(n) as follows, $$w(n)=(KK_cK_f)e(n)+(KK_cK_fh_1)e(n-1) \tag{B25}$$

where $K_c$ is the compensation gain and is usually equal to 1. $K_f$ is the gain for fixed point processing to drive down the quantization noise. A typical value for $K_f$ is 64.

The integrator 470 integrates the output w(n) of the loop filter. This introduces a pole at d.c. which turns into a zero at d.c. when the loop is closed. The output x(n) of the integrator 470 is, $$x(n)=x(n-1)+w(n). \tag{B26}$$

The quantizer 472 prepares the output of the integrator for a register in a digital to analog converter 474, or DAC, in an ASIC by rounding, scaling, offsetting, and clipping. $K_f$ is a power of 2 so as to facilitate the scaling operation. For example, for the DAC expecting offset binary in a 20-bit register, the quantizer 472 provides quantized signal q(n) as follows, $$q(n) = \min\left\{\max\left\{\left\lfloor\frac{x(n)+\frac{k_f}{2}}{K_f}\right\rfloor + \frac{q_0}{2}, 0\right\}, q_0-1\right\} \tag{B27}$$

where $q_0=2^{20}=1048576$. Analog lowpass filter 476 and voltage controlled crystal oscillator (VCXO) and PLL 478 produce an actual oscillator frequency f(n) according to methods known in the art.

Delay Estimation

A weighted average of the time error from equation (B23) is calculated as follows, $$e_t(m) = \frac{\sum_{i=0}^{N-1} s(mN+i)t(mN+i)}{\sum_{i=0}^{N-1} s(mN+i)} \tag{B28}$$

where N is the number of slots used to compute the average, s(n) is the square root of the SINR as computed from equation (B18), and $e_t(m)$ is the decimated sequence of averaged time delay error. For time slot duration of 3⅓ ms and the number of time slots N set to 300, the averaged time delay error would be available once every second. The s(n) of equation (B18) and the weighted average of the time error $e_t(m)$ in equation (B28) can be calculated once per time slot. The division can be calculated once per N slots.

Every N slots, the average time delay error is rounded to the nearest integer and then applied to the receive gate, $$q(m)=\lfloor e_t(m)+0.5\rfloor \tag{B29}$$

The noise gain is the ratio of the output standard deviation to the input standard deviation, $$g_n = \frac{\sigma_e}{\sigma_t} \approx \frac{1}{\sqrt{N}} \tag{B30}$$

where $\sigma_t$ is the standard deviation of the coarse time delay error estimate, t(n). The RMS delay error of the RU, $\sigma_e$, must be less than the amount of link impairment allocated to timing error. For an example system, link impairment allocated to timing error is 0.14 μs. Equation (B30) can be used to determine the number of slots N to average to ensure that $\sigma_e$, is less than 0.14 μs. As a performance metric, an estimate of the standard deviation of the delay error is, $$\sigma_e(i) = \sqrt{\frac{1}{K_U}\sum_{m=0}^{K_U-1} e_t^2(K_U i+m)} \tag{B31}$$

where $K_U$ is the number of receive gate updates over which the statistic is collected.

Figure 37:
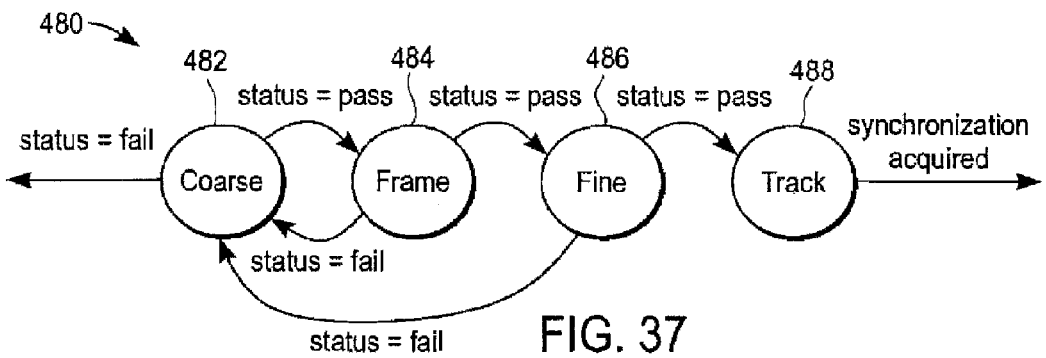
FIG. 37 is a state diagram of synchronization acquisition by the remote unit, in accordance with an aspect of the present invention.

Synchronization has four states, including coarse, frame, fine, and track. FIG. 37 gives a top-level state diagram of synchronization acquisition. Time synchronization refers to the time alignment of a receive gate in the RU.

The first state is the coarse state 482. When this state is entered, the remote unit receive gate may be in error by one-half of a time slot, or +/−1667 μs for this example. In addition, the baseband frequency error may be +/−40 bins, or +/−125 KHz. Frequency error is a direct result of the crystal oscillator tolerance, which could be as large as 50 ppm.

Either the lower subband or upper subband tones are used for coarse state synchronization in order to reduce the processing load. Other embodiments with higher performance processors could use both lower and upper subband tones.

The coarse estimation begins by assuming a receive gate delay and computing detection statistics at frequency bin boundaries. Coarse estimation uses the detection statistic $\rho_b$ given by equation (B16). This statistic will peak when the receive gate delay error is small, and the received FLS data under consideration are aligned with the FLS symbols. The receive gate setting and the frequency error which maximize the detection statistic are used as coarse estimates.

To speed the search, only the FLS base code elements are used in the computation of the detection statistic. The FLS base code elements are the lower 12 tone gains of the FLS partition. Since all the FLS code sequences from a particular base share the same base code elements, the detection statistic can be computed by correlating to a single base code as opposed to all FLS codes. When the FLS base code elements are used, the detection statistic $\rho_b$ is independent of the slot number. The detection statistic will peak when the received FLS data are aligned to any FLS code. This causes frequency error ambiguity to be integer multiples of one partition. Later, the frame state will correct for this ambiguity by correlating with all the elements of each FLS code.

An assumed receive gate delay is composed of two delays. The first is the actual delay of the receive gate in the RU hardware, and the second is the simulated delay of the receive gate relative to the actual gate. This simulated delay corresponds to $\hat{\tau}$ in equation (B11). By simulating a delay, multiple receive gate delays can be analyzed with the same input tones.

The periodicity of FLS partitions in a superframe is used to efficiently locate an initial frequency bin index of a FLS partition. The coarse state performs hypothesis testing of candidate frequency errors spaced at intervals of one frequency bin. For the example in FIG. 61, every sixth partition in each time slot is a FLS partition. For this example, the coarse state performs hypothesis testing of candidate frequency errors covering six partitions in a time slot. For each assumed receive gate delay, ninety-six detection statistics using equation (B16) are computed for every time slot. For a given delay, statistics are accumulated over multiple time slots.

Because the detection statistic peak may be very narrow, it may be missed if it lies midway between two bins. In order to overcome this situation, the maximum statistic resulting from one complete test of all gate delays is compared to a threshold. If the maximum statistic does not exceed this threshold, the oscillator is tuned within a fraction of a bin, and all the hypothesis tests are repeated. If all the frequencies have been tested prior to exiting the coarse state synchronization acquisition, control is returned to the control software with a message indicating failure to synchronize.

Frame State

After successful coarse state synchronization, frame state synchronization 484 of FIG. 37 is entered. Because only base codes were used in the coarse state, there may be a frequency error ambiguity. Frame state synchronization determines and corrects for this ambiguity. Frame state synchronization also aligns the remote unit frames with the base station frames.

The inputs from the coarse state are the frequency bin index and the slot number at which the detection statistic peaked. Referring to FIG. 61 for a spreading factor of two, in every time slot, one of twelve FLS codes is transmitted in a FLS partition in an entry slot. The coarse state frequency bin index is within an integer multiple of sixteen tones of a FLS partition. Referring to FIG. 62 for a spreading factor of four, in every other time slot, one of six FLS codes are transmitted in a FLS partition which is within an integer multiple of sixteen tones of the coarse state frequency bin index. Because each FLS code sequence is transmitted in a specific time slot of a superframe, the time slot number can be determined. In addition, because each FLS code sequence is in a specific partition for a particular time slot in a superframe, the partition number can be determined. The frame state correlates the received FLS tone gains with each of the known FLS codes. When a strong match is found, both frequency and time alignment can be determined.

As for the coarse state, the frame state processes either the lower subband or upper subband tones. Frame state estimation includes two steps. The first step determines which partition is active for the current time slot by correlating candidate partitions of the input data with the FLS base code. As for the coarse state, only the gains of lower twelve tones of the candidate partitions are correlated with the known FLS base code. The initial bin of a candidate partition is an integer multiple of the number of tones per partition of the coarse state frequency index. The integer multiple corresponds to the spacing between the periodic entry slots. The detection statistic of equation (B16) is used for hypothesis testing of receive gate delays. Hypothesized receive gate delays are spaced at intervals of a time slot duration. Referring for example to FIG. 61, this corresponds to testing for the vertical location of a FLS partition along a diagonal. Six detection statistics, one for each hypothesized receive gate delay, are computed for every time slot. This corresponds to searching over one frame. The detection statistic peak indicates the first frequency bin of an active partition in the current time slot. This frequency bin is used to determine the bin that marks the beginning of the active partition for the next time slots. For the example of FIG. 61, for the index for the next time slot is shifted by one partition, or sixteen frequency bins, to move along a diagonal. The output of the frame state's first step is the frequency bin index of an active partition in a given time slot.

In the second step, the particular FLS codeword received in each time slot is determined. Beginning with the frequency bin index of the active partition, all of the tones for the active FLS partition are extracted and correlated to each of the FLS codes. For this example, the number of tones used is equal to sixteen. In addition, for each FLS code multiple simulated receive gate delays corresponding to $\hat{\tau}$ in equation (B11) are analyzed. The range of simulated delays depends on the coarse state time accuracy. For example, the range of simulated delays tested are in equally spaced intervals from −10 μs to +10 μs.

For every active partition and time slot, a SINR is estimated using equation (B17) for every FLS code and for multiple simulated receive gate delays. In order to cycle through all the FLS codes, this operation is repeated for all the time slots in a superframe. For each time slot, the input tones used for this correlation correspond to the active FLS partition tones. The SINR for active partitions are computed over a superframe as a function of time and frequency bins. The SINRs of active partitions form peaks along diagonals in time and frequency bins corresponding to diagonals in FIG. 61. Next, the SINR values are accumulated along the diagonals. The diagonal with the largest accumulated SINR begins with the SINR corresponding to the FLS received in the first time slot. From the largest accumulated SINR, the superframe time slot number, the frequency error, and the receive gate error are estimated.

If this largest accumulated SINR does not exceed a specified threshold, control is returned to the coarse state. Otherwise, the fine state is executed. Control is also returned back to the coarse state if the frequency error lies outside of a maximum allowable range related to the VCXO tolerance.

Fine State

The fine state 486 of FIG. 37 further reduces both the frequency and time errors to a range appropriate for tracking. The fine state performs hypothesis testing of different VCXO frequencies and receive gate delays. For each operating point, the SINR of equation (B17) is estimated and accumulated over a predetermined number of frames. The operating point that maximizes the accumulated SINR corresponds to the minimum synchronization error. For example, VCXO frequencies considered are the current frequency, and seven frequencies which are spaced integer multiples of one-eighth of a bin from this frequency. For each one of these frequencies, simulated receive gate delays are analyzed are relative to the current delay. Changing the slope of the delay ramp using equation (B11) varies the simulated delays. These delays range from −10 μs to +10 μs, in equally spaced intervals. Since the frequency error is very small when this state is entered, the difference between the low subband frequency error and the high subband frequency error is also very small. For this reason, all frequencies are analyzed for each FLS symbol. For a frequency spreading factor of 2, the four frequencies in the lower subband and four frequencies in the upper subband are analyzed for each FLS symbol. All sixteen FLS symbols are used.

In addition to the SNR computations, a weighted phase progression phasor α(n) is also accumulated over the time slots for each operating point. The α(n) is calculated according to equation (B15) for the $n^{th}$ time slot. The weighting factor is the square root of the SINR of equation (B18). Once the best operating point is determined, the corresponding weighted value is used to estimate a fine frequency adjustment according to equation (B19). In this equation, the weighted value α(n) replaces the arctangent argument.

If the maximum accumulated SINR does not exceed a specified threshold, control is returned to the coarse state. Otherwise, the track state is executed.

Track State

The track state 488 of FIG. 37 monitors the received FLS tones over a predetermined number of frames and performs fine delay and fine frequency adjustments. For a spreading factor of 2, the eight partitions containing FLS tones are processed and a fine receive gate delay error is computed according to equation (B23) for every active time slot. The fine receive gate delay error is passed through the smoothing filter given by equation (B29) prior to writing it into a hardware register controlling the receive gate. This filtered value is not written to the hardware every time slot. Rather it is written every N time slots. In addition, the fine frequency error is also computed according to equation (B19). The fine frequency error is passed through the chain of filters given by equations (B24) to (B27) prior to writing it into the hardware registers which control the voltage controlled oscillator 978 of FIG. 36.

Physical Layer Processing of RLI

Figure 38:
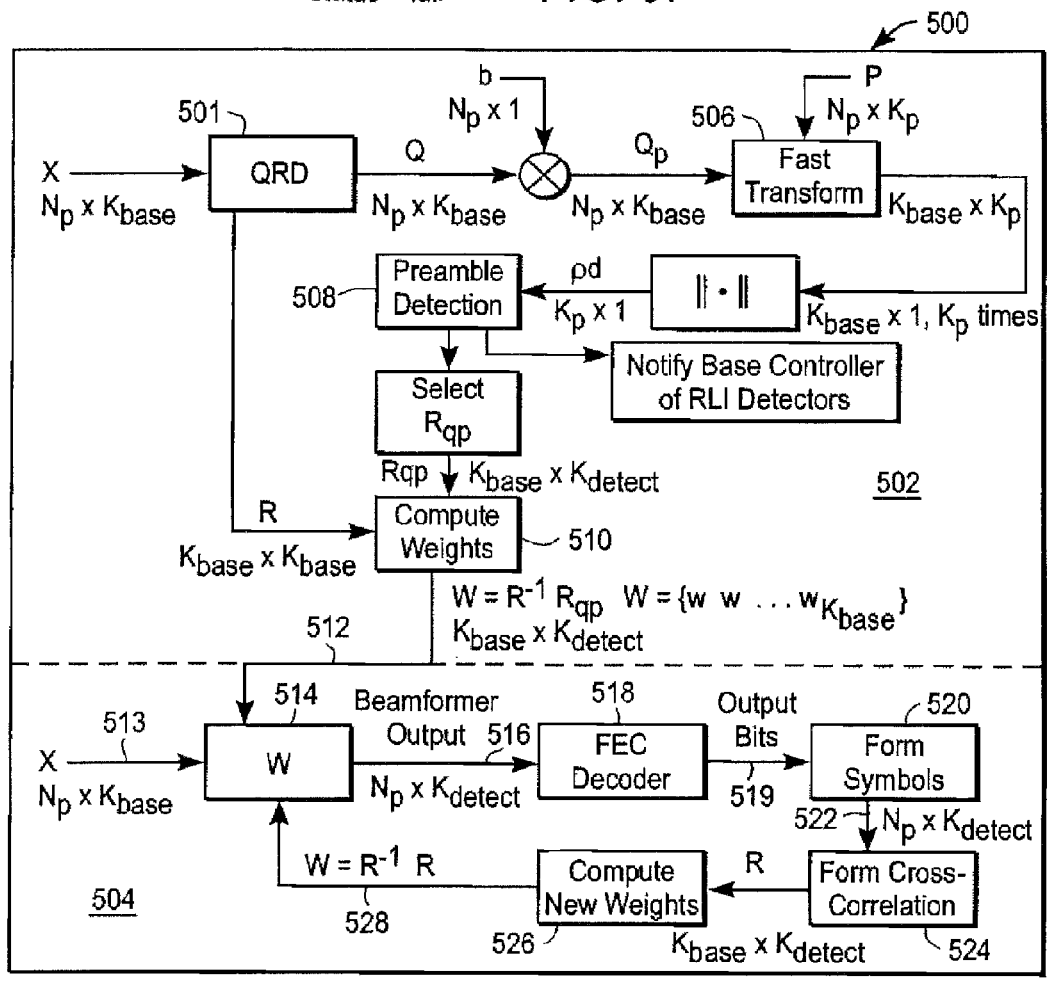
FIG. 38 is a block diagram of the base receiver operations for reverse link initiation (RLI) and reverse link bearer (RLB) data processing including RLI detection, despreading weight computation and decision-directed updating of despreading weights, in accordance with an aspect of the present invention.

FIG. 38 illustrates operation by the base receiver in a preferred embodiment for RLI and RLB data processing 500. Many of the operations are analogous to the embodiment for base receiver operation illustrated in FIG. 1. Preamble data of input 501 to the RLI processing section 502, include RLI codewords of transmitting remote units. Preamble detection block 508 detects RLI codewords. In a preferred embodiment RLI codewords are derived from Hadamard basis functions. In this case, the fast transform processor 506 uses a Hadamard transform. The compute weights block 510 provides initial despreading weights. For the remainder of a frame, the weights are updated using a decision-direction algorithm as part of RLB processing 504.

A specific example of a preferred embodiment described herein. The RLI is 64 complex symbols long comprising 4 bursts of 16 tones. The RLI code is therefore 64 unique complex elements long. The RLI code has in-phase and quadrature components taken from the columns of a length 64 Hadamard matrix, $$p_{ik}=h_i+jh_k, \ i \neq k \quad (C1)$$

where $h_i$ is a particular column from the Hadamard matrix H. The indices i and k select a particular RLI code. There are 64×63=4032 possible RLI codes. This embodiment does not use a base scrambling code. The RLI codes have a separation of 60 degrees or more; cos(60°)=0.5, $$p_{ik}^H p_{in} \leq \frac{N}{2}, \quad (C2)$$
$$n \neq k$$

The base receives the RLI codes from the various remote units and forms a received matrix, $X_p$ (N=64 complex samples by $K_{base}$=32 sensors). The received signal, when multiplied by the weight vector, is the RLI code except for the error introduced by the channel, $$X_p w_{ik} = p_{ik} + e \quad (C3)$$

QR decomposition is performed on $X_p$ yielding Q and R.

$$X_p = QR \quad (C4)$$

Substituting equation (C3) into equation (C4) yields, $$QR w_{ik} = p_{ik} + e \quad (C5)$$

Using the fact that the Q matrix is orthonormal, $$Q^H Q = I \quad (C6)$$

equation (C5) is pre-multiplied by QH to obtain, $$R w_{ik} = Q^H p_{ik} + Q^H e \quad (C7)$$

Since the error e is orthogonal to Q, a weight vector is given by, $$w_{ik} = R^{-1} Q^H p_{ik} \quad (C8)$$

A fast Hadamard transform operates on Q to calculate, $$V = Q^H H \quad (C9)$$

The fast Hadamard transform is more efficient than a FFT because it involves adds and subtracts, but no complex multiplies. The implementation of equation (C9) is not calculated as a matrix multiplication but rather as Kbase fast Hadamard transforms, one for each sensor. V is Kbase=32 sensors by Np=64 codes. V can be considered a set of column vectors, $$V = [v_1 \ v_2 \ \ldots \ v_N] \quad (C10)$$

where each column vector is, $$v_i = Q^H h_i \quad (C11)$$

The correlation of the Q matrix with a particular RLI code is, $$z_{ik} = Q^H p_{ik} \quad (C12)$$

Substituting equation (C1) into equation (C12) gives, $$z_{ik} = Q^H (h_i + jh_k) \quad (C13)$$

Substituting equation (C10) into equation (C13) gives, $$z_{ik} = v_i + j v_k \quad (C14)$$

The detection statistic is, $$\rho_{ik} = \frac{\|z_{ik}\|^2}{2N} \quad (C15)$$

If the statistic is greater than a threshold $\rho_T$, then the RLI is detected, $$\text{if } \rho_{ik} \geq \rho_T \text{ then code } ik \text{ is detected} \quad (C16)$$

For those codewords which are detected, the desired cross-correlation is formed using equation (C12), $$R_{QP} = [z_{ij} \ z_{kl} \ \Lambda \ z_{mn}] \quad (C17)$$

and the weight matrix is organized in a similar fashion, $$W = [w_{ij} \ w_{kl} \ \Lambda \ w_{mn}] \quad (C18)$$

Converting the vector form of equation (C7) to a matrix form suggested by equation (C17) and equation (C18), gives, $$RW = R_{QP} \quad (C19)$$

Noting that R is upper triangular, equation (C19) can be readily solved for W by back-substitution.

In review, the base performs the following signal processing for RLI detection.

calculates a QR decomposition according to equation (C4);

calculates the a fast Hadamard transform for each of $K_{base}$ sensors forming the V matrix of equation (C9);

adds the $i^{th}$ column to the $k^{th}$ column for all of the RLI codes, ik, which are active on the particular partition according to equation (C14);

finds the magnitude squared of the each candidate vector $z_{ik}$ according to equation (C15);

compares its magnitude squared with a threshold according to equation (C16).

For the initial weight vector selection, the base signal processing organizes the desired cross-correlation matrix per equation (C17) from the intermediate values previously calculated by equation (C14) and then uses R from the QR decomposition to find the weight vectors using equation (C19).

The following description derives a detection statistic for equation (C15) and detection threshold for equation (C16).

Substituting equation (C8) into equation (C7) yields, $$e = QRR^{-1}Q^H p_{ik} - p_{ij} \quad (C20)$$

The error power due to noise, interference, excessive number of RUs sending a RLI, etc. is $e^H e$, $$e^H e = (QQ^H p_{ik} - p_{ik})^H (QQ^H p_{ik} - p_{ik}) \quad (C21)$$

which can be simplified using equation (C6) to, $$e^H e = p_{ik}^H p_{ik} - p_{ik}^H QQ^H p_{ik} \quad (C22)$$

Each term of equation (C22) is defined as follows. $\sigma_e^2$ is the normalized noise plus interference power.

$$\sigma_e^2 = e^H e \quad (C23)$$

$\sigma_p^2$ is the normalized ideal signal power.

$$\sigma_p^2 = p_{ik}^H p_{ik} \quad (C24)$$

$\sigma_s^2$ is the normalized received signal power.

$$\sigma_s^2 = p_{ik}^H QQ^H p_{ik} \quad (C25)$$

The received signal power to noise plus interference power ratio is, $$\gamma = \frac{\sigma_s^2}{\sigma_e^2} = \frac{p_{ik}^H QQ^H p_{ik}}{e^H e} \quad (C26)$$

Substituting equation (C22) into equation (C26) yields, $$\gamma = \frac{\rho_{ik}}{1 - \rho_{ik}} \quad (C27)$$

where $\rho_{ik}$ is related to a correlation coefficient squared and is used as the subsequent detection statistic, $$\rho_{ik} = \frac{\sigma_s^2}{\sigma_p^2} = \frac{p_{ik}^H QQ^H p_{ik}}{p_{ik}^H p_{ik}} \quad (C28)$$

The SINR of equation (C27) can expressed in decibels, $$dB = 10 \log_{10}(\gamma_{ik}) \quad (C29)$$

The following description and equations are useful for calculating average and peak tone powers at an antenna.

A model for the received signal X has two components, one is the signal spread by $w_{ik}^H$, and the other is a noise matrix, N, $$X = p_{ik}\left(\frac{w_{ik}^H}{w_{ik}^H w_{ik}}\right) + N \quad (C30)$$

Substituting equation (C35) into equation (C5) yields, $$N w_{ik} = e \quad (C31)$$

Expressed another way, a noise matrix, N, is one of many possible matrices which when multiplied by $w_{ik}^H$, yields the error vector, e. The normalized noise plus interference power, from equation (C23) becomes, $$\sigma_e^2 = e^H e = w_{ik}^H N^H N w_{ik}. \quad (C32)$$

Assuming that the noise from one antenna is uncorrelated with the noise from the other antennas, the noise correlation matrix is modeled as, $$N^H N = \sigma_n^2 NI. \quad (C33)$$

where $\sigma_n^2$ is the average noise power per symbol in each degree of freedom, Np is the number of symbols in the RLI (the length of the $p_{ik}$ vector), and I is a Kbase by Kbase identity matrix where Kbase is the number of degrees of freedom. Solving equations (C26), (C27), (C28), (C32), and (C33) for the average noise power per symbol yields, $$\sigma_n^2 = \frac{\sigma_p^2}{N_p(1 - \rho_{ik}) w_{ik}^H w}. \quad (C34)$$

For RLIs, $\sigma_p^2 = 2N_p$. The noise power for a typical tone for a typical degree of freedom is, $$P_n = 10 \log_{10}(\sigma_n^2). \quad (C35)$$

where the subscript n means that it is the noise power.

The cross-correlation of the signal term of equation (C30) is, $$R_{pp} = \left[p_{ik}\left(\frac{w_{ik}^H}{w_{ik}^H w_{ik}}\right)\right]^H \left[p_{ik}\left(\frac{w_{ik}^H}{w_{ik}^H w_{ik}}\right)\right] \quad (C36)$$

$$= \left[\frac{\sigma_p^2}{(w_{ik}^H w_{ik})^2}\right](w_{ik} w_{ik}^H)$$

The diagonal terms rpp are the signal powers for each degree of freedom, $$r_{pp} = \left[\frac{\sigma_p^2}{(w_{ik}^H w_{ik})^2}\right] diag(w_{ik} w_{ik}^H). \quad (C37)$$

The typical tone power at an antenna would be the average of the diagonal terms, $$P_a = 10 \log_{10}\left(\frac{1}{K}\sum_{i=1}^{K} r_{pp}(i)\right). \quad (C38)$$

Likewise, the peak tone power at the best antenna would be the largest of the diagonal terms, $$P_m = 10 \log_{10}(\max(r_{pp})) \tag{C39}$$

RLB Processing

Once the initial weights have been computed for each detected RLI message, the weights are updated using the subsequent bearer traffic with a decision-direction algorithm. Referring to FIG. 38 in the RLB processing section 504, weights 514 are applied to data 513 from the RLB channel by beamformer block 514 to form output symbols 516 that are subsequently decoded by decoder 518 to form output bits 519. The beamformer block 514 uses the initial weights 512 to provide beamforming and null steering gain. The output bits 519 are then re-encoded by the form symbols block 520. The cross-correlator 524 uses the re-encoded symbols S on line 522 to form cross-correlation $R_{XS}$. The compute new weights block 526 provides updated weights W on line 528. These updated weights are then available for application to subsequent block of input RLB data on line 513.

FLI Processing

The base performs two primary operations for FLI processing. The first is obtaining the correct code for the RU that is being signaled and uploading it to the transmitter. The second is computing the transmit gains that will be used to transmit the FLI waveform. The transmit codes will be stored in memory indexed by the RU number. Also stored in memory are the best transmit weights found so far. Ideally, there is a set of transmit weights for each partition and each RU. The last computed transmit weights used by the RU would be stored in memory. If a RU had not used a given partition, the weights from the closest partition last used by network can be used.

The transmit weights for the FLA and FLI messages for a particular RU are computed using a decision-directed method similar to that of the RLB processing section 504 of FIG. 38 for updating base receiver despreading weights. The following description considers forming a transmit weight vector for a single RU and a frame length of six time slots. As for updating the receiver despreading weights, the base computes the cross-correlation between a base received RLB data and a re-encoded symbol vector to form $R_{XS}(6n+s)$, where n is the frame number, and s is the slot number, $0 \le s < 6$ for six time slots per frame. The cross-correlation $R_{XS}(6n+s)$ is a vector, corresponding to one column of the matrix $R_{XS}$ output from the form cross-correlation block 524 of FIG. 38.

As previously described, a scaled version of the conjugate of the base receive weights forms initial base transmit weights, $$w_{BT} = \kappa_{fwd} w^*_{BR} \tag{D1}$$

where $w_{BR}$ is a vector of base receive weights and $w_{BT}$ is a vector of base transmit weights for FLA or FLI. The cross-correlation matrix is exponentially averaged over the time slots in a frame, $$\hat{R}_{XS}(6n+1) = R_{XS}(6n+1)$$

$$\hat{R}_{XS}(m) = (1-\beta_1)R_{XS}(m) + \beta_1 \hat{R}_{XS}(m-1)$$

$$6n+2 \le m \le 6n+5 \tag{D2}$$

The exponentially averaged cross-correlation is used to calculate the weights at the base during the RLB slots. At the end of the frame, the cross-correlation data, from the last slot, $\hat{R}_{XS}(6n+5)$ is split into the upper carrier and lower carrier portions, $$\begin{bmatrix} R_{XSL}(n) \\ R_{XSU}(n) \end{bmatrix} = \hat{R}_{XS}(6n+5) \tag{D3}$$

The previous FLA or FLI transmit weight vector, $w_{BT}(n-1)$, is also split into the lower and upper carrier weights, $$\begin{bmatrix} w_{BTL}(n-1) \\ w_{BTU}(n-1) \end{bmatrix} = W_{BT}(n-1) \tag{D4}$$

De-rotation values $\alpha_L$ and $\alpha_U$ map the cross-correlation vectors to the transmit weight vectors, $$w_{BTL}(n-1) \approx \alpha_L(n) R_{XSL}(n)$$

$$w_{BTU}(n-1) \approx \alpha_U(n) R_{XSU}(n) \tag{D5}$$

These de-rotation values accommodate the time varying phase difference between the lower carrier and upper carrier whether the difference is from the RU or from the propagation channel Solving equation (D5) for the de-rotation values gives, $$\alpha_L(n) = \frac{w^H_{BTL}(n-1) w_{BTL}(n-1)}{w^H_{BTL}(n-1) R_{XSL}(n)} \tag{D6}$$

$$\alpha_U(n) = \frac{w^H_{BTU}(n-1) w_{BTU}(n-1)}{w^H_{BTU}(n-1) R_{XSU}(n)}$$

The numerator of equation (D6) is the magnitude squared of the transmit weight vector. Since the same power is transmitted on the lower carrier and the upper carrier, the numerator of equation (D6) is replaced with the desired transmit power, □□, $$\alpha_L(n) = \frac{\gamma_H}{w^H_{BTL}(n-1) R_{XSL}(n)} \tag{D7}$$

$$\alpha_U(n) = \frac{\gamma_H}{w^H_{BTU}(n-1) R_{XSU}(n)}$$

The total desired transmit power is split equally between the upper carrier and the lower carrier, $$\gamma_H = \frac{\gamma_{EIRP}}{2} \tag{D8}$$

If the magnitude squared of the denominator of equation (D7) is less than a prescribed threshold, then the transmit weights are not updated. Else, a recursive update is performed, $$w_{BTL}(n) = \beta_2 w_{BTL}(n-1) + (1-\beta_2) \alpha_L(n) R_{XSL}(n)$$

$$w_{BTU}(n) = \beta_2 w_{BTU}(n-1) + (1-\beta_2) \alpha_U(n) R_{XSU}(n) \tag{D9}$$

The update coefficient $\beta_2$ is selected so as to be fast enough to track the changes in the antenna aperture, but slow enough to smooth out the fluctuation of the cross-correlation.

If there is not a previous weight, for instance if the RU was just commissioned, equation (D9) becomes, $$w_{BTL}(0) = \sqrt{\frac{\gamma_H}{R_{XSL}^H(0)R_{XSL}(0)}} R_{XSL}(0) \quad \text{(D10)}$$

$$w_{BTU}(0) = \sqrt{\frac{\gamma_H}{R_{XSU}^H(0)R_{XSU}(0)}} R_{XSU}(0)$$

An alternative computation of FLI transmit weight is now described. The transmit weights for the FLI codes can also be computed using dominant mode prediction. The available cross-correlation $R_{XS}$ computed over a set of partitions and time slots are stored as column vectors in a matrix M. The cross-correlation statistics are computed during the normal course of the base traffic beamforming algorithm, defined by, $$R_{XS} = X^H s \quad \text{(E1)}$$

where X is the complex received signal matrix and s is the information symbol reference signal for the given link. It is found either from a known or hypothesized RLB sequence, or as an interim output from the decoder for use in decision feedback. The actual transmit weights, g, for a given partition will be a scaled version of u, the dominant mode of $MM^H$, which is the eigenvector associated with the largest eigenvalue. The next step is to compute the Cholesky factor of $MM^H$, $$R_M^H R_M = MM^H \quad \text{(E2)}$$

The power method is used to recursively update a guess of the dominant mode, $$v(n) = R_M^H(R_M u(n-1)) \quad \text{(E3)}$$

$$u(n) = \frac{v(n)}{\|v(n)\|} \quad \text{(E4)}$$

$$p(n) = \|u(n) - u(n-1)\|^2 \quad \text{(E5)}$$

After several iterations, the FLI transmit weight vector is selected, $$g = \gamma_{EIRP} u(N) \quad \text{(E6)}$$

An initial estimate for the dominant mode is any copy of the cross-correlation vector used to populate the matrix M, $$u(1) = R_{XS} \quad \text{(E7)}$$

Typically, 3 to 5 iterations of equations (E4) to (E5) are sufficient. Iterations are halted when u changes by a small amount; when p(n) is less than a prescribed threshold. The constant $\gamma_{EIRP}$ is the scaling constant used to obtain the desired transmit power levels.

FLI Detection by RU

The FLI detection statistic at the RU uses the same formula as the detection statistic used at the base to detect orthogonal preambles. No fast transform is needed here of course, since in the nominal situation only a single code corresponding to the RU is transmitted by the base. A single code is assigned to each RU. In the 4 by 6 layout, the RU computes a complex signal vector of 16 frequency tones by 2 carriers. The detection statistic formula that is used at the RU is, $$\rho_{det} = \frac{c^H X (X^H X)^{-1} X^H c}{c^H c}$$

where c is the 16×1 vector containing the FLI code for the given RU.

Physical Layer Forward Error-Control

To maintain airlink data integrity while minimizing transmission power, forward error-control codes (FEC) are applied to both FLB and RLB. The airlink FEC is configured for two types of services, VoIP and data. The performance goal for FEC is to achieve a bit error rate (BER) of $10^{-6}$ for VoIP and a frame error rate (FER) of $10^{-3}$ for data. A CRC-like mechanism is also used for data transmission so that after rejecting error frames the bit error rate can achieve $10^{-15}$ or better.

For VoIP applications, a trellis-coded-modulation (TCM) code is used for reduced latency. For data service, the TCM code is concatenated with a Reed-Solomon (RS) code. The RS code is also used to generate an automatic re-transmission request (ARQ) for frame retransmission.

Figure 39:
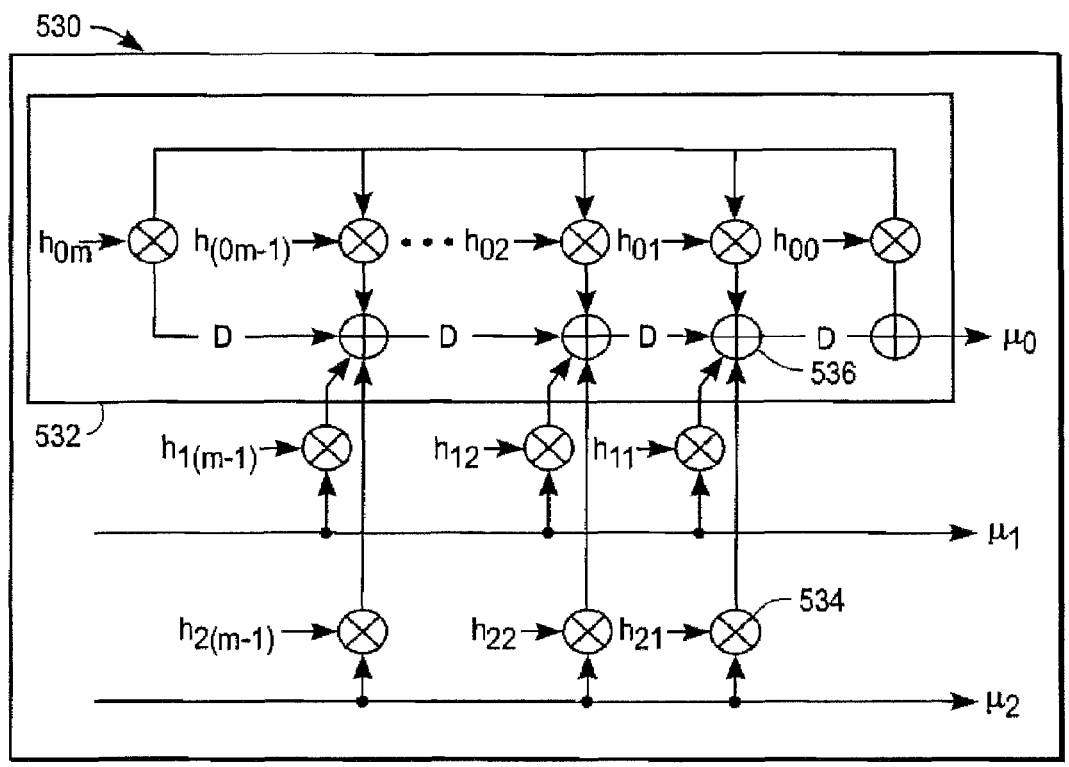
FIG. 39 is a block diagram of a rate 2/3, 2m-state convolutional encoder with feedback, in accordance with an aspect of the present invention.

The core of TCM code is constructed from a generic rate-⅔ convolutional encoder 530 illustrated in FIG. 39. The structure includes an m-stage linear feedback shift-register circuit 532, multipliers 534 (acting like on-off switches), and modulo-2 adders 536. Two input bits, $v_1$ and $v_2$, are coupled into the shift register and three output bits, $u_0$, $u_1$, and $u_2$, are produced every clock cycle. The feedback connections are completely specified by a set of three parity check polynomials, $H=[H_0 \; H_1 \; H_2]$. Together they act like a $2^m$-state state machine. As an example, for a 64-state (m=6) encoder for a QAM constellation the parity check polynomials are, $$H=[H_0 \; H_1 \; H_2]=[110000 \; 000100 \; 1100011]=[060_8 \; 004_8 \; 143_8]$$

where at the right end of the equation numbers are expressed in octal notation.

TCM Encoder and Decoder

Figure 40:
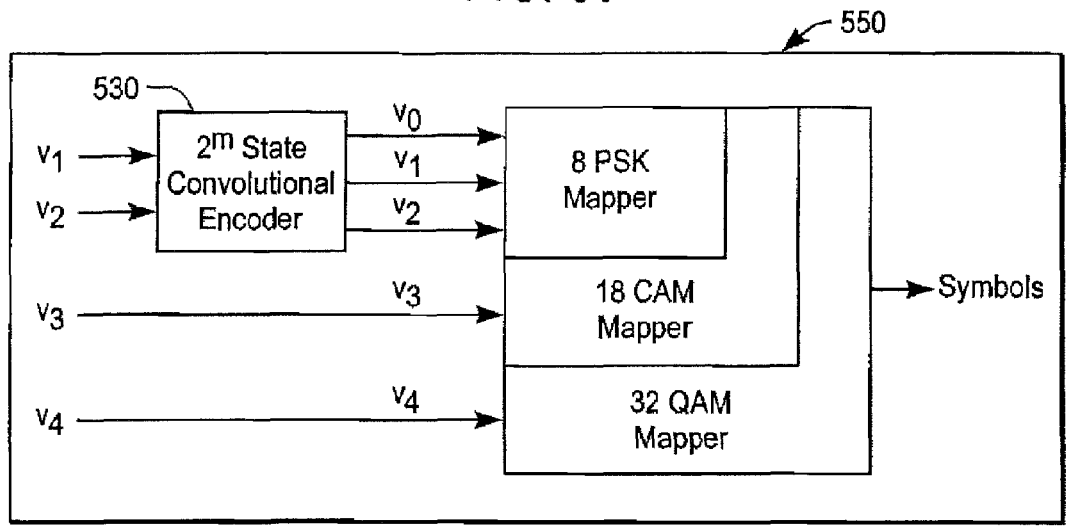
FIG. 40 illustrates a scalable trellis-coded mapper, in accordance with an aspect of the present invention.

The convolutional encoder 530 is used in conjunction with two additional input bits and a constellation mapper to form a TCM. The TCM can be configured for three transmission rates, including 2 bits per symbol, 3 bits per symbol and 4 bits per symbol. For 2 bits per symbol, only two input bits, $[v_1 \; v_2]$, are accepted and the mapper generates three output bits, $[u_0 \; u_1 \; u_2]$ for an 8-PSK constellation. The rate for this TCM is simply ⅔. For 3 bits per symbol, an additional input bit, $v_3$, is accepted and the mapper outputs a 16-QAM constellation that makes a rate ¾ TCM. For 4 bits per symbol, a 4-bit input symbol $[v_1 \; v_2 \; v_3 \; v_4]$ is coded into 5 output bits $[u_0 \; u_1 \; u_2 \; u_3 \; u_4]$ and are mapped to a 32-CROSS constellation; a rate-⅘ TCM. A scalable trellis coded mapper 540 that accommodates the three transmission rates is illustrated in FIG. 40. In general, the convolutional encoder 530 outputs $[u_0 \; u_1 \; u_2]$ represent a coset index and the uncoded bits $[u_3 \; u_4]$ select the member within a coset.

Figure 41:
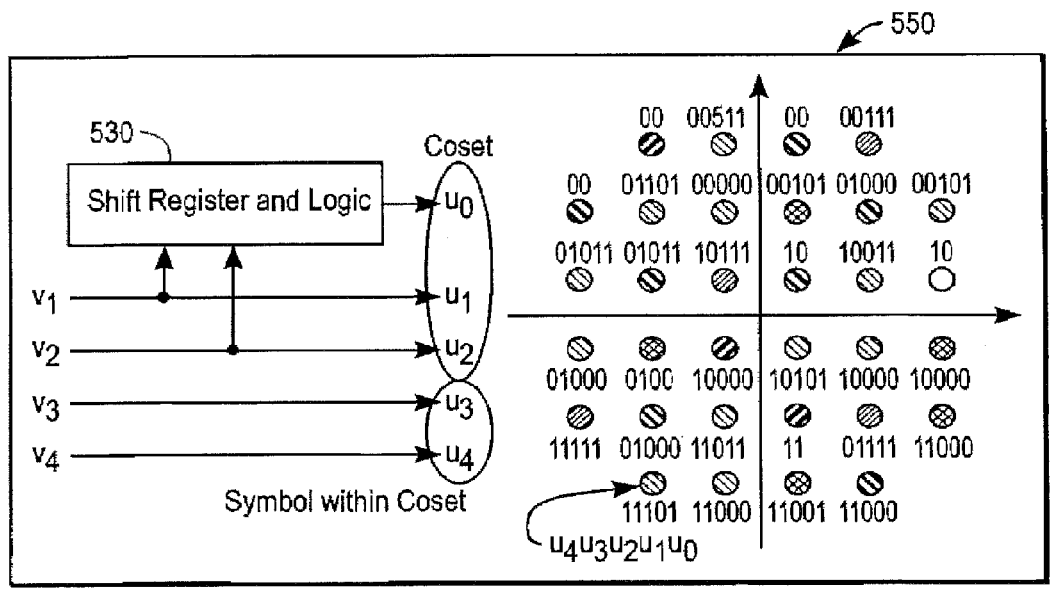
FIG. 41 illustrates symbol mapping by a rate 4/5 trellis-coded modulation encoder, in accordance with an aspect of the present invention.

As a specific example, the rate-⅘ TCM is illustrated in FIG. 41. A rate-⅔ convolutional encoder is paired with two additional input bits ($v_3$ and $v_4$) to form a rate-⅘ TCM. The three bits, $[u_0 \; u_1 \; u_2]$, coming out of the convolutional encoder 530 of FIG. 39 selects one of the 8 cosets, whereas the uncoded bits, $[v_3 \; v_4]$, which are assigned to $[u_3 \; u_4]$, select one of the four constellation points within a coset. The coset construction follows directly from Ungerboeck's coset partitioning method.

Each frame within a partition is coded as an independent data block. To reliably terminate the transmission of data block, the encoder makes use of tail-biting at the end of the frame to force the shift registers to a known state. Because of feedback shift registers are used in the convolutional encoder, a number of non-zero 2-bit symbols are appended at the end of data block to the convolutional encoder. The value of non-zero symbols depends on the state of in shift registers and the set of parity check polynomials. For example, the 64-state encoder with the parity check matrix shown require up to 4 tail-biting samples. Since each sample includes 2-bits [$v_1$ $v_2$], 8 tail-biting bits or a byte are needed. The tail-biting sequence for a specific set of parity check polynomials and $2^m$ states is precomputed and stored in the encoder to be used for terminating a frame of data.

For all three transmission rates, the parity check polynomials are given in Table 5.

TABLE 5

TCM design

| m | States, $2^m$ | H2 | H1 | H0 | Trace back length in samples |
|---|---|---|---|---|---|
| 6 | 64 | 066 | 030 | 103 | 28 |
| 7 | 128 | 024 | 100 | 245 | 28 |

The TCM decoding is based on the Viterbi algorithm and the decoder is typically called a Viterbi decoder. Since the Viterbi decoder is a maximum-likelihood symbol decoding algorithm, a traceback operation is used. Due to the traceback length, decoding latency is introduced for each data frame decoding. However, since the encoding is block-based and tail-biting is used to terminate properly, the Viterbi decoder at the receiver will reach the terminal state at the end of a frame. Therefore, the actual latency for an entire frame is only limited to some hardware operating cycles. The rule for choosing a traceback length is about three to five times the number of shift register stages, which is sometimes called constraint length, of the convolutional encoder. For the three configurations in Table 5, the traceback is implemented with 28 2-bit samples. Still, the intra-frame decoding latency can be an issue because of the TDD characteristics in the time slot.

The traffic despreading algorithm updates the despreading weights at the end of each time slot and the Viterbi decoder output is re-encoded to be used as decision-direction symbols. Due to the traceback, only part of the samples received during the first FLB time slot are decoded and re-encoded for decision-direction symbols. Because of the 28-symbol traceback length, the impact of the incomplete decision-direction symbols should be small, equivalent to a reduction in time-bandwidth product for computing $R_{XS}$. That is, for the FLB decoding RU receives 80 samples and the Viterbi decoder outputs 52 samples in the first time slot. The 52 samples are immediately re-encoded as 52 decision-direction symbols for $R_{XS}$ calculation. For the subsequent three time slots, the Viterbi decoder output entire 80 samples per slot. At the end of the last time slot, the Viterbi decoder outputs 80 samples plus the remaining 28 samples in the traceback memory without incurring additional latency. For the RLB decoding, the Viterbi decoder at base outputs 32 samples of the received 60 samples for the first time slot. The operation for the next four slots is similar to FLB decoding.

Table 6 shows a comparison of data rates for time division duplex TDD of the present invention and frequency division duplex FDD known in the art. The data rates are shown for a single partition (16 tones 50 KHz) with different modulation constellation sizes from 8 PSK to 64 QAM. Although FDD transfers at twice the data rate of TDD, the TDD of the present invention has twice the frequency diversity as FDD.

TABLE 6

PHY and Payload Bytes per Frame per partition

| Modulation After Coding | Information Bits per Symbol | PHY Bytes Per Frame Forward/ Reverse | Payload Bytes Per Frame Forward/ Reverse |
|---|---|---|---|
| 8 PSK, TDD | 2 | 100/80 | 80/64 |
| 16 QAM, TDD | 3 | 160/128 | 120/96 |
| 32 CROSS, TDD | 4 | 200/160 | 160/128 |
| 64 QAM, TDD | 5 | 250/200 | 200/160 |
| 8 PSK, FDD | 2 | 200/200 | 160/160 |
| 16 QAM, FDD | 3 | 320/320 | 240/240 |
| 32 CROSS, FDD | 4 | 400/400 | 320/320 |
| 64 QAM, FDD | 5 | 500/500 | 400/400 |

Table 7 shows the gross bit rate, bit rate to the medium access control (MAC) layer, and payload data rate for various constellation sizes, frame times, and forward error correction codes. A 2.5 MHz active bandwidth, 2 way frequency spreading, and a basic 1.25 MHz subband bandwidth are assumed. The data payload varies between 3.2 Mbps for low SINR, requiring small constellation size, to 8 Mbps for high SINR, which allows large constellation size. The net bit rate does not include sync, training, access, or entry slots from the gross bit rate. The payload rate further excludes MAC header, CRC, RS, and ranging.

TABLE 7

Data Rates in 2.5 MHz Active Bandwidth

| Modulation, Frame Time | Code Rate TCH, RS | Info Bits/ Symbol Guard | Gross Bit Rate (Mbps) | Bit Rate to MAC, Net (Mbps) | Data Payload (Mbps) |
|---|---|---|---|---|---|
| 8PSK, 10 ms | 2/3, (99, 91) | 2, 7 μs | 4.8 | 4.0 | 3.2 |
| 8PSK, 20 ms | 2/3, (99, 91) | 2, 13 μs | 4.8 | 4.0 | 3.2 |
| 16QAM, 10 ms | 3/4, (149, 133) | 3, 7 μs | 7.2 | 6.0 | 4.8 |
| 16QAM, 20 ms | 3/4, (149, 133) | 3, 13 μs | 7.2 | 6.0 | 4.8 |
| 32 CROSS, 10 ms | 4/5, (199, 173) | 4, 7 μs | 9.6 | 8.0 | 6.4 |
| 32 CROSS, 20 ms | 4/5, (199, 173) | 4, 13 μs | 9.6 | 8.0 | 6.4 |
| 64QAM, 10 ms | 5/6, (249, 217) | 5, 7 μs | 12.0 | 10.0 | 8.0 |
| 64QAM, 20 ms | 5/6, (249, 217) | 5, 13 μs | 12.0 | 10.0 | 8.0 |

Reed-Solomon Encoder and Decoder

Figure 42:
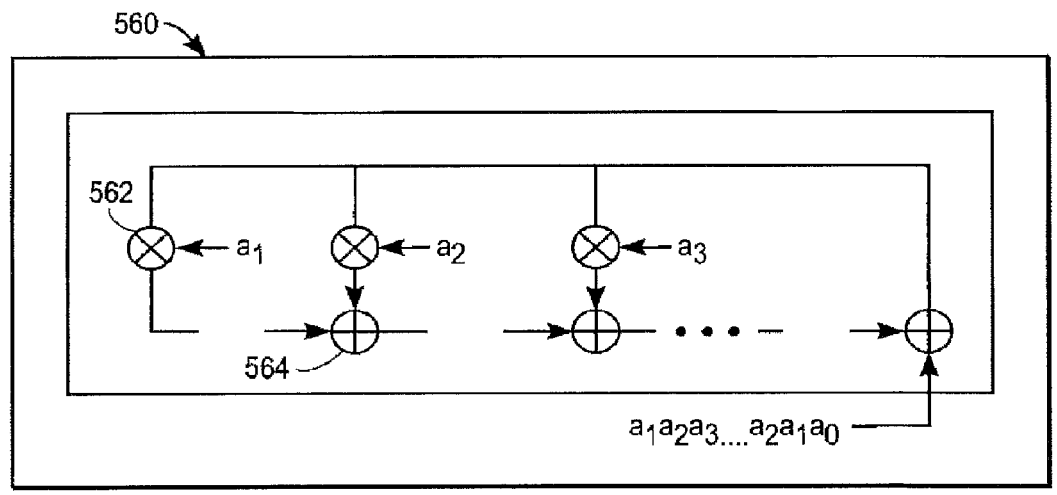
FIG. 42 is a block diagram of a Reed-Soloman encoder, in accordance with an aspect of the present invention.

For data service, the TCM is used as the inner encoder and is concatenated with a Reed-Solomon (RS) code as the outer encoder. As the inner code, the TCM configuration is the same as described in Table 5. The RS symbols are drawn from Galois field GF($2^8$) and codeword size is determined from the data rate. In general, a rate-k n RS code is denoted by RS(n,k), where k denotes 8-bit dataword size and n is the codeword size. The maximum codeword size for the RS is n=$2^8$−1=255 and the code can correct up to t=(n−k)/2 8-bit words. The generating polynomial for the t-error-correcting RS code is given by, $$g(X) = (X + \alpha)(X + \alpha^2)\Lambda(X + \alpha^{2t})$$
$$= g_0 + g_1 X + g_2 X^2 + \Lambda + g_{2t-1} X^{2t-1} + X^{2t}$$

where α is a primitive element in GF($2^8$) and $g_I$ are coefficients from GF($2^8$). A RS encoder 560 corresponding to the generating polynomial is shown in FIG. 42. Again a frame is treated as a single block of data and is encoded into a single RS codeword. In FIG. 42, the multiplications 562 are in GF($2^8$) and the additions 564 are bit-wise exclusive-or operation. The k data samples (bytes) are clocked into the 8-bit wide shift register circuit one sample per cycle and after k clock cycles the data in the 2t registers are the parity check bytes, which are appended to the original data bytes to be sent out.

Figure 43:
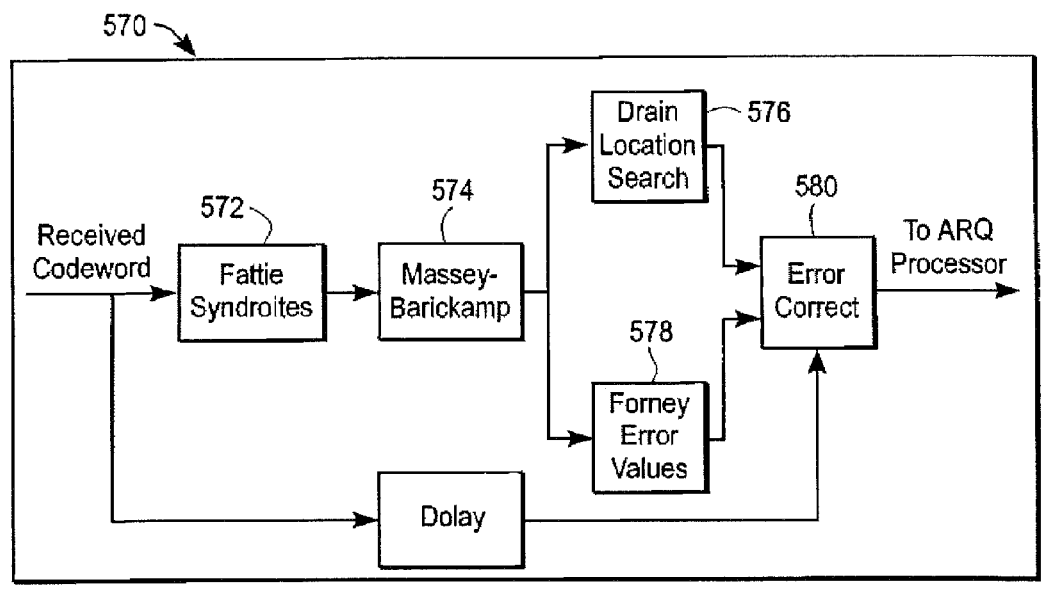
FIG. 43 is a block diagram of a Reed-Soloman decoder, in accordance with an aspect of the present invention.

A RS decoder 570 is illustrated in FIG. 43. Generally, five steps are involved in a RS decoder and the process starts after a frame of data is collected. Hence the latency introduced by the RS decoder is about a frame length of 20 ms, assuming the hardware utilizes the full span of frame timing. When n input bytes are available, the partial syndrome step 572 calculates 2t partial syndromes. The syndromes are subsequently used in Massy-Berlekamp processor 574 to generate an error-locator polynomial and an error-value polynomial. The error-locator polynomial is then sent to the Chien location search processor 576 to identify t error locations, and the error-value polynomial is processed using the Forney algorithm 578 to calculate t error values. The error correct step 580 in the decoder corrects the t errors in the received data. This RS codec is capable of correcting up to t bytes of errors, regardless of how many bits are in error within a byte.

Figure 44:
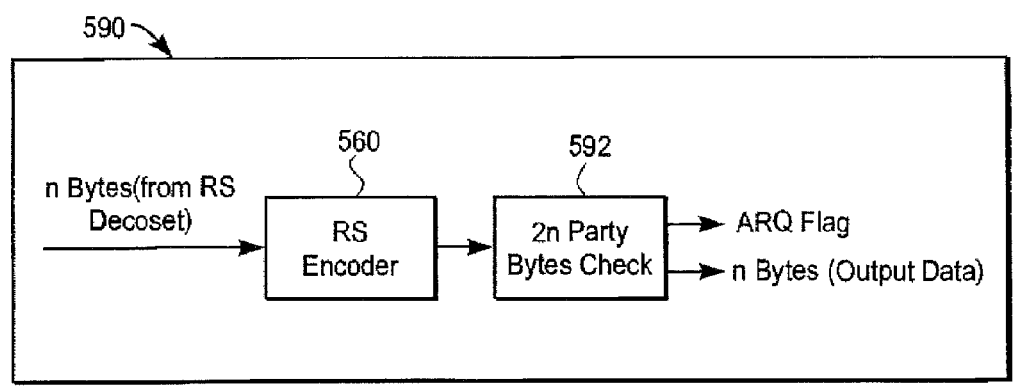
FIG. 44 is a block diagram of an automatic re-transmission request (ARQ) processor, in accordance with an aspect of the present invention.

FIG. 44 illustrates a procedure used as an ARQ process for data re-transmission 590. One of the way to check if the RS decoder 570 corrects all the errors is to feed the resultant n bytes of data into the same RS encoder 560. After clocking in the n bytes, the contents of the 2t registers are examined by 2t parity bytes check 592. If the 2t registers are zeros, then the correction is successful. Otherwise, it is an indication that more than t errors are in the received data. If the 2t parity bytes are all zeros, the k data samples are deemed as "error-free" data. Otherwise, the frame is rejected and an ARQ signal is generated for re-transmission.

Lower Physical Layer Processing

Figure 45:
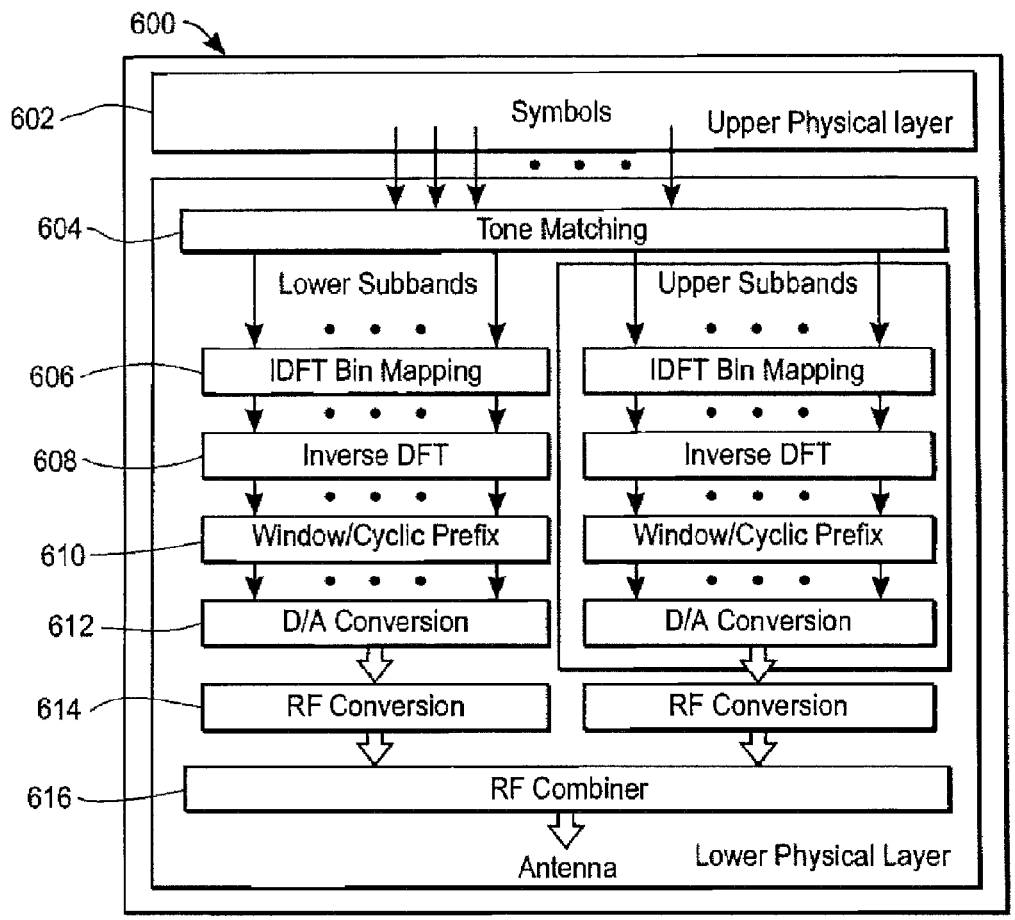
FIG. 45 is a block diagram of physical layer transmission, in accordance with an aspect of the present invention.
Figure 46:
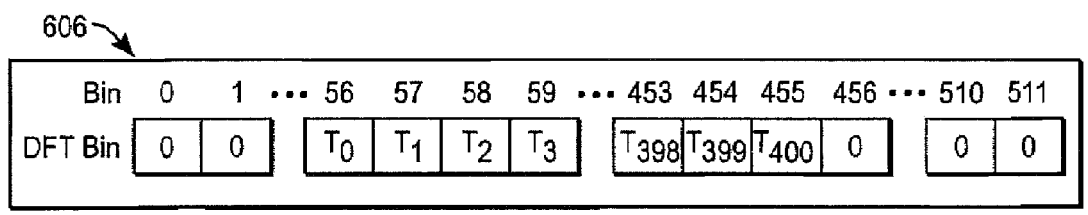
FIG. 46 illustrates a mapping of tones into IDFT bins by the IDFT bin mapping of physical layer transmission, in accordance with an aspect of the present invention.

The physical layer transmitter 600 is functionally described by FIG. 45, and is identical for both forward and reverse links. As shown in FIG. 45, complex baseband signals 602 enter the tone mapping block 604 where they are mapped to appropriate tone locations within a subband. The IDFT bin mapping block 606 maps the tone-mapped complex signals to their appropriate IDFT bins. The inverse DFT 608 is performed. Remaining IDFT bins are filled with a cyclic prefix 610 after performing the inverse DFT. The discrete time-domain samples are then converted into an analog signal by D/A conversion block 612 and mixed to the appropriate RF frequency by RF conversion block 614. RF combiner 616 combines the upper and lower channels prior to transmission over the antenna. There is one antenna for the reverse channel. For the forward link, the function depicted in FIG. 45 is repeated for each antenna element. Furthermore, the tone mapping may represent a combination of symbol data from multiple users into the same IDFT bin. For this example, the spacing between adjacent IDFT bins is 3.125 KHz, and in each 1.25 MHz subband there are 400 bins. Thus, a 512-point IDFT would span 1.6 MHz with 112 unused bins. The IDFT bin mapping 606 is shown in FIG. 46.

By reducing the process of synthesis, or modulation, and analysis, or demodulation, to inverse and forward Fourier transforms, the hardware complexity is driven by the implementation of the FFT algorithms. The dual odd FFT (DOFFT) was been selected since it provides the smallest complex FFT size and fewer complex operations than either the FFT or the odd frequency FFT (OFFT).

Figure 47:
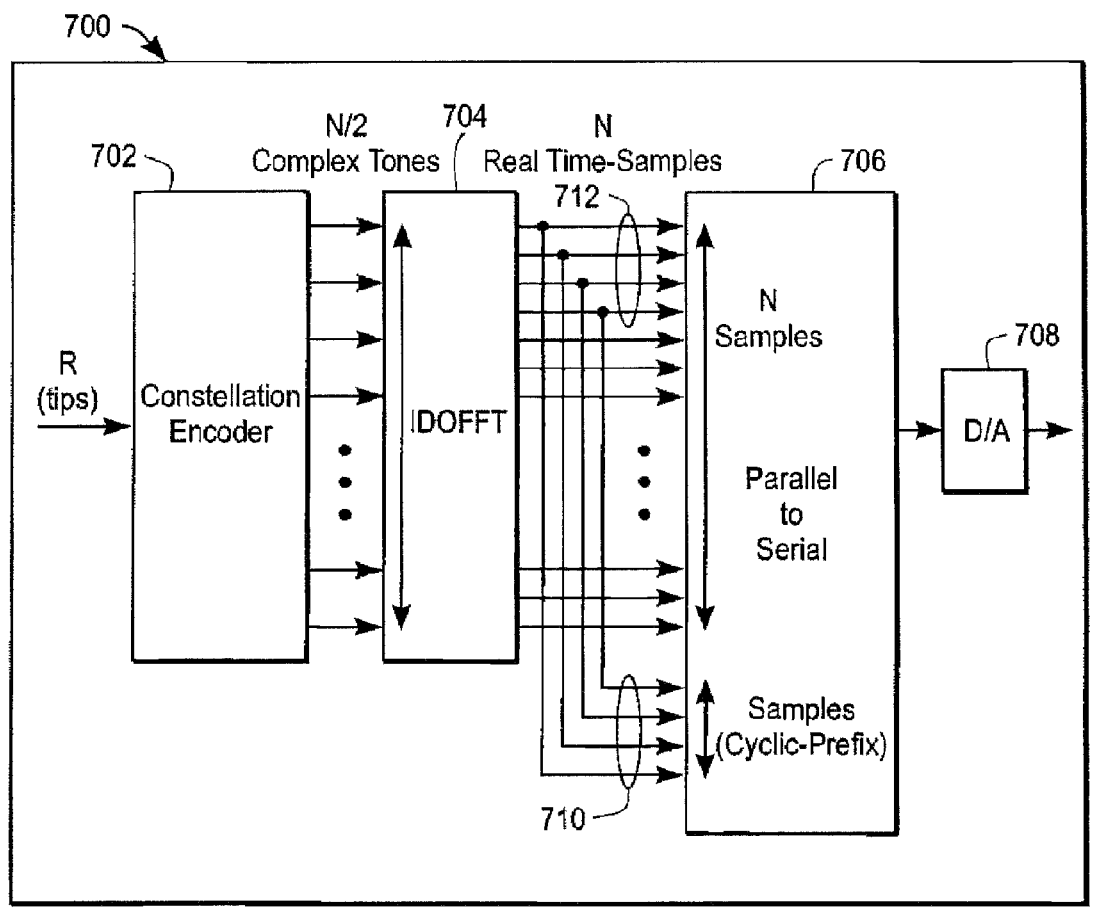
FIG. 47 is a functional block diagram for an example of insertion of a cyclic prefix, in accordance with an aspect of the present invention.

FIG. 47 gives a functional block diagram for an example of insertion of the cyclic prefix 700. The four main blocks of this diagram perform functions analogous to blocks 602 to 612 of FIG. 45. The example of FIG. 47 includes the spectral tone constellation encoder 702, IDOFFT modulator 704 which converts N/2 complex tones into N real time-samples, a parallel to serial converter 706, and a digital to analog converter (D/A) 708. The cyclic prefix 710 is shown as taps from the original sample data lines 712 from the IDOFFT block 704. The cyclic prefix replaces the idle guard period and helps ensure that the receiver can recover the full energy of the transmitted signal.

Data Link Layer Design

Referring back to the OSI Protocol of FIG. 20, the data link layer (DLL) 304 of the OSI protocol framework includes sublayers for logical link control (LLC) 306 and medium access control (MAC) 308. Preferred embodiments for data link layer are described below. These include frame format definitions, improved partition management protocol to reduce the probability of RLI and FLT errors that can break synchronization for the scrambler and encryption engines, partition engines, RU and base schedulers, and the MAC messages and procedures.

MAC Frame Structure

The MAC frame structure 780 is defined in FIG. 66. A common MAC header 782 has forward link and reverse link versions. The goal is to minimize constant overhead by using optional extended MAC header 784, which are used for short and more frequent MAC messages, such as bandwidth request, partition allocation, timing adjustment, etc. The MAC service data unit (SDU) 786 can be concatenated for efficiency. The connection ID 788 is used to distinguish between different classes of services. Specifically, 0 for null SDU. It has no body and cannot be followed by any non-null SDU 1 for MAC messages 2-7 reserved for operation and maintenance (OAM) messages 8-254 for LLC service access points of which 8-136 are reserved for 64 VoIP connections.

32 for 20 ms VoIP and 32 for 10 ms VoIP 255 for global address

The common MAC header for the reverse link 790 is shown in FIG. 67. The forward link common MAC header 800 is shown in FIG. 68. The version fields 792 and 802 allow for future upgrades and are initially set to 0. The priority (P) field 794 is the dynamic bandwidth request is per RU with P=1 indicating high priority. The header extension (HE) fields 796 and 806 indicate whether an extended header (EH) is present. The power control field 808 is a signed 4-bit integer. The reserved field (R) 804 is set to 0. The MAC header check sequences (HCS) 798 and 810 are used to check scrambler and encryption synchronization. Each uses a cyclic redundancy check with polynomial, $x^8+x^2+x+1$ over the header. Other parts of the frame are protected from bit errors with a Reed-Solomon code.

Figure 69:
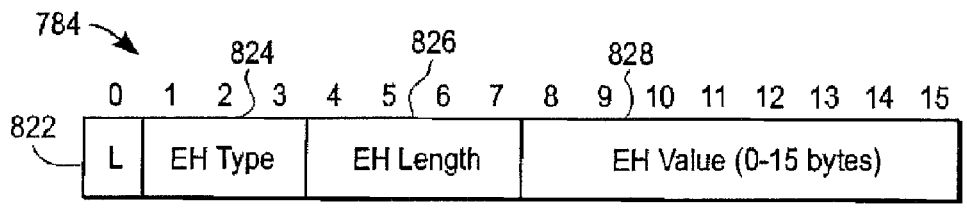
FIG. 69 is a diagram of an extended MAC header of a MAC frame, in accordance with an aspect of the present invention.

The format of the extended MAC header 784 of FIG. 66 is shown in FIG. 69. Multiple extended headers are permitted. The last (L) field 822 is set to indicate that this is the last extended header in the frame. Various messages can be formulated by setting the type field 824, length field 826, and value field 828. Reverse link messages include null and bandwidth request. Forward link messages include null, timing adjustment, add a partition, delete a partition, power control for the access partition, and power control for four way interleaving.

Figure 70:
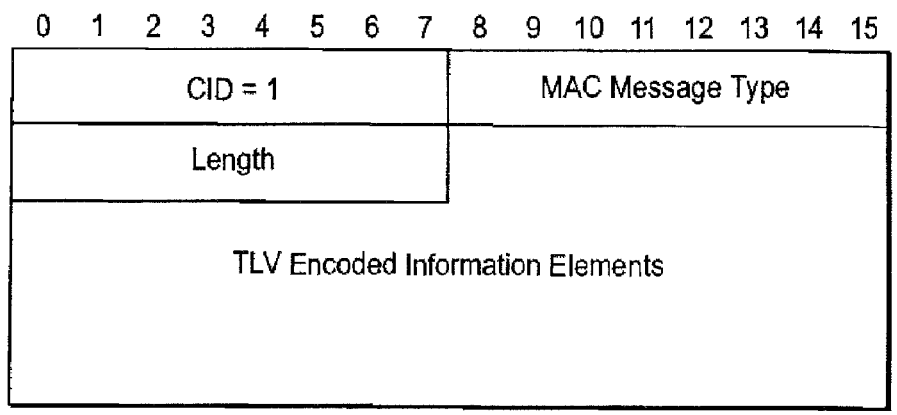
FIG. 70 is a diagram of a MAC message format, in accordance with an aspect of the present invention.

The MAC message format is shown in FIG. 70. The bandwidth management messages are contained in the extended header. The messages include: RangingRequest, TimeOfDayRequest, TimeOfDayResponse, MACRegistrationRequest, MACRegistrationReponse, MACRegistrationConfirm, RUModeRequest, RUModeResponse, EncryptionRequest, EncryptionResponse, EncryptionConfirm, ModulationChangeRequest, ModulationChangeResponse, ModulationChangeConfirm, MACConnectRequest, MACConnectResponse, MACConnectConfirm, MACDisconnectRequest, and MACDisconnectResponse.

Figure 71:
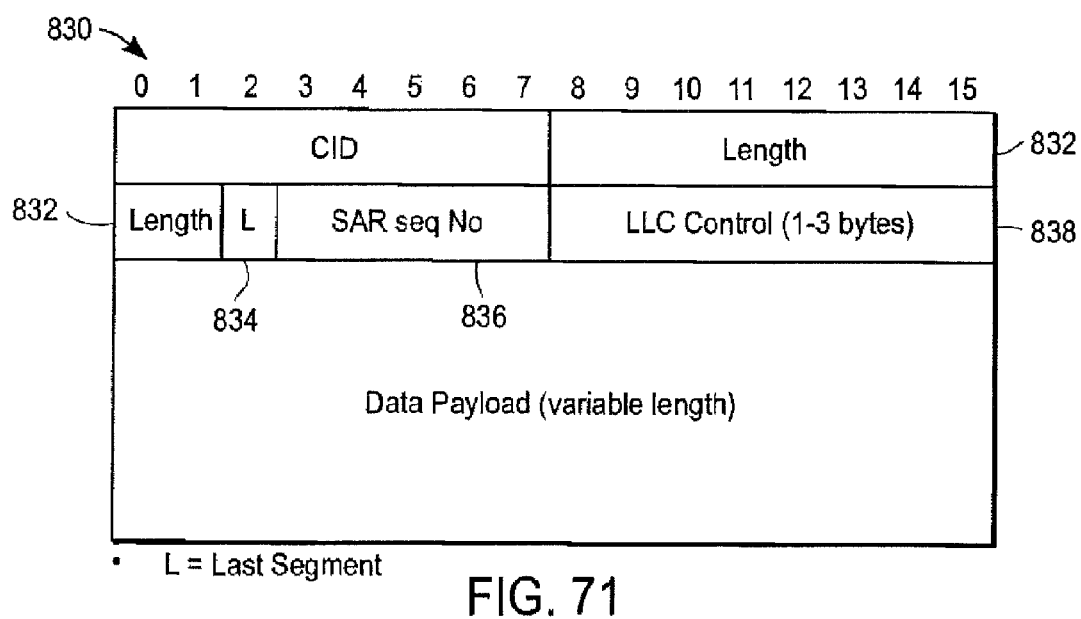
FIG. 71 is a diagram of a protocol data unit format, in accordance with an aspect of the present invention.

The protocol data unit (PDU) format 830 is shown in FIG. 71. The 10-bit Length field 832 is the number of bytes in the PDU and is sufficient for 4-way interleaving. The L field 834 is set to indicate that this is the last segment of the segmentation and reassembly (SAR) process. The SAR_Seq_No field 836 is the sequence number for the SAR. The logical link control (LLC control) field 838 of is expanded in FIG. 72. It provides all signals required by the Institute for Electrical and Electronics Engineers standard IEEE 802.2 LLC for Type 1 (no ARQ) & Type 2 (with ARQ) services. The automatic retransmission request window size is 128 (5 frames in 24 partitions). The window size can be 255 with a Go-back-N algorithm Referring to FIG. 72, the command/response (CR) field 842 is 0 for commands and 1 for responses. The poll/final field 844 is PF. The Control Bits field 846 define all types of LLC packets as described in the IEEE 802.2 standards such as SABME (set asynchronous balanced mode extended).

Figure 74:
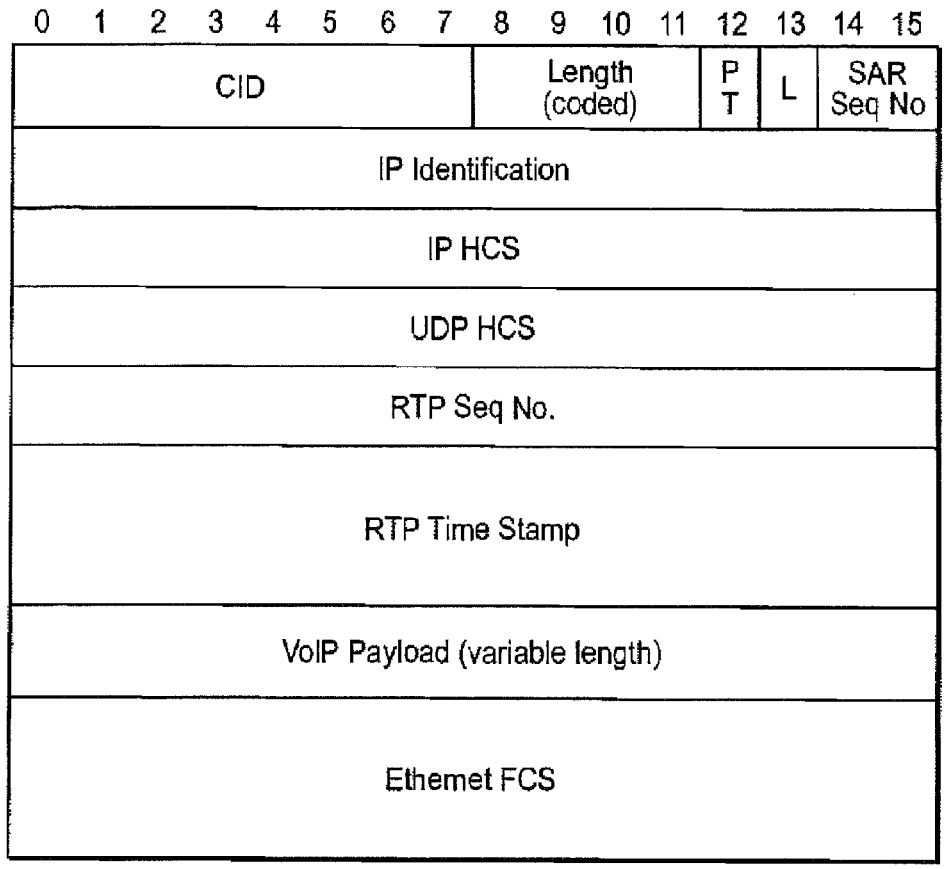
FIG. 74 is a diagram of a frame of a 20 ms voice segment service data unit (SDU) suitable for voice over Internet protocol (VoIP), in accordance with an aspect of the present invention.

Voice can be sent across the airlink in either 20 or 10 ms voice segments. The frame size and data rates for a 20 ms segment are shown in FIG. 73. The fields of a 20 ms voice segment service data unit (SDU) are shown in FIG. 74. The RTP/UDP/IP header is partially compressed. The Ethernet header is suppressed. The payload type (PT) field is cleared for full header without payload (for compressor synchronization), and is set for compressed header with payload (normal payload).

Figure 75:
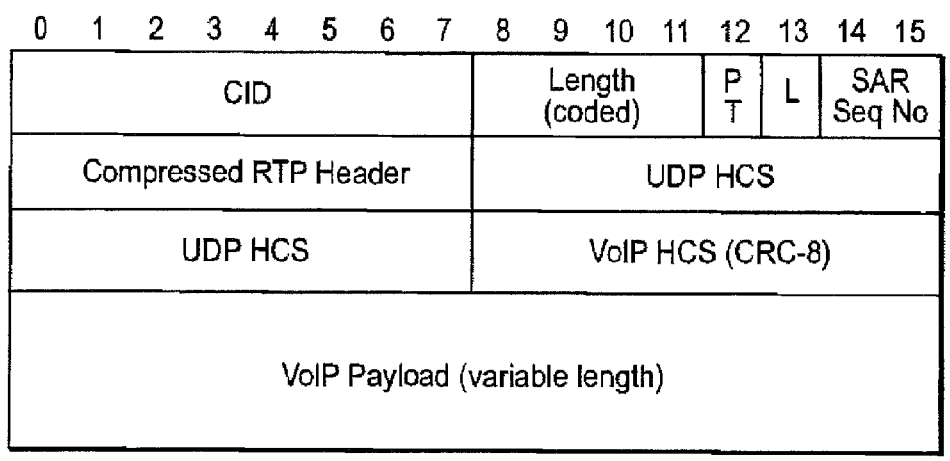
FIG. 75 is a diagram of a frame of a 10 ms voice segment service data unit (SDU) suitable for VoIP, in accordance with an aspect of the present invention.

The fields of a 10 ms voice segment SDU are shown in FIG. 75. The SDU is sent in the second and third slots and another SDU is send the fifth and sixth slots. Thus there are two 10 ms voice segments in a 20 ms airlink frame. This requires a fully compressed RTP/UDP/IP header and Ethernet header and Frame check sequence suppression. There are separate SDU HCS to protect PDU header; the HCS in common MAC header does not cover these parts. The frame size and data rates for a 10 ms segment are shown in FIG. 76.

FIG. 77 shows the number of partitions for various combinations of bits per symbol, voice segment length, and vocoder.

Logical Link Control Sublayer

Figure 78:
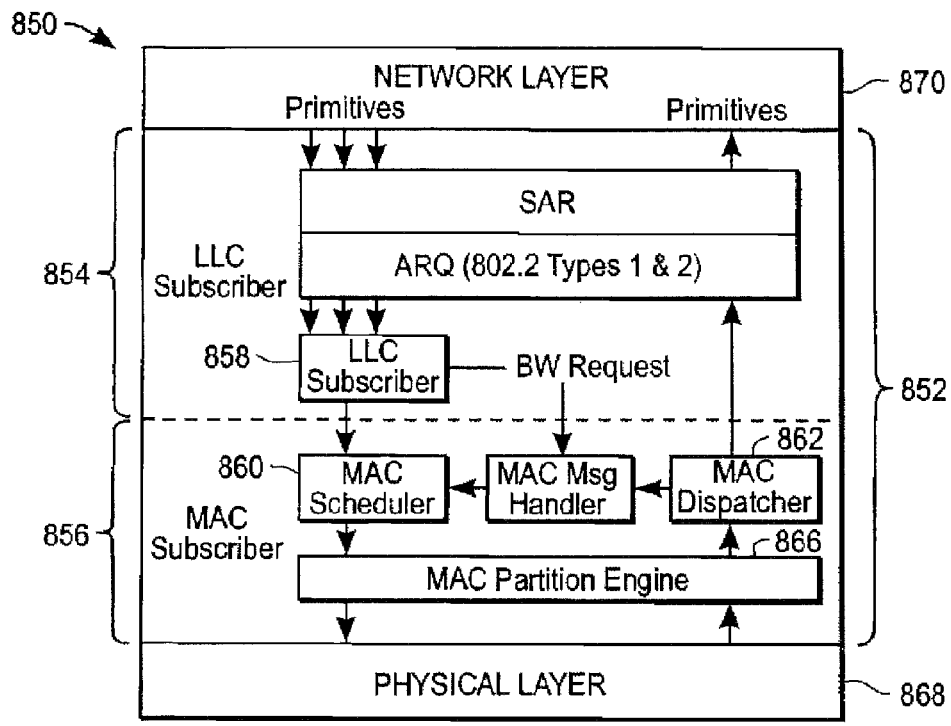
FIG. 78 is block diagram of data link layer (DLL) functions, in accordance with an aspect of the present invention.

FIG. 78 shows the functional components of the data link layer (DLL) of a preferred embodiment 850. The DLL functional block 852 includes the LLC sublayer functional block 854 and the MAC sublayer functional block 856.

The DLL functional block 852 provides service to the network layer (NL) 870 above it via a set of primitives, using the RU identification number and the connection identification number as addresses. The LLC Scheduler 858 selects which frames to transmit. A simple priority scheme is used: Voice>MAC Urgent>Data>MAC Normal>OAM. Clearly, more support for other qualities of service can be provided with more queues and other apparent algorithms. The MAC Scheduler 860 manages bandwidth assignment among RUs. This is centrally controlled by the base. The RU makes bandwidth request and the base makes the partition allocation. The MAC Dispatcher 862 parses and routes received frames. The MAC Message Handler 864 acts on MAC management messages. The MAC Partition Engine 866 manages interactions with the physical layer (PHY) 868, such as starting, maintaining, and closing partitions, and handling time slot interrupts, frame counter, data read/write.

The LLC distinguishes 20 ms voice, 10 ms voice, data, and management messages by the CID. For data, the IEEE 802.2 standard types 1 and 2 are followed. Type 1 transfers data without automatic retransmission request (ARQ). Type 2 handles ARQ using a go-back-N algorithm, including initialization and error recovery.

There are some deviations from the standard: signals are carried in different formats, but interpreted the same way, ARQ sequence numbers are larger for higher speed/longer delay, the DSAP and SSAP addresses are derived from the RU identification number and the connection identification number, group addresses not supported, the global address is CID is 255, and there is an optional feature of packet aging.

For voice, the MAC sublayer provides bandwidth reservation service. A new frame format is used for RTP with no ARQ. RTCP packets use Type 2.

The following is a list of the primitives between the NL and LLC sublayer for 10 ms voice, 20 ms voice, and data according to their CID:

1. DL_UnitData.Request(RUI.CID, Data, PT): The NL uses this primitive to pass voice packets to the LLC or to send unnumbered data packets. For voice, the connection setup must be performed first.
2. DL_UnitData.Indication(RUI.CID, Data, PT): The LLC calls this primitive to pass received voice or unnumbered data packets to the NL.
3. DL_Connect.Request(RUI.CID, ServiceFlowID): When the LLC receives this request from NL, it takes actions depending on the type of service: (1) For data, LLC issues a SABME command to initialize the ARQ engine. It then invokes MA_UnitData.Request to send the frame. SFID is ignored for data. (2) For voice, LLC calls MA_Connect.Request, which executes a MAC connection setup procedure to reserve bandwidth. SFID indicates how many partitions (and priority) are required. The LLC also issues a SABME command to initialize the associated CID for RTCP.
4. DL_Connect.Indication(RULCID): When the MAC receives a MACConnectRequest message and is able to support the bandwidth requirement, it invokes MA_Connect.Indication, which in turn issues this primitive to the NL.
5. DL_Connect.Response(RULCID, RspCode): NL issues this primitive to LLC as a response to a DL_Connect.Indication primitive. For data, the LLC sends a UA response. For voice, the LLC invokes MA_Connect.Response, which in turn sends MACConnectResponse to the remote entity.

6. DL_Connect.Confirm(RULCID, RspCode): The LLC issues this primitive to the NL as a response to DL_Connect.Request. For data, it is caused by the receipt of UA response. For voice, when MAC receives a MACConnectResponse from the remote entity, it invokes MA_Connect.Confirm which causes LLC to generate this primitive in turn.
7. DL_Data.Request(RUI.CID, data): The NL uses this primitive to pass data to the LLC for transmission with ARQ on. Connection bound to RUI.CID must be open.
8. DL_Data.Indication(RUI.CID, data): The LLC uses this primitive to pass received data to the NL.
9. DL_Disconnect.Request(RUI.CID): The NL issues this primitive to close a connection. For data, the LLC sends a DISC command to the remote LLC. For voice, the LLC invokes MA_Disconnect.Request, which causes MAC to execute a MACDisconnect procedure.
10. DL_Disconnect.Indication(RUI.CID, Reason): For data, the LLC issues this primitive when it receives a DISC. For voice, when the MAC receives a MACDisconnectRequest, it invokes MA_Disconnect.Indication, which in turn causes the LLC to issue this primitive to the NL. The MAC also sends a MACDisconnectConfirm to the remote entity and closes the connection.
11. DL_Reset.Request, DL_Reset.Indication, DL_Reset.Response, DL_Reset.Acknowledge: This set of primitives are provided in the LLC standard for the purpose of resetting the link and flushing unacknowledged frames.
12. DL_FlowControl.Request(RUI.CID, bytes): The NL uses this primitive to throttle data flow from the LLC. A CID of 255 is used to indicate the whole LLC sublayer.
13. DL_FlowControl.Indication(RUI.CID, bytes): The LLC uses this primitive to throttle data flow from the NL. A CID of 255 is used to indicate the whole LLC sublayer.

LLC and MAC sublayers communicate with each other using the following set of primitives:
1. MA_UnitData.Request, MA_UnitData.Indication: The LLC and MAC schedulers interact via these primitives for basic data transfer.
2. MA_Connect.Request, MA_Connect.Indication, MA_Connect.Response, MA_Connect. Confirm, MA_Disconnect.Request, and MA_Disconnect.Indication: The LLC scheduler uses these primitives to interact with the MAC Message Handler for bandwidth reservation for voice calls.

Figure 79:
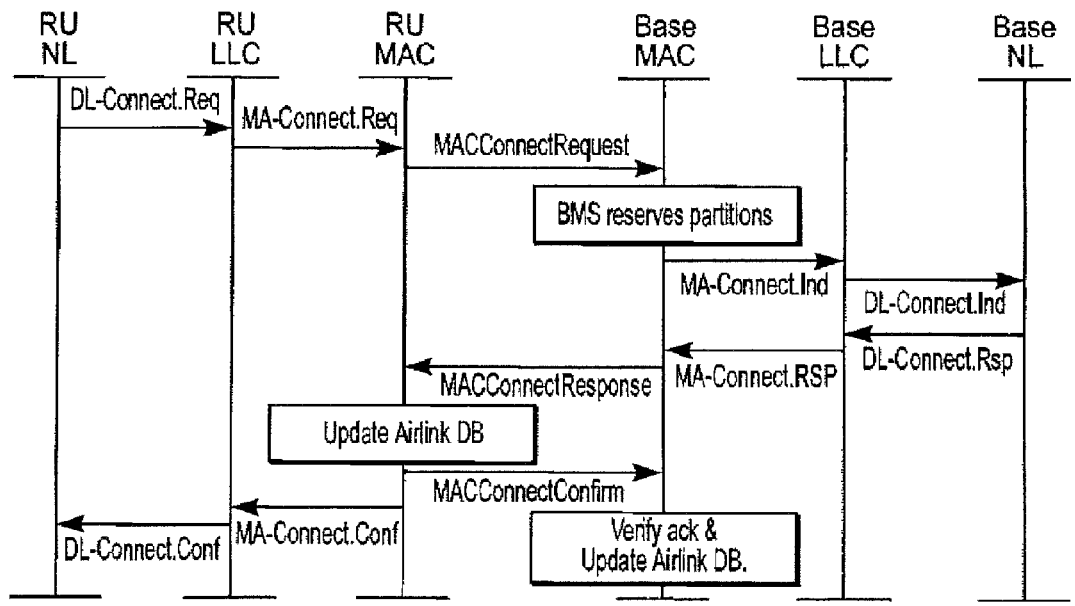
FIG. 79 is an illustration of the interaction of primitives used for voice connection, in accordance with an aspect of the present invention.
Figure 80:
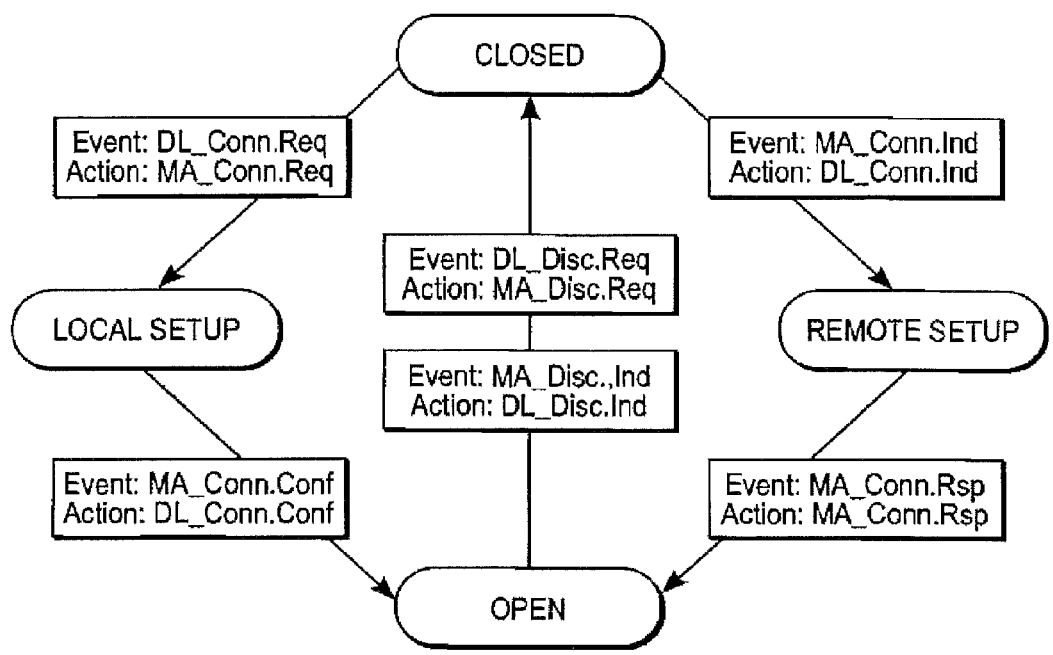
FIG. 80 is a state diagram of logical link control (LLC) operations for voice connections, in accordance with an aspect of the present invention.
Figure 81:
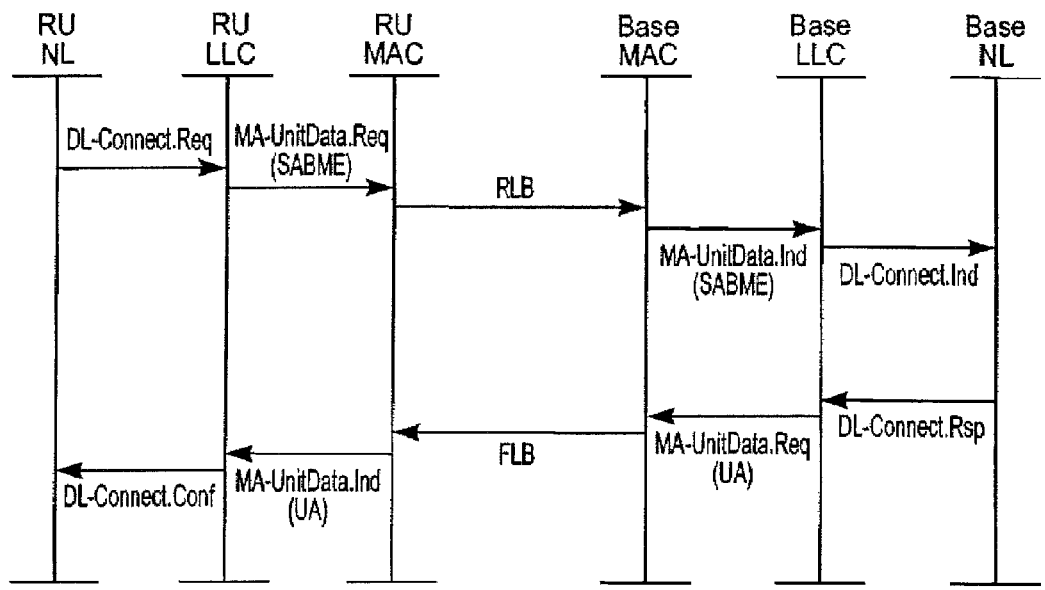
FIG. 81 is an illustration of the interaction of primitives used for data connections, in accordance with an aspect of the present invention.
Figure 82:
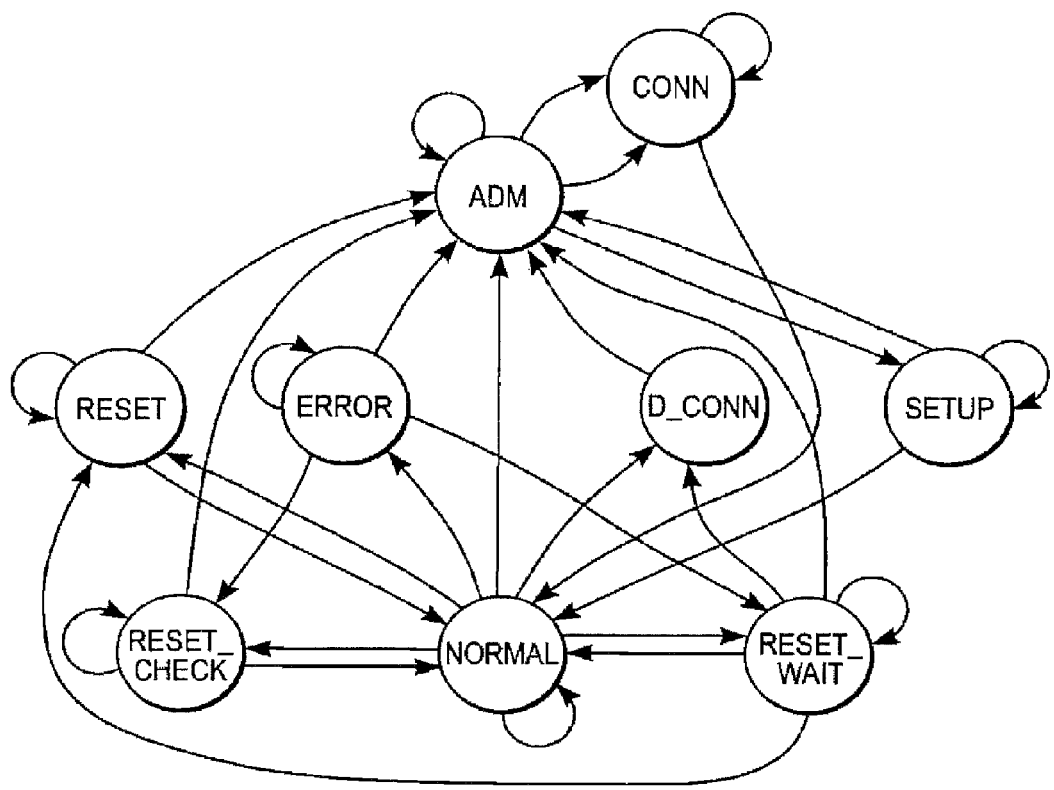
FIG. 82 is a state diagram of LLC link setup, teardown and recovery phase as defined in ISO/IEC 8802-2, a joint standard by the International Organization for Standardization and International Electrotechnical Commission, for reference in understanding an aspect of the present invention.
Figure 83:
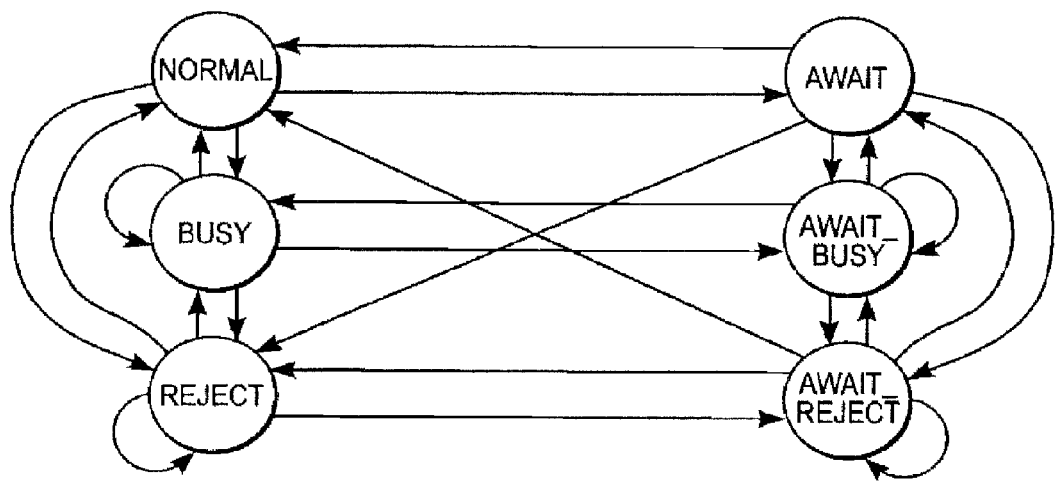
FIG. 83 is a state diagram of the LLC information transfer phase as defined in ISO/IEC 8802-2, for reference in understanding an aspect of the present invention.

FIG. 79 illustrates the interactions of primitives used for voice connection setup. FIG. 80 shows the LLC state diagram for voice connection. The MAC does most of the connection set up and termination for voice, including error handling. The LLC simply passes the commands and responses along (acting as a wrapper). However, the LLC is not totally transparent: initially the LLC will ask the MAC to reserve multiple partitions for voice, in case the voice codecs are G.711, in accordance with the International Telecommunications Union ITU-T Recommendation G.711. Later the LLC can request the MAC to remove excessive reservation. On the other hand, the LLC could reserve a single partition for voice and request additional partitions if the voice protocol demands a higher data rate. FIG. 81 illustrates the interaction of primitives used for data connections. FIG. 82 shows the prior art LLC state diagram for link control and FIG. 83 shows the prior art LLC state diagram for information transfer. Both FIG. 82 and FIG. 83 diagrams are defined in the standard ISO/IEC 8802-2, a joint standard by the International Organization for Standardization and International Electrotechnical Commission.

MAC Sublayer

Figure 84:
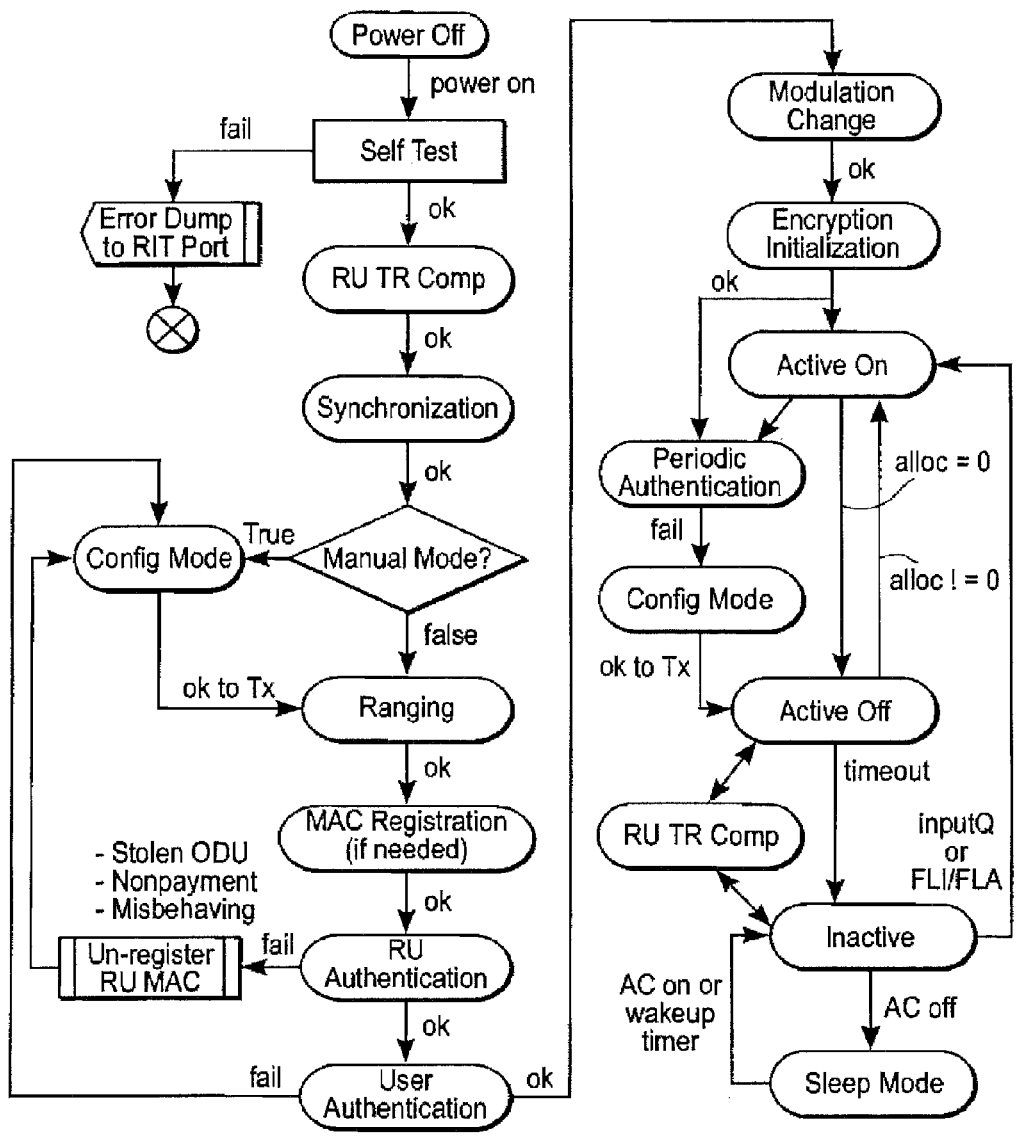
FIG. 84 is the state transition diagram of MAC sublayer operations of a remote unit, in accordance with an aspect of the present invention.

FIG. 84 shows an overall state transition diagram of MAC sublayer operations of the RU.

Figure 85:
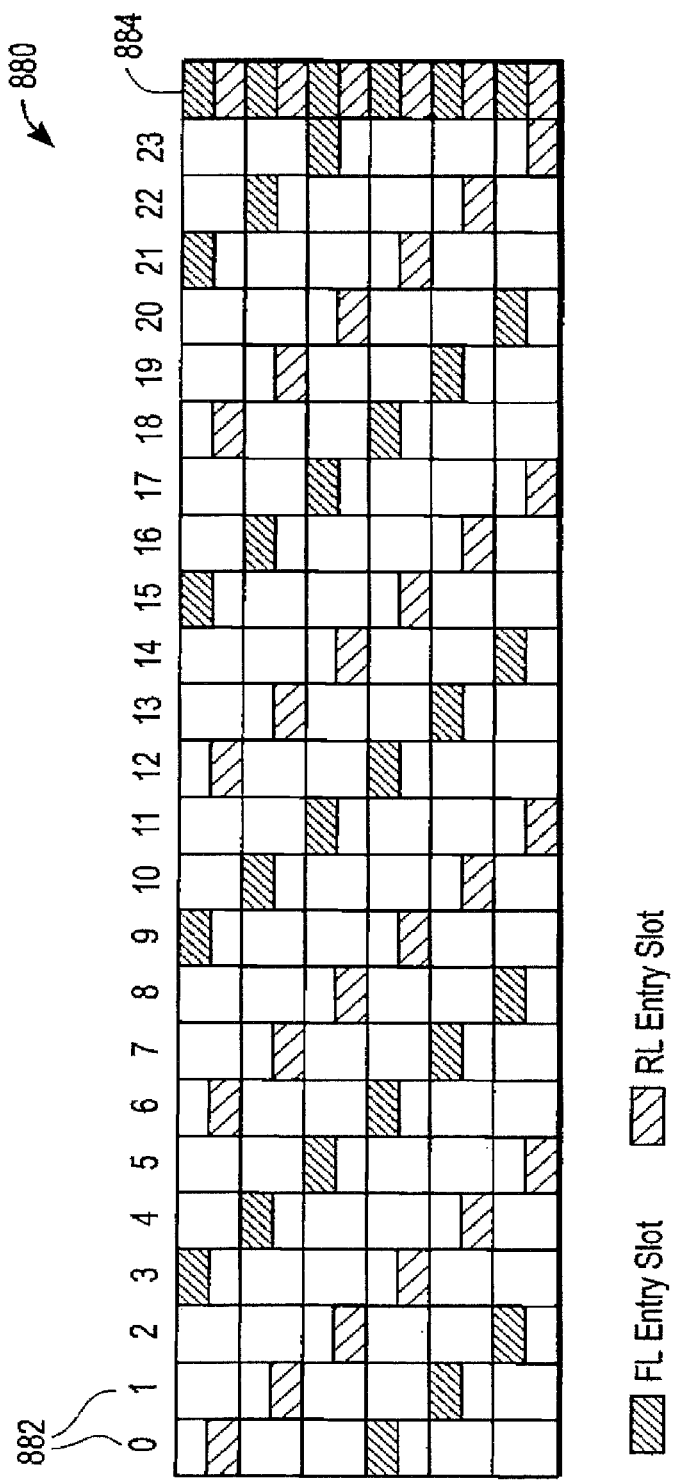
FIG. 85 is an illustration of airlink frame structure, in accordance with an aspect of the present invention.

FIG. 85 shows an airlink frame 880, which includes 24 partitions 882 for traffic and one partition 884 for access.

Figure 86:
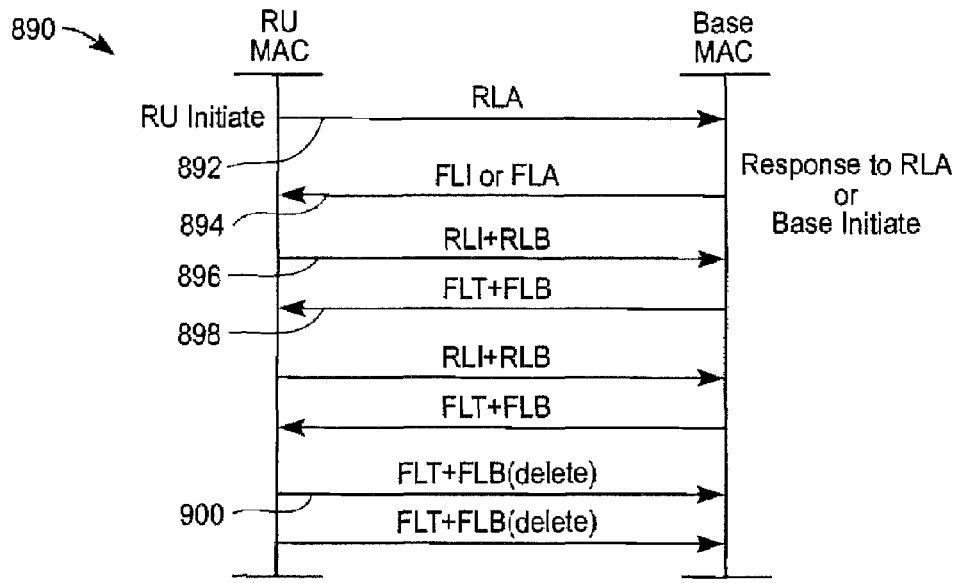
FIG. 86 illustrates a protocol for connection initiation and data transfer using the partitions of FIG. 85, in accordance with an aspect of the present invention.

FIG. 86 shows the protocol for initiating a connection and data transfer 890 using the partitions of FIG. 85. When a RU initiates a connection, it sends a RLA 892 on the access channel as a request. The base detects the RLA and allocates a partition using either a FLA or FLI 894. When the base initiates a connection, it allocates a partition using either FLA or FLI 894. When the RU receives a FLA or a FLI, it sends a RLI followed by RLBs 896 in the allocated partition. When the base detects a RLI, it sends a FLT followed by FLBs 898. To close a partition, the base sends a de-allocation message 900 to the RU, indicating which partition to close and when to close it. The same message will be sent twice to reduce the probability that neither message is received.

For open partitions, the base will flywheel through an occasional miss of a RLI. The RU will flywheel through occasional miss of a FLT. However, consecutive misses of RLIs will cause the base to close the partition, and consecutive misses of FLTs will cause the RU to close the partition. Both will reinitialize their encryption and scrambling engines in this case.

Figure 87:
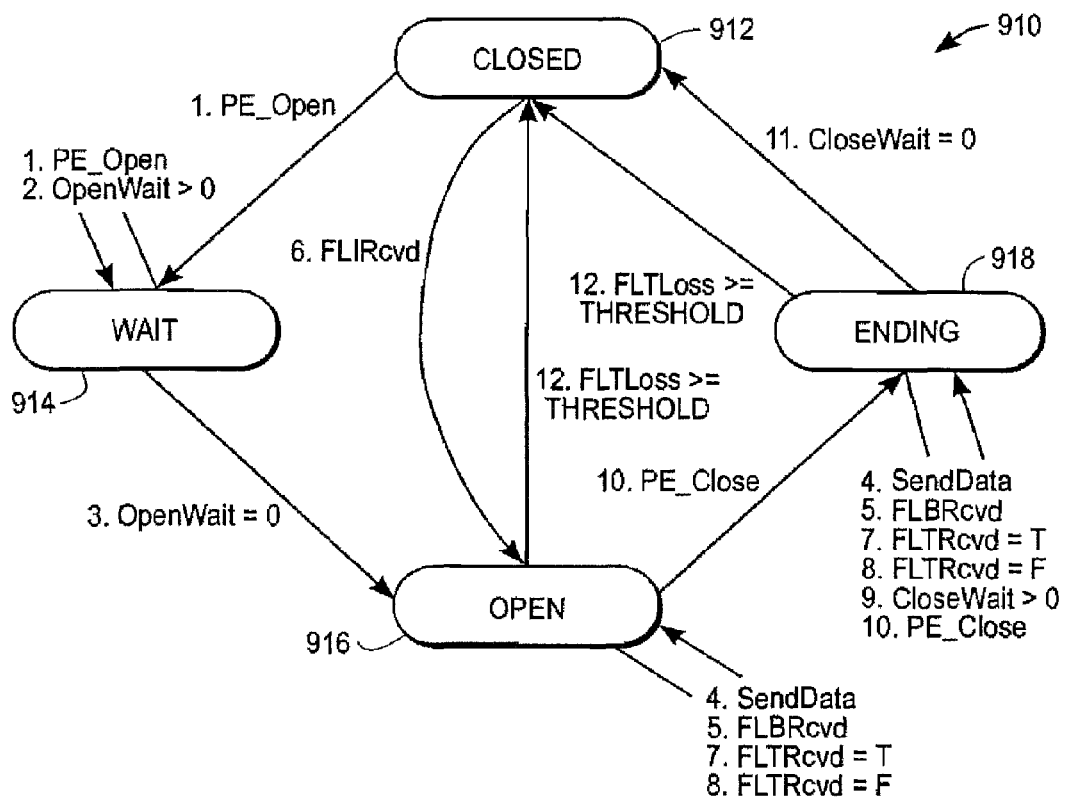
FIG. 87 is a state diagram of a frame-driven component of a RU partition engine, in accordance with an aspect of the present invention.

The RU Partition Engine (PE) handles the airlink protocol. It has two components: a frame-driven component for adding and deleting a partition, sending RLI and RLB and receiving FLI, FLA, and FLB, and a slot-driven component for data transfer to/from the physical layer (PHY). The RU partition engine provides services to RU MAC Scheduler (RMS) via the following primitives:
1. PE_Open(Partition, Configuration, OpenWait): OpenWait indicates the number RL entry slots before send the first RLI. Configuration indicates constellation, encryption, etc, to use for FLB. Results of this function are reflected in the partition state.
2. PE_Close(Partition, CloseWait): CloseWait has a similar meaning to OpenWait.
3. PE_SendData(Partition, Configuration, Data)
4. PE_RcvData(data, RSError): this is a call-back function provided by MAC Dispatcher to receive FLBs.
5. PE_FLARcvd(Burst1, Burst2, Burst3, Burst4): this call-back function is provided by RMS to receive the FLA list.
6. PE_SendRLA( ): RMS calls this function to request the partition engine to send a RLA in the access channel 7 Other functions for configuring PHY, like Power Control, Ranging, etc. FIG. 87 shows a state diagram of the frame driven component of RU partition engine (PE) 910. For the 24 traffic channels, Partition.SendRLB flags tell RMS which partition it should pass data to PE. SendRLB is false in the CLOSED state 912 and WAIT state 914 and true in the OPEN state 916 and ENDING state 918. The actions associated with the numbered events in FIG. 87 are:
1. Update OpenWait
2. Decrement OpenWait
3. Prepare RLI for DMA; set FLTLoss=0
4. Prepare RLB for DMA
5. Call PE_RcvData
6. Prepare RLI for DMA; set FLTLoss=0
7. FLTLoss=0

8. Increment FLTLoss
9. Decrement CloseWait
10. Update CloseWait
11. Set SendRLB=F; FLBEngine=Off
12. Set SendRLB=F; FLBEngine=Off; reinitialize RLB and FLB engines.

Figure 88:
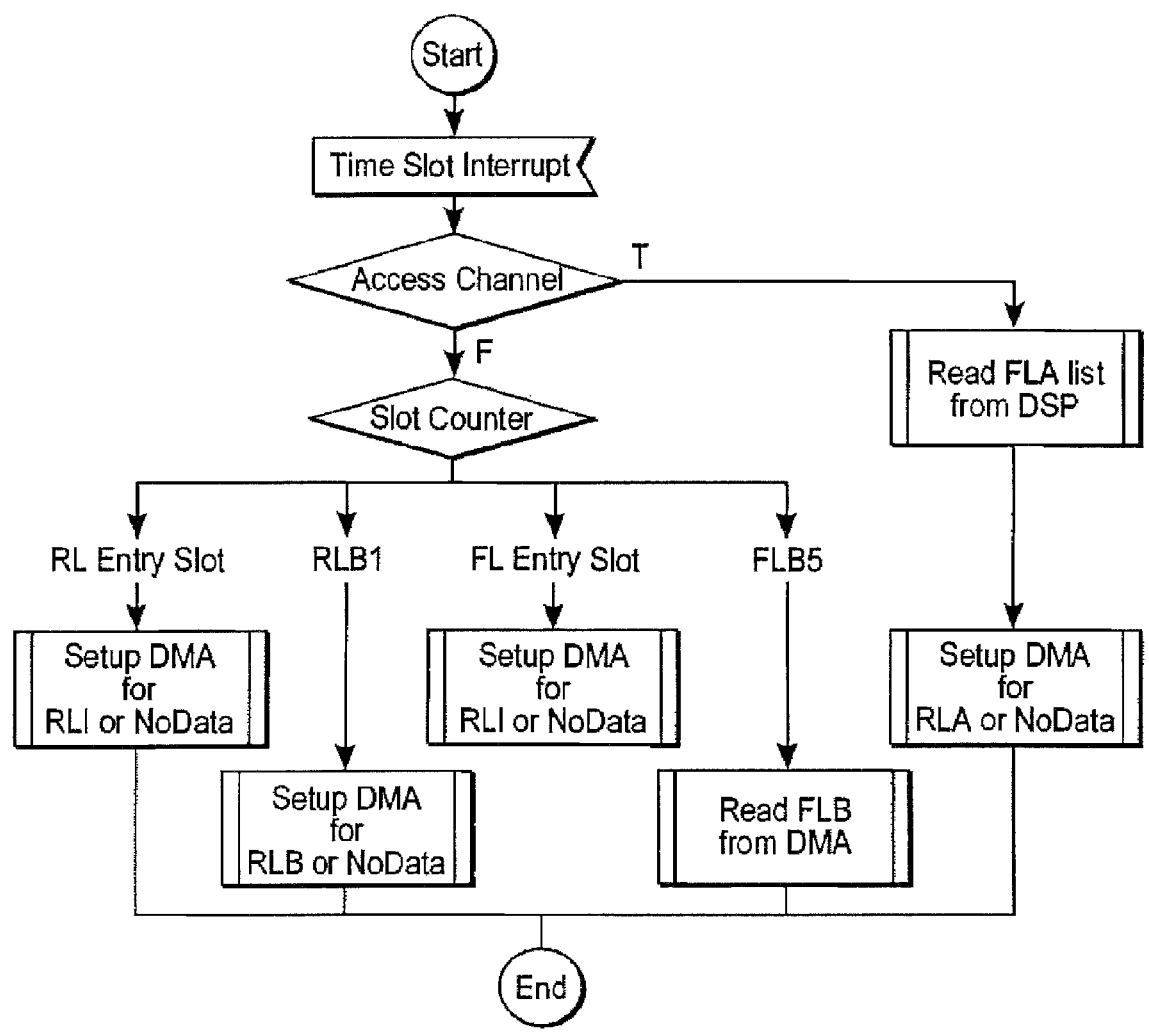
FIG. 88 is a flow diagram of a slot-driven component of a RU partition engine, in accordance with an aspect of the present invention.
Figure 89:
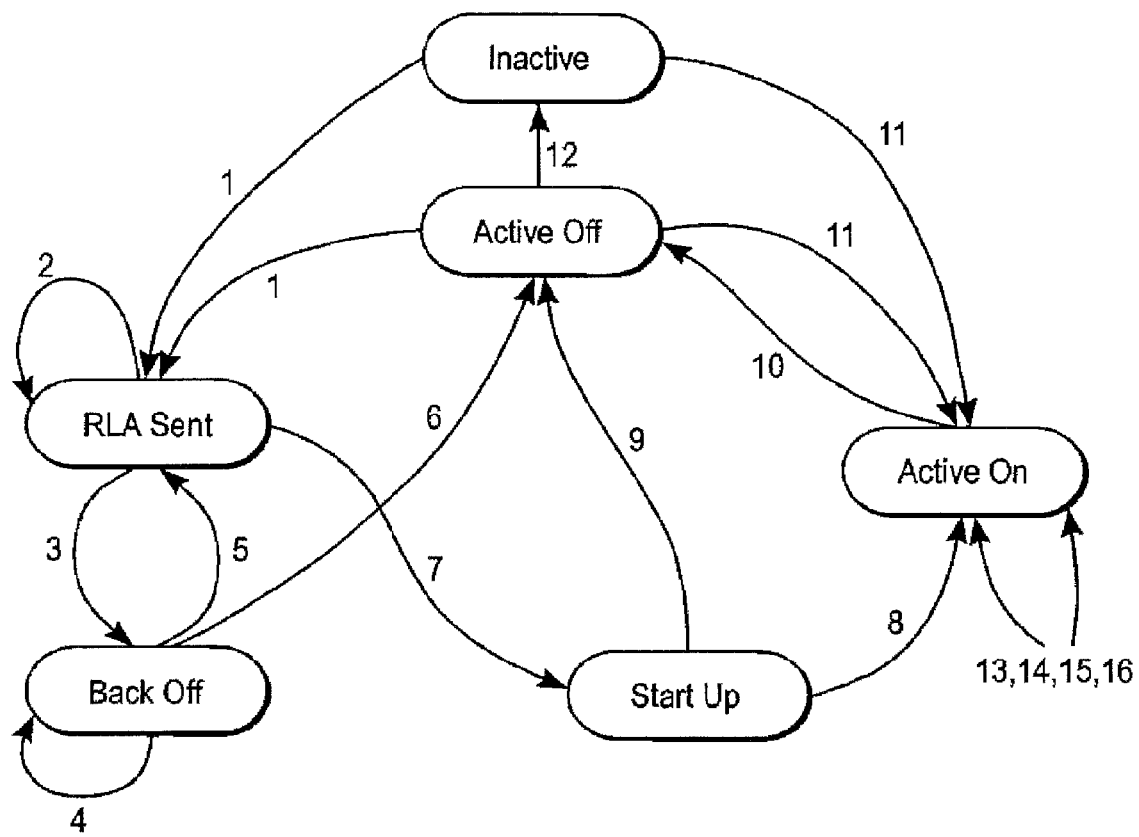
FIG. 89 is a state diagram of a RU MAC scheduler, in accordance with an aspect of the present invention.

In the OPEN state 916 and ENDING state 918, the PE keeps sending RLIs, unless excluded by the base transmit/receive compensation. In the CLOSED state 912 and WAIT state 914, the PE also keeps writing No_Data to the PHY. The slot-driven component of RU PE is basically a driver for PHY. FIG. 88 shows a flow diagram for the slot-driven component of the RU PE. It is driven by PHY interrupts. Timing of interrupts and tasks are coordinated carefully with the PHY. The RU MAC Scheduler handles RU state transitions between active (both active on and active off) and inactive, and contention on the access channel FIG. 89 shows the RU MAC Scheduler state transition diagram and FIG. 90 lists the actions associated with each event.

The base partition engine is the counterpart of the RU PE. It is the main entity in the base that handles the airlink protocol. Similar to RU PE, the base PE also has two components: a frame-driven component for adding and deleting a RU, sending FLB and receiving RLB, and a slot-driven component for data transfer to and from the PHY. The base PE provides its services via the following primitives:

1. PE_Open(AccessCode, Configuration, OpenWait): AccessCode is NULL if allocation messages were sent via FLA or FLB. OpenWait indicates the number RL entry slots before the expected RLI. Results of this function are reflected in state variables
2. PE_Close(AccessCode, CloseWait)
3. PE_RcvMACData(RUID, MAC data): This is a call-back function provided by MAC Dispatcher to receive RU list, power control and ranging info, etc.
4. PE_SendData(RUID, Configuration, Data):
5. PE_RcvData(RUID, Data, RSError): This is a call-back function provided by MAC Dispatcher to receive RLB.

Figure 91:
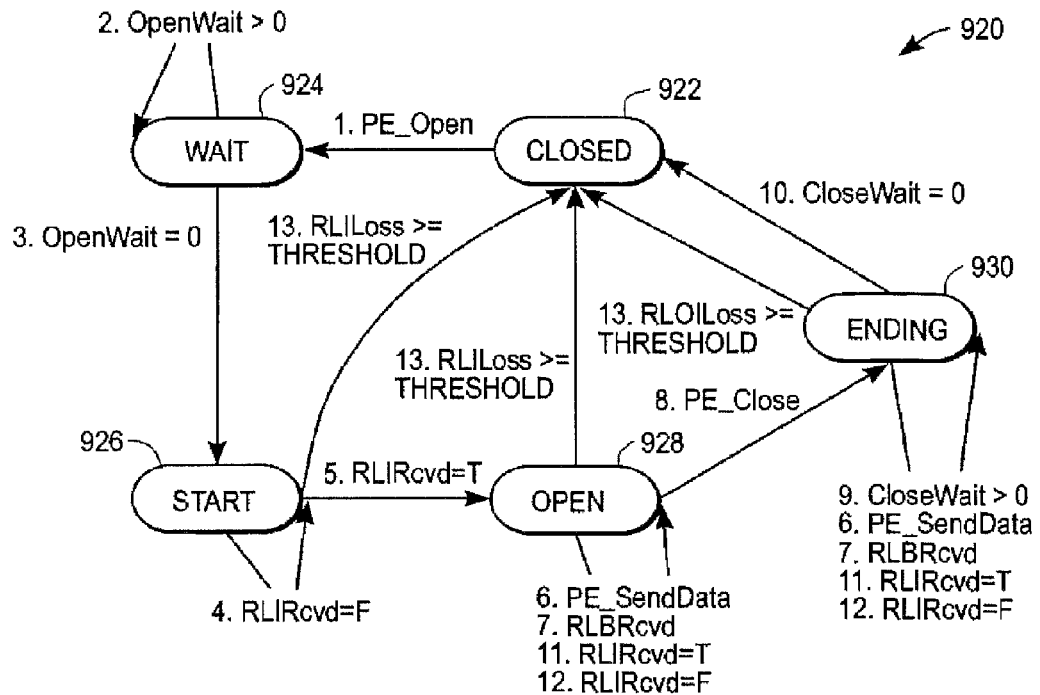
FIG. 91 is a state diagram of a frame-driven component of a base partition engine, in accordance with an aspect of the present invention.
Figure 92:
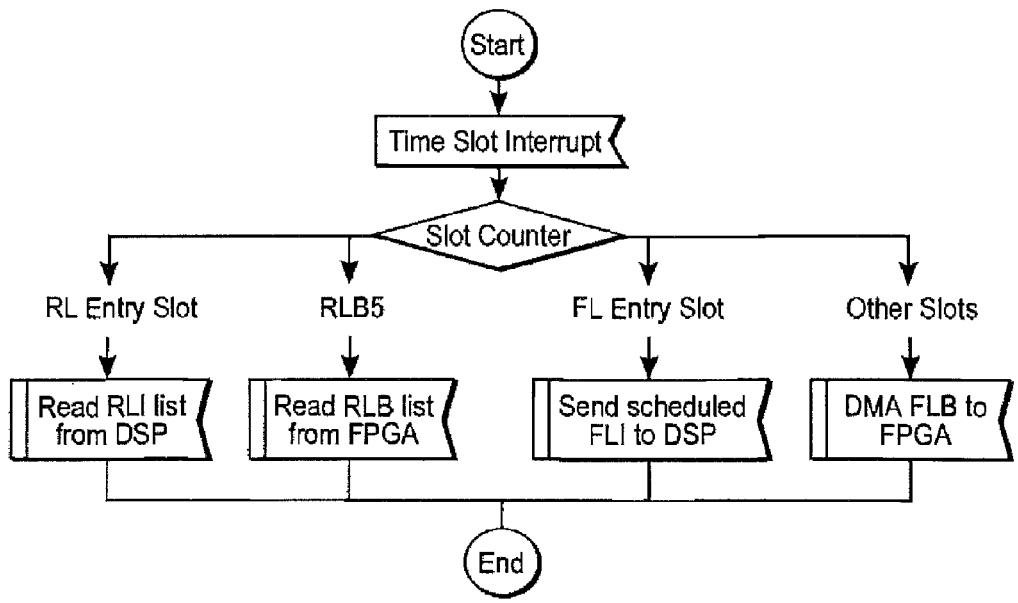
FIG. 92 is a flow diagram of a slot-driven component of a base partition engine, in accordance with an aspect of the present invention.

FIG. 91 shows a state diagram of the frame driven component of the base PE 920. A RUID.SendFLB flag tells MAC Scheduler if it should pass data to PE. SendFLB is false in the CLOSED state 922, WAIT state 924, and START state 926 and true in the OPEN state 928 and ENDING state 930. Logically each RU has its own instance of this state machine. The actions associated with numbered events shown in FIG. 91 are:

1. Schedule FLI (if not NULL)
2. Decrement OpenWait
3. Add RLI (weights=0); set RLILoss=0
4. Increment RLILoss, advance FLB engines
5. Set SendFLB=T; RLILoss=0
6. Prepare data for transfer to PHY
7. Call PE_RcvData
8. No action
9. Decrement CloseWait
10. Set SendFLB=F; Delete RLI
11. Set RLILoss=0
12. Increment RLILoss
13. Set SendFLB=F; delete RLI; reinitialize RLB/FLB engines FIG. 92 shows a flow diagram for the slot driven component of the base PE. It is basically a hardware driver for PHY, and is driven by interrupts from PHY. The base PE also performs encryption and scrambler initialization. The base PE for the access channel is somewhat different from that for the traffic channel.

Figures 93, 94:
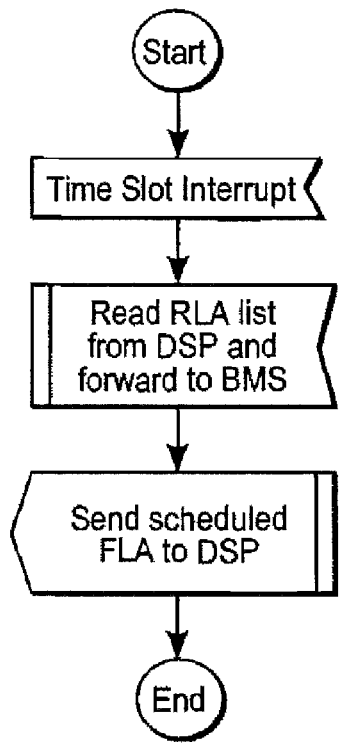
FIG. 93 is a flow diagram for a base partition engine for an access channel, in accordance with an aspect of the present invention.
FIG. 94 shows examples of partition allocation changes based on a backlog for each RU, in accordance with an aspect of the present invention.

FIG. 93 shows the state diagram of base PE for the access channel. It is always slot driven. Its main function is to fetch a list of detected RLAs and transmit FLA as requested by the base MAC scheduler (BMS). Primitives at the interface with BMS are:

1. PE_RLADetected(RLA list): This call-back function is provided by the BMS to receive the detected RLA list.
2. PE_SendFLA(FLA1, FLA2, FLA3, FLA4): The BMS calls this function to request the PE to send FLAs in bursts 1-4.

The BMS performs the following tasks to manage the partition allocation: calculation of the allocation for each RU, calculation of which partitions to add or delete from a RU, calculate the number of frames to wait until the actual add or delete will occur taking into account the time it takes to send repeated MAC messages, schedule a MAC message to be sent at least twice, and start the partition engine.

FIG. 94 shows examples of allocation changes for a CHANGE field based on the backlog for each RU. The backlog is the maximum of the reverse link queue depth and the forward link queue depth. The RU uses the extended header to send the reverse link queue depth. The total number of partitions allocated to a RU is a function of its backlog. One method is to make the number of partitions proportional to the ratio of the RU's backlog to the total of all of the RU's backlog. The CHANGE field is the difference between the new allocation and the previous allocation.

Specific partitions are then selected to be added or deleted from the RU. If the RU has a flow open with a RU and CHANGE is negative, then mark the partition for that RU to be deleted. If the RU does not have a flow with a RU and the CHANGE is positive, then mark the partition for that RU to be added. Only a limited number of additions can occur in a slot due to the number of FLA and FLI bursts. The order in which the RUs are selected for additions is randomized to ensure fairness. If several RUs are nearly in the same azimuthal direction from the base, then assign them to different partitions. The cross-correlation between the RU aperture of the RU to add to a partition and the RU apertures currently assigned to that partition can also be calculated, and if low, then the new RU is assigned to that partition and if high, the RU is assigned to a different partition.

The BMS also sends FLBs to each RU. The BMS arbitrates between sending a provisioned, ranging, and installation FLAs. The BMS gives voice a higher priority than data in allocating partitions.

As the distance between the RU and the base decreases, the RU advances its transmission time so that transmissions from all of the RUs arrive at the base at approximately the same time and within the base receive window that includes the samples to be transformed to the frequency domain. To start ranging, the RU chooses an initial power level based on the FLS signal strength and an initial timing, and sends the ranging RLA and waits for the ranging FLA. The wait time is the round trip time by default. If the ranging FLA is not received, RU adjusts its power and timing and repeats the process. It does this until it receives the ranging FLA or until it covers the entire power-time space a prescribed number of times. If this occurs, RU MAC issues a ranging failure signal. Each RU randomly chooses a ranging access code for each RLA transmission and FLA reception pair. If the RU receives the ranging FLA, it freezes the power and timing settings and sends its own RLA, provisioned or installation, to request a partition. Once a bearer channel is established, the base will correct the residual power and timing errors using the extended MAC header. Once the RU has determined its range from the base, the amount of transmission advancement is stored in non-volatile RU memory. The RU picks a power level and tries different timings in about 1 µs steps. If it covers the entire range without receiving a ranging FLA, it increases power level by 4 dB and repeats the time steps. For a 15 km cell radius, the range is 100 µs, which takes 600 slots or 2 seconds to cover the entire time range once. An alternative method of ranging is to use GPS to identify the position of the RU and the distance from the base when the RU is installed.

FIG. 95 gives the messages, states and actions of a base and RU for starting a normal flow. A probability of missing a particular type of message is indicated by Pm(message). A probability of falsely detecting a particular type of message is indicated by Pf(message). FIG. 95 shows a sequence of events starting with a base sending a FLI to initiate of a flow.

FIG. 96 gives the messages, states and actions of a base and RU for various error conditions that may occur during the start of a flow. Error conditions include missing or falsely detecting various messages.

Although the present invention has been described in terms of the presently preferred embodiments, it is to be understood that the disclosure is not to be interpreted as limiting. Various alterations and modifications will no doubt be come apparent to those skilled in the art after having read the above disclosure. Accordingly, it is intended that the appended claims are interpreted as covering all alterations and modifications as fall within the true spirit and scope of the invention.

What is claimed is:

1. A remote unit for communicating with a base station in a radio communication network, comprising:
   a receiver configured to receive a first signal and at least one data signal from the base station wherein the first signal comprises a bandwidth allocation message (BAM) and wherein the BAM comprises at least one of:
      the expected packet size of the at least one data signal,
      the receiver channel for receiving the at least one data signal, or
      the expected number of packets of the at least one data signal; and
   a transmitter configured to transmit weight training messages to the base station in response to the receiver receiving the first signal, wherein the transmitter is further configured to transmit an acknowledgement (ACK) message to the base station subsequent to the receiver receiving the at least one data signal.

2. The remote unit of claim 1, wherein the receiver is further configured to receive the BAM over a first channel.

3. The remote unit of claim 2, wherein the first channel comprises a forward link alert (FL-A) channel.

4. The remote unit of claim 3, wherein the receiver is further configured to receive the at least one data signal over a second channel.

5. The remote unit of claim 4, wherein the second channel comprises a forward link bearer (FLB) channel.

6. The remote unit of claim 1, wherein the transmitter is further configured to transmit the ACK message over a fourth channel.

7. The remote unit of claim 6, wherein the fourth channel is a reverse link bearer (RLB) channel.

8. The remote unit of claim 1, wherein the transmitter is further configured to transmit weight training messages over a third channel.

9. The remote unit of claim 8, wherein the third channel is a reverse link control (RL-C) channel.

10. The remote unit of claim 8, wherein the third channel is a reverse link bearer (RLB) channel.

11. The remote unit of claim 10, wherein the transmitter is further configured to transmit the acknowledgement (ACK) message to the base station over the third channel.

12. A base station for communicating with at least one remote unit in a radio communication network, comprising:
    a transmitter configured to transmit a first signal and at least one data signal to the at least one remote unit, wherein the first signal comprises a bandwidth allocation message (BAM) and wherein the BAM comprises at least one of:
       the expected packet size of the at least one data signal,
       the channel on which the transmitter will send the at least one data signal, or
       the expected number of packets of the at least one data signal; and
    a receiver configured to receive at least one second signal from the at least one remote unit subsequent to the transmitter transmitting the first signal, the at least one second signal comprising a weight training message, wherein the transmitter is further configured to use the weight training message to train transmit weights used by the transmitter to transmit the subsequent at least one data signal.

13. The base station of claim 12, wherein the transmitter is further configured to transmit the BAM over a first channel.

14. The base station of claim 13, wherein the first channel comprises a forward link alert (FL-A) channel.

15. The base station of claim 14, wherein the transmitter is further configured to transmit the at least one data signal over a second channel.

16. The base station of claim 15, wherein the second channel comprises a forward link bearer (FLB) channel.

17. The base station of claim 12, wherein the receiver is configured to receive an acknowledgment (ACK) message from the remote unit subsequent to the transmitter sending the at least one data signal.

18. The base station of claim 17, wherein the receiver is further configured to receive the ACK message over a fourth channel.

19. The base station of claim 18, wherein the fourth channel is a reverse link bearer (RLB) channel.

20. The base station of claim 12, wherein the receiver is further configured to receive the at least one second signal over a third channel.

21. The base station of claim 20, wherein the third channel is a reverse link control (RL-C) channel.

22. The base station of claim 20, wherein the third channel is a reverse link bearer (RLB) channel.

23. The base station of claim 20, wherein the receiver is configured to receive an acknowledgment (ACK) message from the remote unit over the third channel.

* * * * *